United States Patent [19]

Knapke et al.

[11] Patent Number: 4,513,414
[45] Date of Patent: Apr. 23, 1985

[54] CLOCKING ARRANGEMENT FOR TELEPHONE SWITCHING SYSTEM

[75] Inventors: Paul H. Knapke, Columbus; Robert L. Miller, Westerville, both of Ohio

[73] Assignee: International Telephone and Telegraph Corporation, New York, N.Y.

[21] Appl. No.: 370,930

[22] Filed: Apr. 22, 1982

[51] Int. Cl.³ .............................................. H04J 3/14
[52] U.S. Cl. ................................................... 370/58
[58] Field of Search ............................ 370/58; 371/61

[56] References Cited

U.S. PATENT DOCUMENTS

| | | | |
|---|---|---|---|
| 3,828,136 | 8/1974 | Perna et al. | 370/58 |
| 4,144,448 | 3/1979 | Pisciotta et al. | 371/61 |
| 4,256,926 | 3/1981 | Pitroda et al. | 370/58 |
| 4,276,637 | 6/1981 | Le Dieu | 370/58 |

OTHER PUBLICATIONS

M. Esperseth et al, "GTD-5 EAX, A Family of Digital Switches", GTE Automatic Electric Journal, Sep. 1979, pp. 150-154.
S. Anderes et al, "GTD-5 EAX—Digital Remote Units", GTE Automatic Electric Journal, Jan.-Feb. 1981, pp. 8-15.

Primary Examiner—Douglas W. Olms
Assistant Examiner—Wellington Chin
Attorney, Agent, or Firm—John T. O'Halloran; Jeffrey P. Morris; Thomas F. Meagher

[57] ABSTRACT

A line switch for a digital telephone switching system utilizes distributed processing. The line switch comprises one or more switch modules. Each switch module is coupled to a central office switching system via one or more PCM lines which utilize common channel signaling. Each switch module comprises groups of line circuits, each line circuit being coupled to a subscriber line. Three separate distributed processor functions are provided in each line switch module. A first processor is utilized to communicate with the central office switching system and to coordinate the operations within the line switch module. A second processor is provided to control clock generation and rate conversion circuits. Each group of line circuits includes a third processor to control the operations of the line circuits and to gather information from the line circuit.

The second processor is used to select which of a plurality of sources may be used to provide clock signals within the line switch module.

28 Claims, 80 Drawing Figures

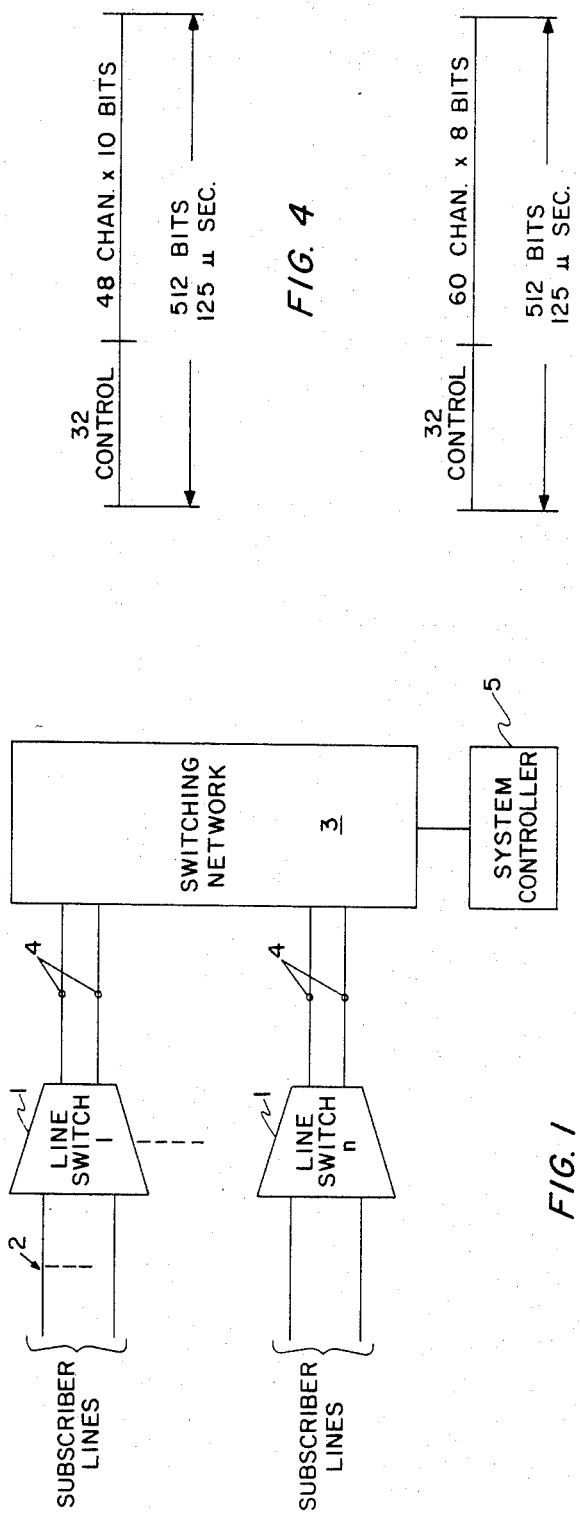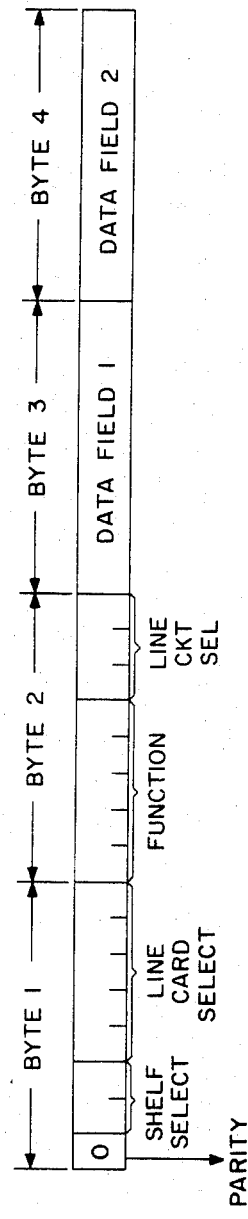

| LINE SWITCH CONFIGURATION | TRAFFIC | |
|---|---|---|
| | 24 CHANNEL | 32 CHANNEL |
| 160 SUBSCRIBER LINES — MODULE 1a / MODULE 1b — PCMA, PCMA — 160 SUBSCRIBER LINES | 32.2E TOTAL .1E./LINE | 42.3E TOTAL .132 E/LINE |
| 160 SUBSCRIBER LINES — MODULE 1a / MODULE 1b — PCMA, PCMB, PCMA — 160 SUBSCRIBER LINES | 52.7E TOTAL .164 E./LINE | 68.6E TOTAL .214 E./LINE |
| 160 SUBSCRIBER LINES — MODULE 1a / MODULE 1b — PCMA, PCMB, PCMA, PCMB — 160 SUBSCRIBER LINES | 73.9E TOTAL .23 E./LINE | 95.5E TOTAL .298E./LINE |

FIG. 3

| LINE SWITCH CONFIGURATION | TRAFFIC | |
|---|---|---|
| | 24 CHANNEL | 32 CHANNEL |
| 160 SUBSCRIBER LINES / 192 SUBSCRIBER LINES — MODULE 1a — PCMA — MODULE 1c — MODULE 1b — PCMA / 160 SUBSCRIBER LINES | 32.2E TOTAL .063E/LINE | 42.3E TOTAL 0.83E/LINE |
| 160 SUBSCRIBER LINES / 192 SUBSCRIBER LINES — MODULE 1a — PCMA, PCMB — MODULE 1c — MODULE 1b — PCMA / 160 SUBSCRIBER LINES | 52.7E TOTAL .103E/LINE | 68.6E TOTAL |
| 160 SUBSCRIBER LINES / 192 SUBSCRIBER LINES — MODULE 1a — PCMA, PCMB — MODULE 1c — MODULE 1b — PCMA, PCMB / 160 SUBSCRIBER LINES | 73.9E TOTAL .144E/LINE | 95.5E TOTAL .186E/LINE |

FIG. 3A

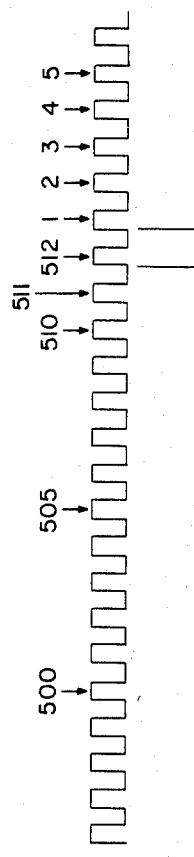
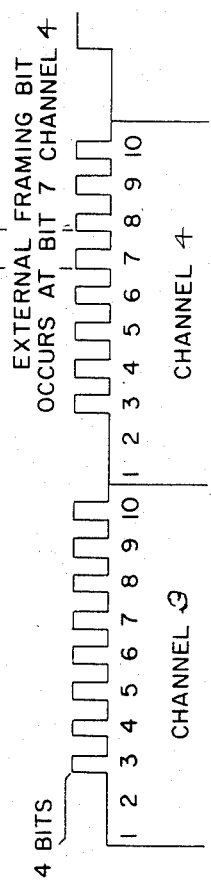
FIG. 24
FIG. 24B

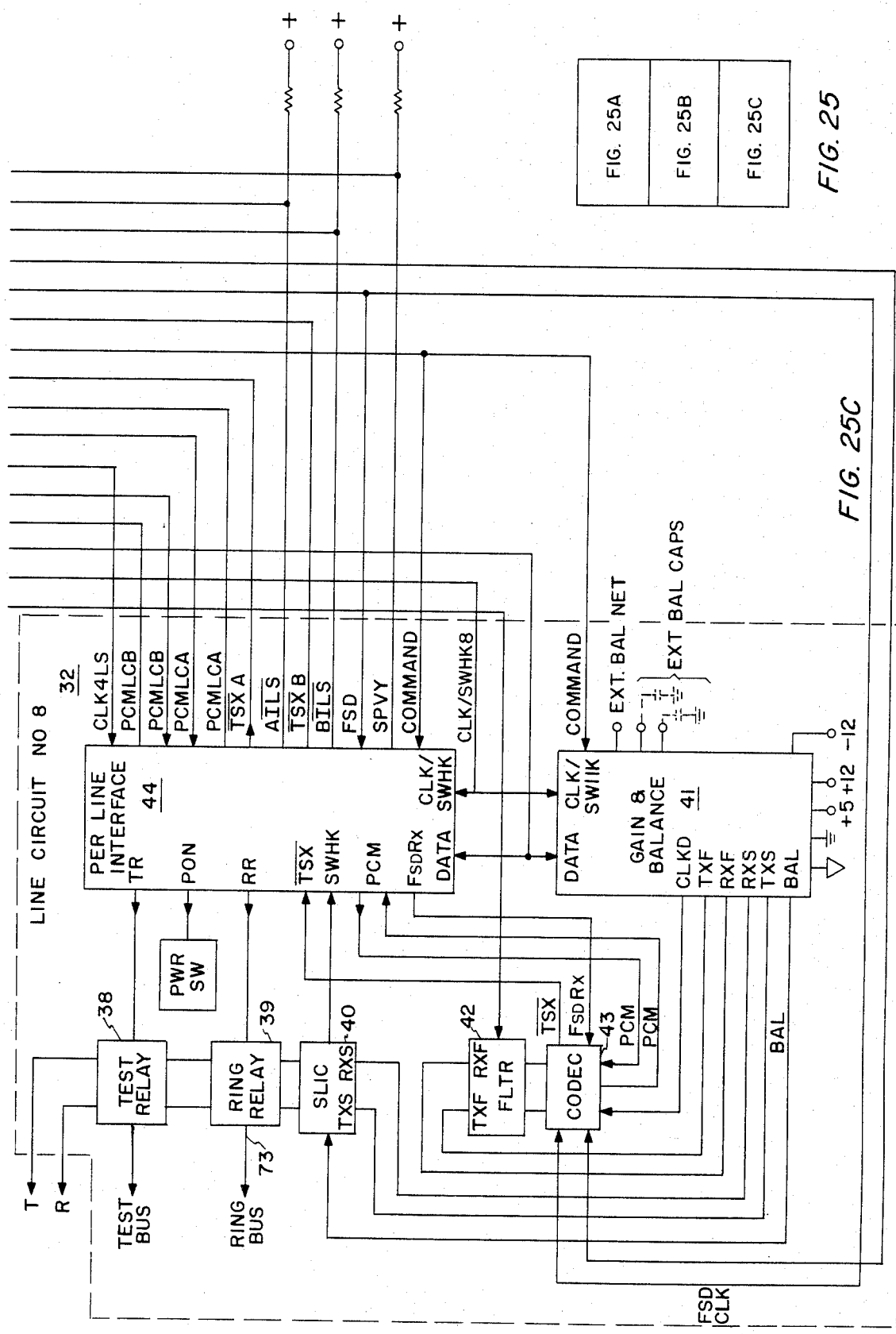

PER-LINE INTERFACE CONTROL FORMAT

| BIT 0 | 1 | 2 | 3 | 4 | 5 | 6 | 7 | 8 | 9 | 10 | 11 |
|---|---|---|---|---|---|---|---|---|---|---|---|
| R/W | ADDRESS | | | N/A | EURO. SEL. | POWER | TR | RR | LC ENA. | ILS | Ā/B SEL. |

(12 BITS)

*FIG. 26*

GAIN-BALANCE CONTROL FORMAT

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| R/W | ADDRESS | | | CLK +/- | ✗ | ✗ | ✗ | LINE BALANCE | | | | Rx GAIN SETTING | | | | | | | | Tx GAIN SETTING | | | | | | | |

← 4 BITS → ← 8 BITS → ← 8 BITS →

*FIG. 28*

CODEC CONTROL FORMAT

| 0 | 1 | 2 | 3 | 4 | 5 | 6 | 7 | 8 | 9 | 10 | 11 |
|---|---|---|---|---|---|---|---|---|---|---|---|
| R/W | ADDRESS | | | CODEC MODE | | CHANNEL ASSIGNMENT | | | | | |

| BIT 1 | BIT 2 | MODE |
|---|---|---|
| 0 | 0 | Tx & Rx CHANNEL |
| 0 | 1 | Tx CHANNEL |
| 1 | 0 | Rx CHANNEL |
| 1 | 1 | STANDBY |

*FIG. 29*

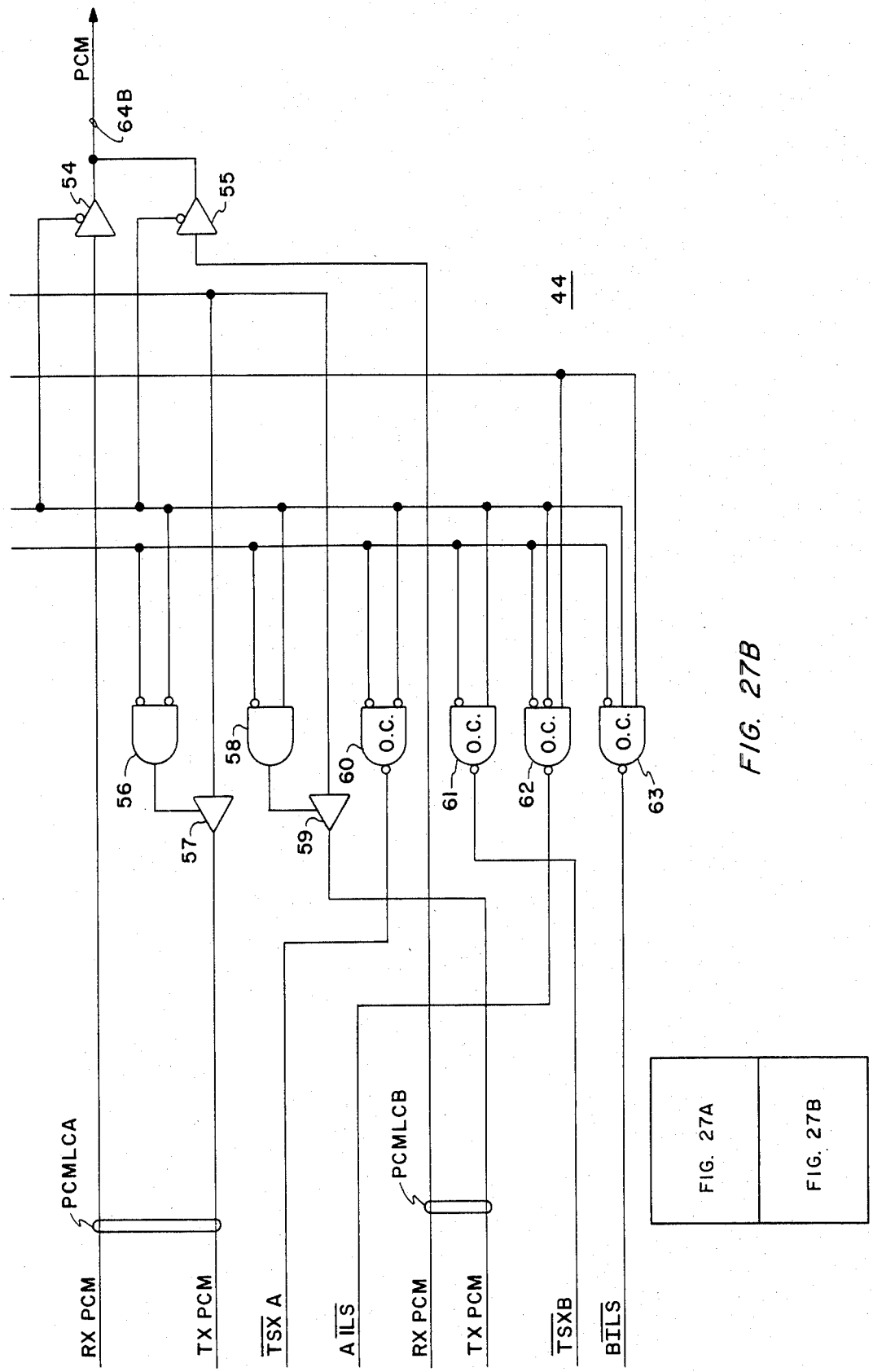

|  | 'A' CONTROL WORD REGISTER CONTENTS (HEX) | | | | 'B' CONTROL WORD REGISTER CONTENTS (HEX) | | | |
|---|---|---|---|---|---|---|---|---|
| FRAMES AFTER START OF TEST | BYTE 1 | BYTE 2 | BYTE 3 | BYTE 4 | BYTE 1 | BYTE 2 | BYTE 3 | BYTE 4 |
| 0 | 63 | C1 | F8 | 0F | XX | XX | XX | XX |
| 1 | 07 | E0 | 3D | 8F | 07 | E0 | 3D | 8F |
| 2 | 80 | F6 | 3C | 1F | 80 | F6 | 3C | 1F |
| 3 | D8 | F0 | 7E | 03 | D8 | F0 | 7E | 03 |
| 4 | C1 | F8 | 0F | 63 | C1 | F8 | 0F | 63 |
| 5 | E0 | 3D | 8F | 07 | E0 | 3D | 8F | 07 |
| 6 | F6 | 3C | 1F | 80 | F6 | 3C | 1F | 80 |
| 7 | F0 | 7E | 03 | D8 | F0 | 7E | 03 | D8 |
| 8 (FINAL DATA) | F8 | 0F | 63 | C1 | F8 | 0F | 63 | C1 |

MATCHES DATA LOADED INTO FIXED ADDRESS REGISTER AT START OF TEST

FIG. 33

```
VERIFIES SHIFT OPERATION OF 'A' & 'B' CONTROL WORD REGISTERS
USING THE TEST DATA FEEDBACK FEATURE OF THE PIC.

INITIALIZE MODE REGISTER (PIC INTERNAL REG. LOCATION 0DH)
        MOV     R0,#0DH
        MOV     R,#8BH
        MOVX    CR0,A   ; WRITE 8BH INTO MODE REG.

LOAD 'A' CONTROL WORD REG. WITH TEST DATA
        MOV     R0,#0EH
        CLR     A
        MOVX    CR0,A   ; WRITE 0 INTO PIC CONTROL REG. POINTER (CRP)
        INC     R0      ; R0 POINTS TO CCRP (PIC INTERNAL REG. LOCATION 0FH)
        MOV     R5,#63H ; C/R TEST DATA BYTE 1 (R5)
        MOV     R4,#0C1H; C/R TEST DATA BYTE 2 (R4)
        MOV     R3,#0F8H; C/R TEST DATA BYTE 3 (R3)
        MOV     R2,#0FH ; C/R TEST DATA BYTE 4 (R2)

MOV     R1,#5   ; INITIALIZE TEST DATA BYTE POINTER (R1)
        MOV     R7,#4   ; INITIALIZE TEST DATA BYTE COUNTER (R7)

LOOP 1: MOV     A,CR1   ; FETCH NEXT BYTE OF TEST DATA
        MOVX    CR0,A   ;   AND WRITE IT INTO NEXT BYTE OF 'A' C/R
        DEC     R1      ; ADJUST TEST DATA POINTER
        DJNZ    R7,LOOP1; REPEAT LOOP 1 FOR ALL 4 TEST DATA BYTES

LOAD FIXED ADDRESS REGISTER WITH C/R BYTE 3 TEST DATA
        MOV     R0,#08H ; PIC FIXED ADDRESS REG. INTERNAL ADDR.
        MOV     A,R3
        MOVX    CR0,A

INITIALIZE FRAME COUNTER AND START DYNAMIC TEST
        STOP    TCNT
        MOV     A,0F6H  ; -10 IN 2'S COMPLEMENT
        MOV     T,A
        JTF     $+2     ; RESET TIMER FLAG
        STRT    CNT

LOOP 2: MOV     A,T
        ADD     A,#8
        JNZ     LOOP 2  ; REPEAT LOOP 2 UNTIL FRAME COUNT REACHES 0F8H (-8)

MOV     R0,#0DH
        MOV     A,#8FH   ; WRITE 8FH INTO MODE REGISTER (SET CONTROL SHIFT ENR)
        MOVX    CR0,A    ; ENABLE SELF-TEST CONTROL SHIFTING
```

FIG. 34

```
WAIT FOR 8 FRAMES TO PASS (TF=1), I.E. LET C/R CYCLE THRU 8 TIMES
                                     42 CLOCK PULSES PER FRAME
LOOP 3:  JTF    $+4        ; SKIP NEXT INSTRUCTION WHEN TIMER FLAG (TF) = 1
         JMP    LOOP 3

DISABLE CONTROL REGISTER SHIFTING
         CLR    A
         MOVX   CR0,A      ; WRITE 0 INTO MODE REGISTER

VERIFY THAT BOTH 'A' & 'B' CARD ADDRESS COMPARATORS INDICATE
   AN ADDRESS MATCH OCCURRED AFTER 8 FRAMES
         MOV    R0,#0CH    ; PIC INTERNAL REG. ADDRESS OF STATUS REGISTER
         MOV    A,CR0      ; FETCH STATUS BYTE
         CPL    A
         JB0    CFAIL      ; JUMP TO ERROR ROUTINE (CFAIL) IF ADDRESS MATCH
         JB1    CFAIL      ;   IS NOT INDICATED BY EITHER CARD ADDRESS COMPARATOR

VERIFY CONTENTS OF 'A' & 'B' CONTROL WORD REGS. MATCH EXPECTED CONTENTS
         MOV    A,R5
         XCH    A,R3       ; 63H EXPECTED IN C/R BYTE 3 (R3)
         XCH    A,R5       ; F8H EXPECTED IN C/R BYTE 1 (R5)
         MOV    A,R4
         XCH    A,R2       ; C1H EXPECTED IN C/R BYTE 4 (R2)
         XCH    A,R4       ; 0FH EXPECTED IN C/R BYTE 2 (R4)

MOV    R0,#0FH    ; PIC INTERNAL ADDR. OF CCRP

MOV    R6,#2
LOOP 4:  MOV    R1,#5      ; INITIALIZE TEST DATA BYTE POINTER
         MOV    R7,#4      ; INITIALIZE TEST DATA BYTE COUNTER

LOOP 5:  MOVX   A,CR0      ; FETCH NEXT C/R DATA BYTE
         XRL    A,CR1      ;   & COMPARE WITH EXPECTED DATA
         JNZ    CFAIL      ; JUMP TO ERROR ROUTINE (CFAIL) IF ANY DATA MIS-MATCH
                           ;   IS DETECTED
         DEC    R1         ; ADJUST TEST DATA POINTER
         DJNZ   R7,LOOP5   ; REPEAT LOOP 5 FOR ALL 4 BYTES OF C/R

DJNZ   R6,LOOP4   ; REPEAT LOOP 4 FOR BOTH 'B' & 'A' C/R'S

END OF PIC DYNAMIC OPERATION TEST
```

FIG. 35

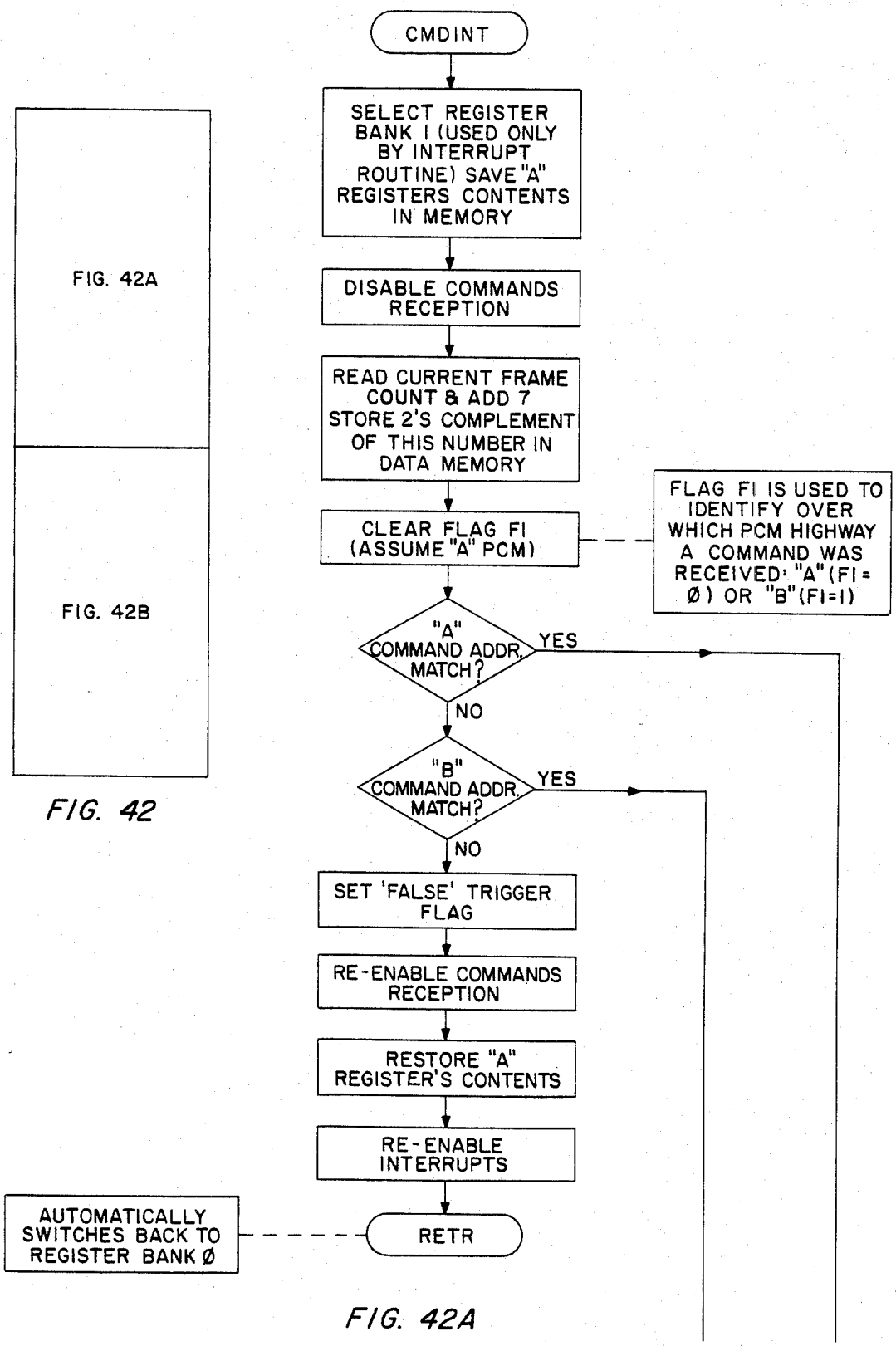

CLOCKING ARRANGEMENT FOR TELEPHONE SWITCHING SYSTEM

BACKGROUND OF THE INVENTION

This invention pertains to telephone switching systems in general, and to clock circuits for distributed control digital telephone switching systems in particular.

The ITT1210 is an advanced digital switching system manufactured in the United States by International Telephone and Telegraph Corporation. The ITT 1210, which was priorly identified as DSS-1, is described by C. G. Svala, "DSS-1, A Digital Local Switching System With Remote Line Switches", National Telecommunications Conference, 1977, pp. 39: 5-1 to 39: 5-7. As described by C. G. Svala, the ITT 1210 comprises three basic elements, i.e., line switches, a switching network, and a system control. A line switch interfaces with subscriber lines and to one or more PCM (pulse code modulation) lines. A line switch may be co-located with the switching network or may be located remoted therefrom. The switching network coupled to the line switches by the PCM lines comprises a number of digital switching modules called switch groups each of which includes a time-space-time network. The system control includes a pair of processors with associated program and data memories. The system control directs the operation of the switching network and the line switches. Communication of control information between the system control and a line switch is via a common channel superimposed on each PCM line. This common channel approach is described in U.S. Pat. No. 4,125,743, issued Nov. 14, 1978 to R. E. Steidl and assigned to a common assignee.

A large percentage of the equipment costs in a digital switching systems is attributable to the line switches. Also the line switch design determines the transmission performance per subscriber line, traffic handling and line signaling functions of the switching system.

It is therefore desirable to provide an improved line switch having a low cost per subscriber line and improved transmission performance.

SUMMARY OF THE INVENTION

In accordance with the principles of the invention, a line switch is provided which has a low cost per subscriber line and improved transmission performance.

In an embodiment of the invention, a line switch comprises one or more line switch modules. Each module can terminate one or more PCM lines and each module interlaces PCM data from the PCM lines onto an internal PCM bus structure that operates at a higher data rate and has a greater number of channels per frame. Each line circuit of a module has access to all the channels of the internal PCM bus structure. Further, in accordance with the invention, a distributed processing control arrangement is provided wherein subscriber lines are arranged in groups and the line circuits associated with a group are controlled by a line group controller. A line switch processor contained in each line switch module is provided for communicating with the system control and for directing the operation of the line group controllers.

In accordance with one aspect of the invention, the internal PCM bus structure serves the dual functions of distributing time multiplexed PCM voice channels data and control data throughout the line switch. All control data exchanged between the line switch controller and the line group controller or any other circuit module is transmitted over the internal PCM bus structure. Thus, expansion of a module is easily accomplished by adding additional line circuit groups or other circuit modules and extending the PCM bus thereto.

Further, in accordance with the invention each line switch controller and line group controller includes a multifunctional interface circuit which provides an interface between a microcomputer and the internal PCM bus structure.

An illustrative embodiment of the invention is a line switch having one or more line switch modules each terminating one or more PCM lines which are connected to the system network. Each line switch module includes a line switch controller which communicates with the system controller via a common channel signaling arrangement over the PCM lines. The line switch controller directs the operation of the various circuits within the line switch module. Each PCM line carries frame organized PCM voice channels with "X" channels per frame. The internal PCM bus structure is arranged such that 2X channels are provided per frame. A rate converter circuit is provided for interlacing PCM channels from two lines onto the PCM bus structure and for demultiplexing PCM channels on the PCM bus structure to the PCM lines.

More specifically, a receive rate converter comprises memory into which PCM data from the PCM lines are stored at the PCM line rate. The memory is read at the PCM bus structure rate in such a fashion that PCM voice channels data from the two PCM lines is alternately applied to the PCM bus structure, i.e. first the PCM data for one channel from one PCM line is read and then the PCM data for one channel of the other PCM line is read. A transmit rate converter likewise comprises memory into which PCM voice channel data from the internal PCM bus structure is stored at the PCM bus structure rate. The stored PCM voice channel data is read from the memory at the rate of the PCM line such that the stored PCM voice channels are read and alternately applied to the two PCM lines.

Additionally, the rate converter includes clock generator and phase-locked loop circuitry. The phase-locked loop permits clock signals which are generated in a line switch module to be in phase-locked synchronism with either of the PCM lines. When two or more line switch modules are connected together to form a line switch, the phase-locked loop circuits of each module will utilize the same PCM line for phase-locking.

Buffer and distributor circuits are interposed in the PCM bus structure. One function the buffer and distributor circuits provide is that of connecting the PCM bus structure of the various line switch modules in a line switch. The buffer and distributor circuits include gates which permit intra-line switch calls to be connected within the line switch without utilizing the system switching network.

Further, in accordance with the principles of this invention, an arrangement is provided for automatic setting of the line circuits gain.

A further aspect of the invention is the provision of another interface circuit for interfacing each line circuit to its respective line group controller and to the PCM buses.

BRIEF DESCRIPTION OF THE DRAWINGS

Above-mentioned and other features and objects of this invention will become more apparent by reference to the following description taken in conjunction with the accompanying drawing, in which:

FIG. 1 illustrates in block diagram form a digital switching system in accordance with the principles of the present invention;

FIGS. 3 and 3A illustrate the traffic handling capability of the line switch of FIGS. 2 and 2A;

FIG. 4 illustrates the format of PCM frames that can be employed in the system of FIG. 1;

FIG. 5 illustrates an alternate PCM frame format that can be employed in the system of FIG. 1;

FIGS. 9F–9N are flow charts illustrating the operation of the line switch controller 7 of FIG. 9E;

FIGS. 24A and 24B when arranged as shown in FIG. 24 are timing diagrams in the buffer and distributor 9 of FIG. 22;

FIGS. 25A, 25B and 25C when arranged as shown in FIG. 25 illustrate in block diagram form a line circuit group in accordance with the principles of the present invention;

FIG. 26 illustrates a command word format;

FIGS. 27A and 27B when arranged as shown in FIG. 27 illustrate in block diagram form the per line control interface 44 of FIG. 25;

FIG. 28 illustrates the format of a control word directed to the per line control interface 44;

FIG. 29 illustrates the format of a control word directed to CODEC 43 of FIG. 25;

FIG. 31 illustrates the format of a control word transmitted over buses PCMLCA, PCMLCB;

FIG. 33 illustrates the register status of interface 33 during a self-test operation;

FIGS. 34 and 35 are flow charts of the self-test operation of interface 33;

FIGS. 42A and 42B when arranged as shown in FIG. 42 and FIGS. 43A and 43B when arranged as shown in FIG. 43 are flow charts of programs for the line group processor 34.

DETAILED DESCRIPTION

Figure 2:
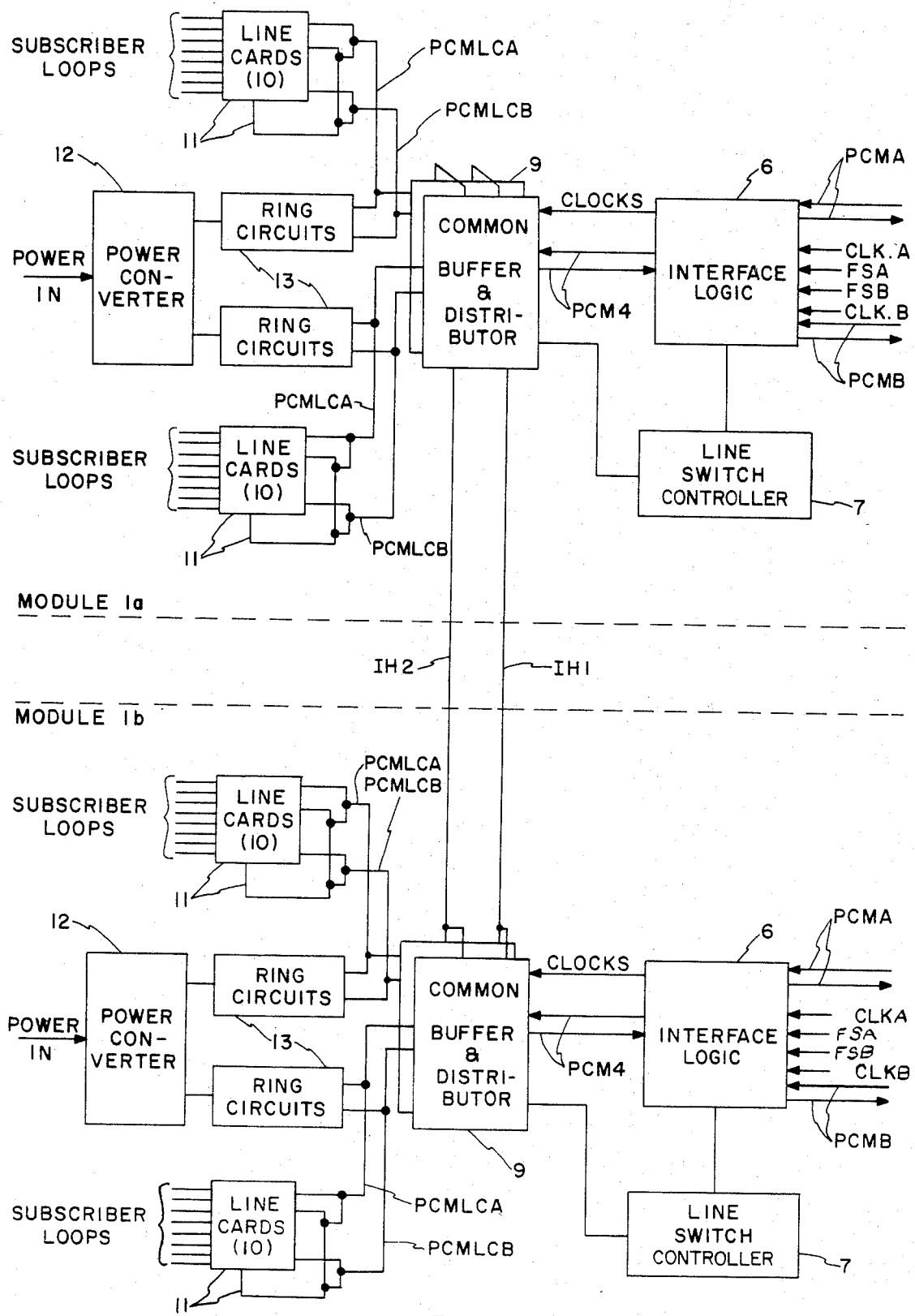
FIGS. 2 and 2A illustrate in block diagram form two embodiments of a line switching comprising two line modules employed in the system of FIG. 1.
Figure 2A:
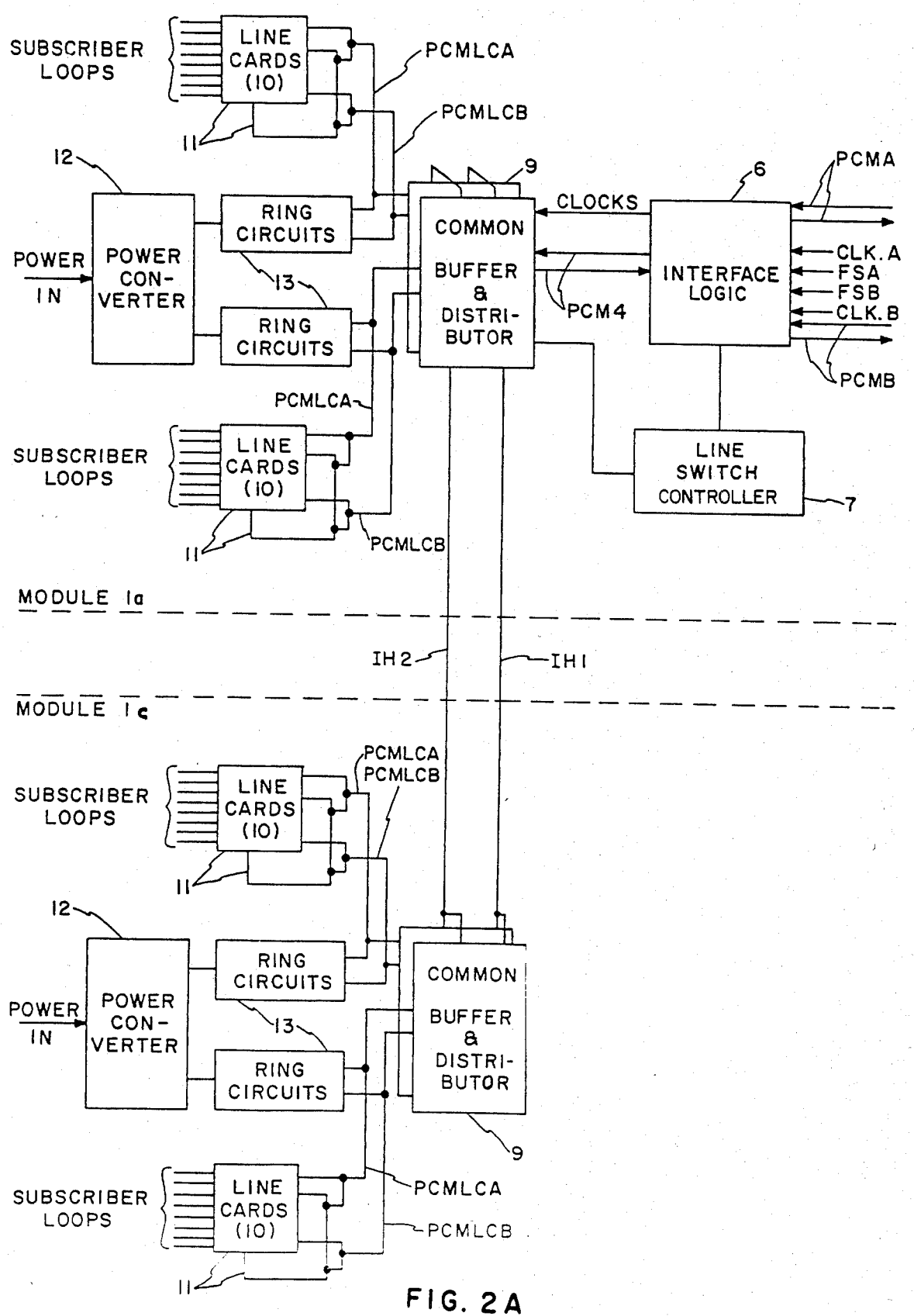

1. GENERAL (FIGS. 1 and 2)

The stored program controlled switching system of FIG. 1 is a PCM-TDM digital switching system which includes a switching network 3 controlled by a system controller 5. A more detailed description of the system controller 5 and the switching network 3 is provided in the aforementioned C. G. Svala reference. The system further includes "n" line switches 1 each serving a number of subscriber lines 2. Each line switch is coupled to the switching network 3 via one or more PCM lines 4. PCM transmission between the line switches 1 and the switching network 3 takes place over the PCM lines 4. Each PCM line 4 includes, as is well understood, a path for PCM transmission from the switching network 3 to a line switch 1 and a second path for PCM transmission from a line switch 1 to the switching network 3. Each PCM line 4 carries frame-organized data or speech at any conventional rate. Operation of the line switches 1 are controlled by the system controller 5. In one illustrative embodiment of the invention, a common channel signaling arrangement such as that taught in U.S. Pat. No. 4,125,743 issued Nov. 14, 1978 to R. E. Steidl is utilized such that control information between the system controller 5 and the line switches 1 is transmitted over the PCM lines 4. Typical information is sent by a line switch to the system controller 5 including the following:

1. Report of line seizures which the line switch has detected; and
2. Report of a fault detected in the line switch.

Typical commands sent by the system control 5 to a line switch include the following:

1. Request for assignment of a subscriber line to a channel or release of a line from a channel;
2. Request for ringing to a line;
3. Request for maintenance functions to be performed; and
4. Request for party test to identify the party on the line.

FIG. 2 illustrates one of the line switches in greater detail.

Reliability of operation and flexibility in expansion is provided by organizing the circuits of each line switch in clusters or "security blocks" of circuits that function as a unit. For any single fault, only the group of circuits within the security block containing the fault may be lost to service. Thus, a single fault will not cause a loss of service to the entire line switch. As will be evident to those skilled in the art, the various circuits in the illustrative line switch described herein may be organized without the security block arrangement shown or the size of the various security blocks may be changed.

In accordance with the security block organization of the line switch, the illustrative line switch is organized as two identical line switch modules. Each line switch module is self contained to the extent that it can operate as a line switch for a number of subscriber lines.

A further aspect of the novel line switch is that distributed processing is advantageously utilized. Three separate distributed processor functions are provided in each line switch module. First, one processor is utilized to communicate with the system controller 5 of FIG. 1 and to coordinate the operations within the line switch module. A second processor is provided within a line switch module to control clock generation and rate conversion circuits. A third processor is provided for a group of line circuits to control the operations of the line circuits and to gather information from the line circuits.

A further aspect of the line switch architecture is that an internal busing arrangement is provided wherein both control and PCM data are routed throughout the line switch. With this arrangement, a standardized interface between each processor and the PCM bus may be provided.

In addition to having the capability for establishing connections between subscriber lines connected to the line switch and the switching network 3, the present line switch has the capability of establishing intra-line switch connections without the switching network 3.

In accordance with the aforementioned security block organization the line switch 1 is organized as two identical line switch modules 1a, 1b. Each of the line switch modules 1a, 1b is self-contained to the extent that it can operate as a line switch and is connectable to up to 160 subscriber lines or loops. The 160 lines associated with a module are arranged as two clusters of lines. Each cluster is in turn divided into 10 groups of lines, each group includes 8 lines and in the illustrative embodiment each group of 8 lines has its associated line circuits arranged on one circuit card. It should be noted, that in other embodiments, a group may contain more or less lines and the lines may be arranged in one or more clusters.

Each line switch module 1a, 1b is coupled to the switching network 3 of FIG. 1 via two PCM lines PCMA, PCMB; bit clock lines CLKA, CLKB; and frame clock lines FSA, FSB. The PCM lines PCMA, PCMB operate at a 1.544 mbs. rate carrying 24 voice channels in a frame in the North American network or at a 2.048 mbs. rate carrying 30 voice channels in a frame in European and many foreign networks. Although two PCM lines are shown, the line switch module may be connected to only one PCM line.

The frame clock lines FSA, FSB each provide a 4 kHz signal from the switching network 3 of FIG. 1 and each is used to identify which incoming bit is a common channel signaling bit. The common channel signaling bits occur in the 193rd bit position of every other frame. The intermediate 193rd bits are synchronization bits and are used to determined the A and B signaling frames.

The bit clock lines CLKA, CLKB each provide a 1.544 mHz clock.

The interface logic 6 operates to derive various clocking signals for use in the line switch module. More significantly, interface logic 6 multiplexes and interlaces the PCM channels from the two PCM lines PCMA, PCMB onto bus PCM4 and demultiplexes and separate PCM channels from bus PCM4 to the PCM lines PCMA, PCMB. More specifically, the bus PCM4 operates at a 4.096 mbs. rate. Data transmitted over bus PCM4 is arranged in frames of 512 bits, 480 of which are used for PCM. If the lines PCMA, PCMB operate at a 1.544 mbs. rate with 24 channels per frame, the channels on the lines PCMA, PCMB will be interlaced and rate converted to provide 48 channels each 10 bits wide at a 4.096 mbs rate on bus PCM4. If the lines PCMA, PCMB operate at a 2.048 mbs rate with 30 channels per frame, they will be interlaced and rate converted to provide 60 channels each 8 bits wide at a 4.096 mbs. rate on bus PCM4. The remaining thirty two bits of each 512 bit frame on PCM4 are used for internal control of the line switch module.

The line switch controller 7 receives common channel commands from the system controller 5 of FIG. 1 over the PCM lines PCMA, PCMB and via the interface logic 6. The line switch controller 7 communicates with and controls the various circuits of the line switch module via bus PCM4 by utilizing the aforementioned 32 bits.

Buffer and distributor circuits 9 are connected to the bus PCM4 and serve to buffer PCM signals between the bus PCM4 and the line cards 11, ring circuits 13, and other circuits. Two buffer and distributor circuits 9 in each line switch module are provided to partition the PCM buses into segments, i.e., security blocks, which are isolated from each other to prevent propagation of faults in the line switch and the impact of faults in a group of lines upon all other lines in the line switch. Both buffer and distributor circuits in a line switch module contain identical circuitry for buffering and distributing PCM signals and each is connected to one of two clusters of line circuits. Additionally, the buffer and distributor circuits 9 provide buffering to the PCM buses in the other line switch modules of the line switch. Thus, each line switch controller 7 has access to all the line circuits in both line switch modules of a line switch and PCM signals may be coupled to all circuits in a line switch. The buffer and distributor circuits 9 includes gating circuits which provide for intra-line switch calls between any two line circuits within the line switch without the need to route the calls through the switching network 3 of FIG. 1. Additionally, one of the buffer and distributors 9 of a line switch module includes circuitry for deriving various clocking signals from the various clock lines CLKA, CLKB, FSA and FSB.

Each buffer and distributor 9 is coupled to all the line and other circuits in a cluster by two PCM buses PCMLCA, PCMLCB each of which runs at a 4.096 mHz rate. One of the PCM buses, e.g. PCMLCA of line switch module 1a, is derived directly from the bus PCM4 in the same line switch module. The other of the PCM buses, e.g. PCMLCB of line switch module 1b, is derived from the bus PCM4 of the other module. In the North American Network each bus PCMLCA, PCMLCB will have 48 PCM channels at a 4.096 mHz rate. Thus each line circuit will have access to 96 PCM channels in the line switch.

As pointed out hereinabove, each group of 8 line circuits is arranged on a single circuit card. Each of group circuits is controlled by a microprocessor which is in turn controlled by the line switch controller 7 via the 32 control bits available during each frame. By providing a microprocessor on each line card the work load on the line switch controller 7 is reduced, flexibility of application is obtained, and maintenance functions may be more easily provided.

Ring cards or circuits 13 are provided in the line modules. The ring cards 13 also include microprocessors which reside on the ring cards. The ring cards contain their own ring frequency generator and a ring card is controlled by the line switch controller 7 via the 32 control bits available during each fame. Timing of the ringing is done via the microprocessors which reside on each line card and on each ring card.

Each line module also includes a power converter 12.

2.0 TRAFFIC HANDLING CAPACITY (FIG. 3)

The line switch shown in FIG. 2 can as noted above be configured such that each line switch module 1a, 1b is connected to the switching network 3 of FIG. 1 by one or more PCM lines PCMA, PCMB. Also, the line switch may be operated as either a 24 or 32 channel system. FIG. 3 illustrates the traffic handling capability of the line switch of FIG. 2 for different numbers of PCM lines in 24 or 32 channel systems.

3.0 PCM BUSES (FIGS. 4,5,6 and 7)

Each of the PCM buses PCMLCA, PCMLCB and PCM4 in the line switch of FIG. 2 carries information in frames of 125 microsec. in duration. One frame comprises 512 bits. Two alternate arrangements for formatting the 512 bit frame are shown in FIGS. 4 and 5 which may be found on the same sheet as FIG. 1. If the line switch is to be used in a 24 channel system, the frames will be arranged as shown in FIG. 4. Forty-eight channels of 10 bits each and 32 additional bits which are utilized as control bits for control of internal line switch functions are provided. By providing 10 bit channels, the line switch may be readily utilized in integrated digital switches proposed for the future wherein each channel will be arranged as shown in FIG. 5. FIG. 5 shows each frame arranged as sixty 8-bit channels and 32 control bits. Other formats may easily be utilized for use in other systems.

Figure 6:
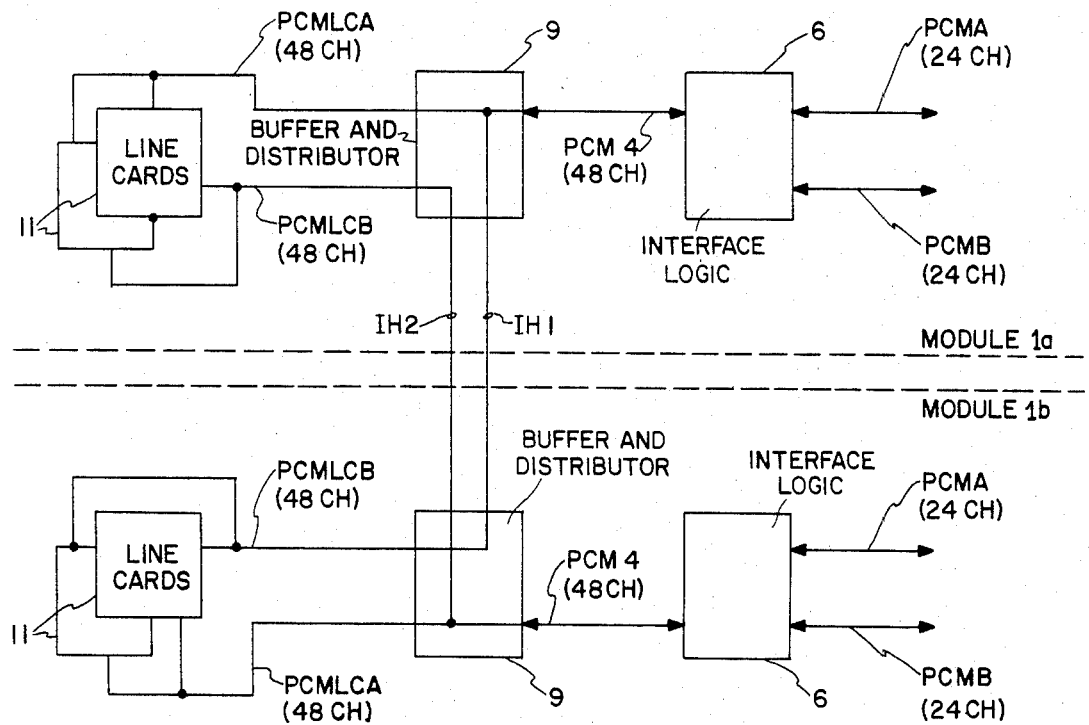
FIG. 6 illustrates in a general form the distribution of PCM channels within the two line modules of FIGS. 2 and 2A.

FIG. 6 illustrates the distribution of PCM channels in the line switch of FIG. 2 when used in a 24 channel system. To further simplify an understanding of the PCM channel distribution, only one cluster of line groups 11 and only one buffer and distributor 9 is shown for each line switch module 1a, 1b. The format of FIG. 4 is utilized. In each line switch module 1a, 1b two 24 channel, 1.544 mHz PCM lines PCMA, PCMB are connected to the interface logic 6. The interface logic 6 provides rate conversion and interlacing between the PCM lines PCMA, PCMB and the 48 channel, 4.096 mHz bus PCM4. The buffer and distributor 9 of each line module connects bus PCM4 to a 48 channel 4.096 mHz bus PCMLCA within the same module and via an inter highway bus IH1 or IH2 to a 48 channel, 4.096 mHz bus PCMLCB in the other module.

Therefore, each line circuit has access to a total of ninety-six 10 bit channels since PCMLCA and PCMLCB are each 48 channel buses. Further, with this configuration each line circuit has access to the two 24 channel PCM lines PCMA, PCMB in the same module and also to the two 24 channel PCM lines PCMA, PCMB in the other module.

Figure 7:
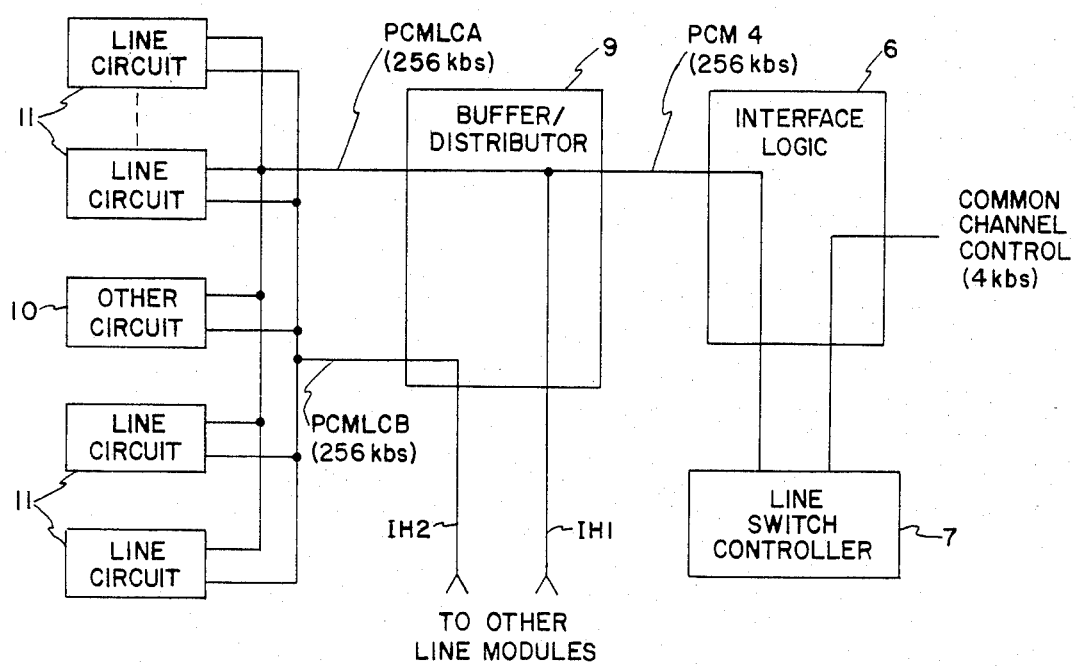
FIG. 7 illustrates in a general form the control communication paths within the line switch of FIG. 2.

As pointed out hereinabove, the line switches 1 are controlled by the system controller 5 of FIG. 1. The line switch controllers 6, in turn control the operation of the line circuits 11 and other circuits within a line switch. Turning now to FIG. 7, the line switch controller 7 communicates with the system controller 5 via a common channel signaling arrangement over the PCM lines PCMA, PCMB as described in the aforementioned R. E. Steidl patent. If it is assumed that the PCM lines operate at a 1.544 mHz rate and one common channel signaling bit is provided in every other frame, then the common signaling channel operates at a 4 kbs rate, i.e. 1 bit/2 frames×8000 frames/sec=4 kbs. The buses PCM4, PCMLCA, PCMLCB are used to transmit 32 bits of control data per frame, each frame being 125 microsec. in duration. The buses PCM4, PCMLCA, PCMLCB operate as 256 kbs control data channels, i.e., 32 bits/frame×8000 frames/sec=256 kbs. A line switch controller 7 thus provides a common 256 kbs. control channel to each line circuit 11 or other circuit (which may be the ring circuit 13 or power converter circuit 12 of FIG. 2) via buses PCM4 and PCMLCA in a line switch module and additionally provides via bus IH1 or IH2 the same 256 kbs control data channel to other line switch modules in a line switch. Furthermore, bus IH2 or IH1 via bus PCMLCB provides a 256 kbs control channel from the other line switch modules in a line switch to the line circuits of the line switch module shown in FIG. 7.

4.0 INTERFACE LOGIC 6 (FIG. 8)

4.1 GENERAL

Figure 8:
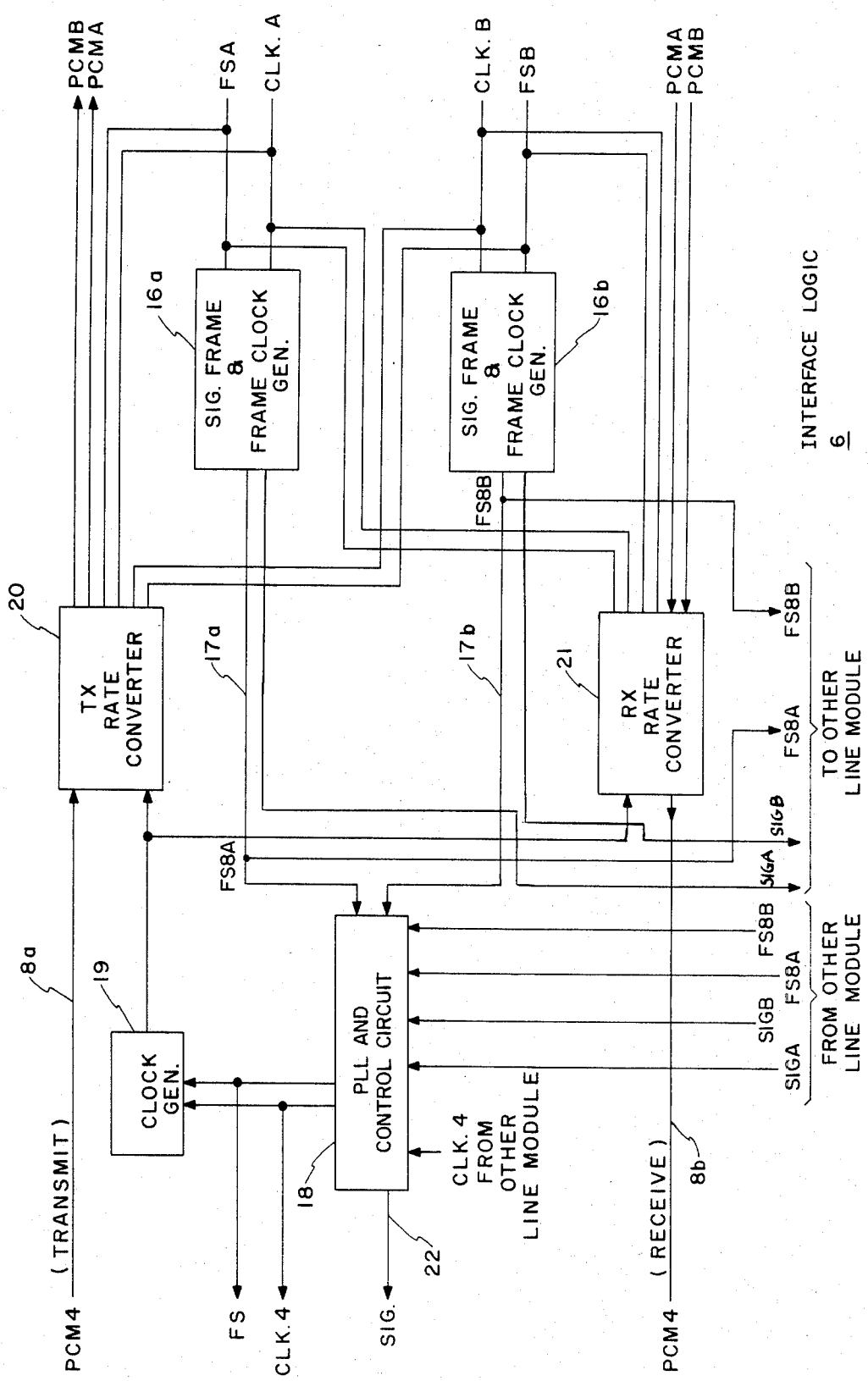
FIG. 8 illustrates in block diagram form the interface logic 6 of FIG. 2.

The interface logic 6 shown in block diagram form of FIG. 8 provides rate conversion and interlacing/demultiplexing of data between the two PCM lines PCMA, PCMB and the bus PCM4 and other PCM buses in the line switch are clocked at a 4.096 mHz bit rate. These buses must interface to the PCM lines PCMA, PCMB which clock PCM at a 1.544 mHz bit rate (or a 2.048 mHz bit rate in other applications). The interface logic 6 provides for the line switch internal clocks to be synchronized to the PCM line clocks CLKA, CLKB at frame boundaries such that no PCM bits are lost during rate conversion. This is accomplished by phase locking the internal clock to a PCM line clock by means of phase-locked loop (PLL) circuitry.

The rate converter portion of interface logic 6 includes memory elements for the PCM bit streams. The PCM data from bus PCM4 are written into a memory in the rate converter as the data for PCM lines PCMA, PCMB are read from the memory. Likewise, PCM data from lines PCMA, PCMB are written into a memory as the data for bus PCM4 is read from the memory.

Each of the two PCM lines PCMA, PCMB is connected to one of two corresponding identical signaling frame and frame clock generator circuits 16a, 16b. Each generator 16a, 16b derives an 8 khz clock signal on leads 17a, 17b, respectively, from the bit clock signal received via the respective bit clock leads CLKA and CLKB and determines the presence of a signaling frame, and generates a signaling frame signal. The 8 kHz clock is applied to a phase-locked loop and control circuit 18 and is supplied to a corresponding phase-locked loop and control circuit 18 in another interface logic 6 via leads FS8A or FS8B. The phase-locked loop and control circuit 18 generates a 4.096 mHz clock which is phase-locked to a selected 8 kHz clock on leads 17a, 17b or on the leads FS8A, FS8B which come from an interface logic circuit 6 of another line switch module. Thus, the phase-locked loop 18 of a line switch module may be locked to any one of four 8 kHz clocks. The 4.096 mHz clock is provided on lead CLK4 and also to a clock generator circuit 19. The generator 19 provides a framing signal at an 8 kHz rate and clock signals at a 4.096 mHz rate for the transmit (TX) and receive (RX) rate converter circuits 20 and 21 respectively.

The PLL and Control Circuit 18 selects which one of the four 8 kHz clocks on lead 17a, 17b, FS8A and FS8B is to be used as a master clock of the line switch. The phase-locked loop and control circuit 18 contains failure detection circuitry for all the 8 kHz clocks. When the absence of a clock pulse occurs the failure detector will insert a pulse to maintain the oscillation frequency of PLL, and another one of the remaining working 8 kHz clocks will be selected as a master.

Additionally, there is cooperation between the PLL and control circuits 18 in the modules of a line switch such that all will operate to select the same 8 kHz derived clock as a master. This assures that the PLL's of all line switch modules are synchronized to the same clock source.

Each PLL further includes self-check circuitry such that, if a PLL fails, the PLL will automatically disconnect itself from the 4.096 mHz line CLK4 and connect the line CLK4 to the output of the PLL in the other line switch module.

4.2 RX RATE CONVERTER (FIGS. 8, 9A-D)

Rate conversion and interlacing/demultiplexing are provided primarily by the TX rate converter 20 and the RX rate converter 21. The bus PCM4 includes a transmit path 8a and a receive path 8b. Likewise, the PCM lines PCMA, PCMB have both transmit and receive paths.

Incoming PCM signals from the switching network 3 over lines PCMA, PCMB are applied to the RX rate converter 21. The RX rate converter 21 operates as a FIFO type memory. Information received over the PCM lines PCMA, PCMB is stored at the rate of the PCM lines, i.e. 1.544 mHz for the North American Network or 2.048 mHz for the other systems. More specifically for the North American Network data from PCM line PCMA is clocked into RX rate converter 21 at a 1.544 mbs rate as determined by the 1.544 mHz PCM clock line CLKA of PCM line PCMA. Likewise, data from PCM line PCMB is clocked into the RX rate converter 21 as determined by CLKB. The data stored in the RX rate converter 21 is read at a 4.096 mbs rate as determined by the 4.096 mHz output of clock generator 19. The 1.544 mHz clocks signals received over CLKA, CLKB are not necessarily synchronized. However, the 4.096 mHz clock signals are phase locked to the clock signals of one of the PCM lines connected to a line switch.

Figure 9A:
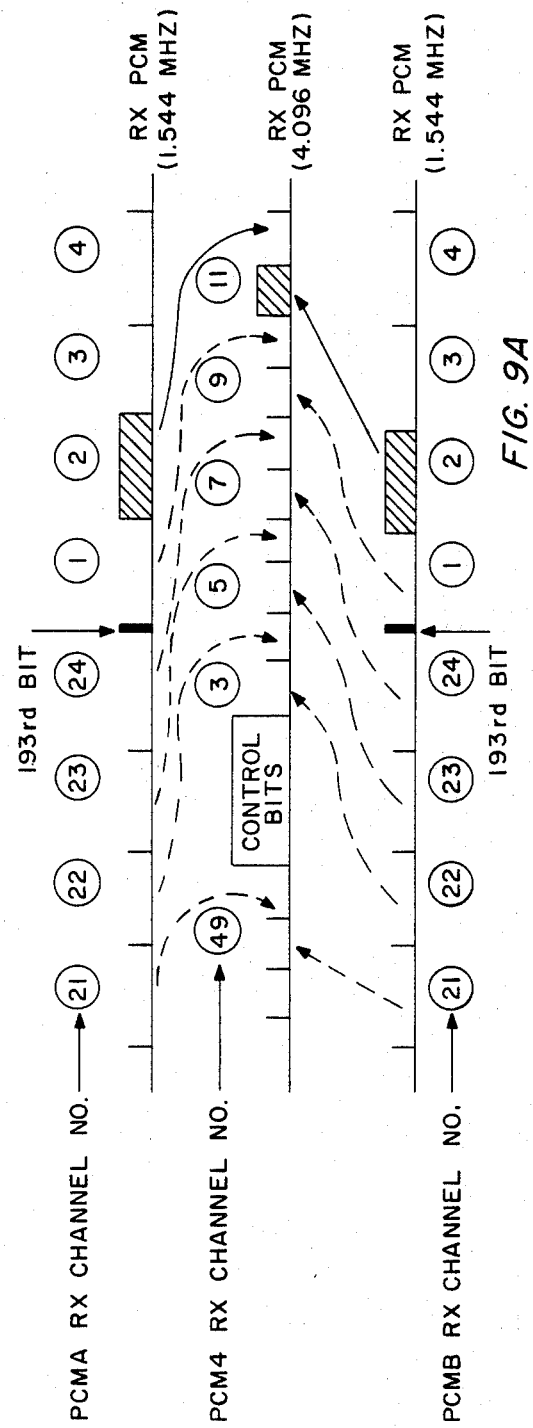
FIG. 9A illustrates the interleaving operation of the RX rate converter portion of interface logic 6 of FIG. 8.

Data from the two PCM lines PCMA, PCMB is alternately read from the RX rate converter and applied to the receive portion of bus PCM4, i.e., path 8b. FIG. 9A illustrates the interleaving of channels from the PCM lines PCMA, PCMB onto the bus PCM4.

Figure 9B:
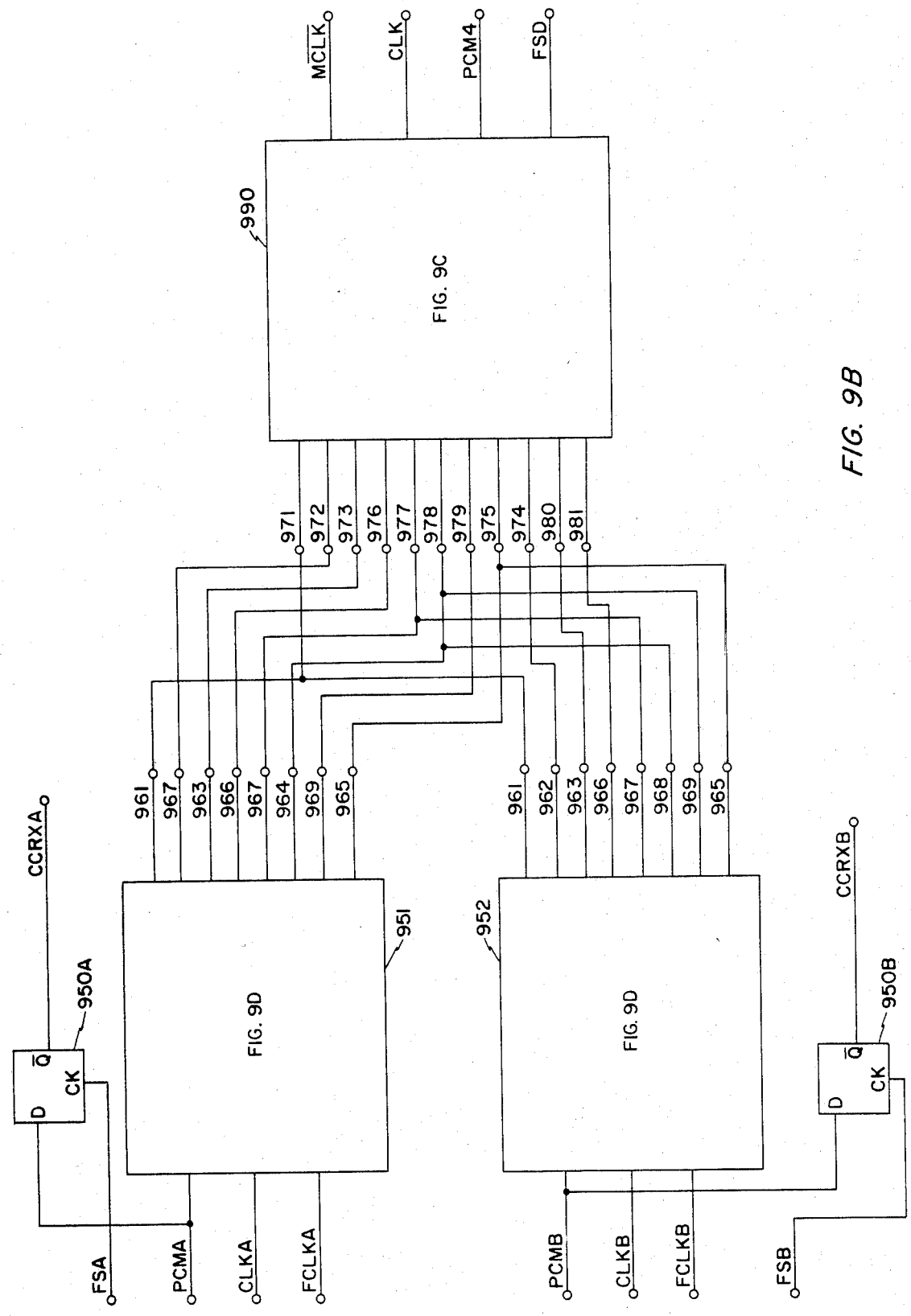
FIGS. 9B, 9C and 9D illustrate in block diagram form RX rate converter 20 of FIG. 8.
Figure 9C:
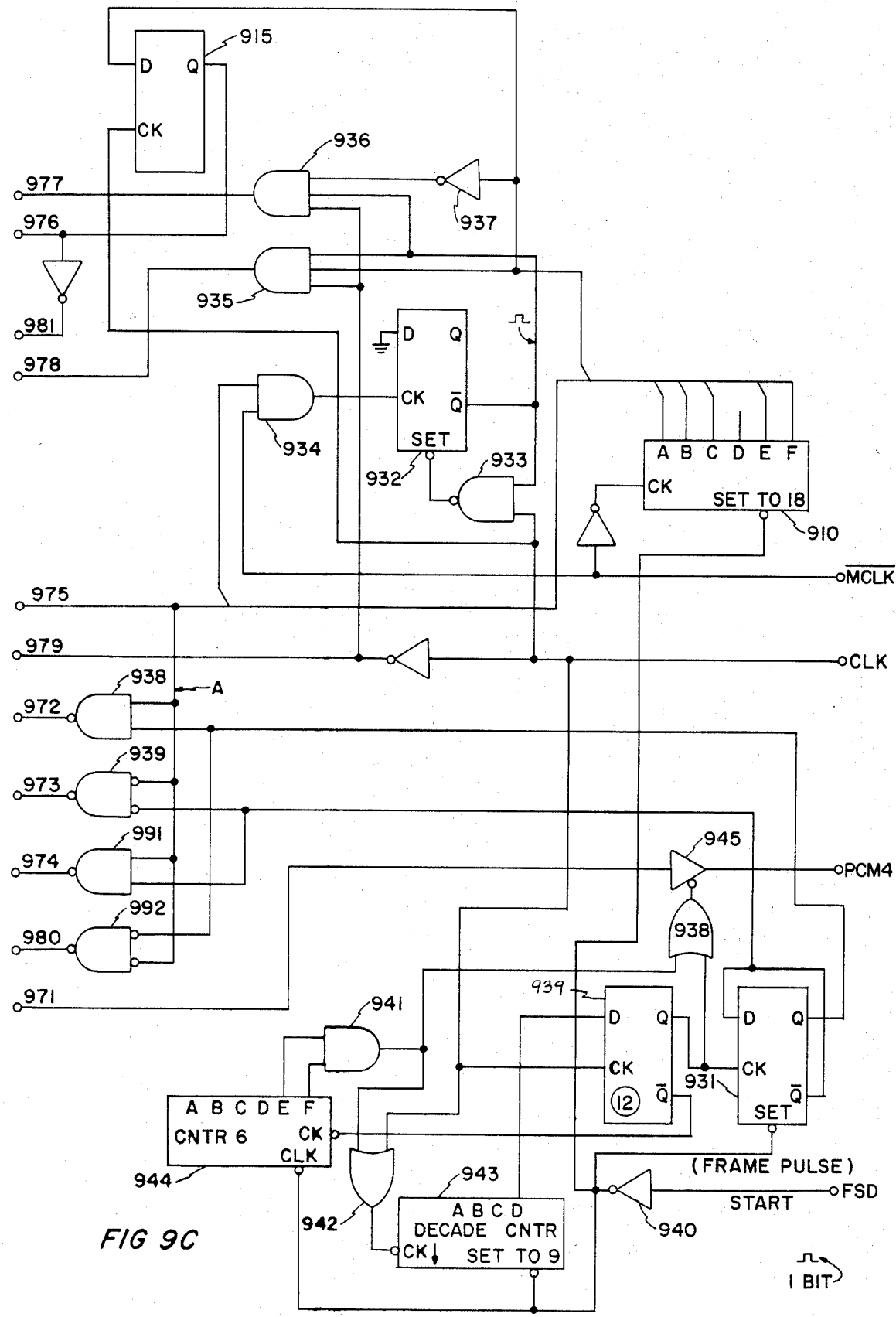
Figure 9D:
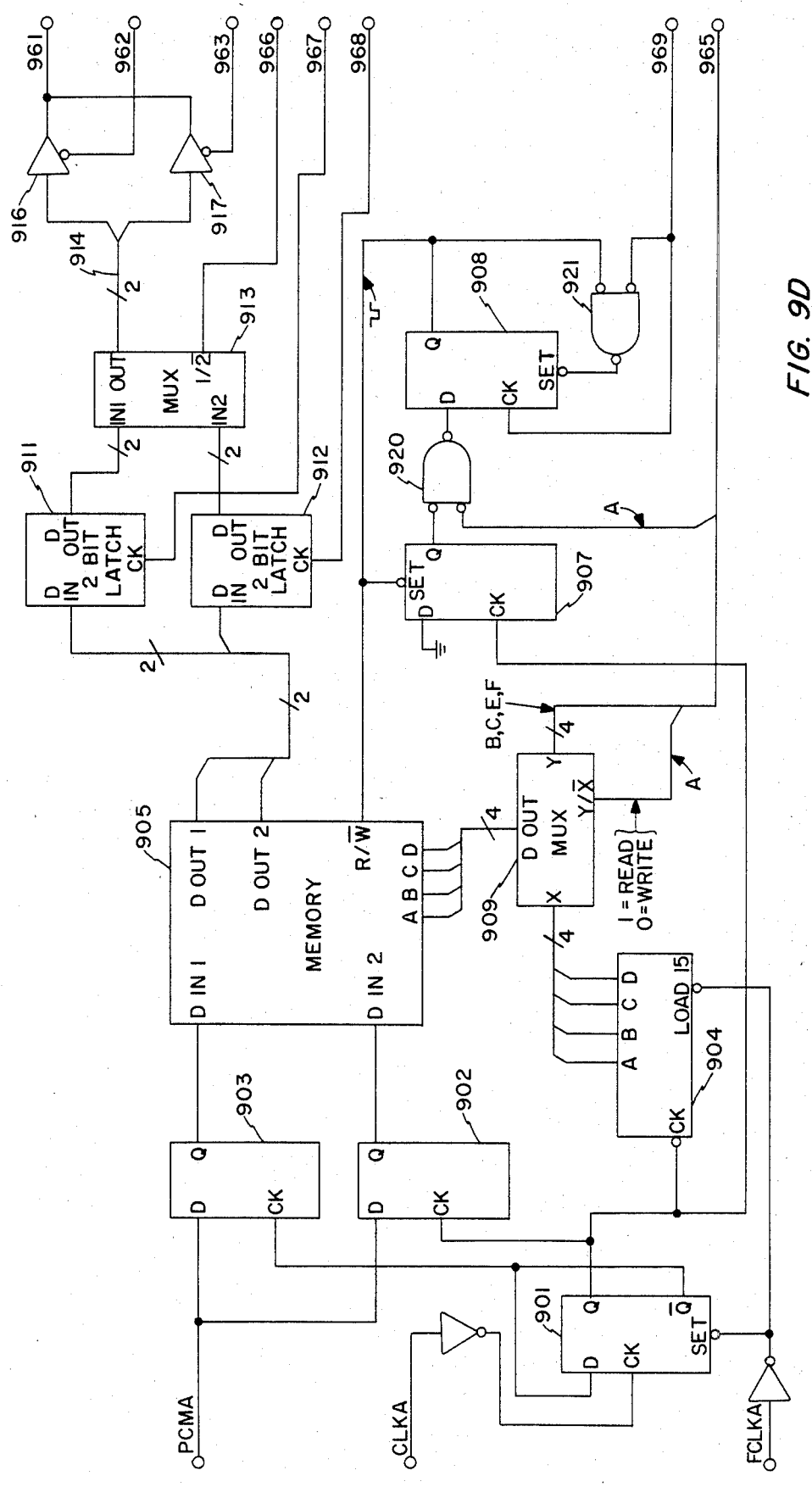

The RX rate converter 20 is shown in greater detail in FIGS. 9B, 9C and 9D. FIG. 9B illustrates the interconnection of the circuits of FIGS. 9C and 9D. The circuitry of box 951 for PCM line PCMA is duplicated in box 952 for PCM line PCMB and is shown in detail in FIG. 9D. FIG. 9C shows box 990 in detail. Turning now to FIGS. 9C and 9D, serial PCM data is received from PCM line PCMA. Alternately received bits are stored in buffer flip-flops 902 and 903 by flip-flop 901. After every other bit is stored in the flip-flops 902, 903, the write address counter 904 is advanced by one count and the two bits stored in flip-flops 902, 903 are stored in the memory 905. The flip flops 902, 903 act as a two bit serial to parallel converter and thus form two bit words for storing in the memory 905. Memory 905 is organized as sixteen 2 bit words and is a random access memory. Memory 905 includes four address bit inputs and read/write input. A read write control circuit comprising flip-flops 907, 908, and gates 920, 921 determines whether a read or write opeation is to occur. An address selector 909 is used to select either a write address from counter 904 or a read address from counter 910.

When the data stored in flip-flops 902, 903 is to be stored in memory 905, the selector 909 selects the counter 904 as the source for the memory address and flip-flip 908 applies a write signal to the memory 905. When data is to be read from memory 905, selector 909 selects counter 910 as the source for the memory address and flip-flop 908 provides a read control signal to the memory 905. Data read from memory 905 is read as two bit words which are alternately stored in the two bit latches 911, 912. The flip flop 932 and gates 933, 934, 935, 936 and 937 control the loading of data read from memory 905 into the latches 911, 912. A selector 913 under control of flip-flop 915 alternately gates the outputs of the latches 911, 912 onto the two bit line 914. Tri-state buffer gates 916, 917 controlled by gates 938, 939 alternately connect one of the lines 914 to the single line 961. The flip-flop 931 is used to select either the outputs from box 951 or 952 to be applied to the line 961. Flip-flop 931 changes its output state once for each voice channel on PCM4.

In effect, latches 911, 912; selector 913 and gates 916, 917 operate as a parallel to serial converter and flip-flop 931 operates to select either PCMA or PCMB as the source of data on PCM4. The read address counter 910 is driven by signal $\overline{MCLK}$ which as will be described below defines the format of PCM4. Pulses are provided by $\overline{MCLK}$ which correspond to the PCM voice bits on the bus PCM4.

The gates 938, 940, 941, 942, flip-flop 939, decade counter 943 and 6 bit counter 944 operate to control the tri-state buffer gate 945. Gate 945 is enabled when PCM data from either PCM line PCMA or PCMB is to be transmitted over PCM4. In accordance with the format for PCM4 shown in FIG. 4, gate 945 is enabled for the 8 PCM sample bit positions of each 10 bit channel and is disabled for the remaining two bits. Also, gate 945 is disabled for the 32 control bit positions in each frame.

Figure 10A:
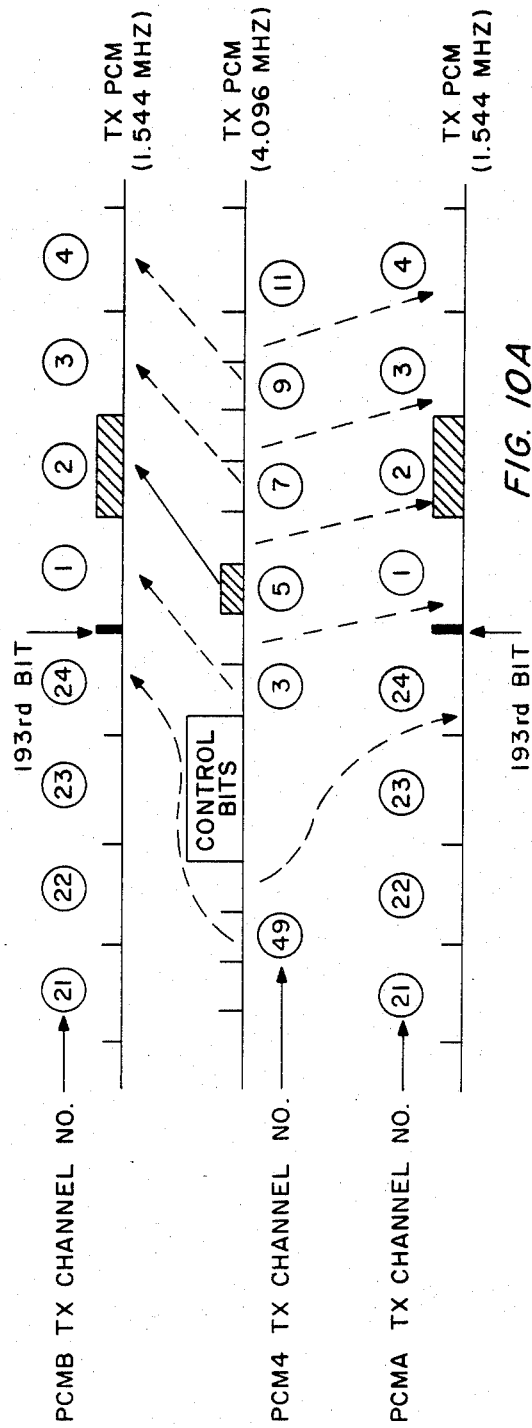
FIG. 10A illustrates the demultiplexing operation of the TX rate converter of FIG. 8.

4.3 TX RATE CONVERTER (FIGS. 8, 10A, B and C)

The TX rate converter 20 of FIG. 8 mirrors the operation of the RX rate converter 21. Specifically, the channels of data on the transmit portion 8a of bus PCM4 are stored in a FIFO memory of the TX rate converter 20. Information is received at a 4.096 mbs rate and stored under control of the 4.096 mHz clock signals of clock generator 19. Alternate channels of data sotred by the TX rate converter are forwarded to the PCM lines PCMA, PCMB at a 1.544 mbs rate as determined by the respective clock signals CLKA, CLKB of the PCM lines. This demultiplexing operation is shown in FIG. 10A.

Figure 10B:
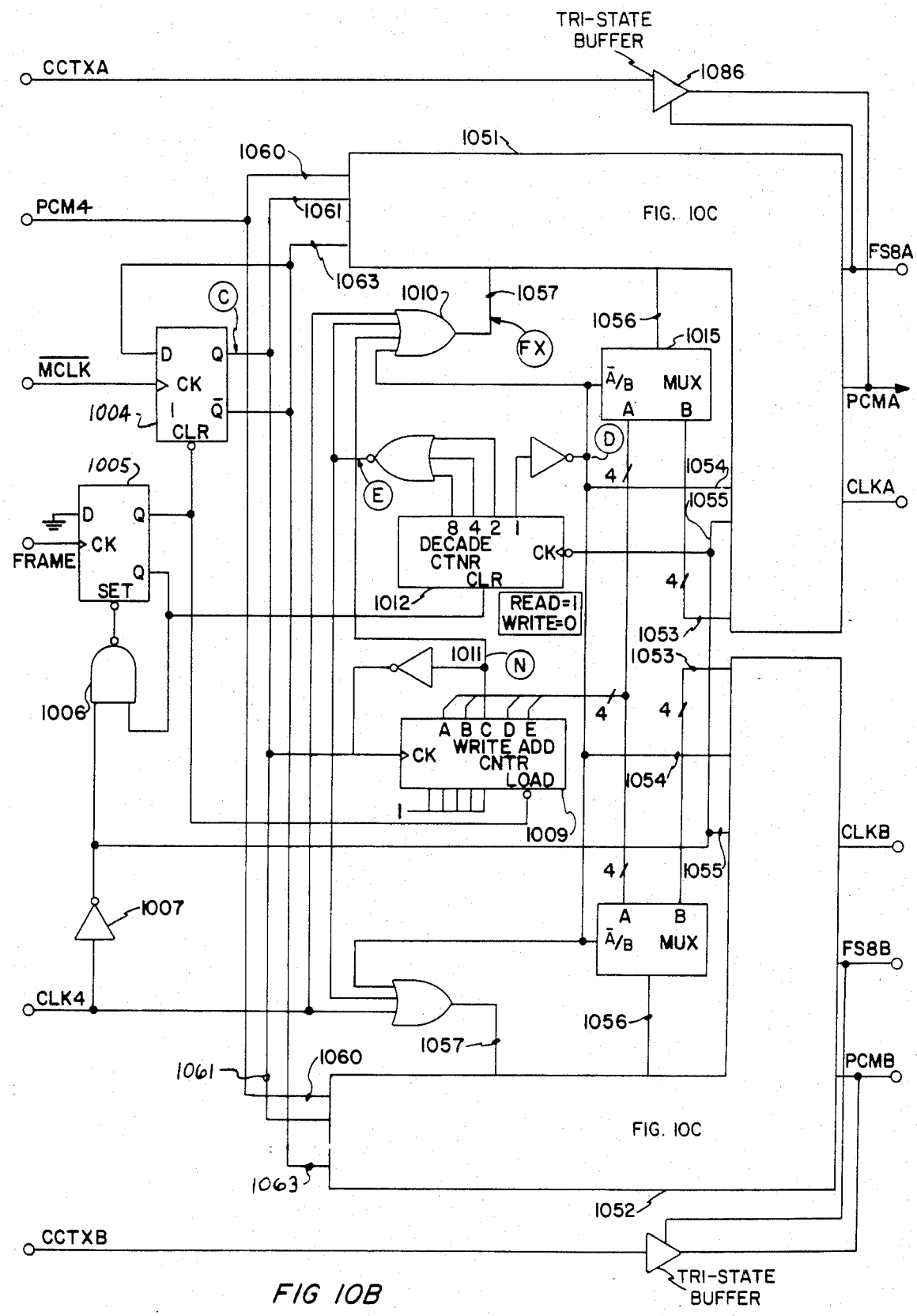
FIGS. 10B and 10C illustrate in block diagram form the TX rate converter 21 of FIG. 8.
Figure 10C:
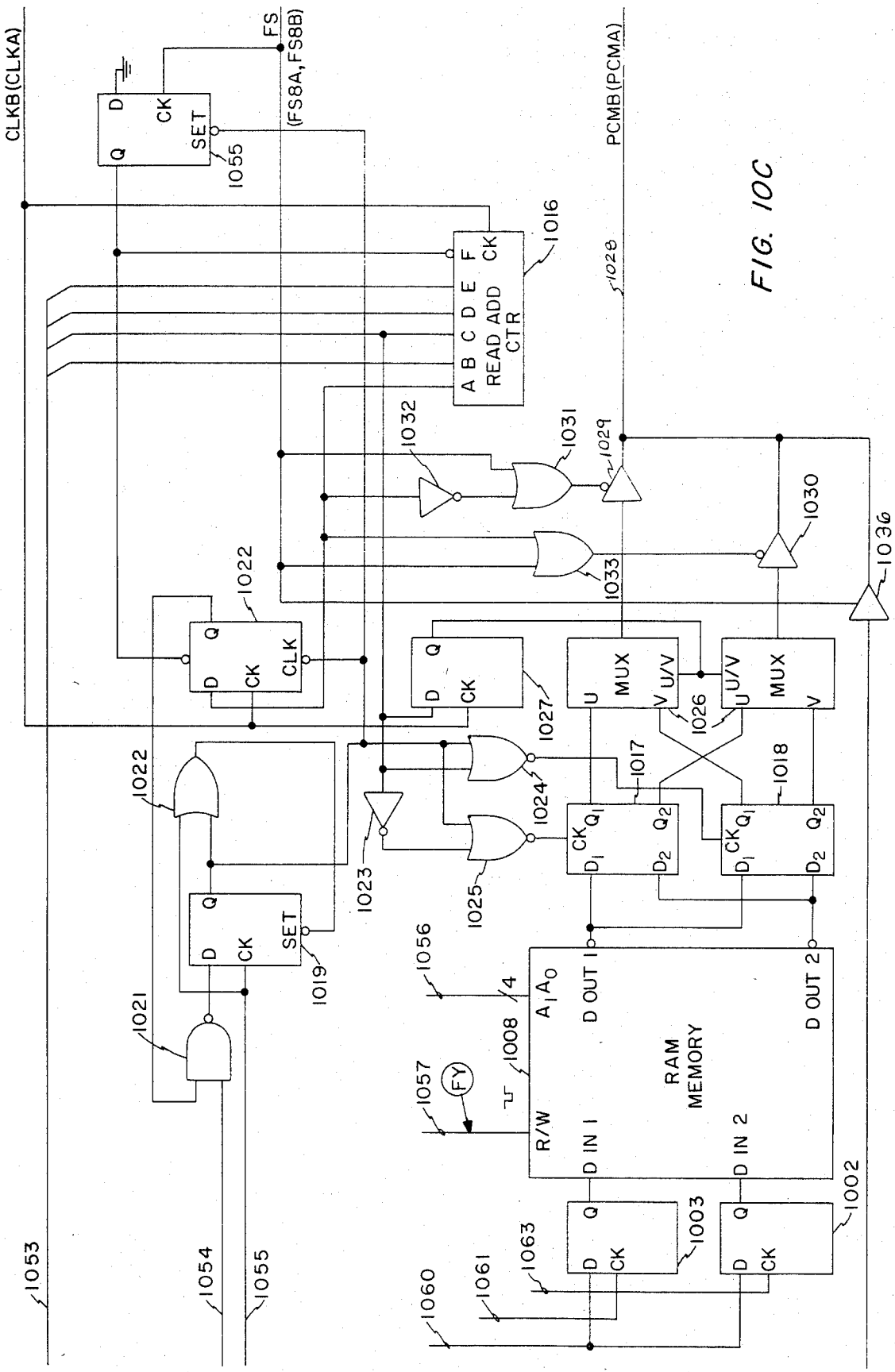

The TX rate converter 21 of FIG. 8 is shown in detail in FIGS. 10B and 10C. The circuitry in box 1051 for PCM line PCMA is duplicated in box 1052 for PCM line PCMB. Boxes 1051 and 1052 are shown in detail in FIG. 10C.

Serial PCM data is received over bus PCM4. Alternately received PCM sample bits are stored in the two buffer flip-flops 1002, 1003. Flip-flop 1004 which is clocked by the signal $\overline{MCLK}$ selects which of the flip-flops 1002 or 1003 into which a PCM bit is to be stored. The flip-flop 1005, and gates 1006, 1007 are used to synchronize the operation of flip-flop 1004 each frame. After every other bit is stored in the flip-flops 1002, 1003, the two stored bits are written into memory 1008. Memory 1008 is a random access memory organized as 16 words of two bits each. Memory write addresses are generated by the counter 1009. Counter 1009 is a 5 bit binary counter which is clocked at one half the rate of the $\overline{MCLK}$ signals by flip-flop 1004. The C output of the counter 1009 is used to control gate 1010 and through an inverter 1011 controls if the corresponding memory on box 1052 is to be written or read. Decode counter 1012 and gates 1013, 1014 control whether data is to be stored in or read from memory 1008 and also counts the number of bits (10) in each channel on bus PCM4.

When counter 1012 contains a count of 0 or 1, a memory write operation is inhibited. Address selector 1015 is used to select the address input to memory 1008. Specifically, the selector 1015 selects output from counter 1009 for memory write address and counter 1016 for a memoy read address. Counter 1016 is a 5 bit binary counter and is clocked by the PCM line clock CLKA. When data is read from memory 1008, the two bit words are alternately stored in the two bit latches 1017, 1018. Flip-flops 1019, 1020 and gates 1021, 1022, 1024, 1025 provide control for gating the data into the latches 1017, 1018. Gate 1023 in combination with the "C" output of counter 1016 provides for alternately selecting the latches 1017, 1018 for storing the read data. The selector circuit 1026 under control of flip-flop 1027 alternately gates the contents of latches 1017 and 1018 on line 1028. Tri-state buffer gates 1029 and 1030 controlled by gates 1031, 1032, 1033 are alternately enabled to alternately connect the two outputs of the selector 1026 to PCM line PCMA. Latches 1017, 1018, selector 1026 and gates 1029, 1030 operate as a parallel to serial converter.

The flip-flop 1055 clears the counters 1016 whenever the framing bit position during a frame on the PCM line PCMA occurs.

Tri-state buffer gate 1036 is enabled during the framing bit position to permit common channel signaling or framing information to be gated onto line PCMA.

The above described interlacing and demultiplexing operations are premised upon the use of 24 channel 1.544 mHz PCM lines PCMA, PCMB and the bus PCM4 having the format of FIG. 4. If however, the PCM lines PCMA, PCMB are 3O channel 2.048 mHz lines then the PCM clock lines CLKA, CLKB would operate at 2.048 mHz and the format of FIG. 5 would be used for bus PCM4.

4.4 PHASE-LOCKED LOOP AND CLOCK CIRCUIT (FIGS. 2, 8, 11–20)

The rate converters require that the clock frequency of bus PCM4, i.e. be exactly 512/193 times the clock frequency of the PCM lines PCMA, PCMB. The phase difference between the two clocks must be controlled such that it falls within the limits required by the rate converter hardware.

The maximum phase difference between the internal line switch clock and the PCM line clocks that is tolerable to the rate converter is limited only by the amount of memory storage in the rate converter. However, a large tolerance for phase variation requires a larger amount of memory storage and causes a larger nominal delay in the rate converter.

The rate converter inherently causes 20 microseconds of nominal delay interfacing the 4.096 mHz PCM to 1.544 mHz PCM. Additional delay is designed into the rate converter to tolerate the phase variation in the internal line switch clock relative to the PCM line clocks CLKA, CLKB. To design the rate converter for minimum delay requires the phase variance of the clocks be tightly controlled.

The rate converter requires a specific relationship between the two clocks. This relationship is a defined sequence which repeats every frame (125 microseconds). At frame boundaries, (Bit 193 of the PCM line clocks) the rising edges of both clocks are synchronous when they are in phase. Any deviation is considered a phase error of the line switch clock.

In the illustrative embodiment of FIG. 2 two 4.096 mHz buses PCM4 are driven by the same clock i.e. one bus in each of the line switch modules 1a, 1b. Up to four external PCM lines, PCMA, PCMB in both line switch modules, whose phase relative to one another can vary, will interface to the two buses PCM4. Since the 4.096 mHz clock will be phase-locked to an arbitrarily chosen PCM line, the rate converter must be capable of tolerating the phase difference relative to other PCM lines. Also, the failure of any one PCM line must not affect service on the other PCM lines. An extension of this philosophy requires that any single failure in the PLL circuitry not cause the loss of all four PCM lines. In summary, the PLL must have a phase error whose variance is minimized relative to the PCM lines;

The PLL must be capable of using any one of the PCM lines as a reference so that a failure of any PCM line doesn't affect service on the other PCM lines; and Two PLL circuits must exist that are independently selectable to ensure that a single failure in the PLL does not affect the PCM clock CLK4.

Figure 11:
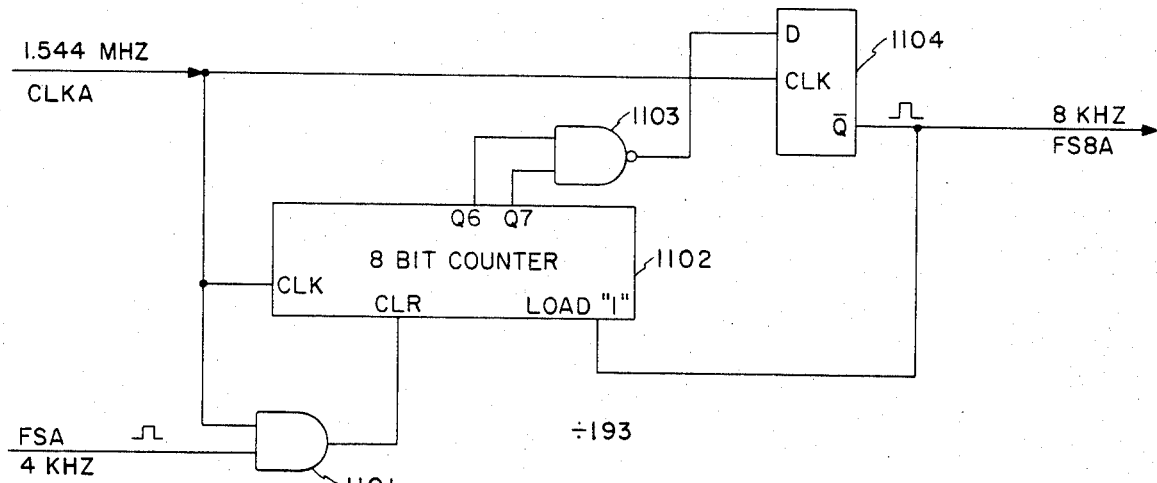
FIG. 11 illustrates in block diagram form a portion of generator 16a of FIG. 8.

The signaling frame and frame clock generators 16a, 16b of FIG. 8 includes a divider circuit to derive an 8 kHz signal from the 1.544 mHz PCM line clock and the signaling frame clock. The divider circuit for generator 16a is shown in detail in FIG. 11. The circuit includes gate 1101 connected to the input of an eight bit counter 1102. Decoder gate 1103 is coupled to the eight bit counter provides an output to the "D" input of flip-flop 1104. Flip-flop 1104 has its clock input CLK connected to CLKA and its Q output provides an 8 kHz framing signal FS8A. The outputs FS8A and FS8B of generators 16a, 16b are provided as inputs to the PLL and control circuit 18 of FIG. 8. Additionally these FS8A and FS8B outputs are provided to the other line switch module in a line switch. Similarly, FS8A and FS8B outputs from the other line switch module are provided as inputs to the PLL and control circuit 18 of FIG. 8. Thus, the PLL and control circuit has clock inputs derived from each of the four PCM lines connected to a line switch, i.e., the signals derived from CLKA and CLKB of line switch module 1a and those derived from CLKA and CLKB of line switch module 1b of FIG. 2. Additionally, each of the circuits 16a, 16b of FIG. 8 generates a signaling frame signal SIGA, SIGB respectively. The signaling frame signals are also supplied to the PLL and control circuit 18 from the circuits 16a, and 16b in both line switch modules.

Figures 12, 12B:
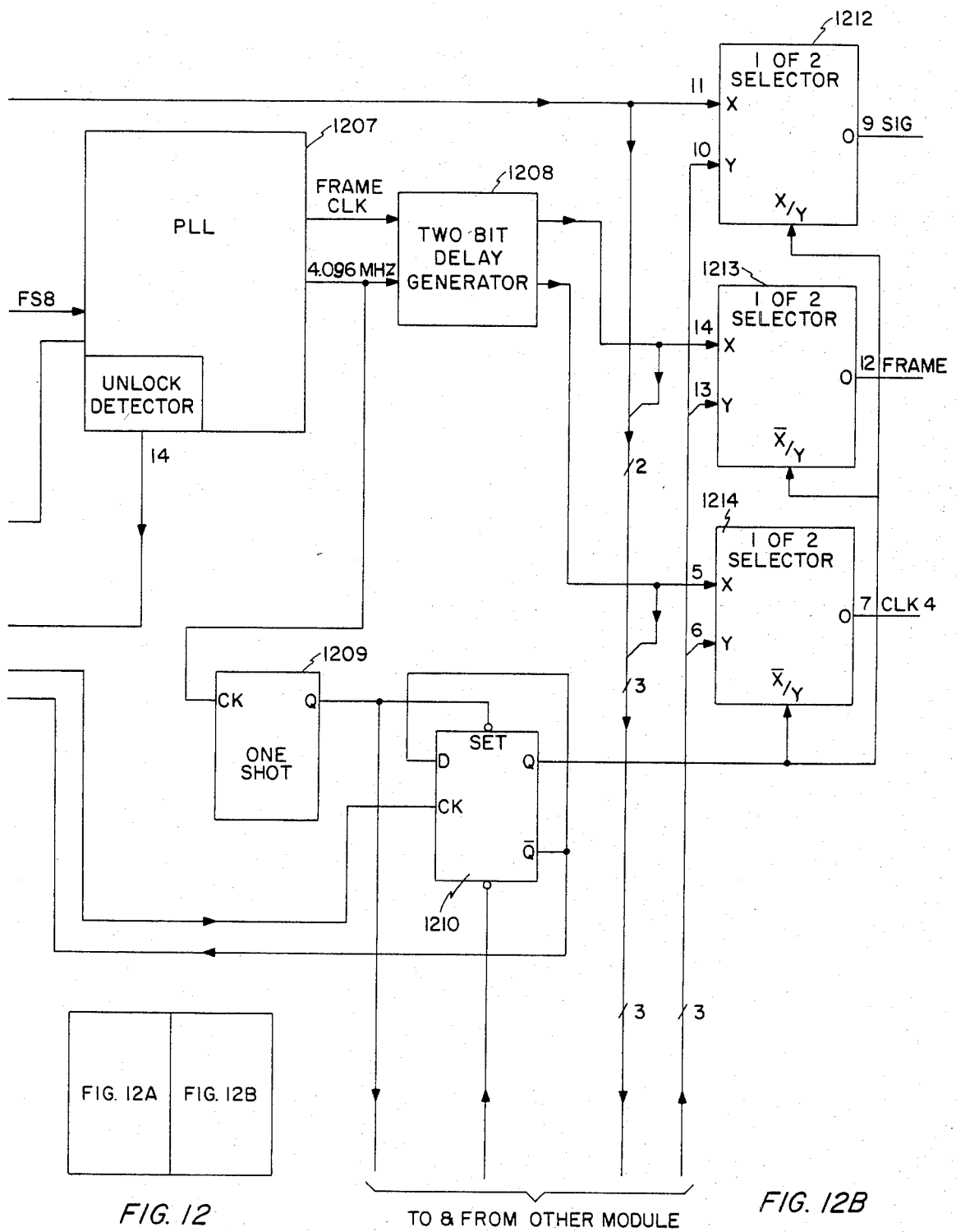
FIGS. 12A and 12B when arranged as shown in FIG. 12 illustrate in block diagram form the PLL and control circuit 18 of FIG. 8.
Figure 12A:
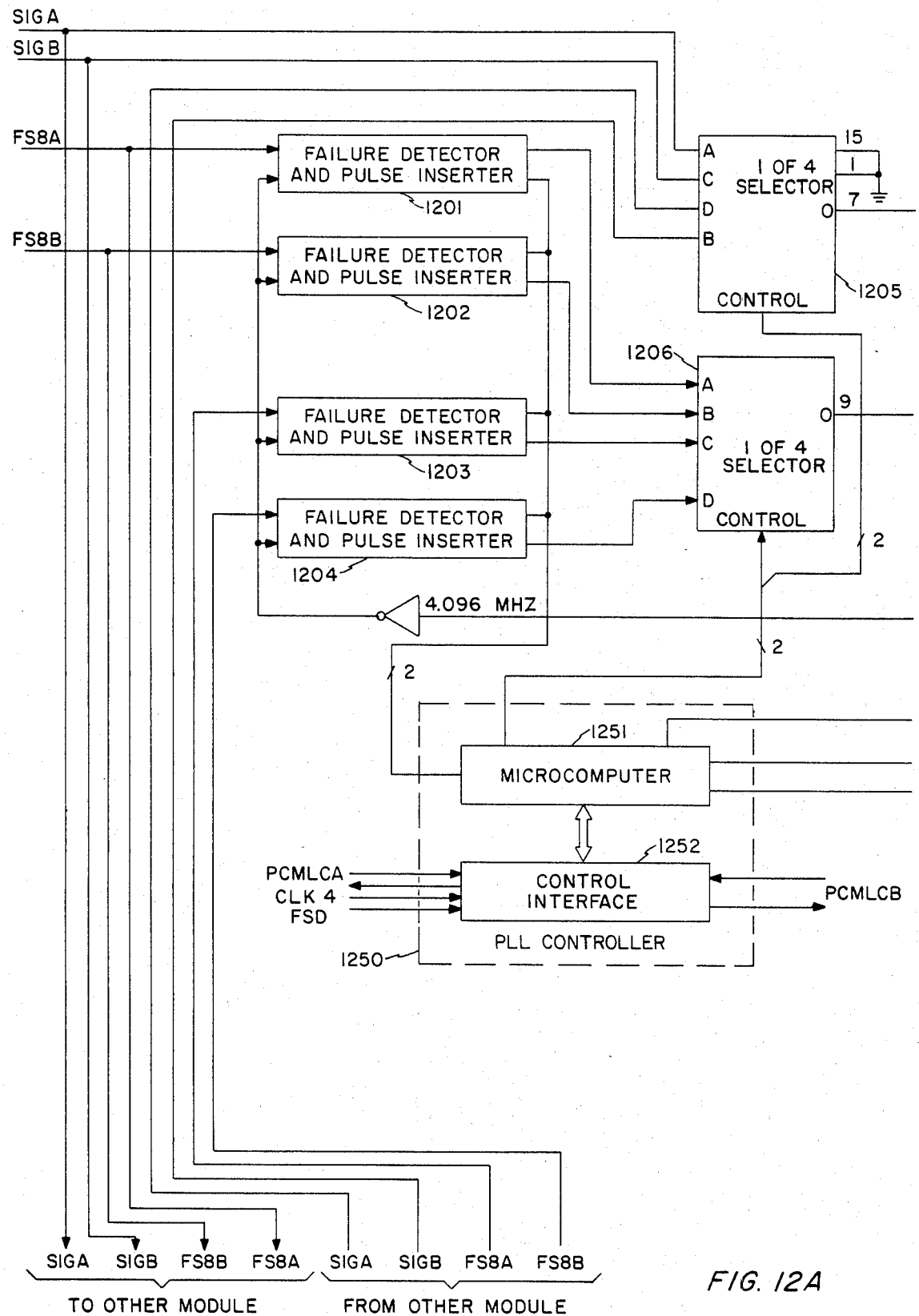
Figure 13:
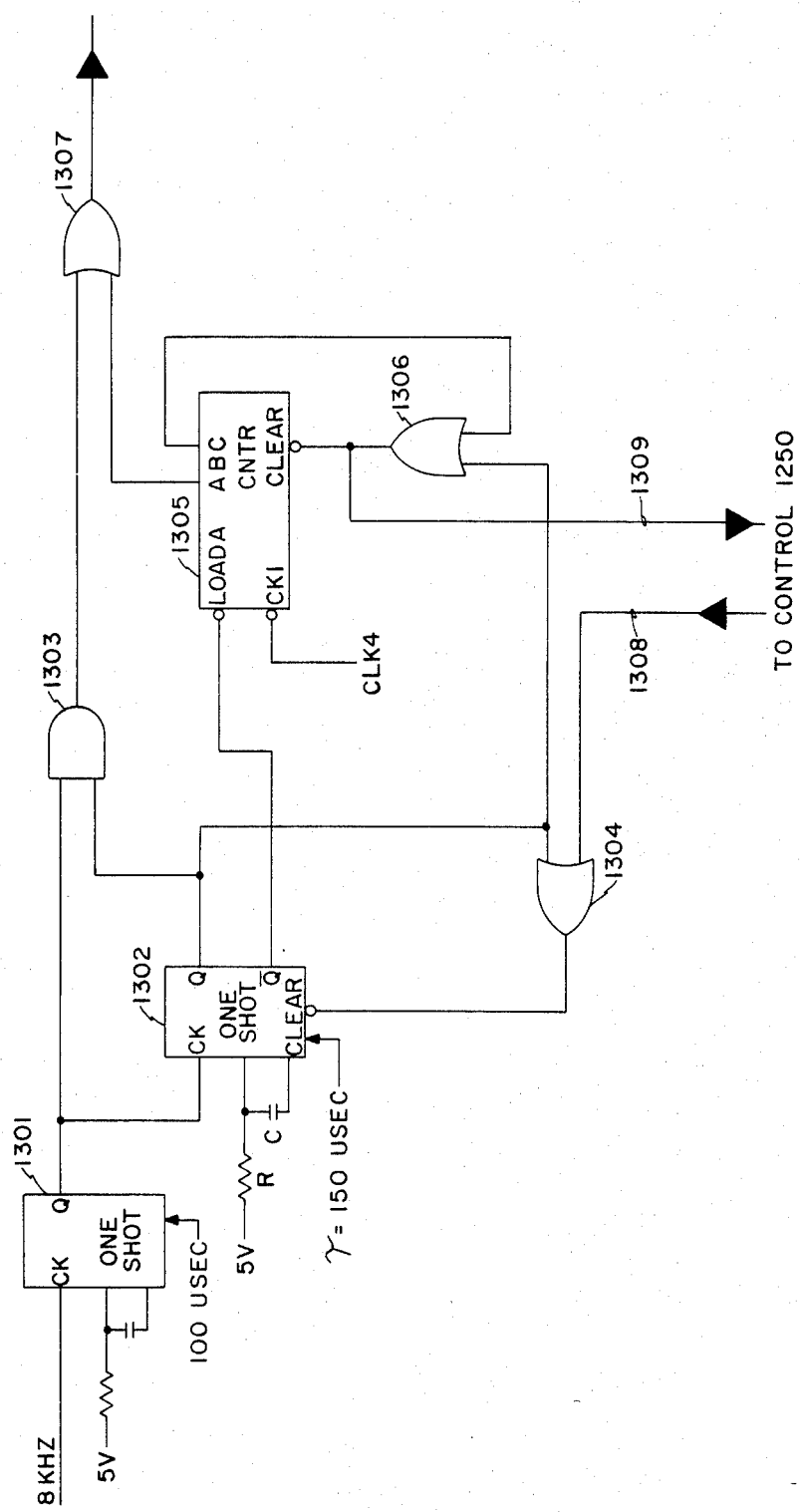
FIG. 13 illustrates in block diagram form failure detector 1201 of FIG. 12A.

Turing now to FIG. 12, the signaling frame signals SIGA and SIGB are coupled to a 1 of 4 selector 1205. Each of the four 8 kHz inputs FS8A, FS8B are individually connected to a failure detector circuit 1201, 1202, 1203, 1204. A 1 of 4 selector 1206 is to select one of the clock outputs from the failure detectors 1201, 1202, 1203, 1204 as the input FS8 to the phase-locked loop 1207. The selector 1206 as well as selector 1205 is controlled by the PLL controller 1250. The PLL 1207 is locked to the selected input. If a failure should occur in the PCM line from which the signal FS8 is derived, service to the other PCM lines would be interrupted if there was no capability of change from the PCM line to which it is phase-locked. The failure detectors 1201, 1202, 1203, 1204 detect failures in the PCM lines. FIG. 13 illustrates in detail the failure detector 1201. Normally, a clock pulse at the 8 kHz rate of FS8A arrives every 125 microsec. If, however, the time between two pulses is less than a predetermined interval, i.e., 100 microsec., the one shot 1301 will prevent the fast pulse from being propagated. If the time interval between pulses is greater than 100 microseconds, (and less than a second predetermined interval as discussed below) the pulse will be transmitted through gates 1303 and 1307. If the time interval between pulses is greater than the second predetermined interval, i.e., 150 microseconds, the one shot 1302 will time out, its Q output will go low inhibiting gate 1303. Additionally, the PLL controller 1250 will maintain a logic low on lead 1308 with the result that the clear input to one shot 1302 is low. With the clear input low, the output Q is maintained low. Thus, the one shot 1302 is "latched" in the low state. When Q is low, $\bar{Q}$ is high. Three bit binary counter 1305 is arranged such that when Q is low, a binary 4 (ABC=001) is loaded and when Q goes high, the counter 1305 may begin counting. Counter 1305 has a clock input coupled to the 4.096 mHz clock CLK4. When the counter reaches binary count 6 (ABC=011) a signal is provided at the output of gate 1307. The output signal will persist through a binary count of 7 (ABC=111) and will terminate at the next binary count (ABC=000) i.e., a binary count of 0. When a binary count 0 is reached, the output signal at gate 1307 is terminated, a low is applied to the clear input of counter 1305 causing counter 1305 to "latch-up".

Additionally, a signal is provided to the PLL controller 1250 on line 1309 indicating that a failure has occurred. Thus, if a pulse is absent for more than 150 microsec. a "phantom" pulse is provided and the PLL controller 1250 is informed of the failure. The PLL controller 1250 will select a different one of the PCM lines to use as a reference for the PLL 1207. The phantom pulse is required to insure that the PLL 1207 does not miss a pulse. If no pulse were to occur, the PLL 1207 would function as though it were an entire frame out of phase and would slow down the 4.096 mHz clock CLK4 to correct for this. This would result in the rate converter losing several frames of PCM before frame resynchronization had occurred. Since the phantom pulse is out of phase with a normal pulse stream, it does cause an aberration in the operation of PLL 1207. However, the PLL 1207 has a narrow loop bandwidth such that its output will be within the limits of the rate converter tolerance. The aberration in the PLL is less than 100 nanosec. of phase change.

Figure 14:
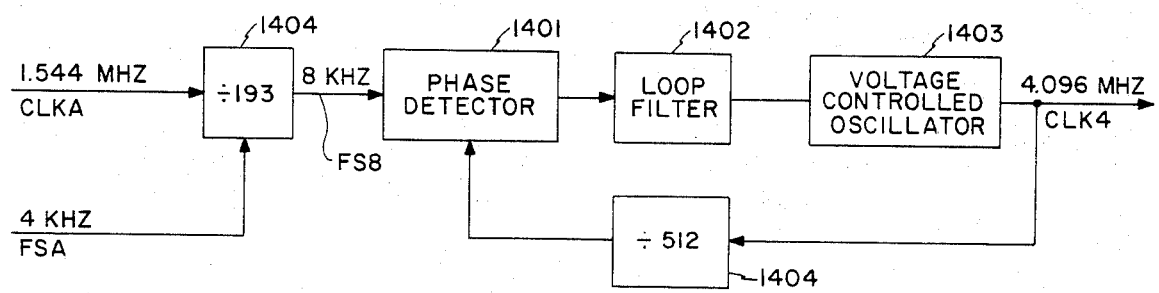
FIG. 14 is a block diagram of PLL 1207 of FIG. 12B.

A block diagram of the PLL 1207 is shown in FIG. 14.

The PLL 1207 comprises a clock input FS8 to which a voltage controlled oscillator (VCO) 1403 is slaved. This a accomplished by dividing both the output of the VCO and the input clock to get a common frequency, i.e. 8 kHz. The signaling frame and frame clock generator 16a of FIG. 8 divides the incoming 1.544 mHz PCM line clock CLKA to obtain an 8 kHz output FS8A which is in this example selected by selector 1206 of FIG. 12 to provide signals on FS8. The divider 1404 of FIG. 14 divides the 4.096 mHz output of VCO 1403 to also generate an 8 kHz signal. The phase detector 1401 generates an error current which is integrated by the loop filter 1402 to control VCO 1403. When CLK4 is phase-locked to FS8, the frequency of VCO 1403 is exacty 512/193 times CLKA.

Figure 15:
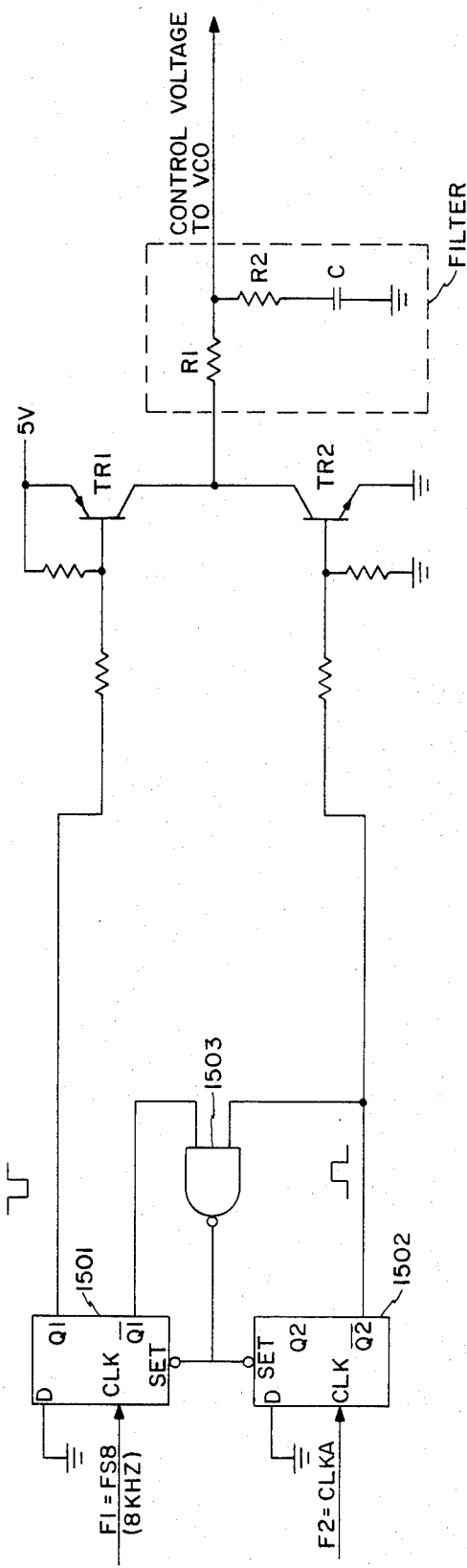
FIG. 15 illustrates in block diagram form the phase detector of FIG. 14.

In order to minimize the phase variance in the PLL 1207, a phase detector is provided that gives a phase error near zero under steady state conditions. A simple phase detector that meets this cirtical requirement is shown in FIG. 15.

This phase detector requires TTL compatible inputs and unlike a quadrature or an EXCLUSIVE-OR type of phase detector, it is not duty-cycle dependent on the inputs since it is strictly rising-edge sensitive which prevents phase lock from occurring on an integer multiple (harmonic) of the desired VCO frequency. It similarly rejects subharmonic phase lock.

Figure 16:
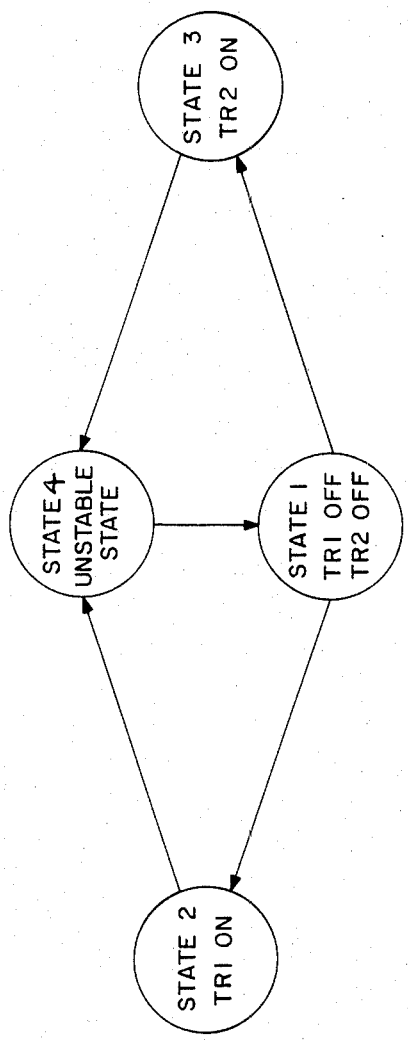
FIG. 16 is a state diagram for the phase detector of FIG. 14.

The outputs (Q1 and Q2) of flip-flops 1501, 1502 have the following four states:
Stage 1=Both Q1 and Q2 high
Stage 2=Q1 is low, Q2 is high
State 3=Q1 is high, Q2 is low
State 4=Both Q1 and Q2 low State 4 is an unstable condition since this causes a set pulse which returns the flip-flop pair to State 1. State 1 is the "off" state in that both transistor switches (TR1 and TR2) are turned off in that state. FIG. 16 shows the state diagram of the phase detector.

The phase detector cycles through the state diagram (FIG. 16) starting at State 1 progressing to either State 2 or 3, to State 4, and returns to State 1. It makes this cycle once every 125 microseconds staying in State 1 for a large duration of the cycle. If F2 lags F1 in phase, the detector cycles through State 2; if F2 leads F1, it cycles through State 3. The time it is in State 2 or 3 is equal to the phase difference between F1 and F2. Thus, the phase detector has a +360 degrees of phase error operating range. If the error exceeds 360 degrees in either direction or F2 is not equal to F1, the cycle time is not necessarily 125 microseconds (out of lock condition). However, the phase detector will always cycle through State 2 when F2 is less than F1 and through State 3 when F2 is greater than F1. Therefore, the phase detector will, in all cases, drive the control voltage toward a locked condition.

When in State 2 or 3, TR1 or TR2 is "on" causing current to be pumped into or out of the loop filter capacitor (C). When fed into an infinitely high impedance, the voltage on the capacitor represents the summation (or integral) of all past phase errors. This is extremely important, since different VCO's require different control voltages to oscillate at 4.096 mHz. The phase detector will operate at nearly zero phase error under steady state conditions independent of the DC voltage on the control voltage line. TR1 and TR2 need only to be turned on to correct for changes in PLL operating conditions and to replace the small amount of charge lost in the capacitor due to circuitry leakage during each 125 microsecond period. The phase error is independent of the vast majority of the PLL parameters including loop gain, supply voltage, loop filter values, and all VCO characteristics. In comparison, when using phase detectors in which the control line voltage is directly proportional to the phase error, the phase error is much more difficult to control. With such phase detectors any required change in control voltage (due to part variance or temperature change) causes a proportional phase error change.

Figure 17:
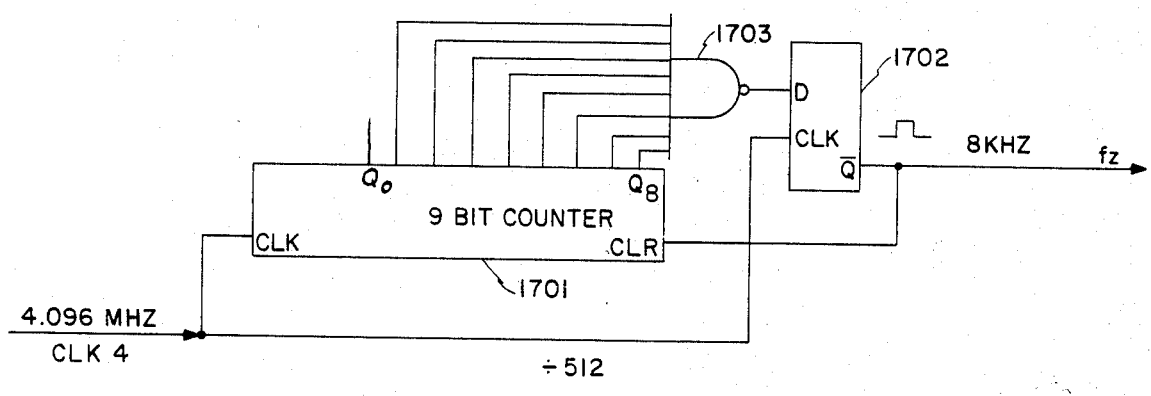
FIG. 17 is a block diagram of divider 1404 of FIG. 14.

Phase error between the VCO and its reference is dependent primarily on the propagation delay through the dividers (512 and 193) and the phase detector. The dividers were both designed with this consideration in mind and have only one flip-flop delay from input to output. The ÷193 counter is that of FIG. 11 and the ÷512 counter is shown in FIG. 17. The phase detector uses two flip-flops that are inherently closely matched since they are in the same integrated circuit package.

The PLL has a measured nominal phase difference between F1 and F2 at the phase detector of 10 nanoseconds (less than 0.03 degrees). The total phase difference between CLK4 and CLKA or CLKB will be larger since there are additional circuit delay tolerances that affect the total phase difference. These include delay tolerances in the dividers, failure detector circuits, selectors and buffering circuits. The worst case phase difference between CLK4 and CLKA or CLKB is under 200 nanoseconds using LSI-TTL technology.

The phase/frequency discrimination attributes of the phase detector give the PLL a capture and lock range limited only by the frequency range of the VCO. This allows great flexibility in the design of the remaining portions of the PLL.

Figure 18:
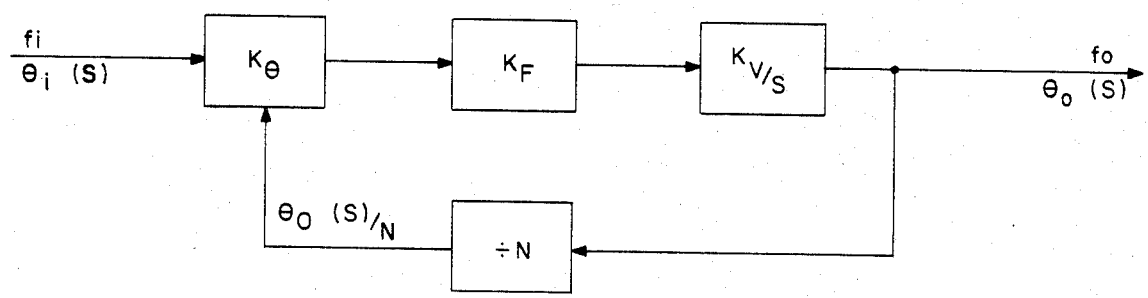
FIG. 18 is a block diagram of loop filter 1402 of FIG. 14.

The design of the loop filter 1402 of FIG. 14 involves several requirements. First, the loop must remain stable under all operating conditions. Secondly, the loop bandwidth must be selected such that the aberration in the 8 kHz reference caused by a PCM line failure, does not cause the VCO to shift in frequency excessively. A damping factor greater than 0.7 is desirable for stability. A damping factor under 0.7 is underdamped with zero being the limit before oscillations result. For stability analysis, the PLL can be modeled as shown in FIG. 18.

Figure 19A:
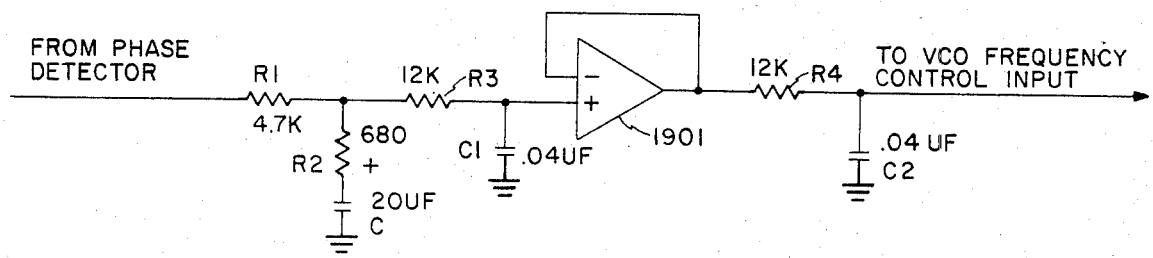
FIG. 19A is one embodiment of loop filter 1402 of FIG. 14.
Figure 19:
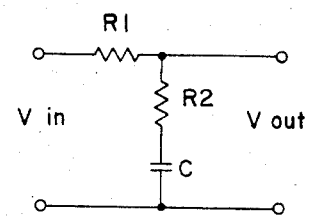
FIG. 19 is a basic loop filter circuit.

Using Laplace Transforms, it is possible to analyze the stability of the PLL. Using servo theory, $$\theta_o(s) = \frac{G(s)}{1 + G(s)H(s)} \theta_i(s)$$

where
$\theta_o(s)$ = Output phase
$\theta_i(s)$ = Input phase
$G(s)$ = Forward gain product = $K_0 \times K_F \times K_V/s$
$H(s)$ = Feedback gain product = $1/N$ Three of the gain blocks (Ko, Kv, and N) are fixed. The transfer function of the loop filter is selectable. The loop filter of FIG. 19 is chosen for its great flexibility in determining both loop natural frequency ($\omega n$) and damping factor ($\xi$).

$$\frac{V_{out}}{V_{in}} = \frac{sR_2C + 1}{s(R_1 + R_2)C + 1} \quad (2)$$

$$K_F = F_{(s)} = \frac{\tau_2 s + 1}{\tau_1 s + 1}$$

where $\tau_2 = R_2C$ $\tau_1 = (R_1 + R_2)C$

Referencing FIG. 18, forward gain and reverse gain products are entered into Equation 1 and reduced to Equation 4.

$$\frac{\theta_o(s)}{\theta_i(s)} = \frac{K_\theta K_V(\tau_2 s + 1)/\tau_1}{s^2 + 2\zeta\omega_n s + \omega_n^2}$$

where $\omega_n = \sqrt{K_\theta K_V/\tau_1 N}$ rad/sec. = natural frequency of PLL and $\zeta = \frac{1}{2}\left(\frac{1}{\tau_1\omega_n} + \omega_n\tau_2\right)$ = damping factor of PLL Table 1 lists the values of the PLL parameters used to determine the loop damping factor ($\xi$) and natural frequency ($\omega_n$).

TABLE 1

| PLL GAIN PARAMETERS |
|---|
| $K_V$ = 550 kHz/volt = 3.46 × 10$^6$ rad/volt-sec. |
| $K_0 = \frac{5V}{4\pi}$ volts/rad = .398 volts/rad. |
| N = 512 |
| $K_F = \frac{\tau_2 S + 1}{\tau_1 S + 1}$ $\tau_2$ = 13.6 msec.; $\tau_1$ = 107.6 msec. |
| These are used in Equation 4 to obtain the following: |
| $w_n$ = 158 rad/sec. (25.1 Hz) |
| $\zeta$ = 1.09 |

This indicates a PLL with a narrow loop bandwidth and is very stable since it is overdamped.

Figure 20:
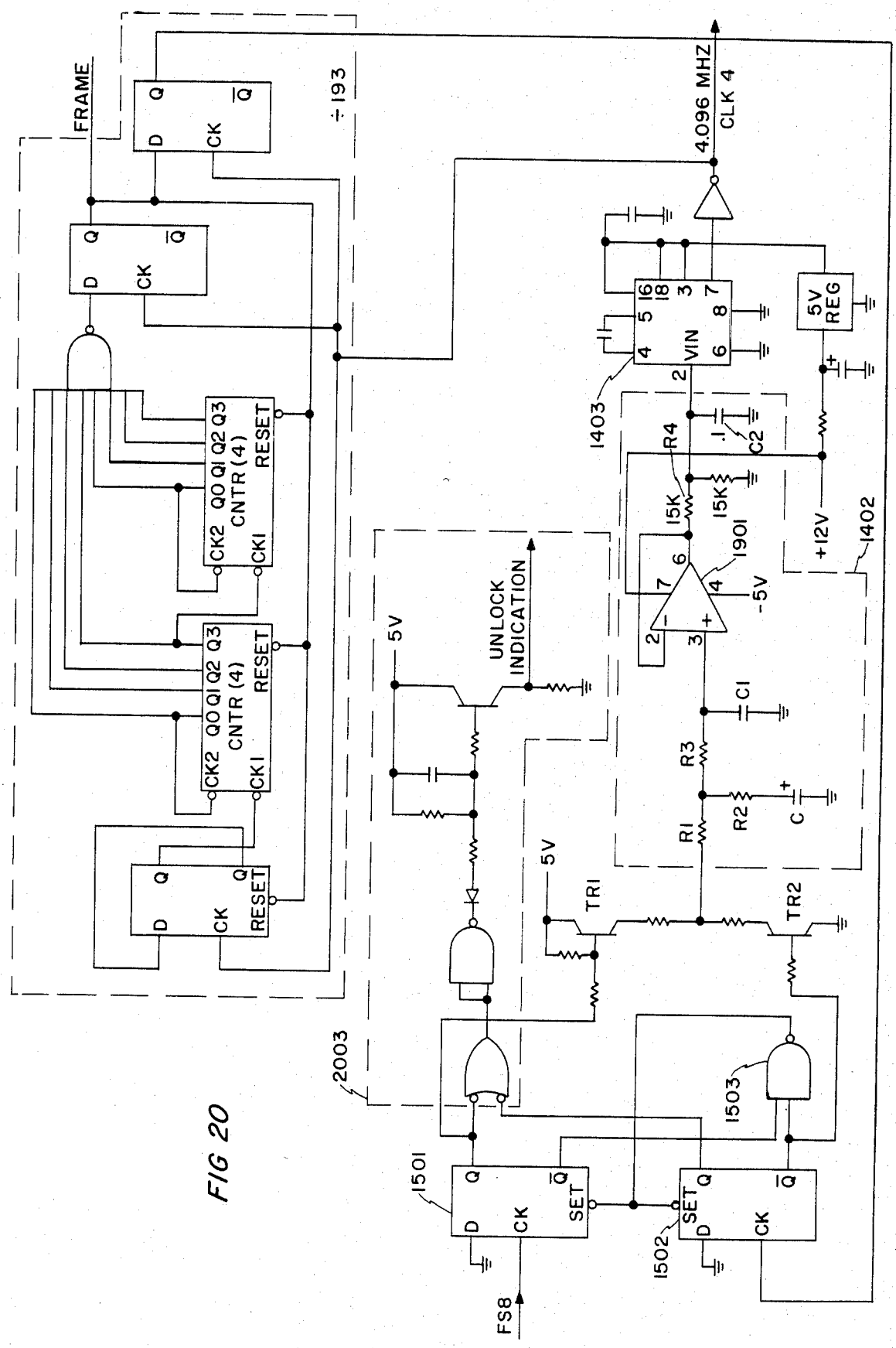
FIG. 20 is a schematic diagram partially in block form of the PLL 1207 of FIG. 12B.

Two low-pass sections were added to the basic loop filter shown in FIG. 19 in order to reduce the aberration caused by a PCM line failure. In addition, isolation is provided between the VCO and active loop filter circuitry at the VCO operating frequency of 4.096 mHz. Turning to FIG. 19A which illustrates the loop filter in simple form, the corner frequencies of the two low-pass filters R3, C1 and R4, C2 is more than an order of magnitude higher in frequency than the natural frequency of the PLL. Thus, the additional phase shift contributed by these filters is negligible and lowers the damping factor only slightly. A J-FET input op amp-1901 is used to provide the low leakage required since the VCO has an input impedance under 100k ohms. FIG. 20 illustrates in detail the complete phase-locked loop circuit combining the circuits of FIGS. 15, 17 and 19A. An unlock indication circuit 2003 provides a signal indicating if the phase-locked loop fails to maintain a locking.

The choice of the VCO is often the most important part of the design of a phase-locked loop. However, in this application, the PLL characteristics that the VCO determine are not cirtical. This includes phase noise, voltage to frequency conversion linearity, temperature sensitivity, frequency range and spectral purity. Three different VCO's were investigated. All were IC designs available from multiple sources and all met the requirements necessary for this application. The MC4024 and 74LS124 are TTL multivibrator designs using an RC network to determine frequency. These parts have very similar performance with approximately 4 nanoseconds of phase jitter at the phase detector. This correlates with the MC4024 specification of 120 Hz RMS (typical) frequency noise deviation at 4.096 mHz. The MC1648 VCO is an ECL IC oscillator design requiring an external varactor and coil. Because of the higher Q elements, it has superior phase noise and spectral purity. At 4.096 mHz, the RMS frequency deviation is specified at less than 20 Hz. This corresponds to a phase jitter at the phase detector of less than 1 nanosecond. With the test equipment available, no phase jitter could be detected.

Turning back to FIG. 12, the output of the PLL 1207 is coupled to a one shot 1209 which acts as a failure detector. If the PLL 1207 fails to be reset within 350 nanosec., it will set flip-flop 120 and will provide a failure indication to the PLL controller 1250. Flip-flop 1210 will automatically operate the selector 1214 to switch to the phase-locked loop in the other line switch module e.g. 1b of FIG. 2. The PLL controller 1250 must however switch the PCM line clock, e.g., CLKA, to the PLL 1207 in the other module without missing clock pulses. The 500 nanosec. delay 1208 permits switching to the other PLL without missing clock pulses since the delay 1208 provides clock pulses for 500 nanosec. after the first PLL 1207 has failed. The selectors 1212 and 1213 are also controlled by flip-flop 1210 to switch the source for SIG and FRAME to the other line switch module.

The PLL controller 1250 includes a microcomputer 1251 and an interface circuit 1252. The microcomputer 1251 in the illustrative embodiment is an INTEL 8049 microcomputer. The interface circuit comprises a protocol interface circuit (PIC) which will be described in greater detail in conjunction with the line group controller. The INTEL 8049 microcomputer is described in INTEL COMPONENT CATALOG 1979, INTEL CORPORATION, 1979, pp 8-27 to 8-30.

The system controller 5 selects which PCM line clock is to be initially selected as the master clock to which the line switch clock circuits are to be synchronized. The system controller 5 informs the line switch controllers 7 in the line switch of the initial selection. The line switch controllers 7 then direct the respective microcomputers 1251 to the initial selection. If one of the line module microcomputers 1251 detects a failure in the clock circuits, it arbitrarily switches to another line clock to be used as a master. The failure detecting microcomputer will send information back to the system controllers 5 via line switch controller 7 identifying the newly selected PCM line clock. The system controller 5 will then transmit command information to the other module microcomputer 1251 via the respective line switch control 7 directing the other modules microcomputer to select the same PCM line clock as master. Thus, all modules within the line switch utilize the same PCM line clock to derive the internal line switch clocks.

5.0 LINE SWITCH CONTROLLER (FIGS. 9B, 9E to 9N, 10B, 10C)

The line switch controller 7 communicates with the system controller 5 of FIG. 1 via the PCM lines PCMA, PCMB. The line switch controller 7 transmits and receives information over the common channeling signaling bits of the PCM lines PCMA, PCMB. The line switch controller 7 has access to the PCM lines PCMA, PCMB via the RX and TX rate converters. More specifically, turning to FIG. 9B, each time a common channel signaling bit appears on the PCM line, PCMA or PCMB, the associated clock lead FSA or FSB will provide a pulse. The clock pulse on the lead, e.g. FSA will cause the common channel signaling bit to be loaded into a buffer flip-flop 950A or 950B. The output of buffer flip-flop 950 or 950B is presented to the line switch controller via lead CCRXA or CCRXB. Information from the line switch controller 7 is inserted into the common channel signaling bit portions on lines PCMA and PCMB under control of the clock leads FS8A, FS8B. Turning to FIG. 10B, common channel signaling information from the line switch controller 7 for PCM line PCMA is provided on lead CCTXA and for PCM line PCMB on lead CCTXB. Tri-state buffer gate 1086 is enabled by CLKA during the common channel signaling bit time and gates the data bit from line CCTXA into PCM line PCMA. Likewise, data from lead CCTXB is gated onto PCM line PCMB.

Figure 9E:
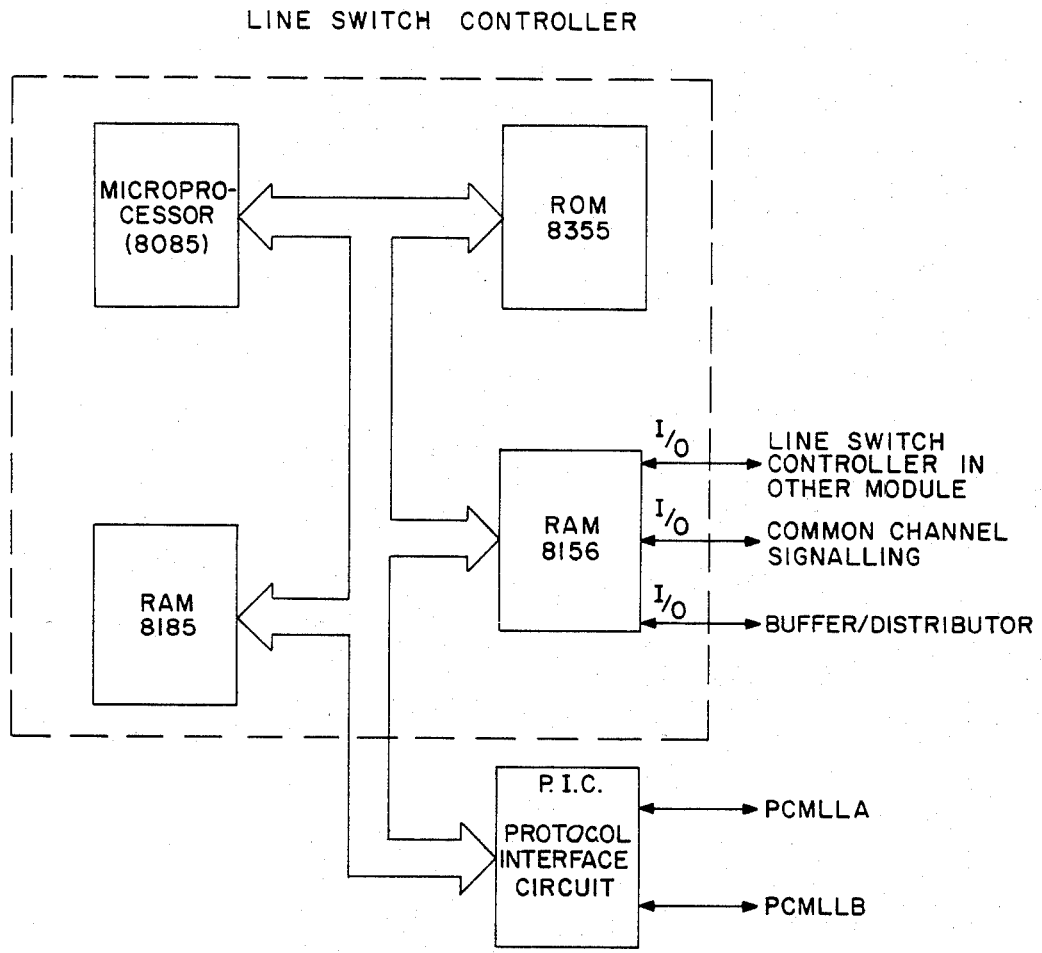
FIG. 9E illustrates in block diagram form the line switch controller 7 of FIGS. 2 and 2A.

Turning now to FIG. 9E, the line switch controller is shown as comprising a Protocol interface circuit PIC and a microcomputer. The microcomputer utilized in the illustrative embodiment is the MCS-85 TM system available from INTEL CORPORATION which is described in INTEL COMPONENT DATA CATALOG 1979, Intel Corporation, 1979, 9-79 to 9-139. More specifically, the microcomputer configuration may be that shown in FIG. 1 at page 9-78 of the aforementioned Intel reference. The 8085 microprocessor, the 8156 RAM with I/O ports and timer, the 8355 ROM and the 8185 RAM shown are all described in detail in the aforementioned INTEL reference.

The protocol interface circuit PIC serves as a control data interface between the parallel data bus of the microcomputer and the high speed, bit serial PCM bus PCM4. The line switch controller 7 operates as the master in a master slave relationship with all other circuits connected to the PCM buses PCM4, PCMLCA, PCMLCB. More specifically, only the line switch controller 7 may transmit control word commands over the PCM buses. A circuit will transmit a control word response on the PCM buses only after receiving a command addressing that circuit. The convention established for the line switch control communication specifies that commands and responses must occur in pairs, only a line switch controller 7 can initiate a command, and the response to a command always occurs a fixed number of frames after the command.

Figure 9F:
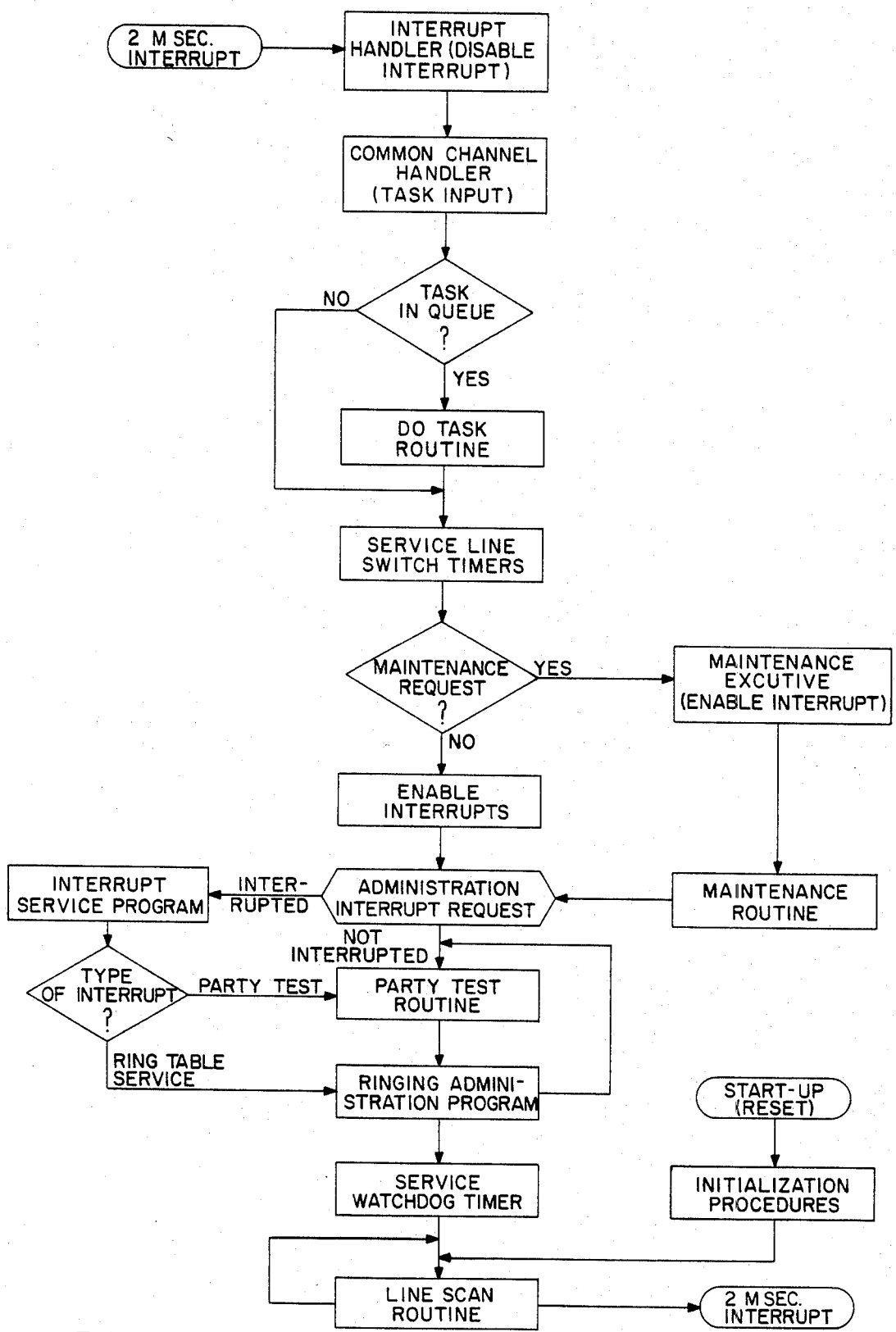

FIG. 9F is a flow chart of the general software architecture of the line switch controller 7. Commands from the system control 5 of FIG. 1 are transmitted over the PCM lines PCMA, PCMB arriving at a rate of one byte (8 bits) every 2 msec. The line switch controller includes a 2 msec. interrupt timer and when a 2 msec. interrupt occurs, an interrupt handler program calls a common channel data handler to process the received data byte. If the received data byte completes a command (each command may have 5 to 10 bytes), the previously received bytes for the command will be retrieved from a queue and the command will be executed. If the received byte does not complete a command, it will be stored in the queue. Typical of the tasks which the line switch controller 7 will be commanded to execute are: calling and called party channel assignments, initiating ringing, disconnecting ringing, call disconnect maintenance, test, alarm and administrative functions. FIGS. 9G to 9N illustrate in greater detail the flow charts of various programs identified in FIG. 9F.

Figure 9G:
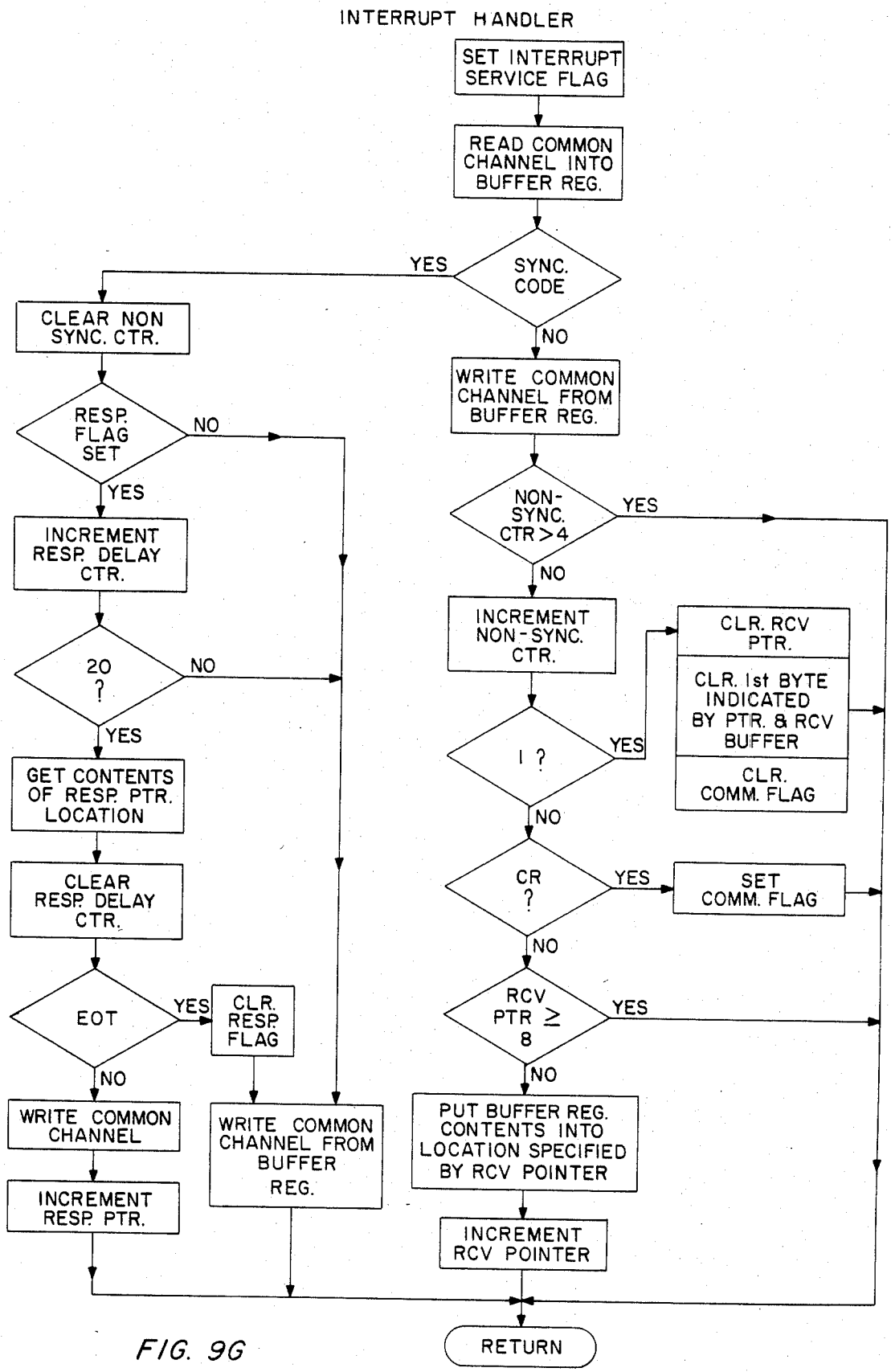
Figure 9H:
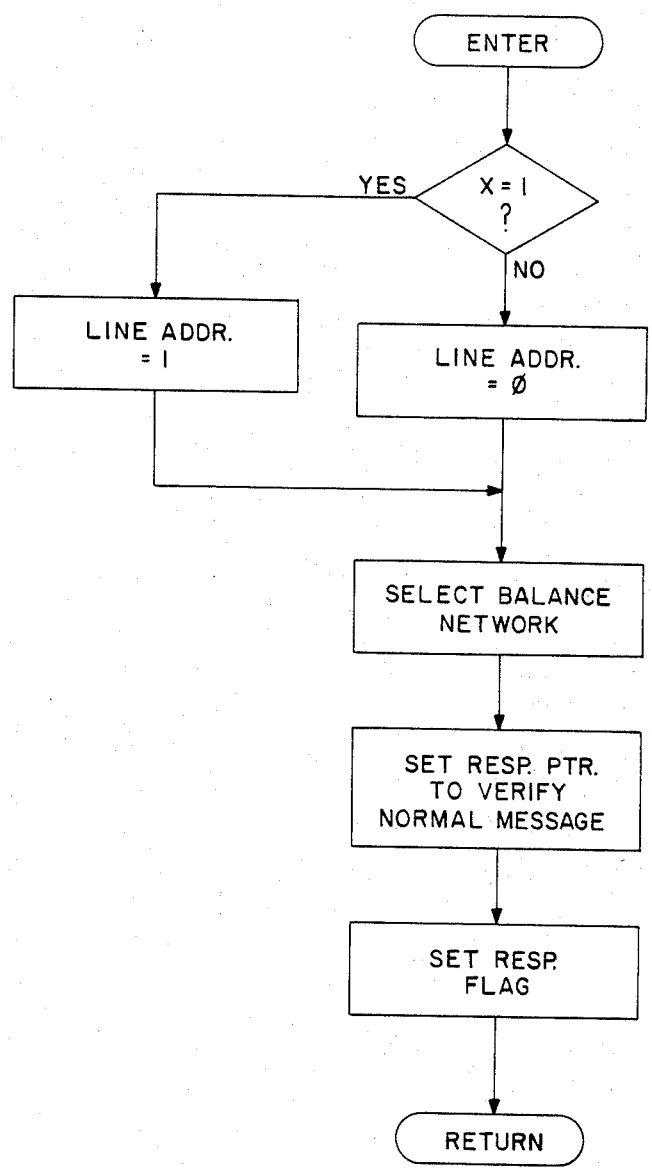
Figure 91:
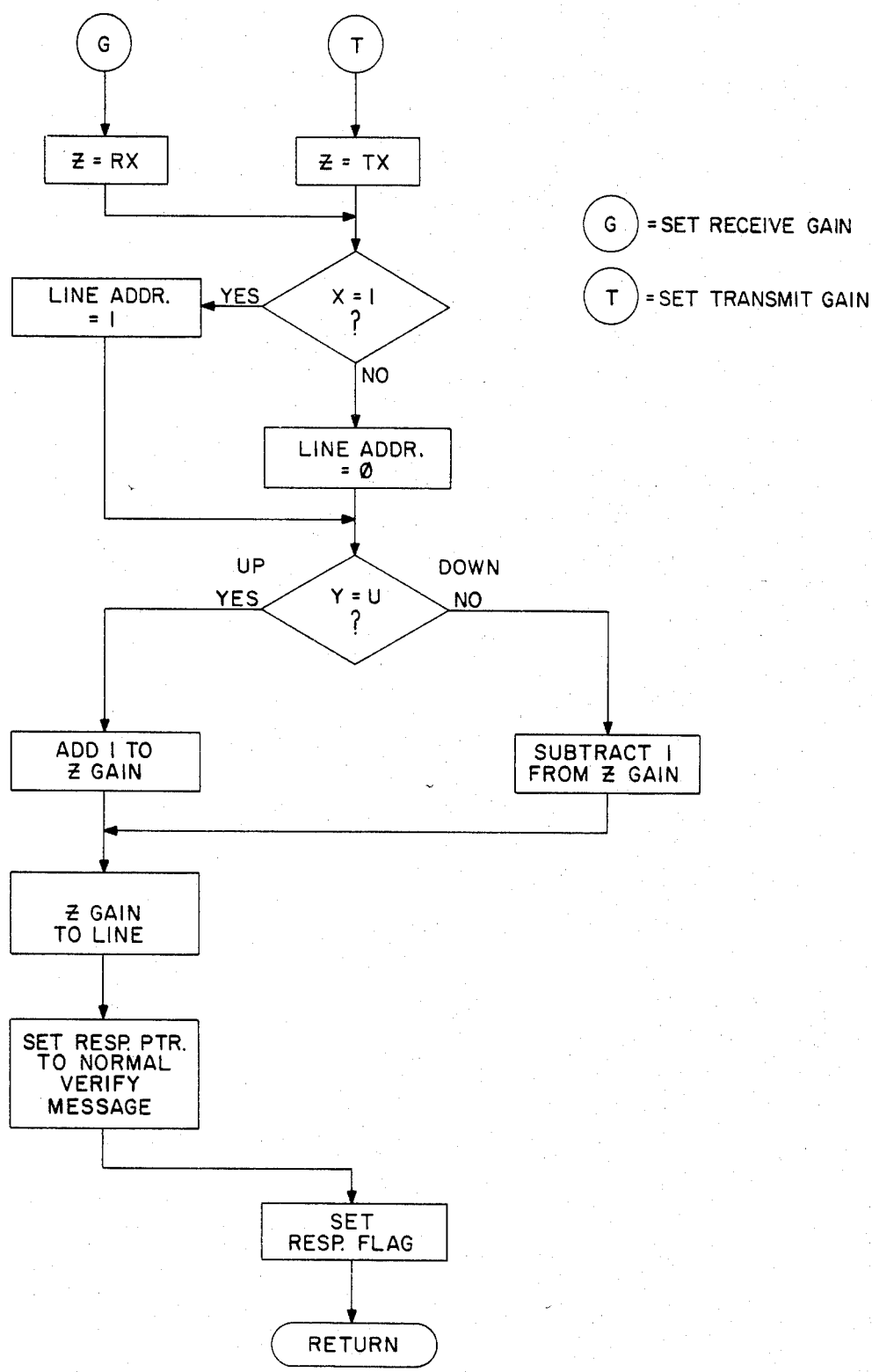
Figure 9J:
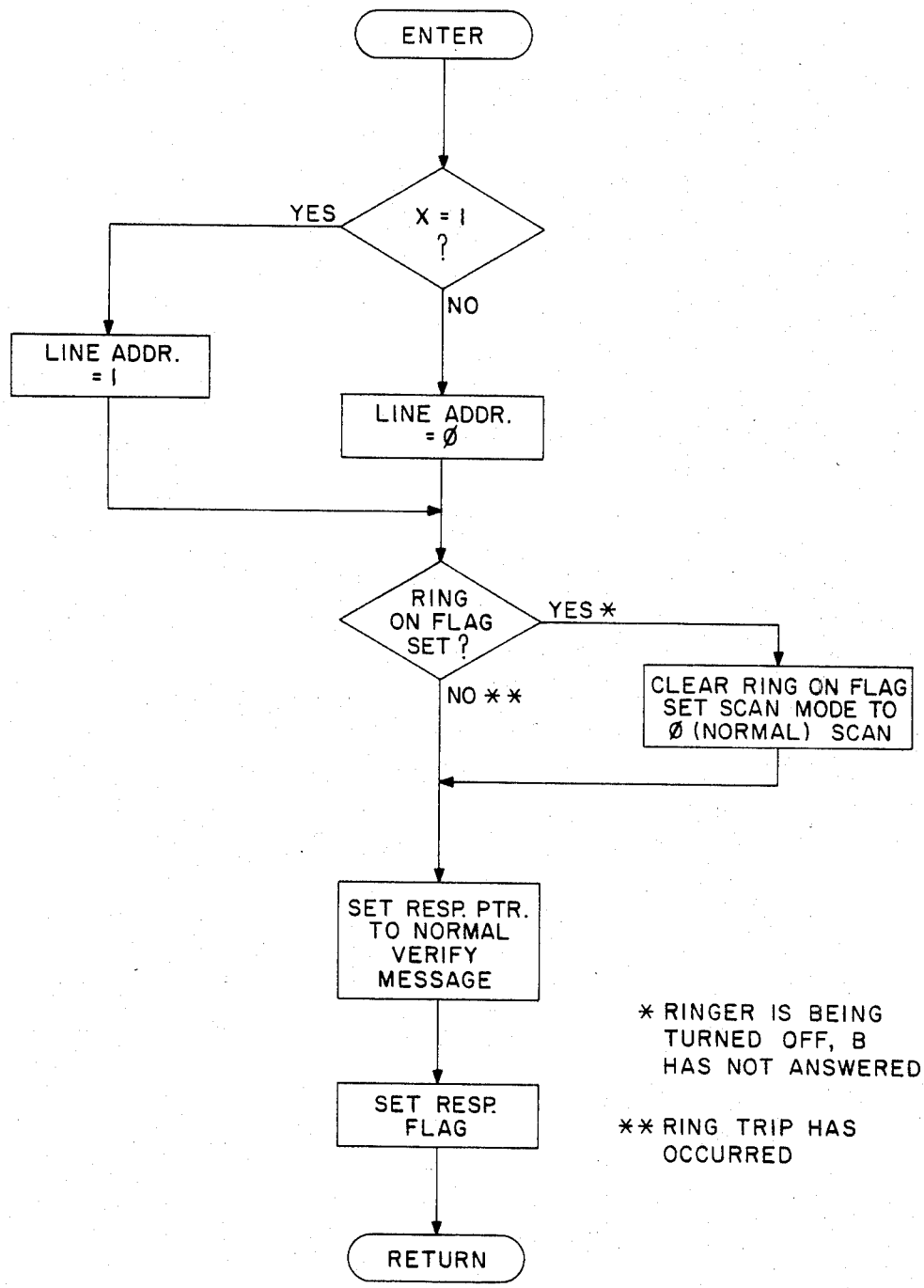
Figure 9K:
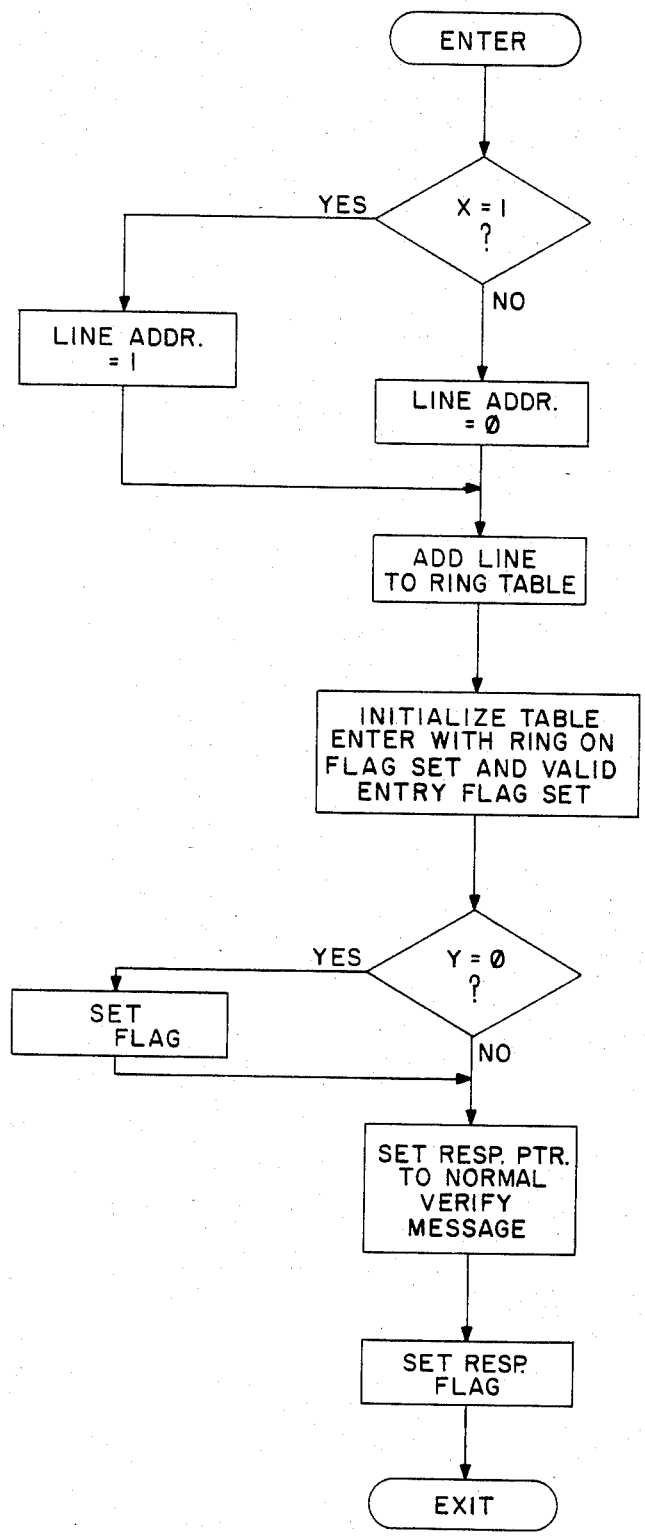
Figure 9L:
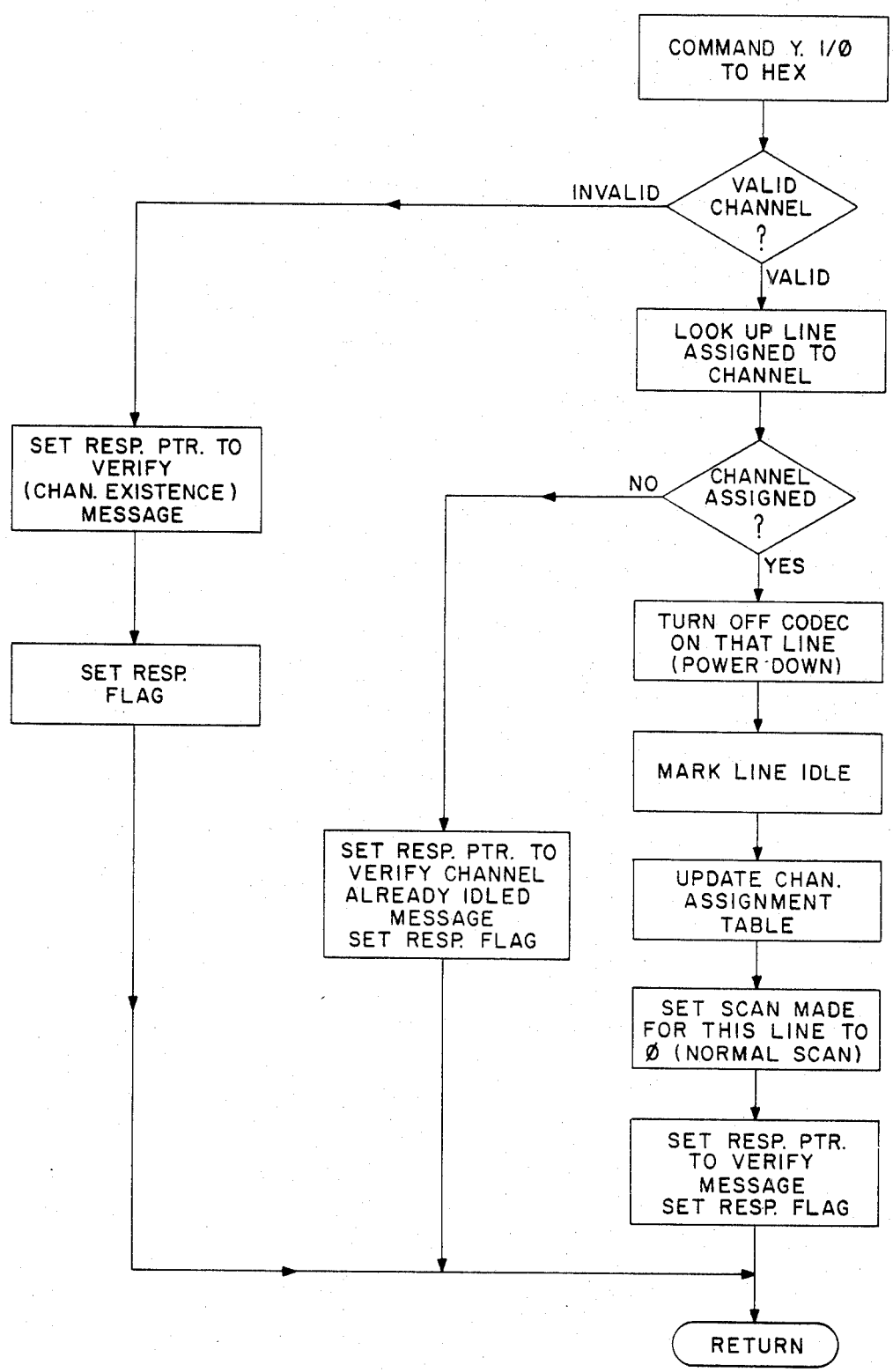

FIG. 9G illustrates the interrupt handler and common channel handle programs.

The following notes are appropriate to FIG. 9G.

EOT indicates end of test.

REV BUFF indicates receive buffer and is the first location of temporary storage for common channel commands.

RESP PTR (response pointer) is set to the character in a command channel response or command.

RES Flag is set by the common channel routine when a response is to be sent.

RCU PTR is a receive pointer.

COMM FLAG indicates when a complete command has been received.

NON-SGAL CTR indicates when 5 consecutive non-signal codes have been received, this initializing resynchronization.

INT SERVFLAG indicates that a 2 millisec. interrupt has occurred.

RESP DLY CTR delays characters to 300 baud

Figure 9M:
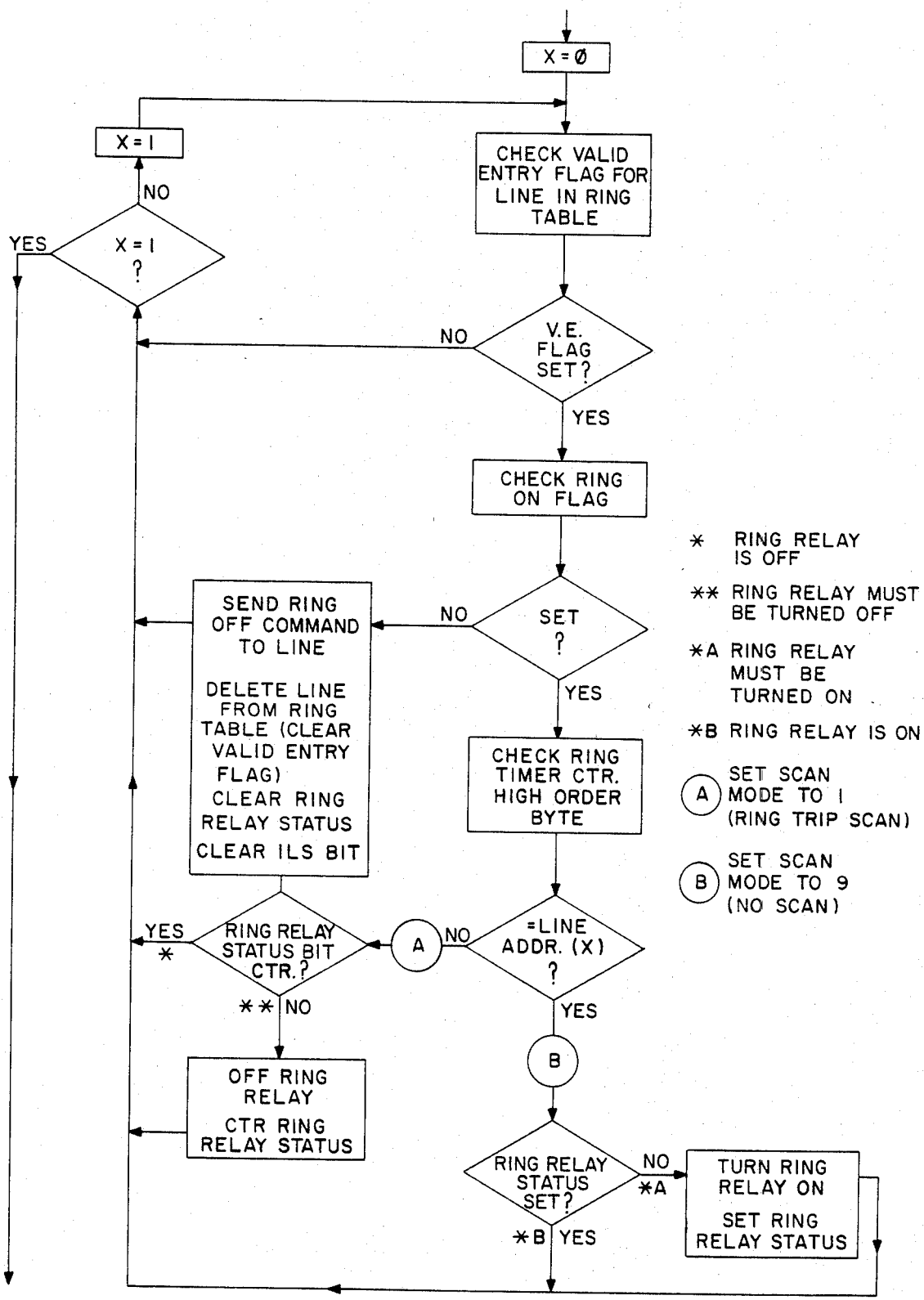
Figure 9N:
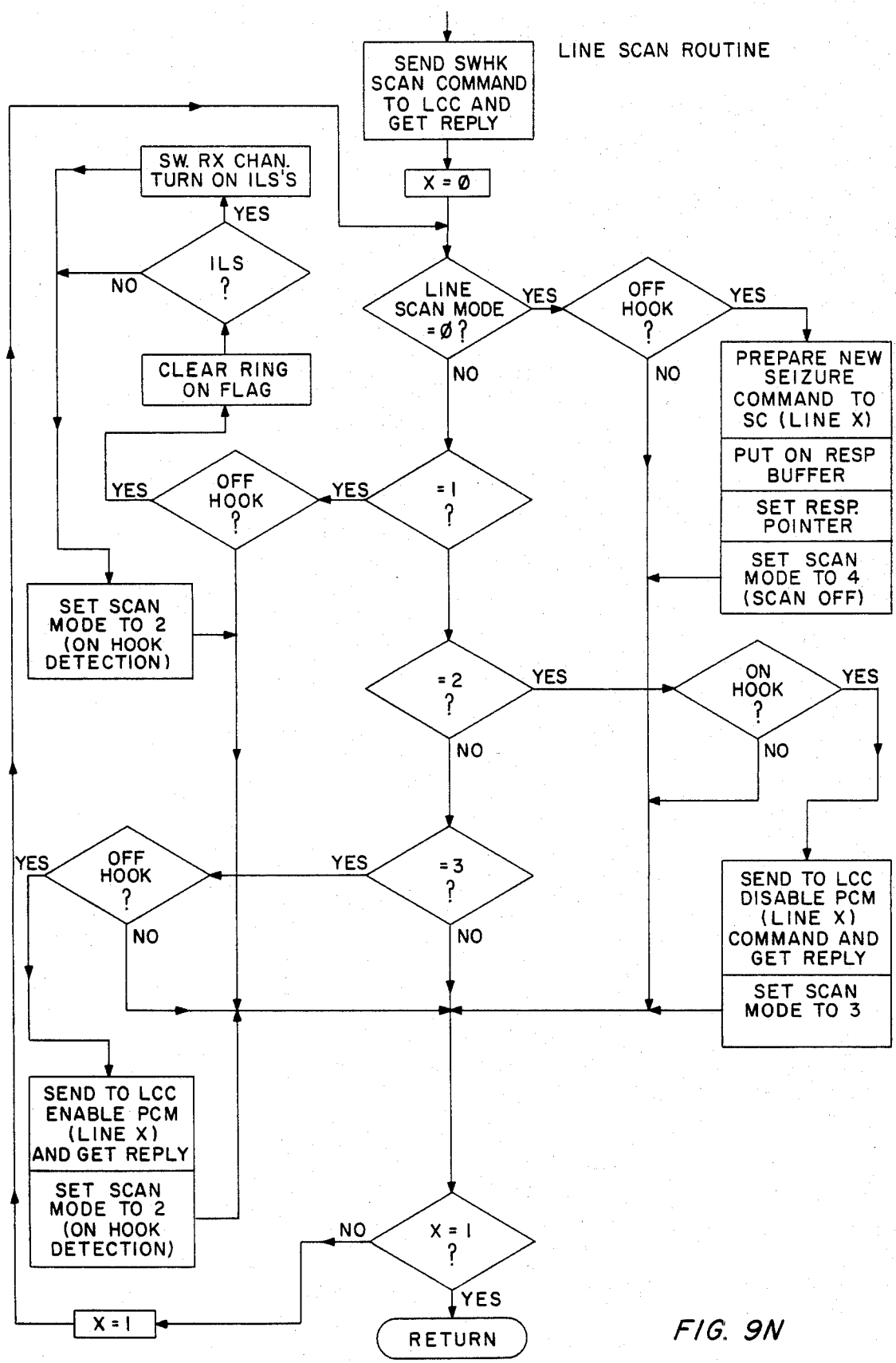

FIGS. 9H to 9L are flow charts for various task routines, FIG. 9M is a flow chart of the ringing administration program; FIG. 9N is a flow chart of the line scan routine.

6.0 BUFFER AND DISTRIBUTOR 9 (FIGS. 21, 22, 23)

Figure 21:
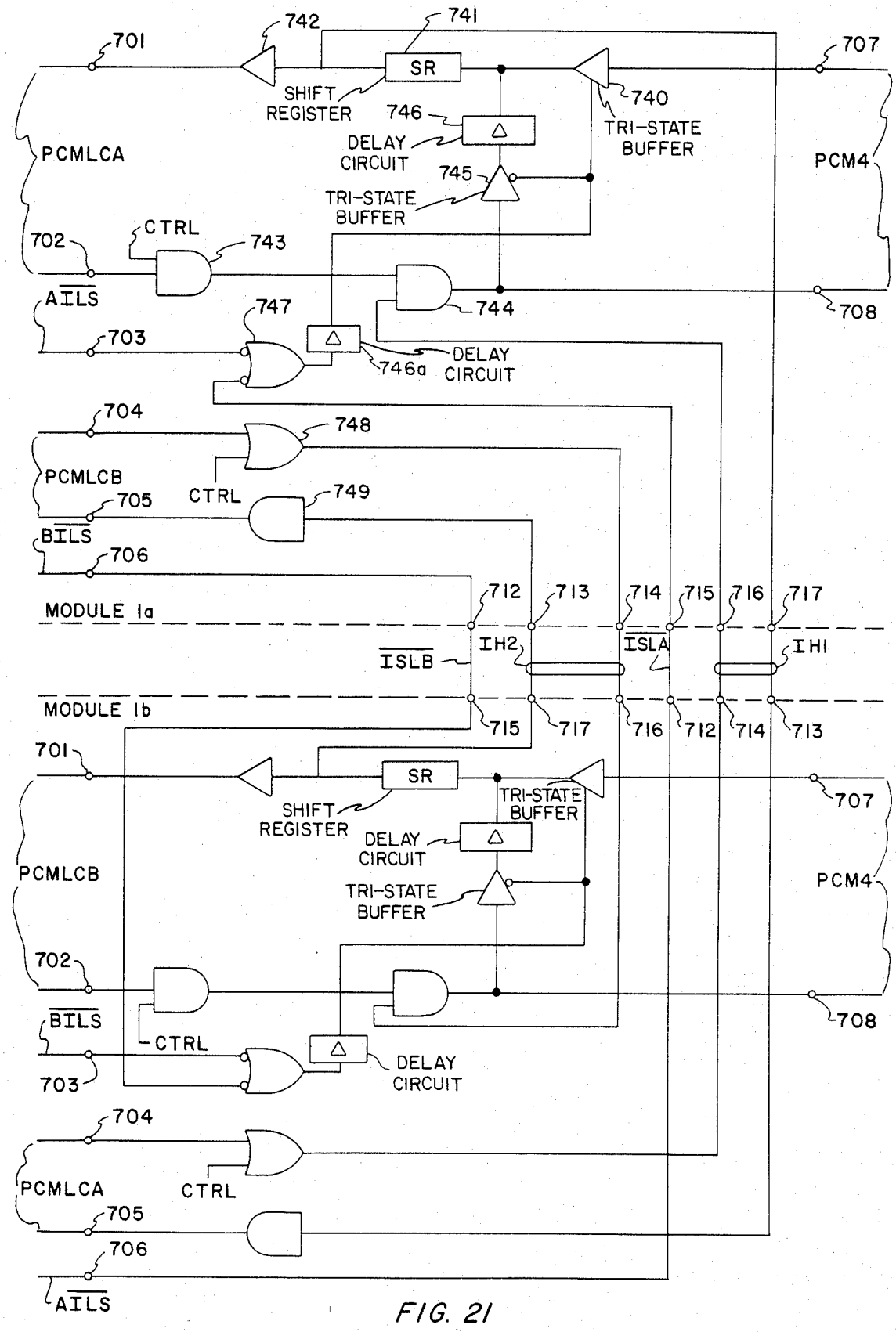
FIG. 21 illustrates in block diagram form one portion of the buffer and distributor 9 of FIGS. 2 and 2A.
Figure 22:
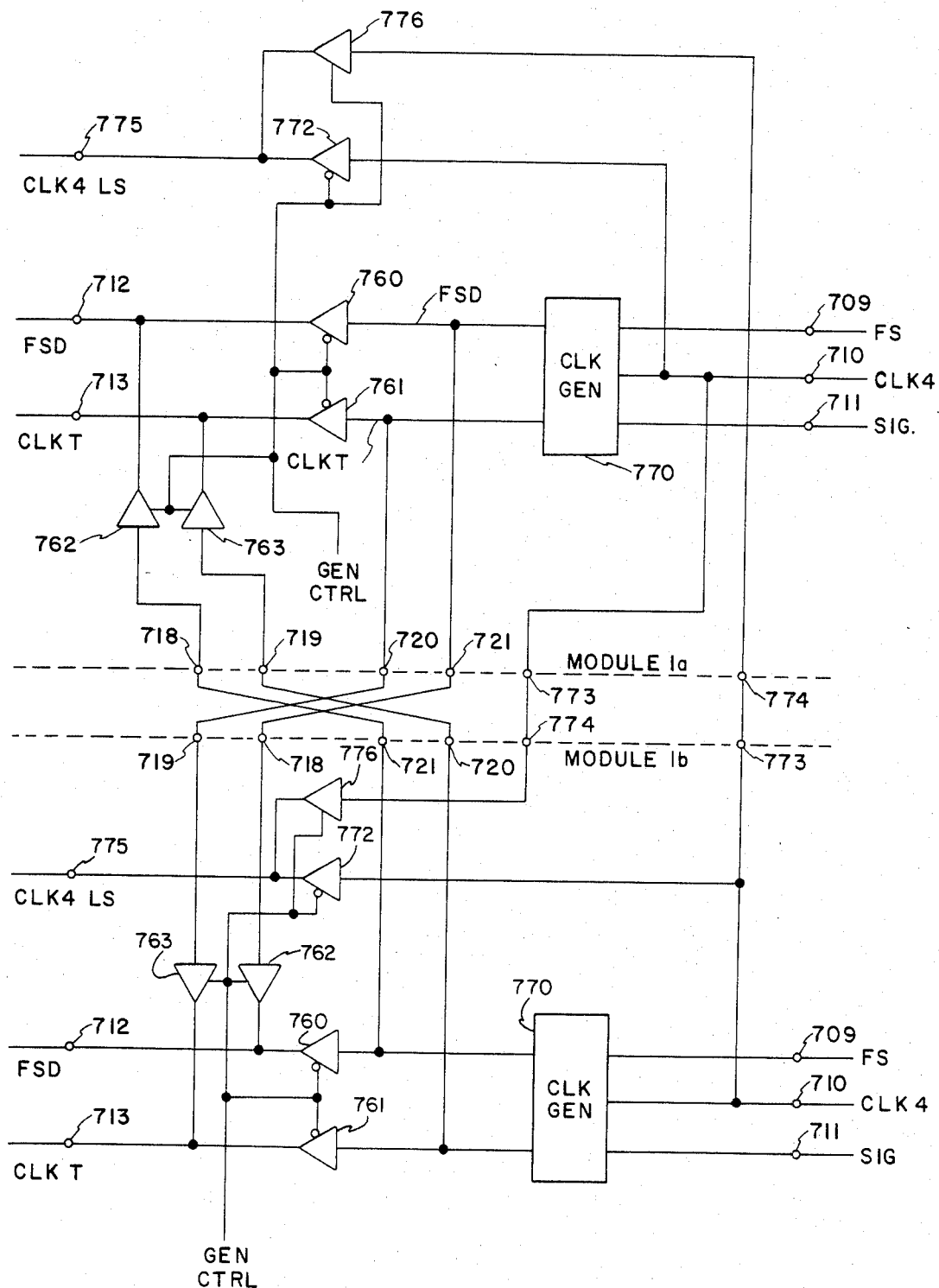
FIG. 22 illustrates in block diagram form another portion of the buffer and distributor of FIGS. 2 and 2A.

FIGS. 21 and 22 illustrate the buffer and distributor circuits 9 of FIG. 2 in greater detail. For purposes of clarity, only one buffer and distributor 9 for each line switch module 1a, 1b is shown in FIGS. 21 and 22. If in accordance with the aforementioned security block concept each line switch module 1a, 1b includes more than one buffer and distributor 9, then one buffer and distributor 9 of each line switch module 1a, 1b will include both the circuitry of FIGS. 21 and 22 and the other buffer and distributor 9 of each line switch module 1a, 1b will include only the circuitry of FIG. 21. The circuitry of the buffer and distributor 9 for each of the line switch modules 1a, 1b shown in FIGS. 21 and 22 are identical and corresponding terminals of the buffer distributor circuits have identical designations. FIG. 21 illustrates the circuitry associated with the PCM buses PCM4, PCMLCA, PCMLCB and FIG. 22 illustrates the clock distributor circuit.

Figure 23:
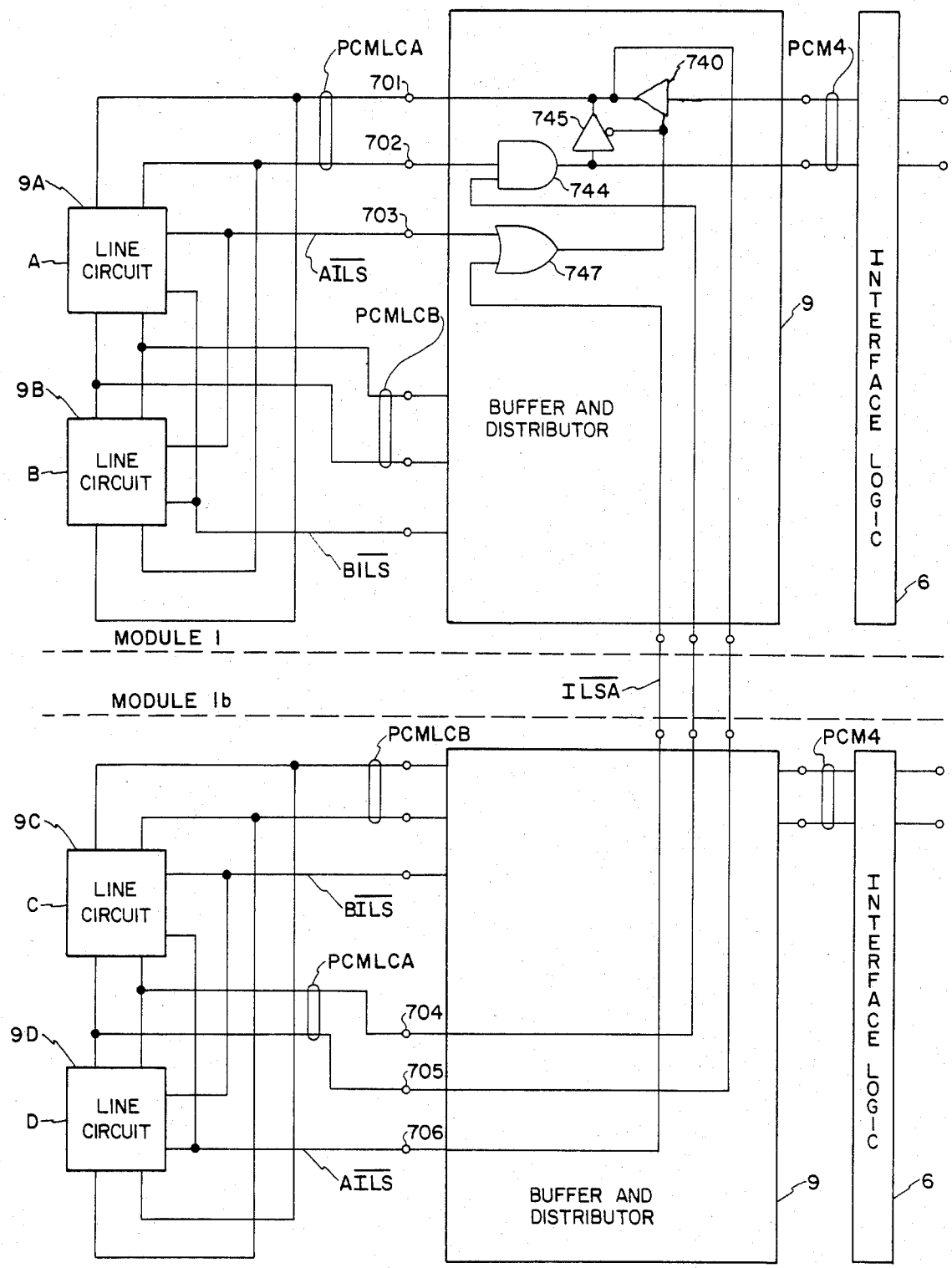
FIG. 23 is a block diagram illustrating the operation of buffer and distributor 9 of FIGS. 2 and 2A.

6.1 BUFFER (FIGS. 21 and 23)

Line switch module 1a of FIG. 21 has terminals 707 and 708 connected to PCM bus PCM4, terminals 701 and 702 connected to PCM bus PCMLCA and terminals 704 and 705 connected to bus PCMLCB. Interposed between terminals 707 and terminal 701 are gate 740, shift register 741 and buffer gate 742. Interposed between terminals 702 and 708 are gates 743 and 744. A path is provided between the output of gate 744 to the lead between gate 740 and shift register 741 via gate 745 and delay circuit 746. Gates 740 and 745 are controlled by gate 747 through delay circuit 746a. Gate 747 has one input connected to terminal 703 and another input connected to terminal 715. Gates 740 and 745 are arranged such that gate 740 is normally closed and gate 745 is normally open, but when an appropriate signal state is present at terminals 703 or 715 gate 740 is open and gate 745 is closed. Together, gates 740 and 745 operate as a crosspoint switch which is utilized for intra-line switch calls as described below.

Terminals 704 and 705 are respectively coupled to terminals 714 and 713 via gates 748 and 749. Terminal 706 is connected directly to terminal 712.

The two line switch modules 1a, 1b are interconnected via intra-line switch highways IH1 and IH2 and leads $\overline{ILSB}$ and $\overline{ILSA}$. It should be noted that the gates 743 and 748 include an additional input CTRL which may be individually controlled in the event of a fault to inhibit PCM transmission.

When the system controller 5 (shown in FIG. 1) determines that a subscriber connected to a line circuit has requested a connection to another subscriber connected to a second line circuit within the same line switch, the system controller 5 forwards commands to line switch controller 7 shown in FIG. 2 indicating that an intra-line switch connection is required. The line switch controller 7, in turn, provides control signals to the line circuits of the originating and terminating parties thereby loading status bits in the respective line circuits. The status bits in turn provide gating of control signals AILS, BILS to the crosspoint switches 740, 745 of FIG. 21 associated with the originating and terminating line circuits. The respective AILS and BILS signals are active only during the time period when the transmit channels occur, which the line switch controller 7 has assigned to the originating and terminating line circuits.

Turning now to FIG. 23, the operation of switches 740, 745 is described. FIG. 23 shows the two line switch modules 1a, 1b each connected to the corresponding interface logic 6. In line module 1a, only two line circuits 9A and 9B are shown and in line module 6 only two line circuits 9C and 9D are shown. It should be understood that only two line circuits are shown in each line switch module 1a, 1b for purposes of clarity.

Two intra-line switch call operations will now be described, with reference to FIG. 23. First, assume that the subscriber A connected to line circuit 9A has requested a connection to a subscriber B connected to line circuit 9B, i.e., to a subscriber connected to the same line module. The system controller 5 of FIG. 1 provides control signals to line switch controller 7 of line switch module 1a, that an intra-line switch call between line circuits 9A and 9B has been requested. Line circuit controller 7 transmits commands to the line circuit groups containing line circuits 9A and 9B, indicating that an intra-line switch call connection is to be established, and that bus PCMLCA is to be used. The transmit and receive channels for the two subscribers A and B are also assigned. When the transmit channel for subscriber A occurs, line circuit 9A provides an active signal on lead $\overline{AILS}$ which closes switch 745 and opens switch 740. The transmit lead of PCM bus PCMLCA connected to terminal 702 is thus connected to the receive lead of PCM bus PCMLCA connected to terminal 701. Thus, a PCM sample from subscriber A transmitted by line circuit 9A on the transmit portion of bus PCMLCA is "looped back" to receive portion of bus PCMLCA. The receive channel assigned to subscriber B line circuit 9B is assigned such that it corresponds to the transmit channel of subscriber A of line circuit 9A. Therefore line circuit 9B receives the PCM sample transmitted by the line circuit 9A. Likewise, when the transmit channel for line circuit 9B occurs, line circuit 9B will apply an active signal to line AILS. Switch 740 will again open and switch 745 will again close for the duration of the transmit channel. Thus, the PCM sample transmitted by line circuit 9B on the transmit portion of PCM bus PCMLCA is "looped back" to receive portion of PCM bus PCMLCA. The receive channel assigned to line circuit 9A corresponds to the transmit channel assigned to line circuit 9B. Therefore, line circuit 9A will receive the PCM sample transmitted by line circuit 9B.

Second, assume that the subscriber A connected to line circuit 9A has requested a connection to a subscriber D connected to line circuit 9D, i.e., to a subscriber connected to a different line switch module within a line switch. The system control of FIG. 1 provides control signals to line switch controller 7 of FIG. 2 of the line switch module 1a that an intra-line switch call between line circuit 9A of line module 1a and line circuit 9D of line switch module has been requested and bus PCMLCA is to be used.

Line switch controller 7 of line switch module 1a assigns transmit and receive channels to line circuits 9A and 9D of FIG. 23. Again, the assigned transmit channel of line circuit 9A will correspond to the receive channel of line circuit 9D and the assigned transmit channel of line circuit 9D will correspond to the receive channel of line circuit 9A. The crosspoint switches 740 and 745 are then operated in the same manner as described above, with the exception that line circuit 9D provides active signals to control the switches 740 and 745 instead of line circuit 9B.

Figure 24A:
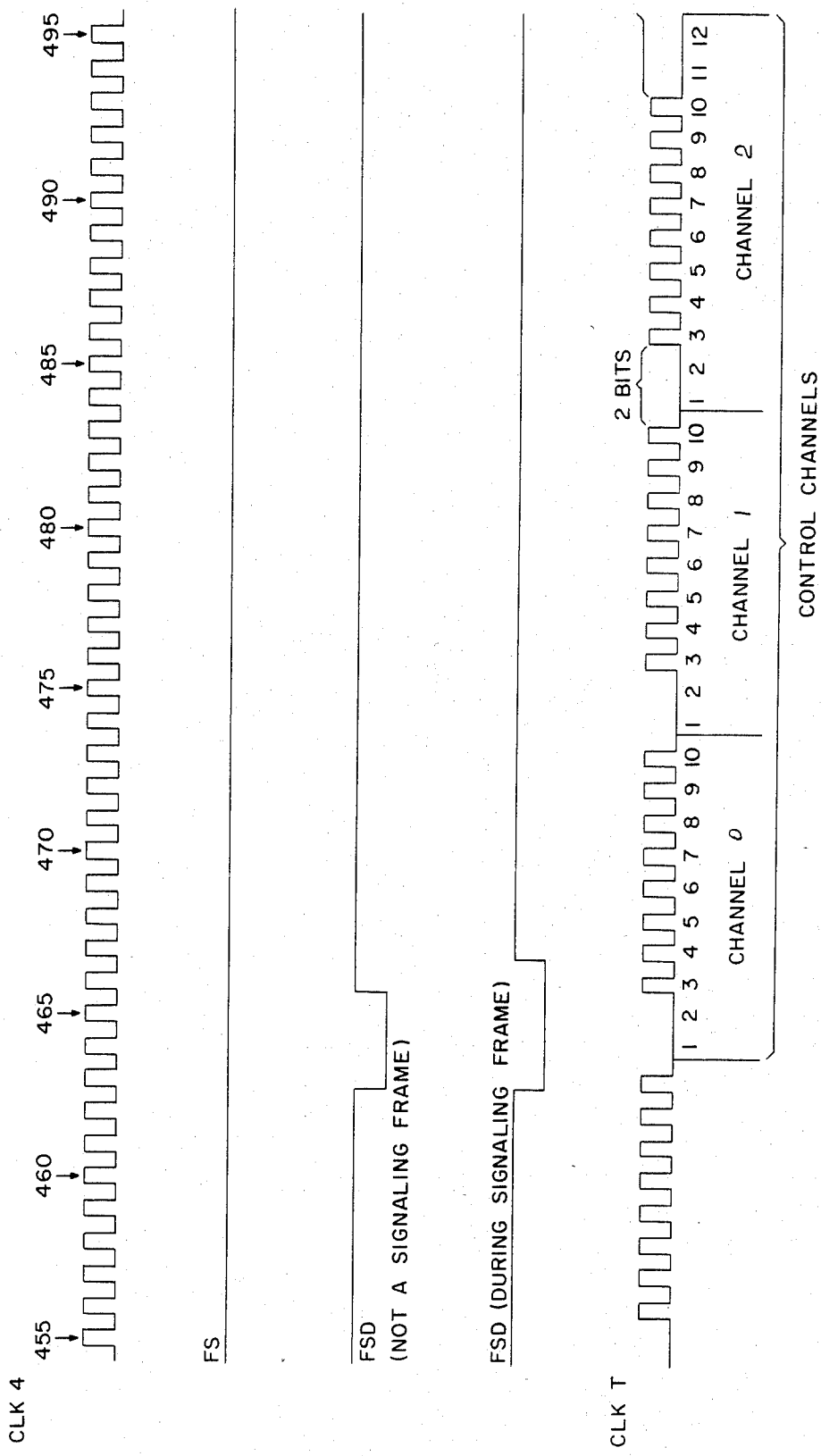

6.2 DISTRIBUTOR (FIGS. 22 and 24)

The clock distribution circuitry of the buffer and distributor circuits 9 for two line switch modules is shown in FIG. 22. Each buffer and distributor 9 has input terminals 709, 710, 711 connected to lines FS, CLK4, and SIG from a corresponding interface logic 6. A clock generator circuit 770 generates a CODEC clock signal CLKT and a frame clock signal FSD. The outputs FSD and CLKT are coupled to terminals 712 and 713 respectively via controlled switches 760 and 761 and are directly coupled to terminals 721 and 720. Input terminals 718 and 719 are coupled to terminals 712 and 713 respectively via controlled switches 762 and 763. Each of the switches 760, 761, 762, and 763 has a control input commonly connected to lead GEN CTRL and operates such that when a signal having a first state is present on GEN CTRL, switches 760 and 761 are open and switches 762 and 763 are closed. When a signal having a second state is present on GEN CTRL switches 760 and 761 are closed and switches 762 and 763 are open. By means of the switches 760, 761, 762, 763, the FSD and CLKT signals for a line switch module may be supplied either by the clock generator 770 within the line switch module or by the clock generator in another line switch module. The GEN CTRL lead of a line switch module is connected to the line switch controller in the same line switch module.

Timing signal waveforms for the signals FS, CLK4, FSD and CLKT are shown in FIG. 24. A 9 stage counter within the clock generator 770 repetitively counts 512 4.096 mHz pulses before recycling.

The FS signal received from the interface logic 6 of FIG. 2 is a frame synchronization pulse which occurs every 125 microseconds. CLK4 is a 4.096 mHz clock signal from interface logic 6. SIG is likewise provided by interface logic 6 of FIG. 8 and indicates the occurrence of signaling frame, i.e., SIG is normally low and goes high the frame before a signaling frame. CLKT is a CODEC clock which generally comprises bursts of eight pulses of a 4.096 mHz clock. The relationship of CLKT to the CODEC channels is shown. When a frame bit FSD occurs, the next 32 bits received over the PCM bus are control bits. More specifically, in a system with 10-bit channels, the next three channels are reserved for control data and channel three is extended by two bits. In a system with 8-bit channels, four channels are reserved for control.

FSD is a framing signal which will vary as shown depending on whether it occurs during a signaling frame or not.

Turning back to FIG. 22, the CLK4 lead coupled to terminal 710 is connected to output terminal 775 via switch gate 772 and is connected directly to output terminal 773. Input terminal 774 is coupled to output terminal 775 via switch gate 776. The terminal 774 is connected to terminal 773 of the other line module. The switch gates 772 and 776 operate in the same manner and under control of the same GEN CTRL signal as the aforementioned switch gates 760, 761, 762, 763 so that either CLK4 from line module 1a or 1b may be utilized as the source for 4.096 mHz clock signals on lead CLK4LS.

7.0 LINE CARD OR GROUP (FIG. 25)

Figure 25A:
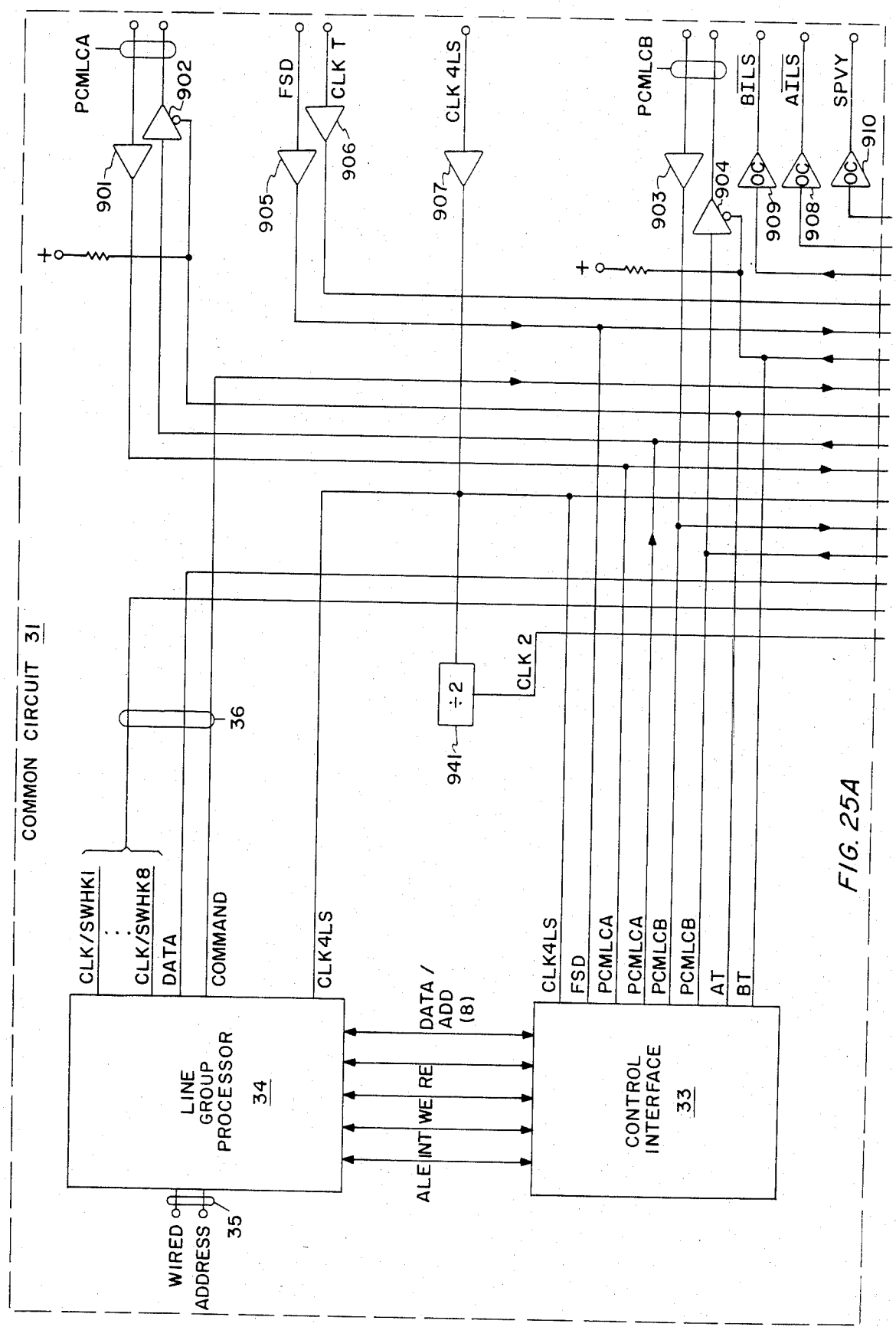
Figure 25B:
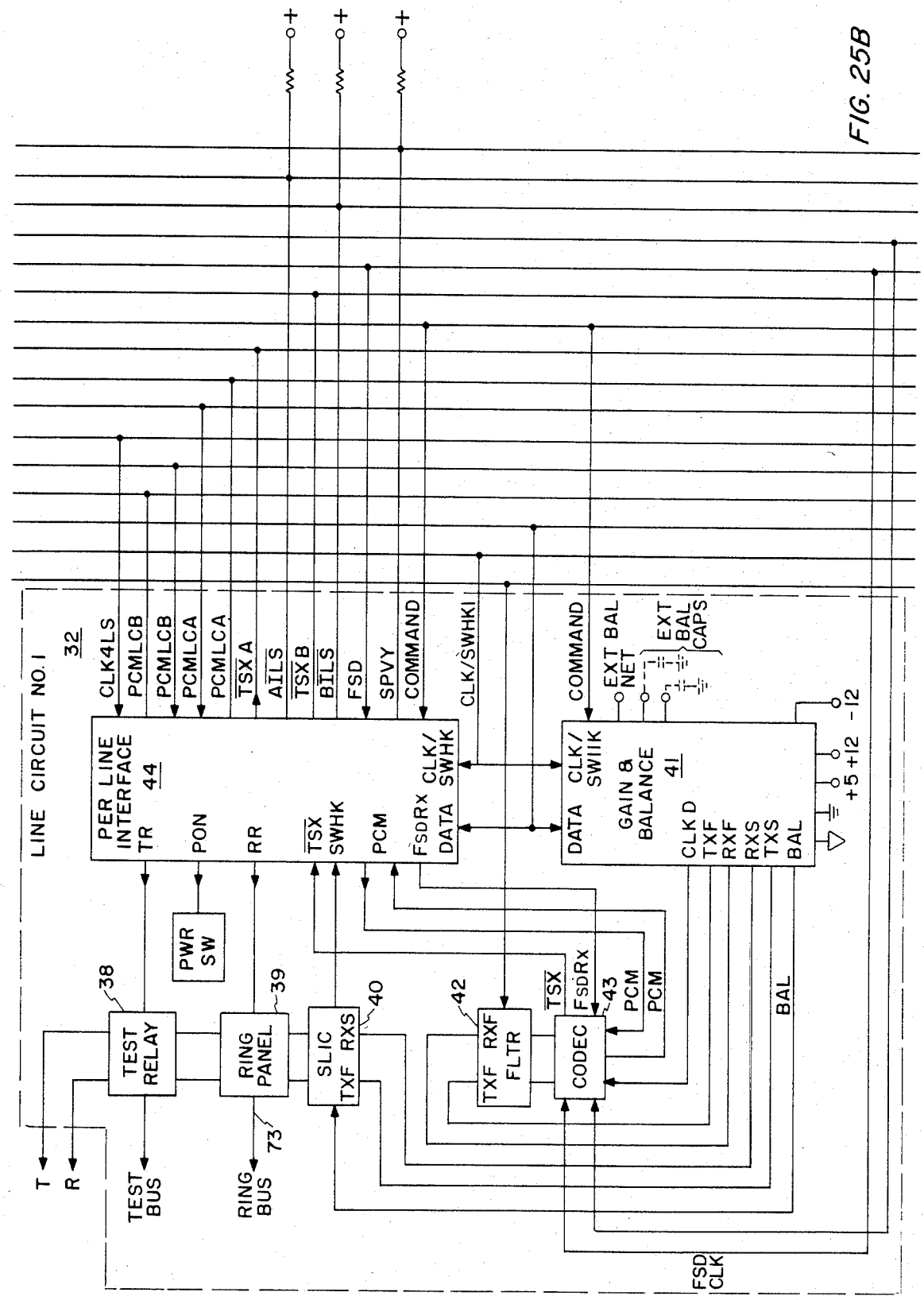

One of the line groups 11 of FIG. 2 is shown in detail in FIG. 25. Each line group includes a common circuit portion 31 and eight line circuits 32 in the illustrated embodiment. In other embodiments, the common circuit portion 31 may be on a separate circuit card and a line group may have more or less than eight line circuits. The common circuit portion includes a control interface 33 which is coupled to PCM bus PCMLCA via buffer 901 and switch gate 902, and to PCM bus PCMLCB via buffer 903 and switch gate 904. The control interface is also coupled to the FSD and CLKT leads via buffers 905 and 906, respectively. The interface 33 extracts and inserts control data bits which are transmitted and received over PCM buses PCMLCA and PCMLCB. Control data received over the buses are examined to determine if the address received matches the address of the line group. If the received address matches, an interrupt signal is sent via line INT to a line card processor 34 which may be a conventional microprocessor of a type well known in the art. It should be noted that the line group address, which the control interface 33 matches against is, in fact, supplied by the line group processor 34 and is stored by the control interface 33. The line group address is supplied to the processor 34 by leads 35 to provide a unique address to the line card.

Other control data are communicated between the processor 34 and the PCM buses PCMLCA, PCMLCB via the control interface 33, which acts as a data buffer. It should be noted that the control interface 33 is provided because the microprocessor 34 cannot operate at a high enough rate to handle 4.096 mbps serial rate on the PCM buses. In other applications, which do not utilize a high speed serial bus for control information, e.g., where control information is received in parallel, or at a slower rate, the control interface 33 may not be necessary. In other words, the microprocessor 34 may be directly coupled to the bus carrying the control information.

After the processor 34 determines that an operation is required within its associated line group, it will select the appropriate line circuit, as determined by portions of the control data received over PCM bus PCMLCA or PCMLCB.

The processor 34 is connected to the line circuits 32 via bus 36. Bus 36 includes ten separate leads, specifically, a separate clock lead CLK/SWHKn (n=1 to the number of circuits in a group) for each of the line circuits, a bidirectional data lead DATA, and an address latch enable lead COMMAND. Control and data information is transferred between the line group processor 34 and the per line control interfaces 44 over the common lead DATA. The information transfer is controlled by the COMMAND lead and the CLK/SWHKn leads.

Additional leads connected to the line group are CLK4LS, which is the 4.096 mHz clock signal, leads $\overline{AILS}$, $\overline{BILS}$ and SUPVY. The lead CLK4LS is distributed to the line circuits via a buffer gate 907. The per line control interface 44 of each of the eight line circuits 32 generates the signals $\overline{AILS}$, $\overline{BILS}$ and SUPVY. The $\overline{AILS}$ outputs of the line circuits are "wire-ored" to the input of buffer output gate 908. Likewise the $\overline{BILS}$ outputs are "wire-ored" to gate 909 and the SUPVY outputs are "wire-ored" to gate 910.

The 4.096 mHz clock CLK4LS is applied to a divide by two circuit 941 which provides a 2.048 mHz clock signal CLK2 for use by the line circuits.

7.1 LINE CIRCUIT (FIGS. 25, 26, 27)

Each line circuit 32 includes conventional line circuit transmission components; test and ring relays 38 and 39, a subscriber line interface circuit 40, a filter circuit 42 and a CODEC 43. The CODEC 43 is of a known type which is operable in a so called "microprocessor controlled mode" of operation, wherein the channel assigned by a line switch or system controller to the associated line circuit is stored by the CODEC and is used to determine when the CODEC will become active. The CODEC may be defined as "active" when the CODEC is transmitting or receiving over PCM buses. One such CODEC is commercially available from the INTEL Corporation and is identified as type number 2910A.

Each line circuit 32 further includes a per line control interface 44 which interfaces between the common circuit 31 and the line circuit transmission components. Control of portions of the per line control interface 44 is achieved by the processor 34 transmitting control words over bus 36. Each of these control words is 12 bits in length and arranged in format as shown in FIG. 26. Bit 0 determines whether the control operation is a read or write; bits 1–3 are address bits for the per line control interface 44; bit 4 is unused; bit 5 is set according to whether the line card is in a system using 8 bit or 10 bit PCM words on its buses; bits 6, 7, and 8 are used to control external components such as power control, device test relay, and ring relay; bit 9 enables the line circuit; bit 10 is used to signify intraline switch calls; and bit 11 selects which of the two PCM buses PCMLCA or PCMLCB will be utilized by the line circuit.

Figure 27A:
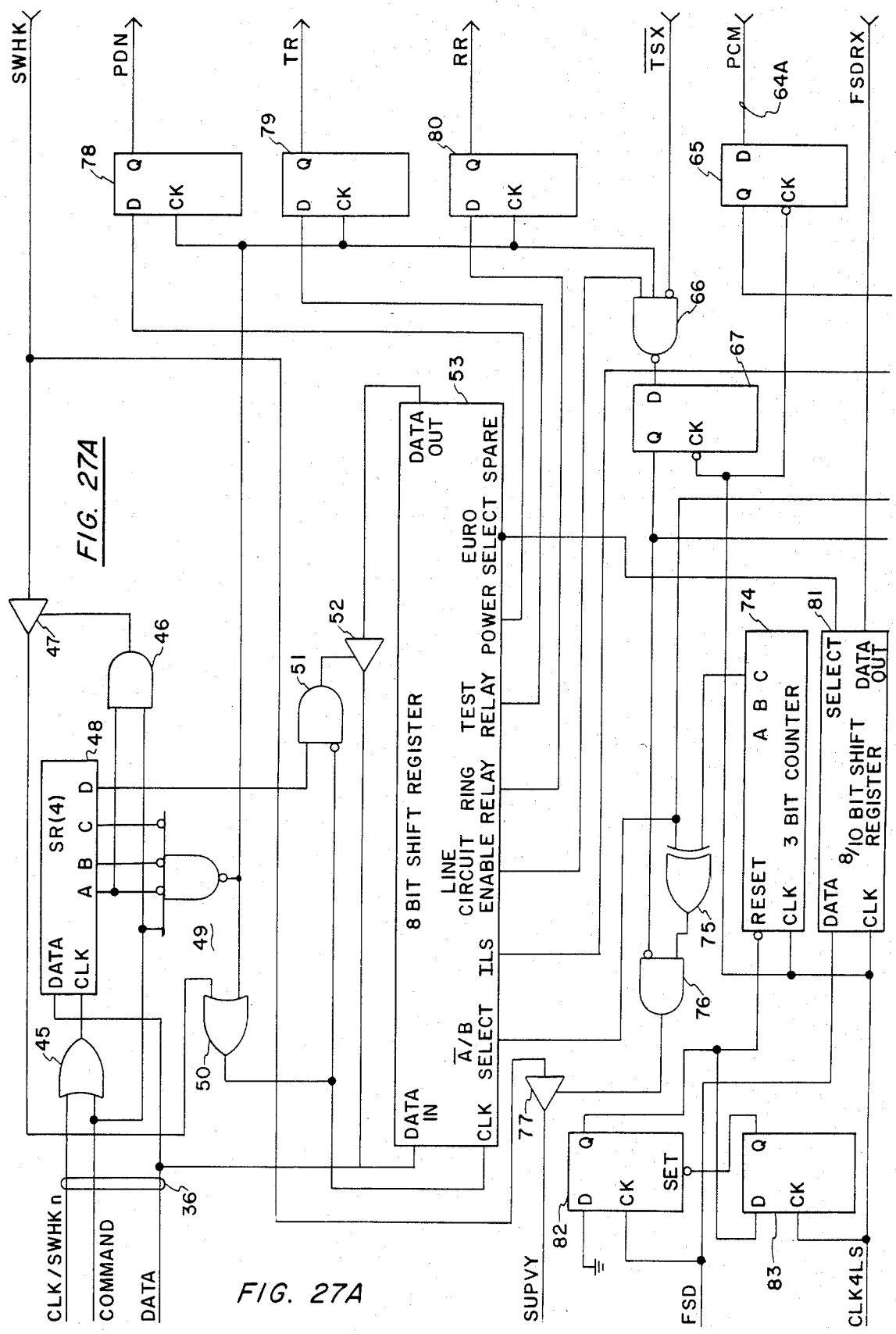

One of the per line interfaces 44 of FIG. 25 is shown in greater detail in FIG. 27. The CLK/SWHKn lead is a dual function lead. More specifically, one function of this lead is that of a normal clock lead to clock data into or out of the line interface circuits 44. The other function of the CLK/SWHKn lead is to return switch-hook status to the line group microprocessor 34 of FIG. 25. The selection as to which of the above two functions is provided is determined by the state of the COMMAND lead and register 48. When the COMMAND lead is high, and when bit 0 of the control word indicates a read, then gate 46 enables tri-state buffer 47 thereby coupling the lead SWHKn, which is connected to the SLIC 40 of FIG. 25 and indicates current switch hook status, to the line card processor 34 of FIG. 25 via CLK/SWHKn lead. When the COMMAND lead is low, gate 45 is enabled and control bits from the DATA lead of bus 36 are shifted into shift register 48. After the four control bits 0–3 are loaded in register 48, the COMMAND lead goes high disabling gate 45 thereby holding the control bits in register 48. Gates 49 and 50 form a decoder circuit to gate clock pulses from the CLK/SWHKn lead to shift register 53. Similarly, gates 51 and 52 determine whether data will be stored in or read from register 53. If data is to be stored in register 53, the next eight bits, i.e., bits 4–11 of the control word are shifted into the register 53 from the Data lead. The A/B select lead control gates 54, 55, 56, 58 to connect either bus PCMLCA, or PCMLCB to the coded PCM bus 64A, 64B. Flip-flop 65 provides buffer timing for the transmit PCM signal from bus 64A.

The $\overline{TSX}$ lead provides timing from the CODEC 43 of FIG. 25. Gate 66 controls gating of the $\overline{TSX}$ signal into buffer flip-flop 67. The Q output of flip-flop 67 is connected to gates 60 and 61 which are controlled by the $\overline{AB}$ select bit to steer the $\overline{TSX}$ signal to leads $\overline{TSXA}$ or $\overline{TSXB}$. The Q output of flip-flop 67 is also coupled to gates 62 and 63 which are controlled by the $\overline{A}/B$ select bit and the ILS bit. The outputs of gates 62 and 63 are coupled respectively to leads $\overline{AILS}$ and $\overline{BILS}$.

In some applications it may be desirable to return switch hook information at a rate fast enough to detect dial pulsing without utilizing the $\overline{A}/B$ signaling bits of the PCM bus. To accomplish this, switch hook information from lead SWHK from the line circuit 32 is gated onto the supervisory lead SUPVY during one half of the channel time assigned to that circuit. The channel during which switch hook information is gated is determined by a signal on lead $\overline{TSX}$ from the CODEC 43 of FIG. 25.

A counter 74 divides each channel into two parts. Flip-flops 82, 83 provide synchronization for counter 74. The $\overline{A}/B$ select bit controls gate 75 to determine in which of the two parts of a channel the switch hook information is to be gated. Gates 76 and 77 gate the switch hook information from flip-flop 67 to supervisory lead SUPVY. The line circuit enable bit controls gating of the lead $\overline{TSX}$ at gate 66 for maintenance purposes, i.e. if it is determined that a CODEC 43 of FIG. 25 is defective, the line circuit enable bit is utilized to prevent the CODEC 43 from interfering with the operation of the remainder of the system. The ring relay, test relay and power control flip-flops 80, 79, 78, respectively control the application of ringing signals from bus 73 of FIG. 14 control connections to a test bus and to apply power to the entire transmission circuit elements of FIG. 14. Register 81 delays the frame clock FSD from the buffer-distributor 9 of FIG. 22 by one channel time to provide a receive frame clock which is coupled to a CODEC 43 of FIG. 25 via lead FSDRX. The Euro Select bit, i.e. bit 5 of FIG. 26, determines whether the channel delay corresponds to 8 or 10 bits.

7.2 GAIN/BALANCE (FIGS. 25, 28, 29, 30, 31)

Turning back to FIG. 25, the gain/balance control circuit 41 provides software selection of transmit gain, receive gain and balance for the line circuit. Control of the gain/balance circuit 41 is achieved by the line card processor 34 transmitting control words over the serial data bus 36 in a manner similar to that described with respect to the per line controller interface circuit 44 hereinabove. The control words are illustrated in FIGS. 28 and 29. As shown in FIG. 28, a control word for the gain/balance operations comprises 28 bits arranged as follows: a read/write bit, three address bits, a clock control bit, three unused bits, four bits for line balance network selection and eight bits each for transmit and receive gain selection. As shown in FIG. 29, a control word for CODEC control comprises 12 bits which includes a read/write bit, three address bits, two mode bits and six channel assignment bits.

Figure 30:
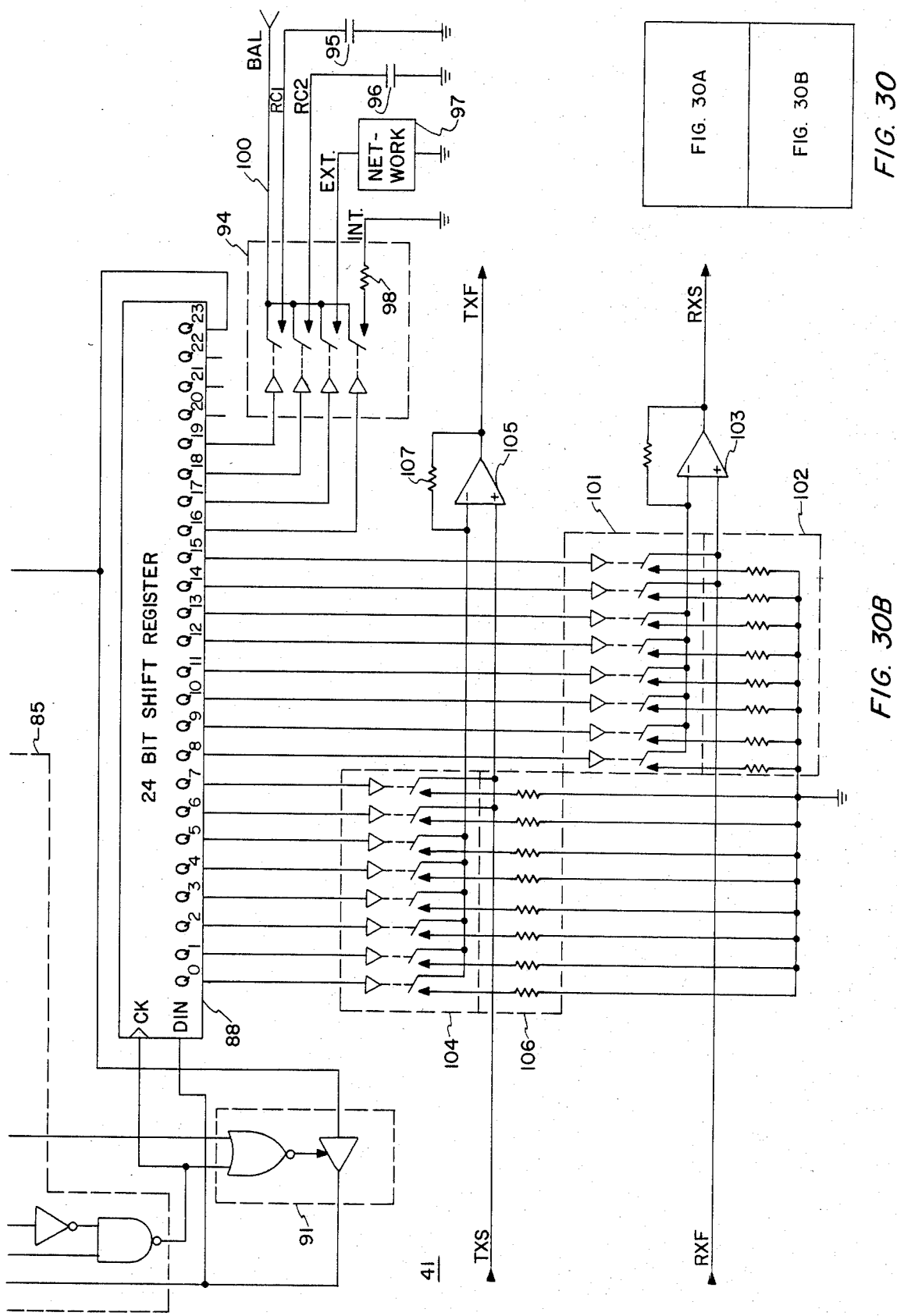
FIGS. 30A and 30B when arranged as shown in FIG. 30 show in block diagram form the gain/balance circuit 41 of FIG. 25B.
Figure 30A:
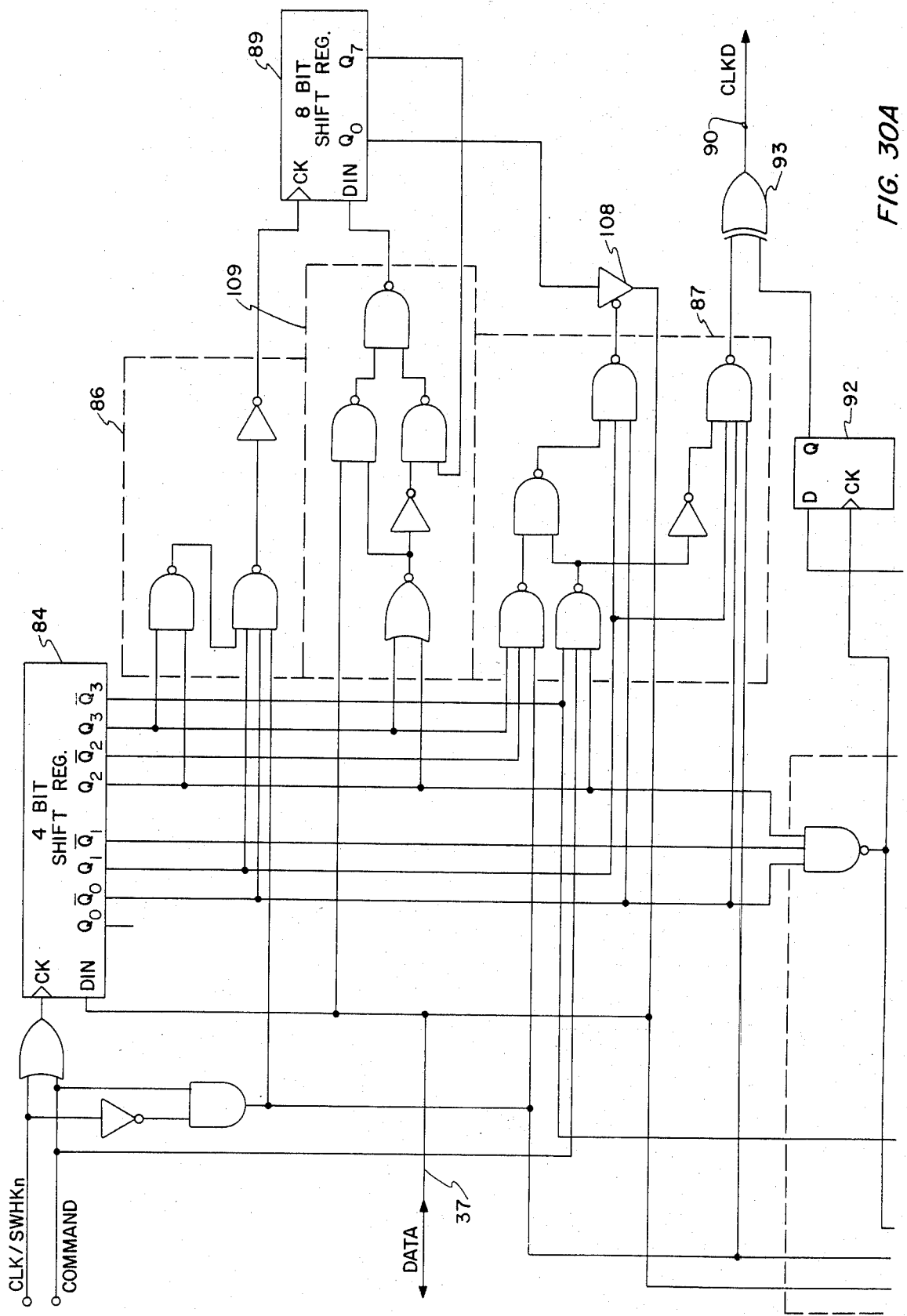

The gain/balance circuit 41 is shown in detail in FIG. 30. The first four bits of a control word are loaded into and stored by register 84 in the same manner as described for register 48 of FIG. 27. Address decoders 85, 86, 109 and 87 decode the contents of the register 84. Decoder 85 determines if the control word is to provide gain/balance settings to be stored in register 88. Decoder 86 permits loading of assigned channel information into a register 89. Decoder 87 controls the loading of channel assignment information from register 89 into the CODEC using data clock lead CLKD.

If the first four bits of the control word shown in FIG. 28 stored in register 84 as indicated above activate decoder 85, then the next 24 bits are then stored in register 88. The clock control bit stored in bit Q23 of register 89 controls the state of flip flop 92 which in turn is connected to EXCLUSIVE-OR gate 93 to determine whether the clock signal on lead CLKD is inverted or not. The four line balance network selection bits of shift register 88 control analog solid state switches 94 to selectively connect capacitors 95 and 96, network 97 and 98, to the SLIC circuit via the balance selection lead BAL. It should be noted that the capacitors 95 and 96 and resistor 98 may be replaced with other network components or with entire networks.

Gain control amplifiers 103 and 105 are connected such that they are interposed in the transmission path between the SLIC 40 and Filter 42 as shown in FIG. 25. More specifically, receive amplifier 103 has one input connected to lead RXF connected to the receive filter and an output lead RXS connected to the receive path of the SLIC. Amplifier 105 has one input connected to SLIC transmit lead TXS and an output connected to transmit filter lead TXF.

The eight receive gain control bits stored in register 88 control analog solid state switches 101 to selectively connect resistors 102 to one input of amplifier 103. Likewise the eight transmit gain control bits stored in register 88 control analog switches 104 to selectively connect resistors 106 to one input of amplifier 105.

It is desirable to maintain closely controlled gain steps, e.g., less than 0.1 db, over a wide range of environmental conditions. Typically, gain circuits comprise a resistive ladder similar to that formed by resistors 106, each leg of the ladder having an analog switch connected in series with a resistor. The ladder in turn forms a resistive divider with another resistor 107. The analog switches have a finite impedance which will vary from unit to unit and with environmental changes. Typically, analog solid state switches have impedances of nominally 50 to 150 ohms in the on-state. The variation of the on-state impedance would thus contribute a significant change to the ratio of the dividers previously used.

This problem is significantly reduced in the gain control circuits shown in FIG. 30. Specifically, an amplifier having an extremely high input impedance such as a FET differential input amplifier, e.g. 103 or 105, is connected in the divider network. The resistance values may then be made relatively high, for example, in the order of tens of thousands of ohms, and accordingly, the impedance variations in analog switches, which are on the order of a hundred ohms, will have a negligible effect on the gain through the circuit.

The gates 91 are controlled by the read/write bit of the control word to determine whether a portion of a control word is to be stored in register 88, or whether the contents of register 88 are to be read via the data bus 37.

A CODEC control word has two distinct addresses. One address (hereinafter first address) will result in either the register 89 being loaded or read by the line card processor 34, and the other address (hereinafter second address) will cause the contents of register 89 to be loaded into a CODEC 43. If the control word contains the first address and the read/write bit indicates a write operation, the mode and channel assignment portion of the control work is loaded into register 89 via decoder 86. If the control word contains the first address and the read/write bit indicated a read operation, the contents of register 89 are supplied to data bus 37 via gate 108, which is controlled by portion of the decoder 87. When the register 89 is read, the gates 109 will feed each bit, as read, back into the register such that after a read of the register 89, the contents of register 89 are unchanged.

If the control word contains the second address, the contents of register 89 are supplied to the CODEC over data bus 37 via gate 108. Gate 108 is controlled by portions of the decoder 87. Other portions of decoder 87, when enabled, supply clock pulses to a CODEC via gate 93 and line 90 to clock the data from bus 37 into the CODEC. The gates 109 will again operate to loop the data bits loaded into the CODEC from register 86 back into register 89.

As noted hereinabove the control words transmitted between the line groups and the line switch controller 7 of FIG. 2 over the buses PCMLCA and PCMLCB as shown in FIGS. 2 and 6 comprise 32 bits. FIG. 31 illustrates the format of these control words. Each control word transmitted from the line switch controller 7 of FIG. 2 comprises four eight bit bytes, indicated as Bytes 1-4. Byte 1 may include one parity bit which is calculated over the entire word, and includes seven address bits. Byte 2 includes five function bits which control the function that line card processor 34 is to perform, and three bits to designate which one of the eight line circuits on a line card is to be effected. Bytes 3 and 4 contain control data as required for the function specified by the function bits. After a control word is transmitted to the line card by the line switch controller 7, the processor 34 will respond by returning the same control word back to the line switch controller 7 if the control word indicates a write operation. If the control word indicates a read operation, the line card processor 34 will return bytes 1 and 2 as originally transmitted from the line switch controller 7 and will include response data in Bytes 3 and 4.

7.3 PROTOCOL INTERFACE CIRCUIT/CONTROL INTERFACE 33 (FIGS. 25, 32)

Figures 32, 32A:
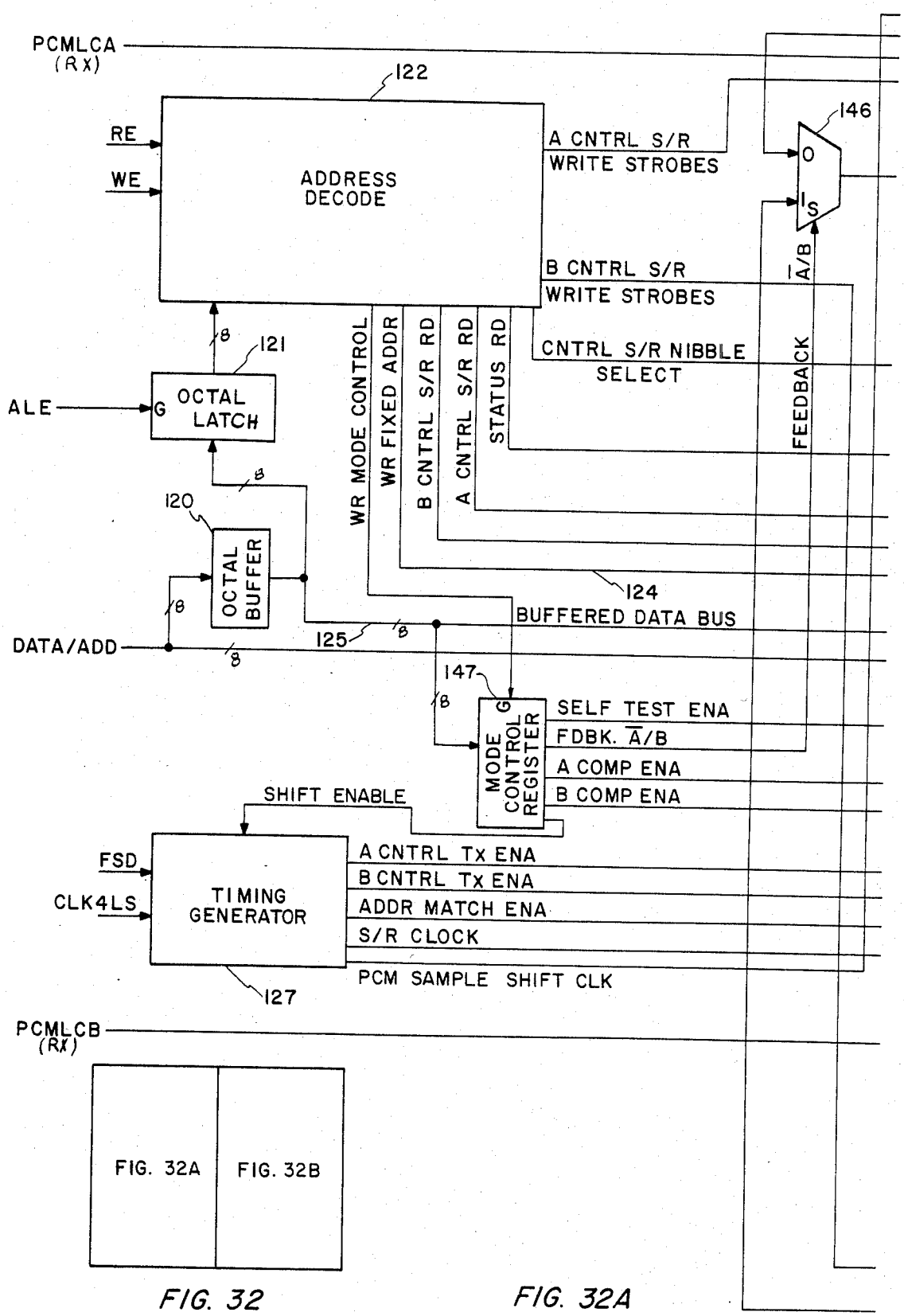
FIGS. 32A and 32B when arranged as shown in FIG. 32 illustrate in block diagram form the control interface 33 of FIG. 25A.
Figure 32B:
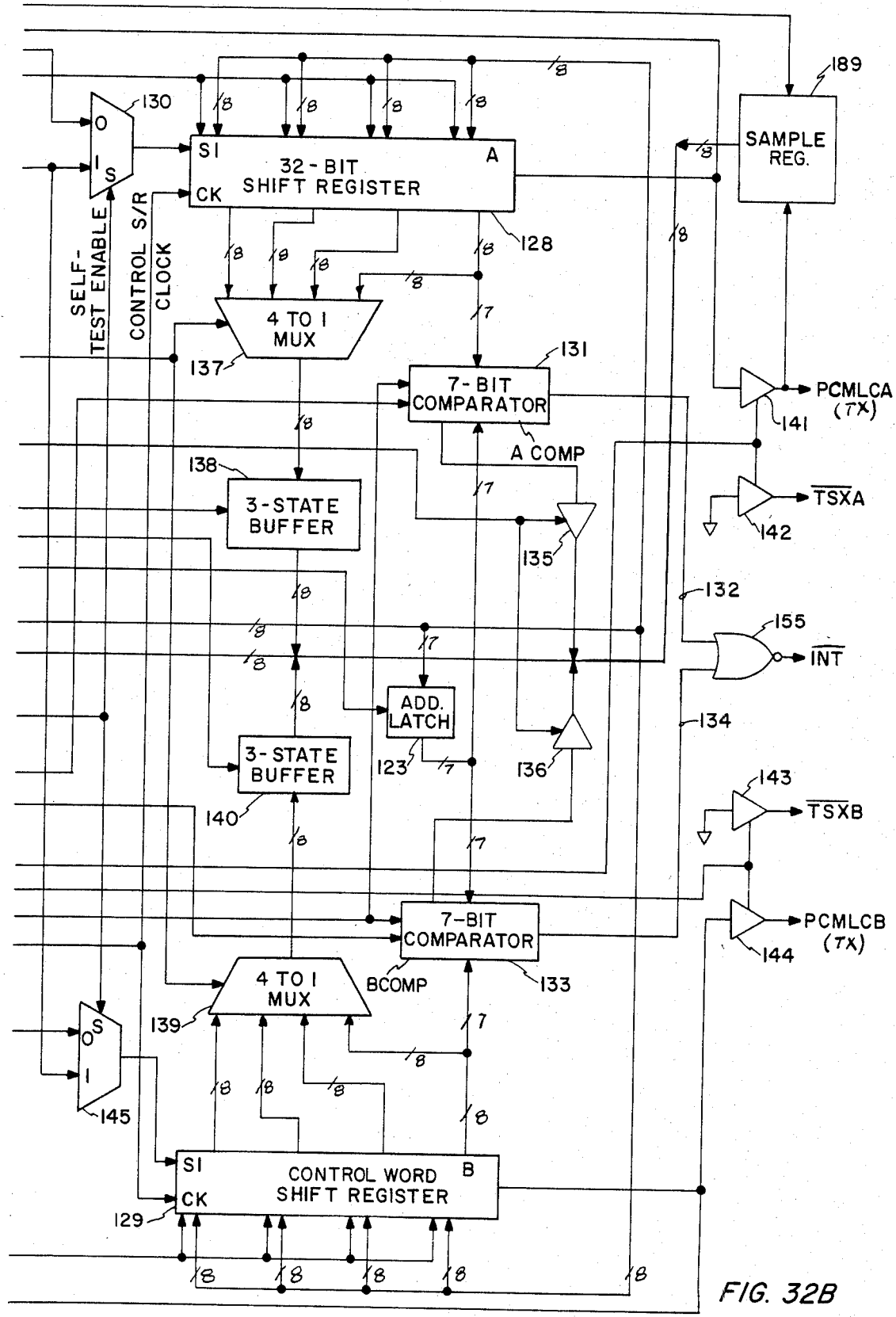

The control interface 33 of FIG. 25 comprises the protocol interface circuit PIC and as shown in detailed block diagram form in FIG. 32 is connected to buses PCMLCA and PCMLCB. For purposes of clarity, single lines are used to represent multi-line buses and the number of lines in a bus is indicated at various points along the bus.

Initially, the line group processor 34 of FIG. 25 reads the line card address from leads 35 as shown in FIG. 25 and loads this address into the control interface latch 123 of FIG. 32 in the following manner. The processor 34 transmits the address to the latch 123 over the DATA/ADD lines to the control interface 33. This internal register address is buffered by buffer circuit 120 and is presented to the input of register 121. The line card processor 34 concurrently transmits a signal over the ALE lead which causes the internal register address to be stored in register 121. The internal register address decoder 122 decodes the address to apply an enable signal WR FIXED ADDR on lead 124. The line card processor 34 then transmits a data word which contains the line card wired address. The data word is applied to the input of register 123 via bus 125 and is gated therein via lead 124 by address decoder 122 upon receipt of a strobe signal from the processor on write enable lead WE. The register 123 then contains the wired address of the line card.

A timing generator circuit 127 receives the FSD and CLK4LS clock signals from the buffer distributor 9 of FIG. 21 and generates various timing signals for controlling the operation of the control interface 33. The FSD signal is used to control the timing of a clock signal on lead S/R clock. The clock signal on S/R clock controls the storing or transmitting of control words between bus PCMLCA and register 128 and between bus PCMLCB and register 129. Initially, a control word is received on one of the two buses e.g., PCMLCA. As the control word appears on bus PCMLCA in serial form it is gated via selector circuit 130 to shift register 128 using S/R clock. Registers 128 and 129 are 32 bit registers. After the proper number of clock pulses have been provided by S/R clock, a strobe signal is applied to the ADDR/MATCH ENA lead thereby enabling a comparator 131 which compares the address portion of the control word in register 128 with the line group address stored in latch 123 and generates a signal on lead 132 if the addresses are the same. Similarily control word received on bus PCMLCB are stored in register 129 via selector 145 and the address portion thereof is compared to the line circuit address by comparator 133 which generates a signal on lead 134 if those addresses are the same. Gate 155 logically "or's" leads 132 and 134 and will provide a signal to the line group microprocessor 34 of FIG. 25 on its interrupt lead INT if an address match occurs for either bus PCMLCA or PCMLCB.

After the line group processor 34 is interrupted it will then obtain the control word by first transmitting an address over the DATA/ADD bus. The address is stored in latch 121 and decoded by decoder 122 which, in turn activates the STATUS RD line. The STATUS RD line enables gates 135 and 136 which provide indications on the DATA/ADD bus as to which of the two comparators 131 or 133 detected the line card address.

The line group processor 34 will then, via a series of commands, obtain 24 bits of the control word from the appropriate one of the registers 128 or 129. If the control is obtained from register 128, then multiplexer 137 and buffer 138 are utilized. Similarly if the control word is to be obtained from register 129 then multiplexer 139 and buffer 140 are utilized.

Response data from the line group processor 34 may be returned to the line switch controller 7 via buses PCMLCA or PCMLCB.

Response data from the line group processor 34 is stored in a preselected one of the registers 128, 129 by a series of commands from the processor 34 which controls the gating of data through buffer 120 via bus 125 from register 128 or 129. The response data is written into register 128 or 129 as eight bit parallel bytes. The response data is transmitted from the registers 128, 129 over the buses PCMLCA, PCMLCB respectively by the S/R clock signals in the following manner.

After the last byte of data is stored in the selected register 128, 129, the timing generator 127 will generate an enable signal at a predetermined time over leads A CONTRL or B CONTRL respectively. The outputs of gates 141 and 144 are connected to buses PCMLCA and PCMLCB respectively. The outputs of gates 142 and 143 are "wire-ored" with the leads $\overline{TSXA}$ and $\overline{TSXB}$ respectively from the line circuits. The S/R clock is used to shift the response data onto PCMLCA or PCMLCB. More specifically, the S/R clock provides pulses at a 4.096 mHz rate, with 42 pulses being supplied in a burst during one frame. The first 32 clock pulses of the 42 pulse burst are used to clock the response data from the registers 128 or 129 onto bus PCMLCA or PCMLCB.

The last 32 clock pulses of the 42 pulse burst are used to clock the control data from the bus PCMLCA or PCMLCB into the register 128 or 129. During the time when the middle 22 pulses are provided, control data is being written into registers 128 or 129 while simultaneously response data is being read from the register 128 or 129. This arrangement is provided because system timing constraints require a 10 bit skew between the receive PCM data bus and the transmit PCM data bus.

Selector 146 is provided for maintenance purposes. The register 147 is also provided for maintenance purposes and permits the processor 34 to disable either or both of the comparators 131, 133 and to control selectors 130, 145 and 146.

7.4 SELF TEST (FIGS. 32, 33, 34, 35)

One feature of the control interface 33 is that it includes a self-test mode of operation in which the serial output of one of the shift registers 128 or 129 is selected as the serial input data source for both of the registers 128 and 129. Selectors 145, 146 and 130 provide feedback paths for the registers 128, 129 during the self-test mode. In this test mode, the shift registers 128 and 129 are loaded with test data by the microprocessor and allowed to shift for several frames. Proper operation of the shifting function of the registers 128, 129 and the address decoder circuit 122 can thus be verified without affecting the PCM buses PCMLCA, PCMLCB.

A self-test program routine is executed during power-on initialization of the line switch. This self-test routine exercises the circuitry of the control interface 33 and produces a go/no-go result.

The test initialized the control interface by loading a code in the mode control register 147 which provides a signal on the SELF TEST ENA line to operate selector 130 and a signal on the FDBK A/B operates selector 146 such that a feedback path for register 128 is enabled. A signal is provided to the timing generator 127 which responds to preventing transmission over the buses PCMLCA, PCMLCB, and by inhibiting the shifting of the registers 128, 129. The A comparator 131 and B comparator 133 are enabled.

Next, A register 128 is loaded with the following test data (in hexadecimal): byte 1=63, byte 2=C1, byte 3=F8, byte 4=φF. The address latch 123 is loaded with F8, i.e., the same as byte 3 on register 128. After the A register and address latch 123 have been loaded, the A and B registers 128 and 129 are allowed to shift for eight PCM frames. FIG. 33 illustrates the contents of the A and B registers 128, 129 at the start of the self-test and after each frame of shifting. Note that the A and B registers 128 and 129 are clocked 42 times each frame as explained above. The A and B control registers are 32 bits long. Therefore, the test data in the A register 128 will be in effect rotated left (left being defined as toward the most significant bit position) a total of 10 (42 modulo 32) places after each 42 pulse clock burst. After eight frames of shifting the test data in the A and B registers 128 and 129 will have been rotated 16 (42×8 modulo 32) places left of the position of the test data at the start of the test. Since the address latch 123 contains F8 and the A and B address comparators 131 and 133 are enabled an address match should occur with both comparators only during the eighth frame of shifting. If both comparators 131 and 133 do not indicate a match condition during the eighth frame, a failure has occurred. If both comparators do indicate a match, the contents of both the A and B registers 120, 129 are compared with the following expected data: byte 1=F8, byte 2=0F, byte 3=63 and byte 4=C1. Any mismatch of the data in the A and B registers 128 and 129 with the expected data indicates a failure.

FIGS. 34 and 35 are a program listing in MCS—48 assembly language code implementing the self-test operation for a line group controller.

7.5 AUTOMATIC GAIN SETTING (FIGS. 25, 30, 32, 36, 37 A-C)

The control interface 33 of FIG. 32 includes a voice channel data sampling register 189 which permits the microprocessor to monitor channel data appearing on one of the PCM buses PCMLCA. This channel sampling feature allows the line group processor to measure and thus provide automatic gain setting of the line circuits. Register 189 is an 8 bit shift register that is serially loaded every frame with data appearing on a predetermined channel of bus PCMLCA. The PCM SAMPLE SHIFT clock from timing generator 127 clocks the serial data from PCMLCA into the register 189. Between the 8-pulse clock bursts, data in register 189 can be read by the microprocessor sending an appropriate command to the control interface. Note that for clarity, the connection from the address decoder 122 to the register 189 has not been shown.

The above described variable gain circuit of FIG. 30 permits adjustment of the gain of the amplifiers 103 and 105 to a predetermined value without costly hand selection of parts. The analog switches 101, 104 respectively control portions of a resistance divider 102, 106 to change the gain of amplifiers 103, 105, respectively.

In the embodiment shown, the predetermined value for amplifier 103 is set such that the overall loss in the receive path of the line circuit is −0.25 dB (decibel). The predetermined value for amplifier 105 is set such that the overall gain in the transmit path of the line circuit is 0 dB. The accuracy of these settings is made to within ±0.1 dB. The incremental difference between adjacent steps of PCM representations representing the peak required signal levels (of around 0 dBm (decibel relative to a milliwatt test tone)) is approximately 0.4 dB for mu-law encoding. As shown below, it is possible to use the PCM representations to measure analog signals peaks with an accuracy greater than that of the PCM steps.

The frequency for a reference signal used in measuring the gain of the transmission circuit is chosen as 1.024 kHz sampling rate. By chosing the frequency of the reference signal in this manner, the reference signal will be sampled at or near its peak amplitude a predictable number of times over a predetermined number of cycles.

For a 1.024 kHz signal sampled at an 8 kHz rate, 16 cycles are required before the PCM representations are repeated. During a 16 cycle period, 125 PCM representations are generated.

From mu-law tables it can be determined that the maximum linear level of a signal that can be encoded is 8159 linear units and, by definition, corresponds to the peak of a signal having an rms (root means square) level of +3.17 dBm. Th peak value of the 0 dBm reference signal can be calculated by reducing 8159 by 3.17 dB. In this manner, the peak value of 0 dBm signal is determined to be 5664.1785 linear units. From mu-law tables it can be determined that 5664.1785 linear unit lies between level 118 which represents 5599 linear units and level 119 which represents 5855 linear units. It can be calculated that levels 118 and 119 are approximately 0.4 dB apart.

If 125 successive PCM samples are monitored and at least one sample corresponds to level 119 or a higher level, the signal represented by that group of 125 samples is greater than 0 dBm by more than 0.278 dB.

If all samples in a group of 125 successive PCM samples are less than level 118 then the signal represented is less than 0 dBm by more than 0.1 dB. For a 0 dBm signal, the number of samples N out of 125 successive PCM sample that are at level 118 either positive and negative polarity is determined as follows:

The reference signal may be represented as A sin ωt. If decision level 118 is represented by A' then $$A' = A \sin(\pi/2 - Q) \tag{1}$$

where $\pi/2 - Q$ represents the angular displacement from zero degree where the reference signal reaches level 118.

Solving equation (1) for Q yields $$Q = \pi/2 - \sin^{-1} A'/A \tag{2}$$

The probability that any one PCM sample in a group of 125 successive samples will be above level 118 is $$P = 4Q/2\pi = 2Q/\pi \tag{3}$$

Substituting equation 2 in equation 3 yields $$P = \frac{2}{\pi}\left(\frac{\pi}{2} - \sin^{-1}\frac{A'}{A}\right) = 1 - \frac{2}{\pi}\sin^{-1}\frac{A'}{A} \tag{4}$$

The number of PCM samples in a group of 125 successive samples which will be at level 118 for a 0 dBm signal is $$N = 125P \qquad (5)$$

For a 0 dBm signal
A = 5664
A' = 5599
and N may be calculated as 12.08.

Equations 1-5 may be used to determine the signal levels corresponding to the number of occurrences N of level 118 samples in a successive group of 125 PCM samples yielding the results shown in the table below:

TABLE

| N | A(dBm) | N | A(dBm) | N | A(dBm) |
|---|---|---|---|---|---|
| 1 | −0.998 | 9 | −.0447 | 16 | +.0762 |
| 2 | −.0978 | 10 | −.032 | 17 | +.0992 |
| 3 | −.0944 | 11 | −.0173 | 18 | +.1236 |
| 4 | −.0896 | 12 | −.0014 | 19 | +.1494 |
| 5 | −.0834 | 13 | +.0159 | 20 | +.1767 |
| 6 | −.0758 | 14 | +.0346 | 21 | +.2055 |
| 7 | −.0669 | 15 | +.0547 | 22 | +.2357 |
| 8 | −.0565 | | | | |

In the illustrative embodiment, if 9 to 16 level 118 samples occur during 125 successive PCM samples, it is assumed that the samples represent a signal of 0 dBm. From the above table it is seen that this sample range represents 0 dBm over a range of −0.0447 dBm to +0.0762 dBm.

Advantageous use of the variable gain circuitry is made to permit automatic adjustment of the gain setting. Each line circuit shown in FIG. 25 is connected via a test relay 38 to a test bus. The test bus is multipled to all the test relays of a line group and may also be multipled to all line groups in a line switch module. Alternatively, the serial test buses may be utilized within a line switch module, each test bus being multipled to one or more line groups. To set the TX gain of a line circuit, i.e., the gain of amplifier 105, the line switch controller will connect an analog milliwatt generator to the proper test bus.

Figure 36:
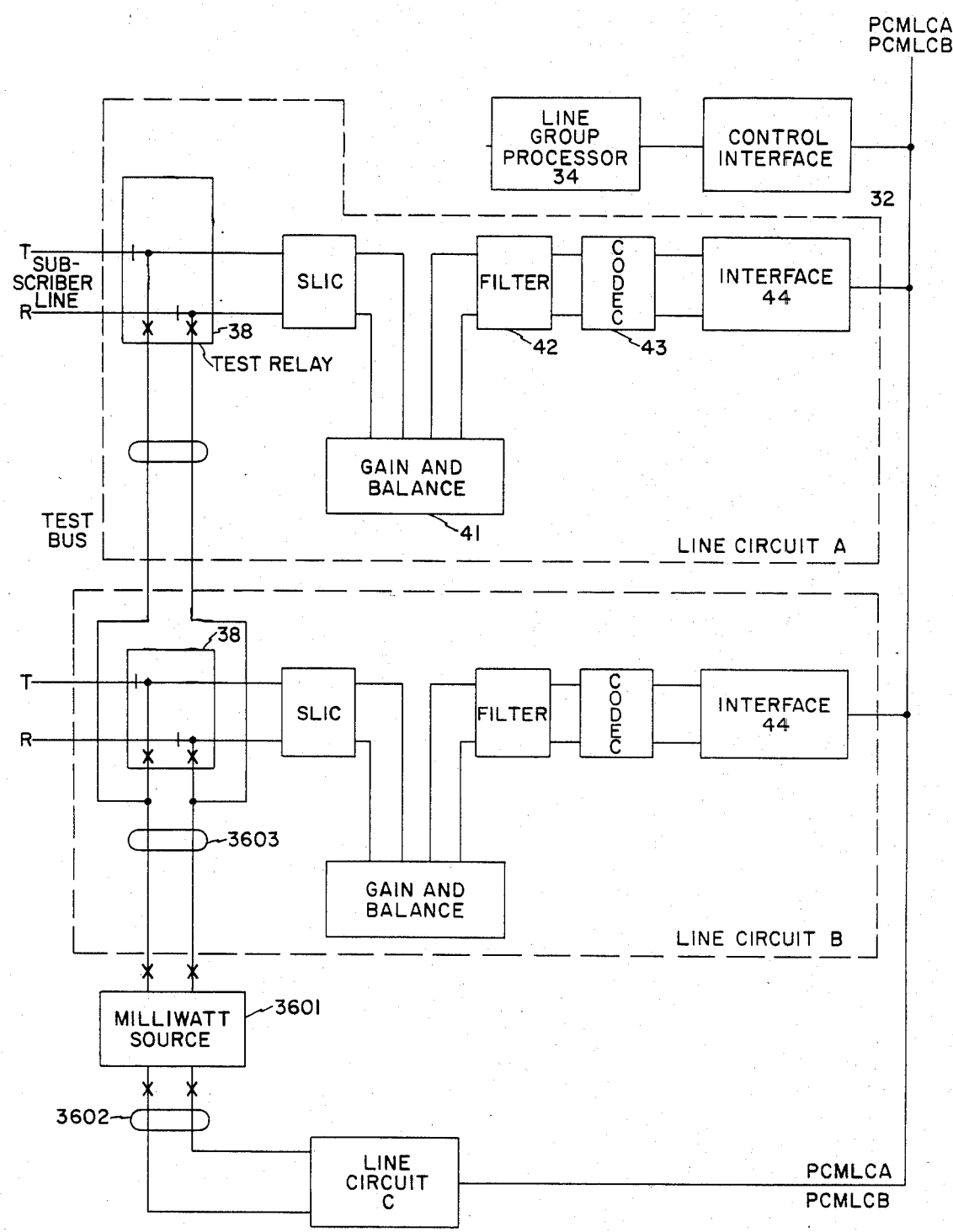
FIG. 36 illustrates in block diagram form an automatic gain setting feature in accordance with the principles of the present invention.

FIG. 36 illustrates the arrangement for setting the transmit gain in a line circuit, the line switch controller 7 will connect a milliwatt generator 3601 to the proper test bus. The line group processor 34 of the line circuit which is to have its transmit gain set will then actuate the test relay 38 of the line circuit. By means of the sample register 189 of the control interface 33 shown in FIG. 32, the line group processor will monitor the PCM output of the line circuit. The line group processor will then incrementally change the gain of the transmit amplifier 105 in FIG. 30 and balance circuit 41 by selectively actuating the analog switches 104 shown in FIG. 30. After each incremental change in the gain, the line group controller will monitor the PCM data. The iterative process will continue until the monitored PCM signals represent a signal of 0 dbm±0.1 dB. The line group processor 34 will then release the test relay 38 and signal the line switch controller 7 that the transmit gain has been set. The line switch controller 7 can then direct a line group processor 34 to set the transmit gain of other line circuits. To set the receive gain, i.e., that of amplifier 103 in FIG. 30, the line switch controller will cause a digital signal representing a signal 0.25 dB greater than 1 milliwatt to be applied on a PCM channel that can be used for testing. One way in which this may be done is for the line switch controller 7 to connect the milliwatt source 3601 providing a 0.25 dB signal to a test bus 3602 and direct the line group processor 34 to connect a line circuit, e.g., line C, which has had its transmit gain adjusted to the desired level connected to the test bus 3602. The line circuit C will then provide PCM signals representative of the milliwatt source on a predetermined channel of the PCM bus PCMLCA or PCMLCB. If it is assumed that line circuit A is to have its receive gain set, then line group processor 34 will actuate test relay 38 connecting the output of line circuit A to the test bus 3603. Another line circuit B which has previously had its transmit gain set will be connected to the same test bus 3603 by actuating its test relay 38. Thus, the analog output of line circuit A will be connected to the analog input of line circuit B. The line circuit B will be directed by the line group processor 34 to receive the PCM channel which is carrying the digital PCM tone signal from line circuit C.

The PCM output of line circuit A will be monitored by its line group processor 34 again utilizing the sample register 189 of the control interface 33.

The line group processor will incrementally change the gain of the receive amplifier in line circuit A until the output is again 0 dBm±0.1 dB. Thus the transmit gain of any circuit can be set to 0±1 db and the receive gain of any circuit can be set to 0.25 dB±0.1 dB.

Figure 37A:
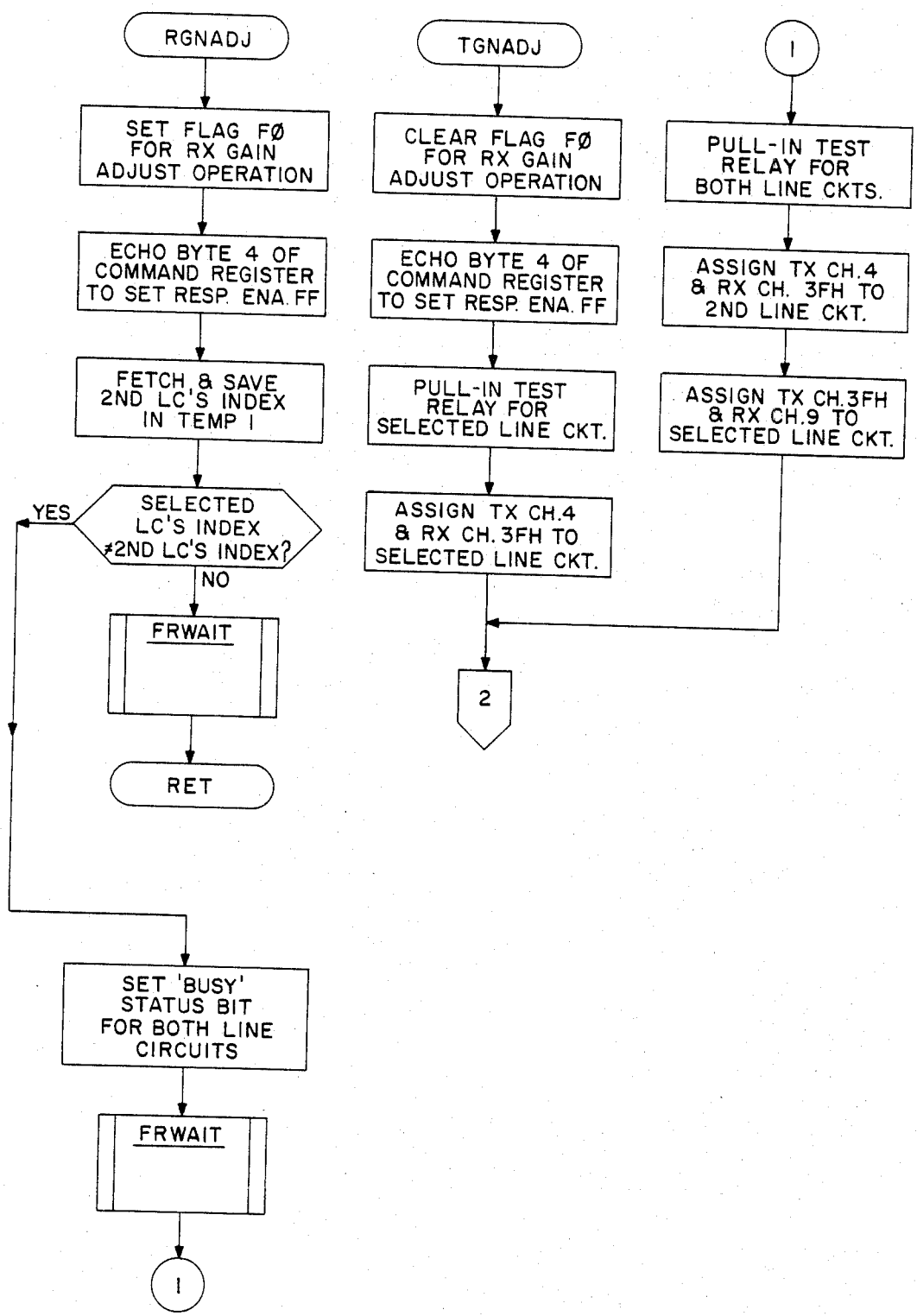
FIGS. 37A, 37B and 37C are flow charts of programs for automatic gain setting according to FIG. 36.
Figure 37B:
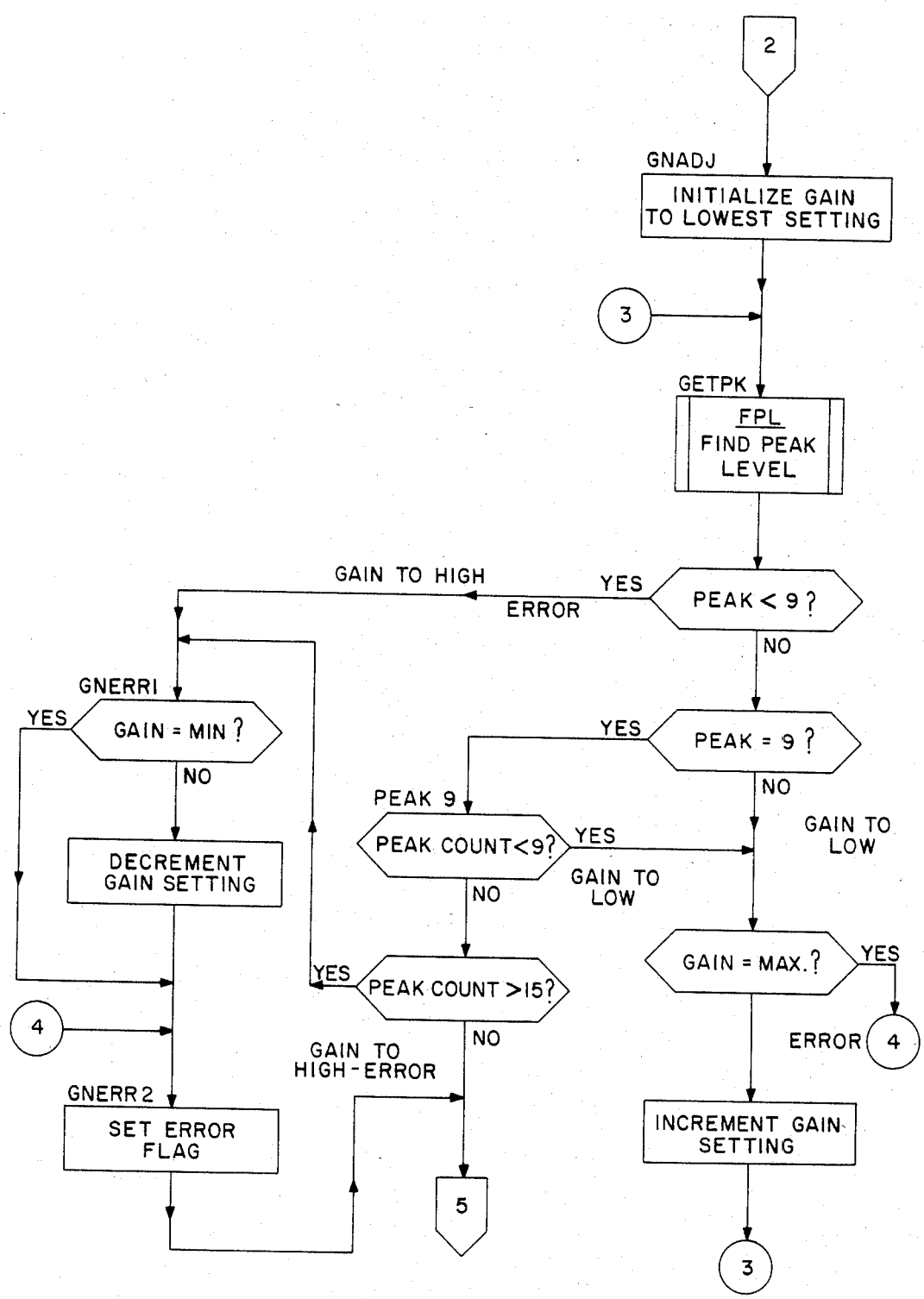
Figure 37C:
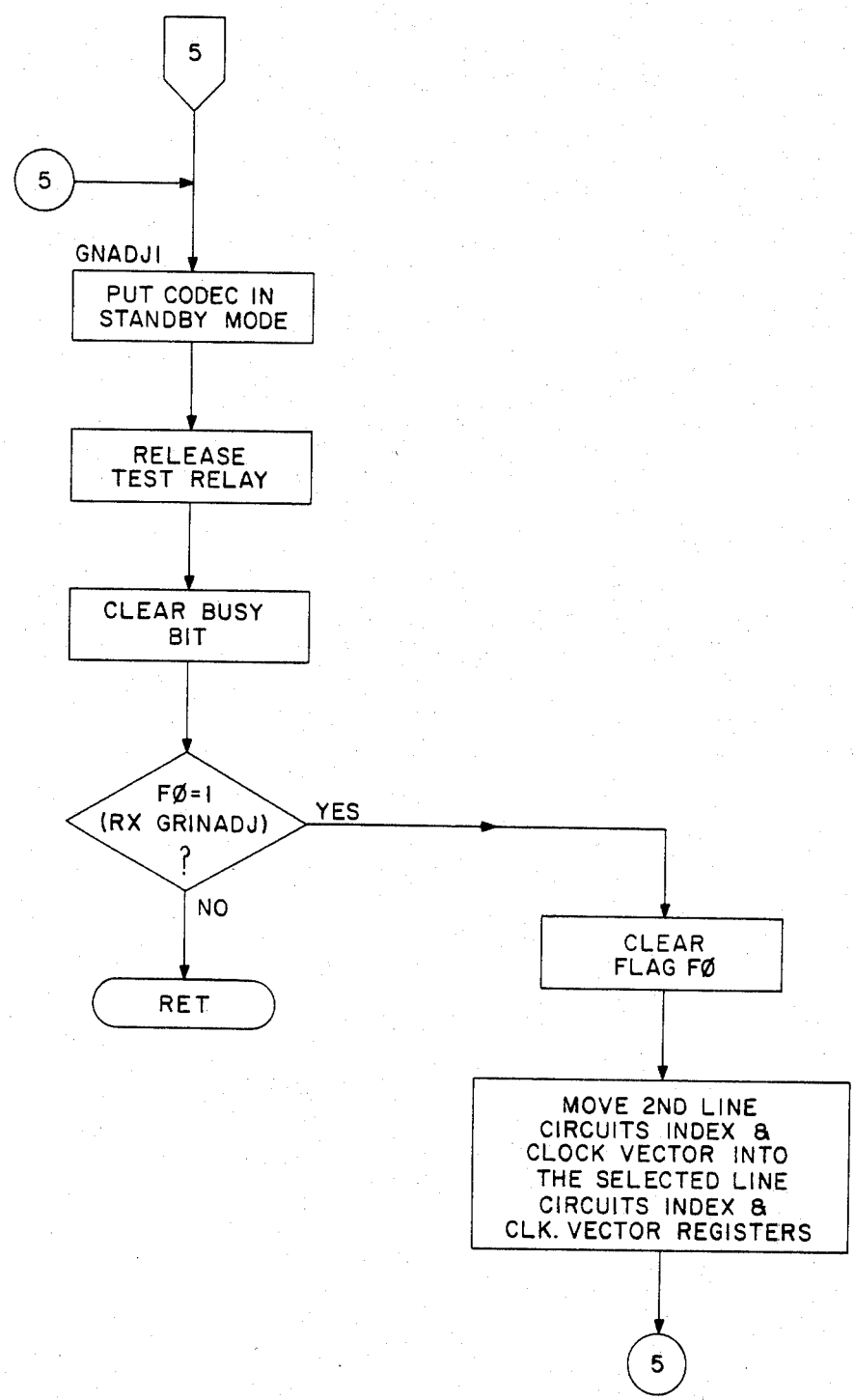

FIGS. 37 A, B and C illustrates in flow chart form the program for setting the transmit and receive gain.

8.0 OTHER LINE CARD ARRANGEMENTS (FIGS. 25, 38, 39 and 40)

Figure 38:
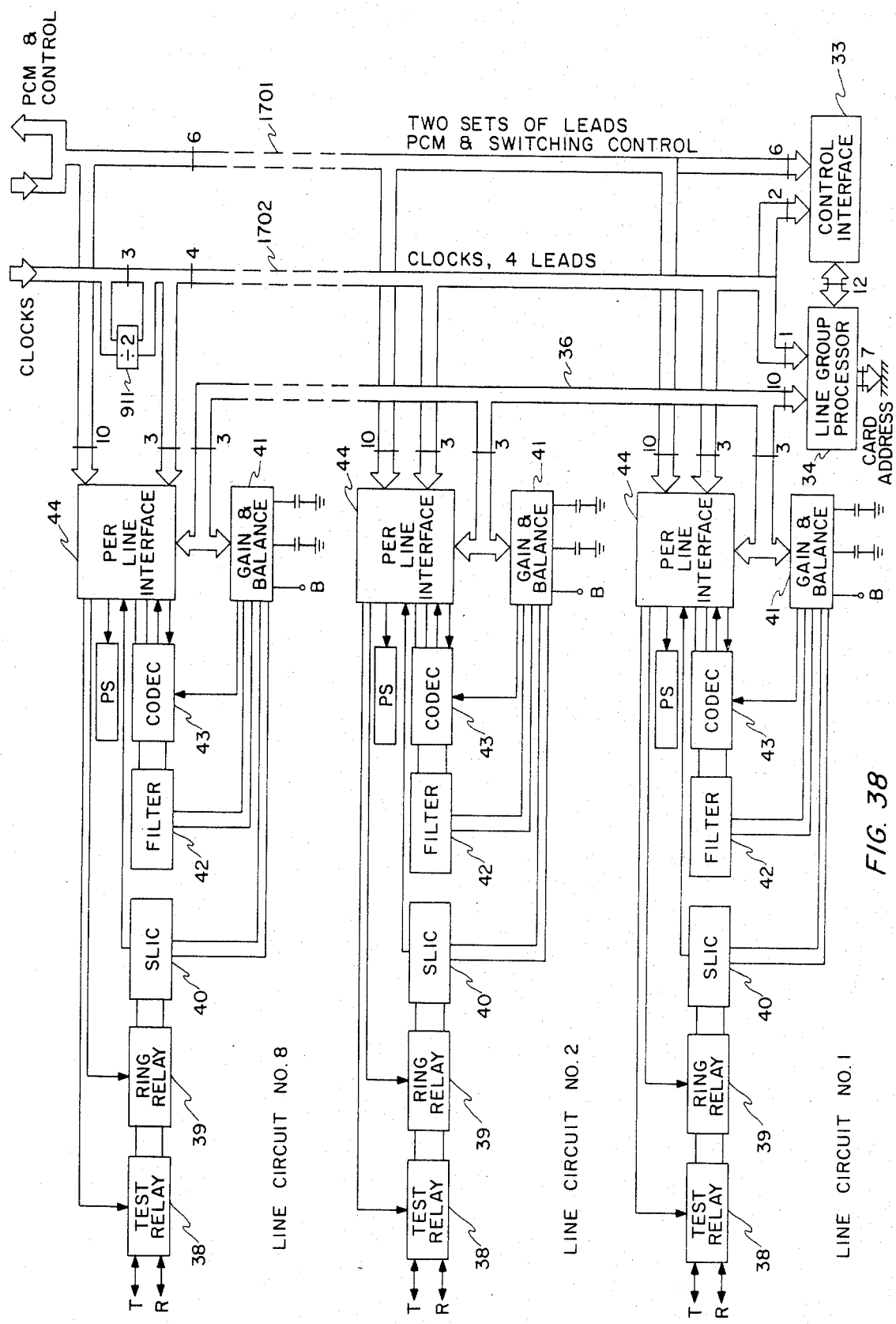
FIG. 38 is a general block diagram of the detailed drawing of FIG. 14.

The detailed drawing of FIG. 25 may be redrawn in general block diagram form with various leads grouped into buses as shown in FIG. 38. Bus 1701 includes PCMLCA, PCMLCB, $\overline{\text{AILS}}$, and $\overline{\text{BILS}}$. Bus 1702 includes CLK4LS, FSD, CLKT and CLK2.

The line card control interface 33 as described hereinabove interfaces between the line group processor 34 and the PCM buses PCMLCA and PCMLCB for the interchange of control information over the PCM buses.

Figure 39:
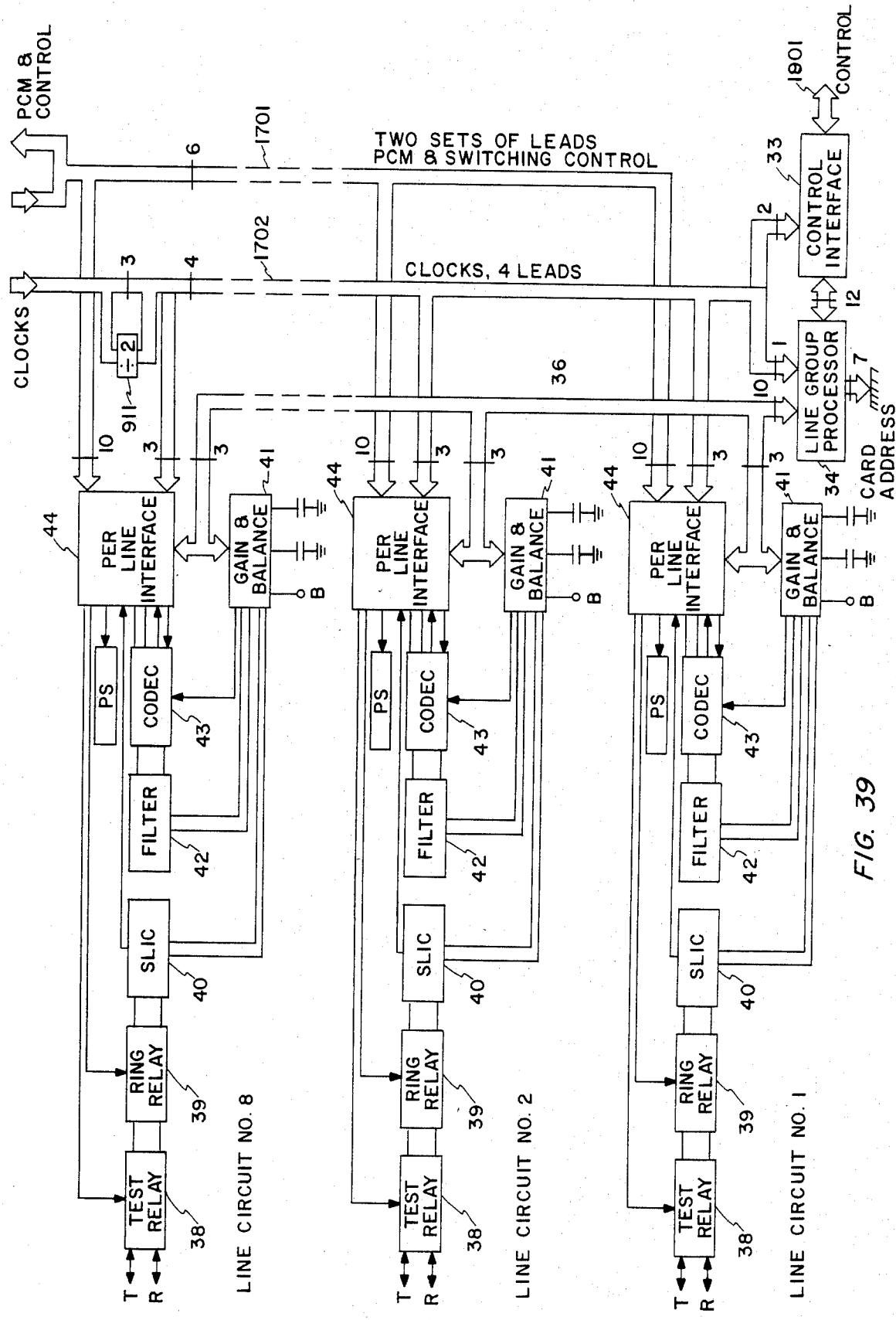
FIG. 39 is a general block diagram of another embodiment of FIG. 14.

In another embodiment of the invention shown in FIG. 39, a separate control bus 1801 is provided and the line group control interface 33 is not connected to the PCM bus 1701. In this arrangement, control information may be exchanged between the line card control interface 33 and a line switch control 7 in the system control 5 over a control bus 1801.

Figure 40:
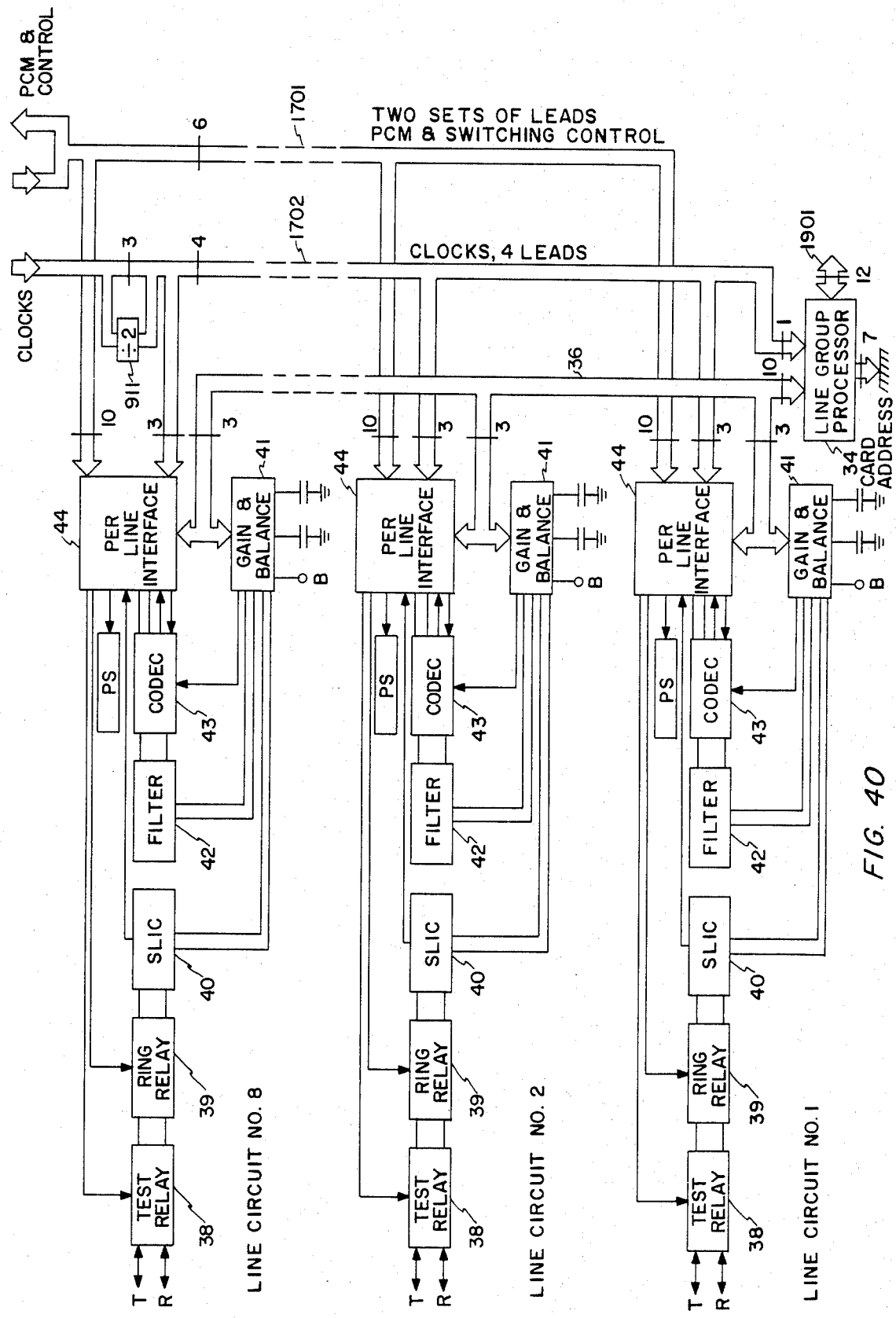
FIG. 40 is a general block diagram of a third embodiment of FIG. 14.

In yet another embodiment of the invention shown in FIG. 40, the line group processor 34 may directly communicate via bus 1901 with the line switch control 7 or the system control 5.

Figure 41:
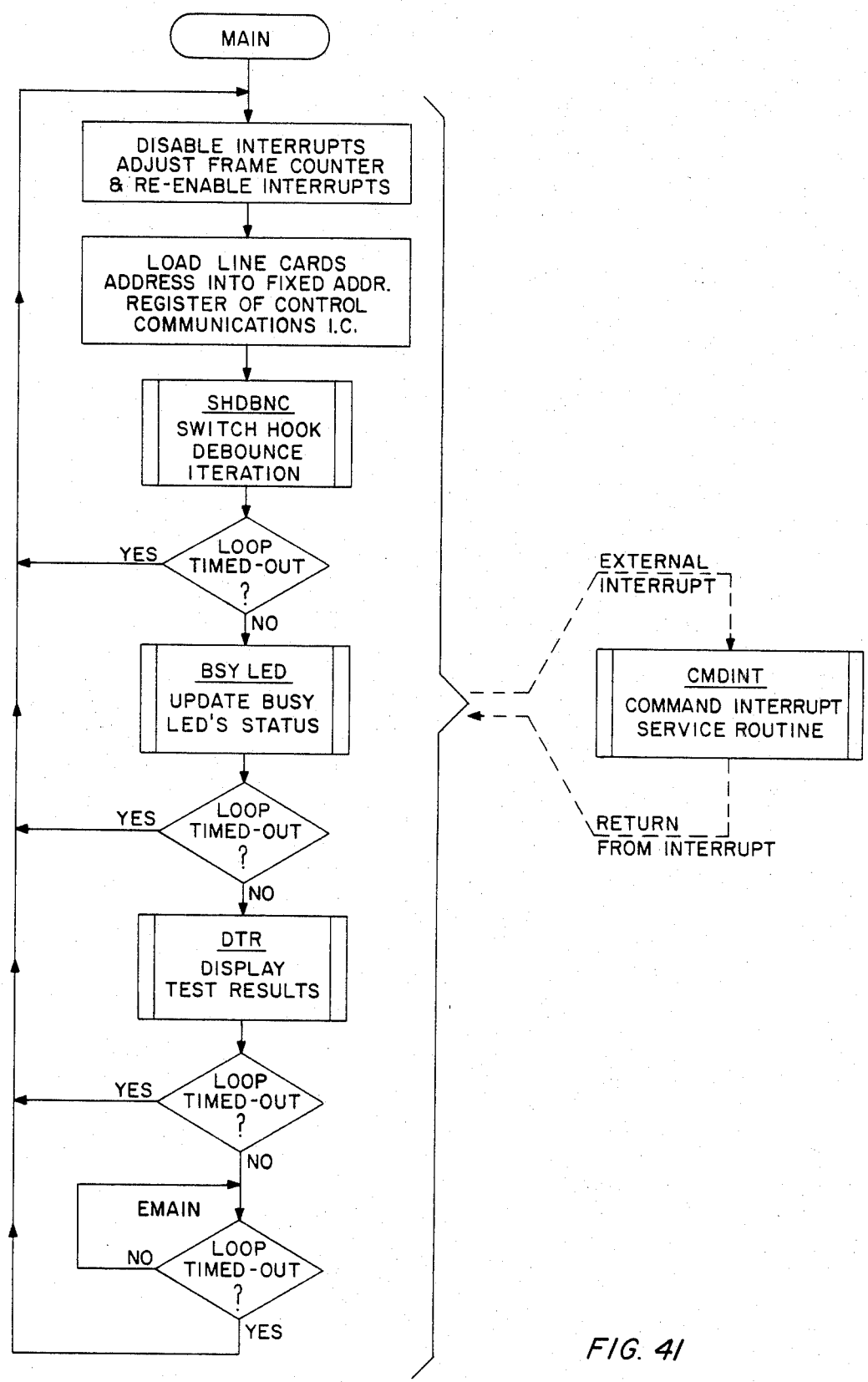
FIG. 41 is a flow chart of the software architecture of the line switch controller 7.
Figure 42B:
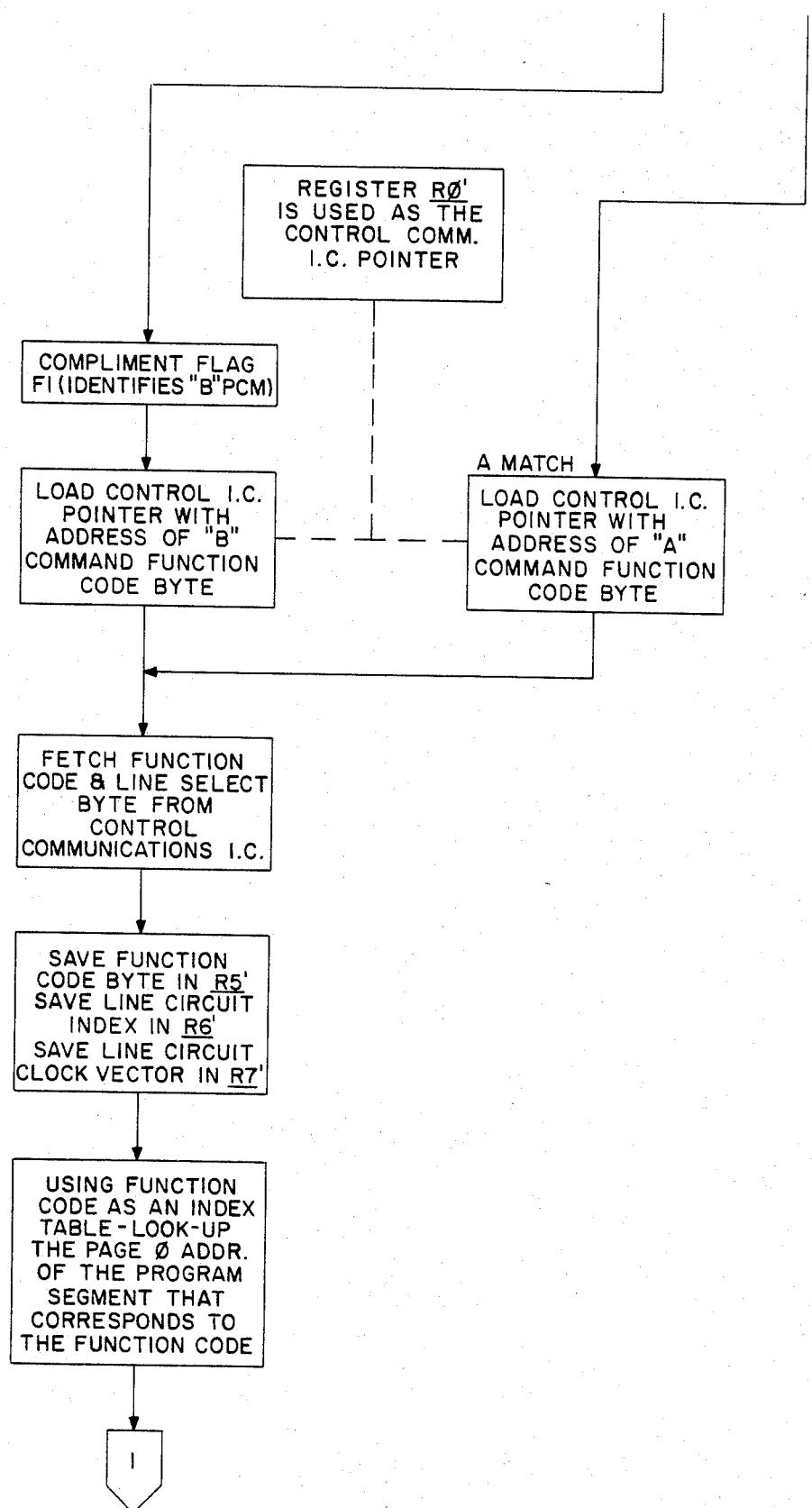
Figures 43, 43B:
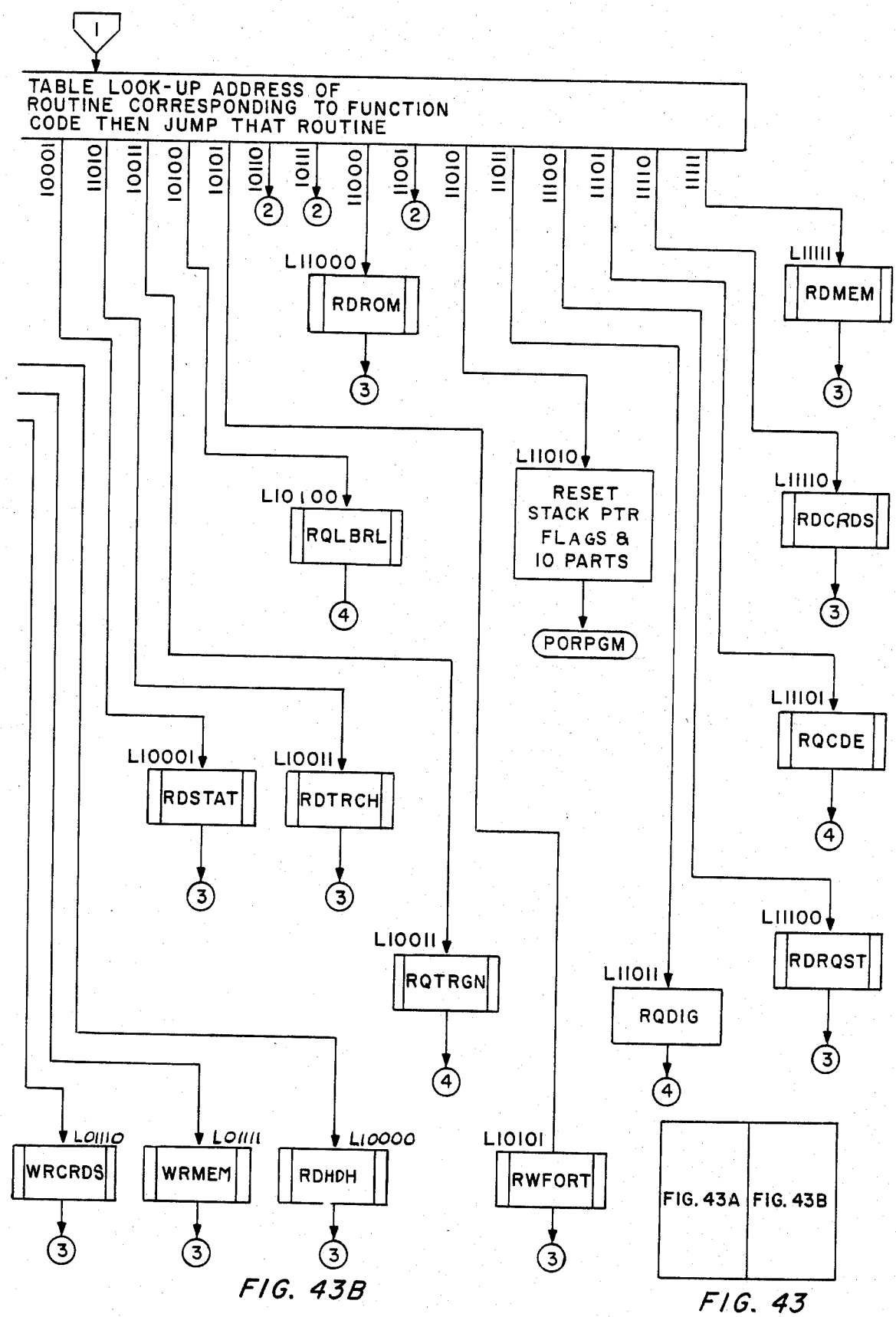
Figure 43A:
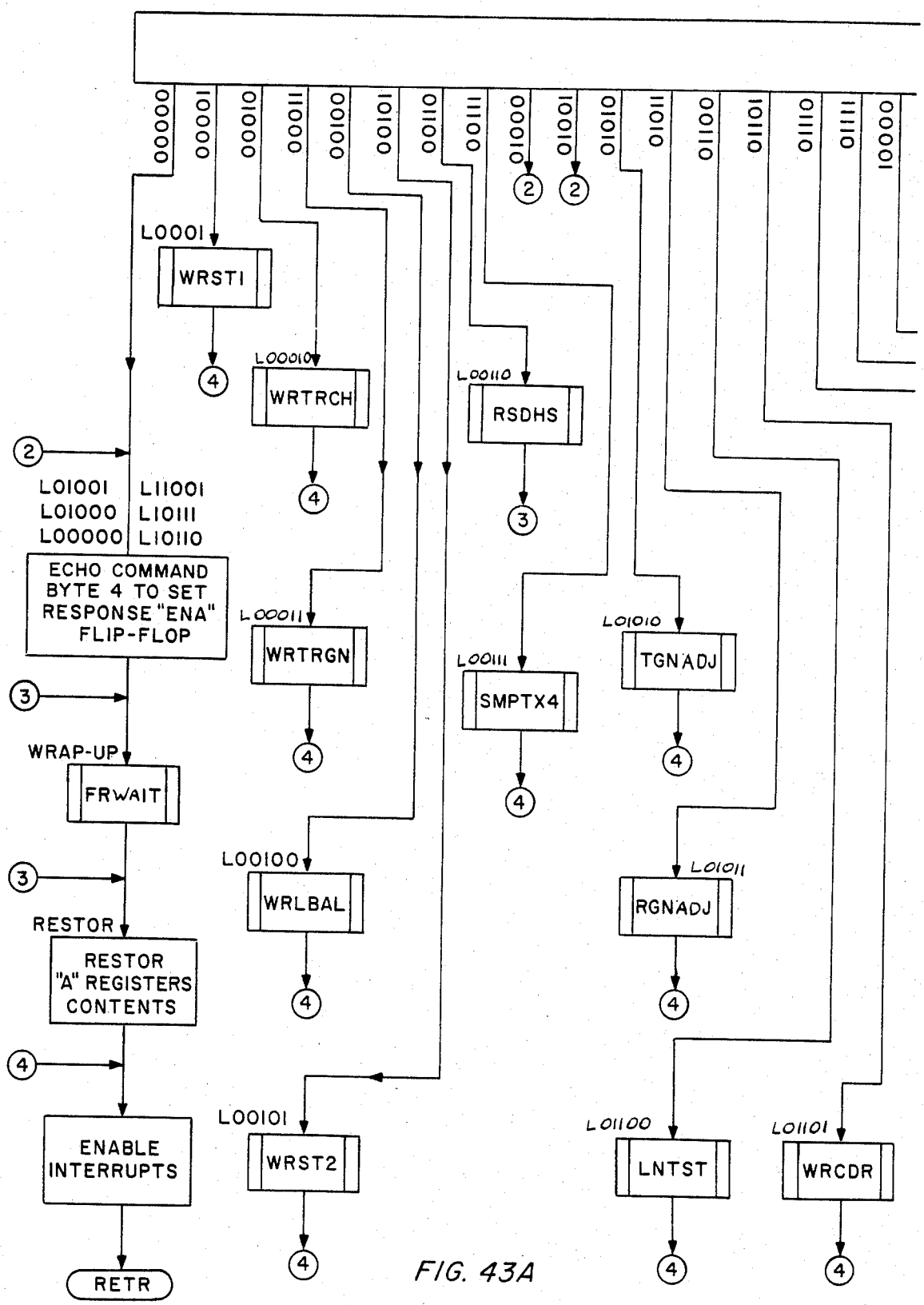

9.0 LINE GROUP PROCESSOR 34 (FIGS. 41, 42 and 43)

The line group processor 34 in the illustrative embodiment comprises an INTEL 8049 microprocessor which is described in the aforementioned INTEL reference at pages 8-31 to 8-35. FIG. 41 illustrates in flow chart form the main program loop of the software utilized in the illustrative embodiment. FIG. 42 illustrates the interrupt service routine of FIG. 41 in greater detail. FIG. 43 illustrates in flow chart form the table look-up addresses of various routines called by the command interrupt service routine. Program listings for the line group processor program are shown in the attached appendix.

CALL SET-UP (FIGS. 1, 2, 25)

When a subscriber line (A) goes off-hook, the line switch controller 7 of FIG. 2 transmits a common channel command to the system control 5 of FIG. 1 informing the system control 5 of a new sequence. The system control 5 responds by transmitting a common channel command to the line switch controller 7 assigning a PCM channel A and providing dial tone.

The line switch controller 7 transmits a channel assignment command (32 bit control word) to a line group processor 34 of FIG. 25. The line group processor 34 activates power to the line circuit for A, assigns transmit and receive channels at the CODEC for A, and updates the status of the line circuit. The system control 5 will then monitor dial pulses from A.

When the system control 5 determines the called line (B), the system control 5 will transmit a common channel command to the line switch controller 7 of the line switch to which B is terminated. The line switch controller 7 will request the busy/idle status of B from the line group processor 34 associated with the group of lines including B. The line group processor 34 responds by transmitting B's busy/idle status to the line switch controller 7. If B is idle, the line switch controller 7 transmits the channel assignment to the line group processor 34. The line group processor 34 then enables power to B's line circuit, assigns the transmit and receive channels to B's CODEC, and updates the line circuit status.

9.1 RINGING AND CALL CONNECT (FIGS. 1, 2, and 25)

The system control 5 sends a common channel command to the second line switch controller 7 to connect ringing to B, and turns on a ring-back tone generator to provide ring-back tone to A. If A and B are both terminated at the same line switch, the system control 5 may also indicate an intra-line switch call. The second line switch controller 7 sends ring commands to a ring circuit B of FIG. 2 and to the line group processor 34 for B. The line group processor 34 begins a ringing routine.

When B answers, the system control 5 sends a stop ringing command to the line switch controller 7. The line switch controller 7 in turn sends ring terminate commands to the ring circuit 13 and line group processor 34. The line group processor 34 terminates the ring routine.

If the call is an intra-line switch call, the receive channels for A and B are switched upon commands from the line switch controller 7 to the line group processors 34.

9.2 CALL DISCONNECT (FIGS. 1, 2 and 25)

When A and B go on-hook, the system control 5 sends a common channel command to one of the line switch controllers 7 to release the line. The line switch controller in turn sends a disconnect command to the line group processor 34. The line group processor 34 removes power from the line circuit and updates the line circuit status. This procedure is repeated for the other party.

While we have described above the principles of our invention in connection with specific apparatus, it is to be clearly understood that this description is made only by way of example and not as a limitation to the scope of our invention as set forth in the objects thereof and in the accompanying claims.

APPENDIX

```
ISIS-II MCS-48/UPI-41 MACRO ASSEMBLER, V3.0          PAGE    1
MASTER--ALS OLC B/B FIRMWARE

LOC  OBJ       LINE      SOURCE STATEMENT

1 ;      NAME         MASTER
                    2
                    3 ;
                    4 ;
                    5 ;
                    6
                    7 ;  MASTER -- SOFTWARE FOR THE ALS OCTAL LINE CARD CONTROLLER
                    8
                    9 $EJECT
                   10
                   11 ;      NAME         MEMMAP
                   12
                   13 ;
                   14 ;
                   15 ;
                   16
    0020           17 LNCRDS  EQU   20H    ; ADDR. OF 'LINE CARD STATUS BYTE'
                   18
    0021           19 HSW     EQU   21H    ; ADDR. OF 'HOOK SWITCH STATUS BYTE'
    0022           20 DLTAHS  EQU   22H    ; ADDR. OF 'DELTA HOOK SWITCH STATUS BYTE'
    0023           21 TMPDHS  EQU   23H    ; ADDR. OF 'TEMP. DLTA HOOK SWITCH'
```

```
0024        22 HSCNT   EQU     24H     ; ADDR. OF 'SWITCH HOOK DEBOUNCE ITERATION COUNTER'
            23
0025        24 RQFNCD  EQU     25H
0026        25 RQBYT1  EQU     26H
0027        26 RQBYT2  EQU     27H
            27
0028        28 RSPCNT  EQU     28H     ; ADDR. OF 'RESPONSE FRAME COUNT' BYTE
0029        29 ASAVE   EQU     29H     ; ADDR. OF 'A REG. SAVE AREA'
            30
002A        31 TESTR   EQU     2AH     ; ADDR. OF 'TEST RESULTS' BYTE
002B        32 TESTRC  EQU     2BH     ; ADDR. OF 'CDR TEST RESULTS'
002C        33 TESTRD  EQU     2CH     ; ADDR. OF 'DIGITAL I.C. TEST RESULTS'
002D        34 TESTRA  EQU     2DH     ; ADDR. OF 'ANALOG I.C. TEST RESULTS'
002E        35 GDCNT   EQU     2EH     ; ADDR. OF 'GOOD BOARD LED BLINK COUNTER'
002F        36 BLINKC  EQU     2FH     ; ADDR. OF 'LED BLINK COUNTER'
            37
0030        38 LCST1   EQU     30H     ; BASE ADDR. OF 'LINE CKT STATUS 1' BYTES
0038        39 LCST2   EQU     38H     ; BASE ADDR. OF 'LINE CKT STATUS 2' BYTES
0040        40 TXCH    EQU     40H     ; BASE ADDR. OF 'TX CHAN. ASSIGNMENTS'
0048        41 RXCH    EQU     48H     ; BASE ADDR. OF 'RX CHAN. ASSIGNMENTS'
0050        42 GNBAL   EQU     50H     ; BASE ADDR. OF GAIN & BALANCE SETTINGS
            43
0068        44 RELAYD  EQU     68H
0069        45 GNDEL   EQU     69H
006A        46 SHDCNT  EQU     6AH
006B        47 TEMP1   EQU     6BH
            48
            49 $EJECT
            50 ;****************************************
            51 ;  CONTROL COMMUNICATIONS I.C. INTERNAL REGISTERS
            52 ;****************************************
0001        53 ACRB2   EQU     01H     ; 'A PCM' CONTROL SHIFT REG. BYTE 2 ADDRESS
0005        54 BCRB2   EQU     05H     ; 'B PCM' CONTROL SHIFT REG. BYTE 2 ADDRESS
0008        55 CFXADD  EQU     08H     ; ADDR. OF 'FIXED ADDRESS' REGISTER
000C        56 CSTS    EQU     0CH     ; ADDR. OF CONTROL COMM. I.C.'S STATUS REG.
000D        57 CMODE   EQU     0DH     ; ADDR. OF CONTROL COMM. I.C.'S MODE REG.
000E        58 CRP     EQU     0EH     ; ADDR. OF 'CONTROL REG. POINTER'
000F        59 ATCRP   EQU     0FH     ; ADDR. OF CONTROL S/R BYTE POINTED TO BY 'CRP'
            60
            61 ;****************************************
            62 ;  LINE CIRCUIT COMMAND CODES (4-BIT CODE----BITS 7-4)
            63 ;****************************************
0000        64 WRDIG   EQU     00H     ; 'WRITE TO DIGITAL I.C. REG.' CODE (BITS 7-4)
0020        65 WRCDRC  EQU     20H     ; 'WRITE TO CODEC DATA REG.' CODE
0040        66 WRANA   EQU     40H     ; 'WRITE TO ANALOG I.C. REG.' CODE
0060        67 LDCODC  EQU     60H     ; 'LOAD CODEC' CODE
0080        68 RDDIG   EQU     80H     ; 'READ DIG. I.C. REG.' CODE
00A0        69 RDCDR   EQU     0A0H    ; 'READ CODEC DATA REG.' CODE
00C0        70 RDANA   EQU     0C0H    ; 'READ ANALOG I.C. REG.' CODE
            71
            72 ;****************************************
            73 ;                       ; INITIALIZATION VALUES
            74 ;****************************************
0018        75 IDIG    EQU     18H
00FF        76 ICODEC  EQU     0FFH
0084        77 IANA1   EQU     84H
```

```
0000                78 IANA2   EQU     00H
0000                79 IANA3   EQU     00H
                    80
                    81 ;****************************************
                    82 ; ADDRESS OF LAST BYTE OF 8049'S DATA MEMORY
                    83 ;****************************************
007F                84 LSTBYT  EQU     7FH
                    85
                    86 ;****************
                    87 ; RESPONSE DELAY
                    88 ;****************
0008                89 RSPNCD  EQU     8       ; NUMBER OF FRAMES DELAY THAT RESPONSE
                    90                         ;   FOLLOWS COMMAND.
                    91
                    92 $EJECT
                    93
                    94 ;        NAME            PORPGM
                    95
                    96 ;
                    97 ;
                    98 ;
                    99
                   100 ; PORPGM -- POWER-ON RESET PROGRAM
                   101
                   102 ; ENTERED AFTER A POWER-ON OR MANUAL RESET
                   103
0000               104         ORG     0
                   105 RESET:
0000 C5            106         SEL     RB0     ; REG. BANK 0 IS USED EVERYWHERE EXCEPT IN
0001 6400          107         JMP     PORPGM  ;   INTERRUPT SERVICE ROUTINES.
                   108
0300               109         ORG     300H
                   110 PORPGM:
0300 15            111         DIS .   I
                   112 ; INITIALIZE ALL LINE CIRCUITS
0301 54A6          113         CALL    LINERS
                   114
                   115 ; IS SELF-TEST TO BE SKIPPED (P23=0)?
0303 0A            116         IN      A,P2
0304 7211          117         JB3     POR1
                   118
                   119 ; SKIPPING SELF-TEST--------CLEAR TEST RESULTS BYTES
0306 B820          120         MOV     R0,#TESTR+3
0308 B904          121         MOV     R1,#4
030A B000          122         MOV     @R0,#0
030C C8            123         DEC     R0
030D E90A          124         DJNZ    R1,$-3
030F 6413          125         JMP     STRET   ; RETURN TO PORPGM
                   126
                   127 POR1:
                   128 ; PERFORM SELF-TEST OF LINE CARD HARDWARE
0311 C400          129         JMP     SLFTST
                   130 STRET:          ; SELF-TEST ROUTINE'S RETURN ADDRESS
                   131
                   132 ; INITIALIZE DATA RAM
0313 7445          133         CALL    RAMRS
                   134
```

```
                    135 ; ENABLE RECEPTION OF COMMANDS FROM ALS CONTROLLER
0315 748F           136         CALL    CNTLRS
0317 1404           137         CALL    CNTLEN
                    138
                    139 ; INITIALIZE FRAME COUNTER BEFORE ENTERING 'MAIN'
0319 2318           140         MOV     A,#18H
031B 65             141         STOP    TCNT
031C 62             142         MOV     T,A
                    143 ; ENTER MAIN LOOP
                    144
                    145 ;*** END OF PORPGM ***
                    146 $EJECT
                    147
                    148 ;       NAME            MAIN
                    149
                    150 ;
                    151 ;
                    152 ;
                    153
                    154 MAIN:
031D C5             155         SEL     RB0
                    156
                    157 ;###############################################################
031E 15             158         DIS     I       ; DISABLE INTERRUPT WHILE FRAME COUNTER
031F 65             159         STOP    TCNT    ;   IS STOPPED
0320 42             160         MOV     A,T     ; READ CURRENT COUNTER VALUE AND SUBTRACT
                    161                         ;   16 (DECIMAL) IN ORDER TO RESET THE
                    162                         ;   COUNTER FOR THE 2 MILLISEC MAIN LOOP
                    163                         ;   DELAY. (EQUIV. TO ADDING 0F0H MOD 256)
0321 03F0           164         ADD     A,#0F0H ; (ADDING 0F0H IS EQUIV. TO SUBTRACTING 10H
                    165                         ;   IN MODULO 256 ARITHMETIC)
0323 62             166         MOV     T,A     ; LOAD NEW VALUE INTO COUNTER
                    167 ;###############################################################
                    168
0324 05             169         EN      I       ; RE-ENABLE INTERRUPTS NOW THAT COUNTER HAS
                    170                         ;   BEEN RESTARTED.
0325 45             171         STRT    CNT     ; RESTART COUNTER
                    172
                    173 ; RE-LOAD LINE CARD'S FIXED ADDRESS INTO CONTOL COMM. I.C.
0326 9498           174         CALL    LDFXAD
                    175
                    176 ; PERFORM S/H DEBOUNCE ITERATION
0328 749B           177         CALL    SHDBNC
032A 7439           178         CALL    LOOPCK  ; CHECK FOR LOOP TIME-OUT
                    179
                    180 ; UPDATE LINE CARD 'BUSY INDICATION LED'
032C 7404           181         CALL    BSYLED
032E 7439           182         CALL    LOOPCK  ; CHECK FOR LOOP TIME-OUT
                    183
                    184 ; SCAN TEST RESULTS REGISTERS FOR HARDWARE MALFUNCTION
                    185 ;   AND BLINK LED IF BOARD IS BAD.
0330 9454           186         CALL    DTR     ; DISPLAY TEST RESULTS SUBROUTINE
0332 7439           187         CALL    LOOPCK  ; CHECK FOR LOOP TIME-OUT
                    188
                    189 $EJECT
```

```
                         190
                         191
                         192 ;     OTHER MAIN LOOP SUBROUTINES WILL BE INSERTED HERE
                         193
                         194 ; END OF MAIN LOOP
                         195 ; WAIT UNTIL 2 MS HAS ELAPSED BEFORE RESTARTING MAIN LOOP
                         196 EMAIN:
0334 45                  197        STRT    CNT
0335 7439                198        CALL    LOOPCK  ; CHECK FOR LOOP TIME-OUT
                         199
0337 6434                200        JMP     EMAIN
                         201
                         202 ; SUBROUTINE LOOPCK ****************************
                         203 LOOPCK:
0339 42                  204        MOV     A,T     ; READ FRAME COUNT
033A 03E8                205        ADD     A,#0E8H ; HAS FRAME COUNT EXCEEDED 18H (LOOP TIME-OUT VALUE)?
033C F63F                206        JC      $+3     ; IF CARRY OCCURRED, THEN LOOP HAS TIMED-OUT.
033E 83                  207        RET             ; LOOP HAS NOT TIMED OUT---PERFORM NEXT OPERATION
                         208
                         209 ; LOOP HAS TIMED OUT-----RESET STACK POINTER & RESTART MAIN LOOP
033F C7                  210        MOV     A,PSW
0340 53F8                211        ANL     A,#0F8H ; CLEAR 'SP' BITS
0342 D7                  212        MOV     PSW,A
0343 641D                213        JMP     MAIN
                         214
                         215 ; END OFF SUBROUTINE LOOPCK ********************
                         216
                         217 ;*** END OF MAIN ***
                         218 $EJECT
                         219
                         220 ;      NAME            RAMRS
                         221
                         222 ;
                         223 ;
                         224 ;
                         225
                         226 ; RAMRS -- INITIALIZES CONTENTS OF DATA RAM
                         227
                         228 RAMRS:
                         229 ; INITIALIZE UNUSED PORTION OF RAM TO ZERO
0345 B87F                230        MOV     R0,#LSTBYT ; ADDR. OF LAST BYTE OF DATA RAM
0347 B918                231        MOV     R1,#18H ; (24 BYTES)
0349 B000                232        MOV     @R0,#0
034B C8                  233        DEC     R0
034C E949                234        DJNZ    R1,$-3  ; REPEAT LAST 3 INSTRUCTIONS UNTIL R1=0
                         235
                         236 ; INITIALIZE GAIN & BALANCE SETTINGS BYTES
034E B908                237        MOV     R1,#8
                         238
0350 2304                239 RAMRS3: MOV    A,#IANA1
0352 A0                  240        MOV     @R0,A
0353 C8                  241        DEC     R0
0354 2300                242        MOV     A,#IANA2
0356 A0                  243        MOV     @R0,A
0357 C8                  244        DEC     R0
0358 2300                245        MOV     A,#IANA3
```

```
035A A0            246         MOV     @R0,A
035B C8            247         DEC     R0
035C E958          248         DJNZ    R1,RAMRS3
                   249
                   250 ; INITIALIZE CHANNEL ASSIGNMENT BYTES
035E B910          251         MOV     R1,#10H
0360 B03F          252 RAMRS4: MOV     @R0,#3FH
0362 C8            253         DEC     R0
0363 E960          254         DJNZ    R1,RAMRS4      ; REPEAT LAST 3 INSTRUCTIONS UNTIL R1=0
                   255
                   256 ; INITIALIZE 'LC STATUS 2' BYTES TO 00000000B
0365 B908          257         MOV     R1,#8
                   258
0367 B000          259 RAMRS5: MOV     @R0,#0
0369 C8            260         DEC     R0
036A E967          261         DJNZ    R1,RAMRS5
                   262
                   263 $EJECT
                   264 ; INITIALIZE 'LC STATUS 1' BYTES TO 00110000B
036C B908          265         MOV     R1,#8
                   266
036E B018          267 RAMRS6: MOV     @R0,#IDIG
0370 C8            268         DEC     R0
0371 E96E          269         DJNZ    R1,RAMRS6
                   270
                   271 ; INITIALIZE 'GOOD BOARD LED BLINK COUNTER'
0373 B82E          272         MOV     R0,#GDCNT
0375 B002          273         MOV     @R0,#2
0377 B82F          274         MOV     R0,#BLINKC
0379 B000          275         MOV     @R0,#0
                   276
                   277 ; RESET 'LNCRDS', 'HSW', 'DLTAHS', ... , 'ASAVE' (20H-29H)
037B B829          278         MOV     R0,#29H
037D B90A          279         MOV     R1,#10
                   280
037F B000          281 RAMRS7: MOV     @R0,#0
0381 C8            282         DEC     R0
0382 E97F          283         DJNZ    R1,RAMRS7
                   284
                   285 ; INITIALIZE RELAY DEBOUNCE DELAY & GAIN SET DELAY BYTES
0384 B368          286         MOV     R0,#RELAYD
0386 B032          287         MOV     @R0,#50  ; 50 MILLISEC DEFAULT RELAY DEBOUNCE DELAY
0388 18            288         INC     R0
0389 B005          289         MOV     @R0,#5   ; 5 MILLISEC DEFAULT GAIN ADJ. DELAY
                   290
                   291 ; INITIALIZE S/H DEBOUNCE CYCLE ITERATION COUNT
038B 18            292         INC     R0
038C B014          293         MOV     @R0,#20  ; DEFAULTS TO 20 ITERATIONS
                   294
038E 83            295         RET
                   296
                   297 ;*** END OF RAMRS ***
                   298 $EJECT
                   299
                   300 ;       NAME            CNTLRS
                   301
```

```
                            382 ;
                            383 ;
                            384 ;
                            385
                            386
                            387 ; CNTLRS -- CONTROL PROTOCOL I.C. INITIALIZATION ROUTINE
                            388
                            389 ; INITIALIZES MODE REG., CRP, & FIXED ADDR.
                            390
                            391 CNTLRS:
                            392 ; INITIALIZE MODE REGISTER
038F B80D                   393         MOV     R0,#CMODE   ; ADDR. OF MODE REG.
0391 2303                   394         MOV     A,#03H      ; 'B COMP ENA' & 'A COMP ENA' = 1
0393 90                     395         MOVX    @R0,A
                            396
                            397 ; CLEAR CRP (CONTROL REGISTER POINTER)
0394 B80E                   398         MOV     R0,#CRP     ; ADDR. OF 'CNTRL REG POINTER'
0396 27                     399         CLR     A
0397 90                     320         MOVX    @R0,A
                            321
                            322 ; LOAD FIXED ADDRESS
0398 9480                   323         CALL    LDFXAD
                            324
039A 83                     325         RET
                            326
                            327 ;*** END OF CNTLRS ***
                            328 $EJECT
                            329
                            330 ;       NAME            SHDBNC
                            331
                            332 ;
                            333 ;
                            334 ;
                            335
                            336 ; SHDBNC -- SWITCH-HOOK DEBOUNCE SUBROUTINE
                            337
                            338 SHDBNC:
                            339 ; READ CURRENT S/H DEBOUNCE ITERATION COUNTER TO SEE IF
                            340 ;   DEBOUNCING IS CURRENTLY IN PROGRESS.
039B B824                   341         MOV     R0,#HSCNT
039D F0                     342         MOV     A,@R0           ; READ 'HOOK STATUS COUNTER'
039E 96AF                   343         JNZ     SHLOOP
                            344
                            345 ; TEST FOR ANY CHANGES OF S/H VALUES (COMPARED TO THE CURRENT
                            346 ;   STORED VALUES OF 'HOOK SWITCH STATUS')
03A0 B921                   347         MOV     R1,#HSW
03A2 09                     348         IN      A,P1            ; READ S/H VECTOR FROM PORT 1
03A3 D1                     349         XRL     A,@R1           ; 'TMPDHS'=S/H VECTOR 'XOR' HOOK STATUS
03A4 B923                   350         MOV     R1,#TMPDHS
03A6 A1                     351         MOV     @R1,A           ; STORE TMPDHS
03A7 96AA                   352         JNZ     SHNEW
03A9 93                     353         RETR
                            354
                            355 SHNEW:
                            356 ; AT LEAST ONE S/H LINE HAS CHANGED STATUS---START DEBOUNCING ITERATIONS
                            357 ; INITIALIZE ITERATION COUNTER
```

```
03AA B96A      358        MOV     R1,#SHDCNT
03AC F1        359        MOV     A,@R1
03AD A0        360        MOV     @R0,A
03AE 93        361        RETR
               362
               363 SHLOOP:
               364 ; NORMAL S/H DEBOUNCE ITERATION SEQUENCE
03AF B921      365        MOV     R1,#HSW
03B1 09        366        IN      A,P1
03B2 D1        367        XRL     A,@R1   ; 'TMPDHS'=S/H VECTOR 'XOR' HOOK STATUS
               368
               369 ; 'AND' THE CURRENT VALUE OF 'TMPDHS' WITH THE LAST VALUE OF 'TMPDHS'
               370 ;   IF THE RESULT IS ZERO THEN ABORT THE DEBOUNCING
03B3 B923      371        MOV     R1,#TMPDHS
03B5 51        372        ANL     A,@R1
03B6 A1        373        MOV     @R1,A
03B7 AA        374        MOV     R2,A    ; SAVE 'TMPDHS' VALUE IN R2
03B8 C6C0      375        JZ      ABORT
               376
               377 $EJECT
               378 ; HAVE ALL ITERATIONS BEEN PERFORMED?
03BA F0        379        MOV     A,@R0
03BB 07        380        DEC     A       ; DECREMENT ITERATION COUNTER & TEST FOR ZERO
03BC A0        381        MOV     @R0,A
03BD C6C3      382        JZ      DONE
03BF 93        383        RETR
               384
               385 ABORT:
               386 ; RESET S/H DEBOUNCE ITERATION COUNTER
03C0 B000      387        MOV     @R0,#0  ; RESET 'HSCNT' TO ZERO
03C2 93        388        RETR
               389
               390 DONE:
               391 ; UPDATE CURRENT VALUES OF 'HOOK SWITCH STATUS' & 'DELTA HOOK STATUS'
03C3 FA        392        MOV     A,R2    ; FETCH 'TMPDHS' VALUE
03C4 B921      393        MOV     R1,#HSW
03C6 D1        394        XRL     A,@R1   ; UPDATE &
03C7 A1        395        MOV     @R1,A   ;    SAVE HOOKSW
03C8 B922      396        MOV     R1,#DLTAHS
03CA FA        397        MOV     A,R2
03CB 41        398        ORL     A,@R1   ; UPDATE &
03CC A1        399        MOV     @R1,A   ;    SAVE DLTAHS
03CD B920      400        MOV     R1,#LNCRDS
03CF F1        401        MOV     A,@R1
03D0 4301      402        ORL     A,#01H  ; SET "OR'D DELTA H/S" BIT OF 'LNCRDS'
03D2 A1        403        MOV     @R1,A
               404
03D3 93        405        RETR
               406
               407 ;*** END OF SHDENC ***
               408 $EJECT
               409
               410 ;   NAME          BSYLED
               411
               412 ;
               413 ;
```

```
                414 ;
                415
                416 ;   BSYLED -- LINE CARD 'BUSY INDICATE LED' UPDATE ROUTINE
                417
                418 BSYLED:
03D4 B838       419             MOV     R0,#LCST2   ; ADDR OF 'LC STATUS 2' BYTE
03D6 BA08       420             MOV     R2,#8
                421
                422 ;   IF ANY OF THE LINE CIRCUITS ARE BUSY TURN-ON 'BUSY LED'
                423
                424 BLED1:
03D8 F0         425             MOV     A,@R0
03D9 F2E1       426             JB7     BLED2
03DB 18         427             INC     R0
03DC EAD8       428             DJNZ    R2,BLED1    ; IF COUNT#0, CHECK NEXT LINE CKT BUSY STATUS
                429
                430 ;   NO LINES BUSY ----- TURN-OFF 'BUSY LED'
                431
03DE 9AEF       432             ANL     P2,#0EFH    ; TURN-OFF 'BUSY INDICATE LED' (P24)
                433                                 ;    & RETURN TO MAIN LOOP
03E0 93         434             RETR
                435
                436 BLED2:
                437
                438 ;   AT LEAST ONE LINE IS BUSY ----- TURN-ON 'BUSY LED'
                439
03E1 8A10       440             ORL     P2,#10H     ; TURN-ON 'BUSY INDICATE LED' (P24)
                441                                 ;    & RETURN TO MAIN LOOP
                442
03E3 93         443             RETR
                444
                445 ;*** END OF BSYLED ***
                446 $EJECT
                447
                448 ;       NAME        RTNSH
                449
                450 ;
                451 ;
                452 ;
                453
                454
                455 ;   RTNSH -- RETURN SWITCH HOOK: SENDS RETURN S/H COMMAND
                456 ;                   TO ALL LINE CIRCUITS ON THE CARD.
                457
                458 RTNSH:
03E4 8A40       459             ORL     P2,#40H     ; SET 'DATA' LINE TO 1
03E6 9A7F       460             ANL     P2,#07FH    ; SET 'CMD ENA BAR' TO 0
03E8 9900       461             ANL     P1,#0       ; PULSE CLOCK LINES LOW
03EA 89FF       462             ORL     P1,#0FFH    ;    THEN HIGH.
03EC 8A80       463             ORL     P2,#80H     ; SET 'CMD ENA BAR' TO 1 TO RETURN S/H
                464 ;                                        ON CLK/SH<7:0>
                465
03EE 83         466             RET
                467
                468 ;*** END OF RTNSH ***
                469 $EJECT
```

```
                471 ;      NAME          CLKVCT
                472
                473 ; CLKVCT -- CLOCK VECTOR LOOK-UP TABLE
                474
                475 CLKVCT:
03EF FE         476        DB     11111110B
03F0 FD         477        DB     11111101B
03F1 FB         478        DB     11111011B
03F2 F7         479        DB     11110111B
03F3 EF         480        DB     11101111B
03F4 DF         481        DB     11011111B
03F5 BF         482        DB     10111111B
03F6 7F         483        DB     01111111B
                484
                485
                486 ;*** END OF CLKVCT ***
                487 $EJECT
```

ISIS-II MCS-48/UPI-41 MACRO ASSEMBLER, V3.0          PAGE  15
MASTER---ALS OLC B/B FIRMWARE

```
LOC  OBJ        LINE     SOURCE STATEMENT 488
                489 ;     NAME          TIMINT
                490
                491 ; TIMINT -- TIMER INTERRUPT SERVICE ROUTINE
                492
0007            493        ORG    7
                494 TIMINT:
0007 93         495        RETR
0008 00         496        NOP
                497
                498 ;*** END OF TIMINT ***
                499 $EJECT
                500
                501 ;     NAME          CMDINT
                502
                503 ;
                504 ;
                505 ;
                506
                507 ; CMDINT -- COMMAND INTERRUPT SERVICE ROUTINE
                508
0003            509        ORG    3
                510 CMDINT:
0003 D5         511        SEL    RB1
```

```
0004 45          512        STRT    CNT
0005 0409        513        JMP     ICONT   ; SKIP OVER 'TIMER INTERRUPT' VECTOR LOCATION (7-8)
                 514
0009             515        ORG     9
                 516 ICONT:
                 517 ; SAVE 'A' REGISTER'S CONTENTS
0009 B929        518        MOV     R1,#ASAVE
000B A1          519        MOV     @R1,A   ; SAVE CONTENTS OF 'A' REG.
                 520
                 521 ; DISABLE COMMANDS RECEPTION
000C B380        522        MOV     R0,#CMODE
000E 2303        523        MOV     A,#03H
0010 90          524        MOVX    @R0,A   ; DISABLE COMMANDS RECEPTION CIRCUITRY
                 525
                 526 ; CALCULATE AND SAVE 2'S COMPLEMENT OF RESPONSE FRAME COUNT.
0011 42          527        MOV     A,T
0012 0307        528        ADD     A,#(RSPNCD-1)
0014 37          529        CPL     A
0015 17          530        INC     A       ; 2'S COMP. IN A REG.
0016 C9          531        DEC     R1      ; R1 NOW POINTS TO 'RESPONSE COUNT' SAVE AREA
0017 A1          532        MOV     @R1,A
                 533
                 534 ; CLEAR FLAG F1 (ASSUME COMMAND RECEIVED OVER "A" PCM HIGHWAY)
                 535 ; (F1 = A BAR/B)
0018 A5          536        CLR     F1
                 537
0019 C8          538        DEC     R0      ; R0 POINTS TO CNTRL STATUS BYTE
001A 80          539        MOVX    A,@R0   ; FETCH STATUS INFO.
001B 1228        540        JB0     AMATCH
001D 3223        541        JB1     BMATCH
                 542
                 543 ; NEITHER ADDRESS COMPARATOR FLAG --
                 544 ;     ***** CONTROL COMMUNICATONS I.C. HARDWARE ERROR *****
001F D4C7        545        CALL    CFAIL
0021 04AF        546        JMP     RESTOR
                 547
                 548 $EJECT
                 549 BMATCH:
                 550 ; SET FLAG F1 (IDENTIFY "B" PCM HIGHWAY AS SOURCE OF COMMAND)
0023 B5          551        CPL     F1
0024 B885        552        MOV     R0,#BCRB2 ; LOAD R0 WITH ADDR. OFF "B" COMMAND BYTE 2
0026 042A        553        JMP     $+4     ; SKIP OVER NEXT INSTRUCTION
                 554
0028 B801        555 AMATCH: MOV    R0,#ACRB2 ; LOAD R0 WITH ADDR. OF "A" COMMAND BYTE 2
                 556
                 557 ; FETCH FUNCTION CODE & LINE SELECT BYTE FROM COMMAND REG.
                 558 ; AND SAVE IN R5.
002A 80          559        MOVX    A,@R0   ; FETCH FUNCTION CODE BYTE
002B AD          560        MOV     R5,A    ; & SAVE IN R5
                 561
                 562 ; SAVE LINE CIRCUIT INDEX IN R6.
002C 5307        563        ANL     A,#07H  ; MASK OFF FUNCTIN BITS
002E AE          564        MOV     R6,A    ; & SAVE 'LINE CKT. INDEX' IN R6
                 565
                 566 ; CALCULATE LINE CIRCUIT'S CLOCK VECTOR AND SAVE IN R7.
                 567 ;     ('CLOCK VECTOR' LOOK-UP TABLE RESIDES IN PROG. MEM. PAGE 3)
```

```
002F 03EF    568          ADD     A,#(LOW CLKVCT)
0031 E3      569          MOVP3   A,@A    ; TABLE LOOK-UP 'CLOCK VECTOR' &
0032 AF      570          MOV     R7,A    ;   SAVE 'CLOCK VECTOR' IN R7
             571
             572 ; INCREMENT POINTER TO POINT AT COMMAND/RESPONSE DATA BYTE 1
0033 18      573          INC     R0
             574
             575
             576 ; DECODE 'FUNCTION CODE' BY USING 'FUNCTION CODE' AS AN INDEX TO
             577 ;   THE 'FUNCTION CODE' JUMP TABLE
             578
0034 FD      579          MOV     A,R5
0035 77      580          RR      A
0036 77      581          RR      A
0037 77      582          RR      A       ; FUNCTION CODE BITS IN LSB POSITIONS
0038 531F    583          ANL     A,#1FH  ; MASK OFF LINE CKT. SELECT BITS
003A 0384    584          ADD     A,#FNCODE ; ADD FUNCTION CODE JUMP TABLE BASE ADDR.
003C B3      585          JMPP    @A      ; JUMP TO FUNCTION CODE'S SERVICE ROUTINE
             586
             587 ; ASSIGNMENT OF WORKING REGISTERS AT THIS POINT IS:
             588 ;    R0     POINTS TO BYTE 3 OF THE COMMAND/RESPONSE S/R
             589 ;    R1     GEN. PURPOSE POINTER
             590 ;    R2     GEN. PURPOSE
             591 ;    R3     GEN. PURPOSE
             592 ;    R4     GEN. PURPOSE
             593 ;    R5     CONTAINS COMMAND FUNCTION CODE
             594 ;    R6     CONTAINS LINE CKT. INDEX
             595 ;    R7     CONTAINS LINE CKT. 'CLOCK VECTOR'
             596 ;ZZZZZZZZZZZZZZZZZZZZZZZZZZZZZZZZZZZZZZZZZZZZZZZZZ
             597 $EJECT
003D 3400    598 L00001:  CALL    WRST1   ; 'WRITE LINE CIRCUIT STATUS 1'
003F 04AF    599          JMP     RESTOR
             600
0041 3438    601 L00010:  CALL    WRTRCH  ; 'WRITE TX & RX CHAN. ASSIGNMENTS'
0043 04AF    602          JMP     RESTOR
             603
0045 3486    604 L00011:  CALL    WRTRGN  ; 'WRITE TX & RX GAIN SETTINGS'
0047 04AF    605          JMP     RESTOR
             606
0049 34AA    607 L00100:  CALL    WRLBAL  ; 'WRITE LINE BALANCE SETTING BYTE'
004B 04AF    608          JMP     RESTOR
             609
004D 34B5    610 L00101:  CALL    WRST2   ; 'WRITE LINE CIRCUIT STATUS 2'
004F 04AF    611          JMP     RESTOR
             612
0051 94AC    613 L00110:  CALL    RSDHS   ; RESET 'DELTA HOOK STATUS' BIT
0053 04AD    614          JMP     WRAPUP
             615
0055 94B0    616 L00111:  CALL    SMPTX4  ; SAMPLE TX CH. 4
0057 04AF    617          JMP     RESTOR
             618
0059 B442    619 L01010:  CALL    TGNADJ  ; TX GAIN AUTOMATIC ADJUSTMENT
005B 04AF    620          JMP     RESTOR
             621
005D B400    622 L01011:  CALL    RGNADJ  ; RX GAIN AUTOMATIC ADJUSTMENT
005F 04AF    623          JMP     RESTOR
             624
```

```
0061 9495    625 L01100: CALL   LNTST   ; TEST SPECIFIED LINE CKT.
0063 04AF    626         JMP    RESTOR
             627
0065 54B0    628 L01101: CALL   WRCDR   ; 'WRITE BYTE INTO CODEC CONTROL REG.'
0067 04AF    629         JMP    RESTOR
             630
0069 5418    631 L01110: CALL   WRCRDS  ; 'UPDATE SPECIFIED BITS OF LINE CARD STATUS'
006B 04AD    632         JMP    WRAPUP
             633
006D 5406    634 L01111: CALL   WRMEM   ; 'WRITE BYTE INTO DATA MEMORY'
006F 04AD    635         JMP    WRAPUP
             636
0071 542A    637 L10000: CALL   RDHDHS  ; 'READ "HOOK STATUS" & "DELTA HOOK STATUS"'
0073 04AD    638         JMP    WRAPUP
             639
0075 34EE    640 L10001: CALL   RDSTAT  ; 'READ LINE CIRCUIT STATUS BYTE'
0077 04AD    641         JMP    WRAPUP
             642
0079 5433    643 L10010: CALL   RDTRCH  ; 'READ TX & RX CHANNEL ASSIGNMENTS'
007B 04AD    644         JMP    WRAPUP  ;   (AS STORED IN DATA MEMORY)
             645
007D 5441    646 L10011: CALL   RQTRGN  ; 'REQUEST TX & RX GAIN SETTINGS DATA'
007F 04AF    647         JMP    RESTOR
             648
             649 $EJECT
0081 5458    650 L10100: CALL   RQLBAL  ; 'REQUEST LINE BALANCE SETTING DATA'
0083 04AF    651         JMP    RESTOR
             652
0085 54E8    653 L10101: CALL   RWPORT  ; READ/WRITE I/O PORTS 1 & 2
0087 04AD    654         JMP    WRAPUP
             655
0089 94CF    656 L11000: CALL   RDROM   ; 'READ BYTE OF PROGRAM MEMORY'
008B 04AD    657         JMP    WRAPUP
             658
008D 27      659 L11010: CLR    A       ; 'COMMAND RESET'---RESTARTS OLC CTR SOFTWARE
008E D7      660         MOV    PSW,A   ; RESET FLAGS & STACK POINTER
008F 65      661         STOP   TCNT
0090 E5      662         SEL    MB0
0091 37      663         CPL    A
0092 39      664         OUTL   P1,A
0093 3A      665         OUTL   P2,A
0094 0400    666         JMP    RESET
             667
0096 546E    668 L11011: CALL   RQDIG   ; 'REQUEST DIGITAL PER-LINE CHIP CONTENTS'
0098 04AF    669         JMP    RESTOR
             670
009A 5488    671 L11100: CALL   RDRQST  ; 'READ REQUESTED DATA'
009C 04AD    672         JMP    WRAPUP
             673
009E 548C    674 L11101: CALL   RQCDR   ; 'REQUEST CODEC DATA REG.' ROUTINE
00A0 04AF    675         JMP    RESTOR
             676
00A2 549E    677 L11110: CALL   RDCRDS  ; 'READ CARD STATUS' ROUTINE
00A4 04AD    678         JMP    WRAPUP
             679
00A6 5400    680 L11111: CALL   RDMEM   ; 'READ BYTE OF DATA MEMORY' ROUTINE
00A8 04AD    681         JMP    WRAPUP
```

```
                682 ;////////////////////////////////////////////////////////
                683 L00000:                    ; 'NO OPERATION COMMAND'
                684
                685 ; UNDEFINED FUNCTION CODES-----TREATED AS NO-OPS
                686 L01000:
                687 L01001:
                688 L10110:
                689 L10111:
                690 L11001:
00AA 18         691         INC    R0      ; FUNCTION CODE IS UNDEFINED----ECHO BYTE 4
00AB 80         692         MOVX   A,@R0   ;    TO SET 'RESPONSE ENA' FLIP-FLOP
00AC 90         693         MOVX   @R0,A
                694
                695 $EJECT
                696
                697 WRAPUP:
                698 ; WAIT FOR FRAME COUNT TO REACH RESPONSE FRAME COUNT-1
00AD 14E4       699         CALL   FRWAIT
                700 RESTOR:
                701 ; RESTORE 'A' REGISTER'S CONTENTS
00AF B929       702         MOV    R1,#ASAVE
00B1 F1         703         MOV    A,@R1   ; RESTORE 'A' REG. CONTENTS
                704
                705 ; RE-ENABLE INTERRUPTS
00B2 05         706         EN     I
                707
                708 ; RETURN TO INTERRUPTED ROUTINE AT THE POINT WHERE
                709 ; INTERRUPTED AFTER RESTORING STATUS (CARRY FLAG, AUX. CARRY,
                710 ; FLAG F0, REG. BANK SELECT)
00B3 93         711         RETR
                712
                713 ;*** END OF CMDINT ***
                714 $EJECT
                715
                716 ;       NAME            FNCODE
                717
                718 ; FNCODE -- FUNCTION CODE SERVICE ROUTINE ADDRESS LOOK-UP TABLE
                719
                720 FNCODE:
00B4 AA         721         DB     L00000, L00001, L00010, L00011
00B5 3D
00B6 41
00B7 45
00B8 49         722         DB     L00100, L00101, L00110, L00111
00B9 4D
00BA 51
00BB 55
00BC AA         723         DB     L01000, L01001, L01010, L01011
00BD AA
00BE 59
00BF 5D
00C0 61         724         DB     L01100, L01101, L01110, L01111
00C1 65
00C2 69
00C3 6D
00C4 71         725         DB     L10000, L10001, L10010, L10011
```

```
00C5 75
00C6 79
00C7 7D
00C8 81        726         DB      L10100, L10101, L10110, L10111
00C9 85
00CA AA
00CB AA
00CC 89        727         DB      L11000, L11001, L11010, L11011
00CD AA
00CE 8D
00CF 96
00D0 9A        728         DB      L11100, L11101, L11110, L11111
00D1 9E
00D2 A2
00D3 A6

729
               730 ;*** END OF FNCODE ***
               731 $EJECT
               732
               733 ;        NAME             CNTLEN
               734
               735 ;
               736 ;
               737 ;
               738
               739 ; CNTLEN -- ENABLE CUSTOM CONTROL COMM. I.C. FOR COMMANDS RECEPTION
               740
               741 CNTLEN:
               742 ; WAIT UNTIL 'CONTROL WINDOW' HAS PASSED
00D4 45        743         STRT    CNT       ; START FRAME COUNTER
00D5 42        744         MOV     A,T
00D6 37        745         CPL     A
00D7 07        746         DEC     A         ; 2'S COMPLEMENT OF STARTING FRAME COUNT
00D8 A9        747         MOV     R1,A
               748
00D9 42        749 CNTLE1: MOV     A,T
00DA 69        750         ADD     A,R1
00DB 96D9      751         JNZ     CNTLE1    ; LOOP UNTIL STARTING FRAME BEGINS
               752
               753 ; ENABLE COMMANDS RECEPTION
00DD B980      754         MOV     R1,#CMODE
00DF 81        755         MOVX    A,@R1
00E0 4304      756         ORL     A,#04H    ; SET 'CNTRL RX ENA'
00E2 91        757         MOVX    @R1,A
00E3 83        758         RET
               759
               760 FRWAIT:
               761 ; CHECK TO SEE IF FRAME COUNT HAS REACHED OR EXCEEDED THE
               762 ; RESPONSE FRAME COUNT.
00E4 B928      763         MOV     R1,#RSPCNT
00E6 F1        764         MOV     A,@R1     ; FETCH RESPONSE COUNT REFERENCE BYTE
00E7 A9        765         MOV     R1,A      ; & PUT IN R1
00E8 42        766         MOV     A,T
00E9 69        767         ADD     A,R1
00EA F6EE      768         JC      TOOLAT
00EC 04D9      769         JMP     CNTLE1
               770
```

```
                    771 TOOLAT:
                    772 ; RESET 'RESPONSE ENABLE FLIP-FLOP' IN CONTROL COMM. I.C.
00EE B900           773         MOV     R1,#CMODE
00F0 81             774         MOVX    A,@R1
00F1 4308           775         ORL     A,#08H  ; PULSE 'RESP. ENA FLIP-FLOP RESET' HIGH
00F3 91             776         MOVX    @R1,A
00F4 53F7           777         ANL     A,#0F7H ;   THEN LOW AGAIN.
00F6 91             778         MOVX    @R1,A
00F7 0404           779         JMP     CNTLEN  ; RE-ENABLE COMMANDS RECEPTION
                    780
                    781 ;*** END OF CNTLEN ***
                    782 $EJECT
                    783
                    784 ;       NAME            WRST1
                    785
                    786 ;
                    787 ;
                    788 ;
                    789
                    790 ; WRST1 -- WRITE LINE CIRCUIT STATUS 1 (SELECTED BITS)
                    791 ;         COMMAND DATA BYTE 1 CONTAINS 'NEW STATUS DATA'
                    792 ;         COMMAND DATA BYTE 2 CONTAINS 'CHANGE MASK'
                    793
0100                794         ORG     100H
                    795 WRST1:
0100 80             796         MOVX    A,@R0   ; FETCH NEW STATUS BYTE
0101 AA             797         MOV     R2,A    ;   AND SAVE IN R2
                    798
0102 85             799         CLR     F0
0103 B206           800         JB5     $+3     ; SKIP NEXT INSTRUCTION IF 'PWR' BIT=1
0105 95             801         CPL     F0      ; SET F0 IF 'PWR' BIT = 0 (F0='PWR BAR')
                    802
                    803 ; F0 = 'PWR BAR'
0106 2330           804         MOV     A,#LCST1
0108 6E             805         ADD     A,R6    ; ADD 'LC INDEX' TO 'LINE CKT STAT' BASE ADDR.
0109 A9             806         MOV     R1,A
                    807
010A 18             808         INC     R0
010B 80             809         MOVX    A,@R0   ; FETCH STATUS WRITE MASK
                    810
010C B20F           811         JB5     $+3     ; SKIP NEXT INSTR IF 'PWR MASK' = 1
010E 85             812         CLR     F0
                    813
                    814 ; F0 = ('PWR BAR' AND 'PWR MASK')
010F 2A             815         XCH     A,R2    ; EXCHANGE PLACES WITH 'NEW STATUS' BYTE
0110 5A             816         ANL     A,R2    ; CLR 'NEW STATUS' BYTE BIT POSITIONS NOT CHANGING
0111 2A             817         XCH     A,R2
0112 37             818         CPL     A       ; COMPLEMENT STATUS WRITE MASK
0113 51             819         ANL     A,@R1   ; CLEAR BIT POSITIONS WHICH ARE TO BE MODIFIED
0114 4A             820         ORL     A,R2    ; NEW STATUS BYTE
0115 A1             821         MOV     @R1,A
0116 C8             822         DEC     R0
0117 90             823         MOVX    @R0,A   ; PUT UPDATED STATUS BYTE IN RESPONSE REG.
0118 AA             824         MOV     R2,A    ;   & SAVE IN R2
                    825
0119 18             826         INC     R0
011A 34F5           827         CALL    RDST2   ; PUT CURRENT 'STATUS 2' BYTE IN RESPONSE REG.
                    828
```

```
                        829 ; ENABLE RESPONSE TRANSMISSION
011C 14E4               830         CALL    FRWAIT
                        831
                        832 $EJECT
                        833 ; CHECK TO SEE IF LINE CIRCUIT IS BEING POWERED-DOWN
011E 95                 834         CPL     F0
011F B631               835         JF0     NOPDWN
                        836
                        837 PDWN:
                        838 ; LINE CIRCUIT IS BEING POWERED-DOWN----PUT CODEC IN 'STAND-BY' MODE
0121 23FF               839         MOV     A,#0FFH
0123 942F               840         CALL    CODEC
0125 2340               841         MOV     A,#TXCH
0127 6E                 842         ADD     A,R6
0128 A9                 843         MOV     R1,A
0129 B13F               844         MOV     @R1,#3FH        ; RESET TX CHAN. ASSIGN. BYTE IN DATA MEM.
012B 2348               845         MOV     A,#RXCH
012D 6E                 846         ADD     A,R6
012E A9                 847         MOV     R1,A
012F B13F               848         MOV     @R1,#3FH        ; RESET RX CHAN. ASSIGN. BYTE IN DATA MEM.
                        849
                        850 NOPDWN:
                        851 ; TRANSMIT MODIFIED STATUS TO DIGITAL PER-LINE CUSTOM I.C.
0131 2300               852 LDDIG:  MOV     A,#WRDIG
0133 9400               853         CALL    XMIT4
0135 FA                 854         MOV     A,R2            ; UPDATED STATUS IN 'A' REG.
0136 9406               855         CALL    XMIT8           ; SEND MODIFIED STATUS TO LINE CKT.
                        856
                        857 ; RETURN S/H VECTOR ON PORT 1 INPUTS
0138 74E4               858         CALL    RTNSH
                        859
013A 83                 860         RET
                        861
                        862 ;*** END OF WRST1 ***
                        863 $EJECT
                        864
                        865 ;       NAME            WRTRCH
                        866
                        867 ;
                        868 ;
                        869 ;
                        870
                        871 ; WRTRCH -- WRITE TX & RX CHANNEL ASSIGNMENTS INTO DATA MEMORY
                        872 ;                 AND TO THE CODEC.
                        873
                        874 WRTRCH:
                        875 ; READ TX CHANNEL ASSIGNMENT AND STORE IN DATA MEMORY.
013B 2340               876         MOV     A,#TXCH
013D 6E                 877         ADD     A,R6            ; ADD LC INDEX TO TX CHAN. BASE ADDR.
013E A9                 878         MOV     R1,A
                        879
013F 80                 880         MOVX    A,@R0           ; FETCH NEW TX CHANNEL ASSIGNMENT
0140 A1                 881         MOV     @R1,A           ; STORE NEW TX CHAN. ASSIGNMENT IN RAM
0141 533F               882         ANL     A,#3FH          ; MASK OFF 2 MSB'S
                        883
                        884 ; FORMAT TX CHANNEL ASSIGNMENT FOR CODEC
```

```
0143 85          885           CLR    F0
0144 95          886           CPL    F0       ; SET F0 (ASSUME ODD CHAN.)
0145 97          887           CLR    C
0146 67          888           RRC    A        ; ROTATE LSB INTO CARRY FLAG
0147 F64B        889           JC     WTRCH1   ; SKIP NEXT TWO INSTRUCTIONS IF ODD
                 890
0149 85          891           CLR    F0       ; CLEAR F0 & DECREMENT ACCUMULATOR TWICE
014A 07          892           DEC    A        ;   IF EVEN TX CHAN.
                 893
014B 07          894 WTRCH1:   DEC    A
014C 4340        895           ORL    A,#40H   ; APPEND '01' PREFIX TO 'TX CHAN.'
014E AC          896           MOV    R4,A     ; & SAVE IN R4
                 897
                 898 ; READ RX CHANNEL ASSIGNMENT AND STORE IN DATA MEMORY.
014F 2348        899           MOV    A,#RXCH
0151 6E          900           ADD    A,R6
0152 A9          901           MOV    R1,A
0153 18          902           INC    R0       ; R0 NOW POINTS TO COMMAND REG. BYTE 4
                 903
0154 80          904           MOVX   A,@R0    ; FETCH NEW RX CHAN. ASSIGNMENT
0155 90          905           MOVX   @R0,A    ; ECHO BYTE 4 TO SET RESPONSE ENA FF
0156 A1          906           MOV    @R1,A    ; STORE NEW RX CHAN. ASSIGNMENT IN RAM
0157 533F        907           ANL    A,#3FH   ; MASK OFF 2 MSB'S
                 908
                 909 ; FORMAT RX CHANNEL ASSIGNMENT FOR CODEC
0159 4380        910           ORL    A,#80H   ; PREFIX CHAN. WITH '10' CODEC FUNCTION BITS
015B AD          911           MOV    R5,A     ; & SAVE IN R5
                 912
                 913 $EJECT
                 914 ; UPDATE LINE STATUS 'EVEN BAR/ODD', 'POWER', & 'LC ENA' BITS
015C 2330        915           MOV    A,#LCST1
015E 6E          916           ADD    A,R6
015F A8          917           MOV    R0,A
                 918
0160 F0          919           MOV    A,@R0    ; FETCH 'LINE CIRCUIT STATUS' BYTE
0161 43A4        920           ORL    A,#0A4H  ; SET 'EVEN BAR/ODD', 'POWER', & 'LC ENA' BITS
0163 B667        921           JF0    $+4      ; SKIP NEXT INSTRUCTION IF ODD
                 922
0165 537F        923           ANL    A,#7FH   ; CLEAR 'EVEN BAR/ODD' BIT IF EVEN
                 924
0167 A0          925           MOV    @R0,A    ; STORE UPDATED 'LINE CKT STATUS' BYTE
                 926
                 927 ; SET LINE CIRCUIT'S 'BUSY' BIT
0168 2338        928           MOV    A,#LCST2
016A 6E          929           ADD    A,R6
016B A9          930           MOV    R1,A     ; ADD 'LC INDEX' TO 'HW STATUS' BASE ADDR.
                 931
016C F1          932           MOV    A,@R1
016D 4320        933           ORL    A,#20H   ; SET 'BUSY' BIT
016F A1          934           MOV    @R1,A
                 935
                 936 ; CLEAR 'DELTA HOOK STATUS' BIT FOR THIS LINE CKT.
0170 94AC        937           CALL   RSDHS
                 938
                 939 ; ENABLE RESPONSE TRANSMISSION, THEN CONTINUE WRITING CHANNEL
```

```
                              940 ;   ASSIGNMENTS TO CODEC.
        0172 14E4              941         CALL    FRWAIT
                              942
                              943 ; SEND NEW 'LC STATUS 2' DATA TO PER-LINE DIG. CUSTOM I.C.
        0174 2300              944         MOV     A,#WRDIG
        0176 9400              945         CALL    XMIT4   ; PUT DIGITAL CUSTOM I.C. IN WRITE MODE
        0178 2330              946         MOV     A,#LCST1
        017A 6E                947         ADD     A,R6
        017B A9                948         MOV     R1,A
        017C F1                949         MOV     A,@R1   ; FETCH 'LCST1' BYTE
        017D 9406              950         CALL    XMIT8
                              951
                              952 ; SEND TX CHANNEL ASSIGNMENT TO CODEC
        017F FC                953         MOV     A,R4
        0180 942F              954         CALL    CODEC
                              955
                              956 ; SEND RX CHANNEL ASSIGNMENT TO CODEC
        0182 FD                957         MOV     A,R5
        0183 942F              958         CALL    CODEC
                              959
        0185 83                960         RET
                              961
                              962 ;*** END OFF WRTRCH ***
                              963 $EJECT
                              964
                              965 ;     NAME            WRTRGN
                              966
                              967 ;
                              968 ;
                              969 ;
                              970
                              971 ; WRTRGN -- WRITE NEW TX & RX GAIN SETTINGS INTO SELECTED
                              972 ;           LINE CKT'S CUSTOM ANALOG I.C.
                              973
                              974 WRTRGN:
                              975 ; SET UP R1 AS THE DATA MEMORY POINTER FOR GAIN & BAL. SETTINGS
        0186 54E1              976         CALL    RGNADD
        0188 C9                977         DEC     R1      ; R1 POINTS TO TX GAIN SETTING BYTE
                              978
                              979 ; FETCH & SAVE NEW TX GAIN SETTING
        0189 80                980         MOVX    A,@R0
        018A A1                981         MOV     @R1,A
        018B 18                982         INC     R0
                              983
                              984 ; FETCH & SAVE NEW RX GAIN SETTING
        018C 19                985         INC     R1      ; R1 POINTS TO RX GAIN SETTING BYTE
        018D 80                986         MOVX    A,@R0
        018E 90                987         MOVX    @R0,A   ; ECHO BYTE 4 TO SET 'RESPONSE ENA' FF
        018F A1                988         MOV     @R1,A
                              989
                              990 ; ENABLE RESPONSE TRANSMISSION, THEN CONTINUE WRITING GAIN SETTINGS.
        0190 14E4              991         CALL    FRWAIT
                              992
                              993 ; WRITE GAIN & BALANCE SETTINGS INTO ANALOG CUSTOM I.C.
        0192 2340              994 LOGAIN: MOV     A,#WRANA
        0194 9400              995         CALL    XMIT4
                              996
```

```
0196 54E1      997         CALL    RGNADD
0198 19        998         INC     R1      ; R1 POINTS TO CURRENT LINE BAL. BYTE
0199 F1        999         MOV     A,@R1
019A 9406     1000         CALL    XMIT8   ; RE-WRITE CURRENT LINE BAL. INTO I.C.
              1001
019C 54E1     1002         CALL    RGNADD  ; R1 POINTS TO RX GAIN BYTE
019E F1       1003         MOV     A,@R1
019F 9406     1004         CALL    XMIT8   ; WRITE NEW RX GAIN SETTING
              1005
01A1 54E1     1006         CALL    RGNADD
01A3 C9       1007         DEC     R1      ; R1 POINTS TO TX GAIN BYTE
01A4 F1       1008         MOV     A,@R1
01A5 9406     1009         CALL    XMIT8   ; WRITE NEW TX GAIN SETTING
              1010
              1011 ; RETURN S/H VECTOR ON PORT 1 INPUTS
01A7 74E4     1012         CALL    RTNSH
              1013
01A9 83       1014         RET
              1015 ;*** END OF WRTRGN ***
              1016 $EJECT
              1017
              1018 ;      NAME            WRLBAL
              1019
              1020 ;
              1021 ;
              1022 ;
              1023
              1024 ; WRLBAL -- WRITE NEW LINE BALANCE SETTING INTO THE SELECTED
              1025 ;            LINE CKT'S CUSTOM ANALOG I.C.
              1026
              1027 WRLBAL:
              1028 ; SET UP R1 TO POINT TO LINE BAL. DATA MEMORY BYTE
01AA 54E1     1029         CALL    RGNADD
01AC 19       1030         INC     R1      ; R1 POINTS TO LINE BAL. BYTE
              1031
              1032 ; READ & ECHO NEW LINE BALANCE SETTING
01AD 18       1033         INC     R0      ; R0 POINTS TO BYTE 4 OF COMMAND REG.
01AE 80       1034         MOVX    A,@R0
01AF 90       1035         MOVX    @R0,A
01B0 A1       1036         MOV     @R1,A   ; SAVE NEW LINE BAL. SETTING IN RAM
              1037
              1038 ; ENABLE RESPONSE TRANSMISSION, THEN CONTINUE WRITING LINE BALANCE
01B1 14E4     1039         CALL    FRWAIT
              1040
              1041 ; WRITE NEW LINE BALANCE SETTING INTO BYTE 1 OF ANALOG I.C.'S
              1042 ;   24-BIT CONTROL REGISTER
01B3 2492     1043         JMP     LDGAIN  ; (LDGAIN IS LOCATED IN WRTRGN)
              1044
              1045 ;*** END OF WRLBAL ***
              1046 $EJECT
              1047
              1048 ;      NAME            WRST2
              1049
              1050 ;
              1051 ;
              1052 ;
```

```
                1053
                1054 ; WRST2 — WRITE STATUS 2 TO THE SELECTED LINE CKT.
                1055
                1056 ; BIT POSITION ASSIGNMENTS
                1057 ;      BIT 7 = 'BUSY'   (LINE BUSY)
                1058 ;      BIT 6 = 'LK'     (LOCKOUT)
                1059 ;      BIT 5 = 'RV'     (REVERTIVE CALL)
                1060 ;      BIT 4 = N/A      (NOT ASSIGNED)
                1061 ;      BIT 3 = N/A
                1062 ;      BIT 2 = N/A
                1063 ;      BIT 1 = N/A
                1064 ;      BIT 0 = N/A
                1065
                1066 ; COMMAND WORD DATA BYTE 1 = 'NEW STATUS DATA'
                1067 ; COMMAND WORD DATA BYTE 2 = 'CHANGE MASK'
                1068
                1069 ; ONLY THE BITS INDICATED BY '1' IN THE 'CHANGE MASK' ARE
                1070 ; TO BE AFFECTED BY THIS COMMAND.
                1071
                1072 ; LINE CIRCUIT IS POWERED-DOWN IF 'BUSY' STATUS IS CLEARED.
                1073
                1074 WRST2:
01B5 80         1075        MOVX   A,@R0    ; FETCH NEW STATUS BYTE
01B6 AA         1076        MOV    R2,A     ;   & SAVE IN R2
                1077
01B7 85         1078        CLR    F0
01B8 F2BB       1079        JB7    $+3      ; SET FLAG F0 TO 'BUSY BAR'
01BA 95         1080        CPL    F0
                1081
                1082 ; F0 = 'BUSY BAR'
01BB 2338       1083        MOV    A,#LCST2
01BD 6E         1084        ADD    A,R6
01BE A9         1085        MOV    R1,A     ; R1 NOW POINTS TO 'LC STATUS 2' BYTE
                1086
01BF 18         1087        INC    R0
01C0 80         1088        MOVX   A,@R0    ; FETCH 'LINE STATUS 2' WRITE MASK
                1089
01C1 F2C4       1090        JB7    $+3
01C3 85         1091        CLR    F0       ; CLEAR F0 IF 'BUSY MASK' = 0
                1092
                1093 $EJECT
                1094 ; F0 = ('BUSY BAR' AND 'BUSY MASK')
01C4 2A         1095        XCH    A,R2     ; EXCHANGE PLACES WITH 'NEW STATUS' BYTE
01C5 5A         1096        ANL    A,R2     ; CLEAR BIT POSITIONS WHICH ARE NOT BEING CHANGED
01C6 2A         1097        XCH    A,R2
01C7 37         1098        CPL    A        ; COMPLEMENT WRITE MASK
01C8 51         1099        ANL    A,@R1    ; CLEAR BIT POSITIONS WHICH ARE TO BE CHANGED
01C9 4A         1100        ORL    A,R2     ; NEW STATUS BYTE
01CA A1         1101        MOV    @R1,A
                1102
01CB C8         1103        DEC    R0
01CC 34EE       1104        CALL   RDSTAT
                1105
                1106 ; WAIT FOR RESPONSE FRAME
01CE 14E4       1107        CALL   FRWAIT
                1108
01D0 B6D3       1109        JF0    PDWN2
```

```
                    1110
01D2 83             1111 NOPD2:  RET
                    1112
01D3 23FF           1113 PDWN2:  MOV     A,#0FFH
01D5 942F           1114         CALL    CODEC   ; PUT CODEC IN STANDBY MODE
01D7 2340           1115         MOV     A,#TXCH
01D9 6E             1116         ADD     A,R6
01DA A9             1117         MOV     R1,A
01DB B13F           1118         MOV     @R1,#3FH ; RESET TX CHAN. BYTE
01DD 2348           1119         MOV     A,#RXCH
01DF 6E             1120         ADD     A,R6
01E0 A9             1121         MOV     R1,A
01E1 B13F           1122         MOV     @R1,#3FH ; RESET RX CHAN. BYTE
01E3 2330           1123         MOV     A,#LCST1
01E5 6E             1124         ADD     A,R6
01E6 A9             1125         MOV     R1,A
01E7 2318           1126         MOV     A,#IDIG
01E9 A1             1127         MOV     @R1,A   ; RESET 'LC STATUS 1' BYTE
01EA AA             1128         MOV     R2,A    ;         AND
01EB 3431           1129         CALL    LDDIG   ; DIGITAL PER-LINE CUSTOM I.C.
                    1130
01ED 83             1131         RET
                    1132
                    1133 ;*** END OF WRST2 ***
                    1134 $EJECT
                    1135
                    1136 ;       NAME            RDSTAT
                    1137
                    1138 ;
                    1139 ;
                    1140 ;
                    1141
                    1142 ; RDSTAT - READ LINE CIRCUIT STATUS WORD
                    1143
                    1144 RDSTAT:
01EE 2330           1145         MOV     A,#LCST1        ; ADDR. OF 'LC STATUS 1'
01F0 6E             1146         ADD     A,R6    ; ADD LINE CIRCUIT INDEX
01F1 A9             1147         MOV     R1,A    ; TO LINE CKT. INDEX AND PUT IN R1
                    1148
01F2 F1             1149         MOV     A,@R1   ; FETCH 'LC STATUS 1' BYTE
01F3 90             1150         MOVX    @R0,A
01F4 18             1151         INC     R0
                    1152
                    1153
                    1154 ; RDHWS - READ 'HW STATUS'
                    1155
                    1156 RDST2:
01F5 2338           1157         MOV     A,#LCST2
01F7 6E             1158         ADD     A,R6
01F8 A9             1159         MOV     R1,A
                    1160
01F9 F1             1161         MOV     A,@R1   ; FETCH 'LC STATUS 2' BYTE
01FA 90             1162         MOVX    @R0,A   ; PUT 'LC STATUS 2' IN RESPONSE REG.
                    1163
01FB 83             1164         RET
                    1165
                    1166 ;*** END OF RDSTAT ***
                    1167 $EJECT
```

```
1168
1169 ;        NAME           RDMEM
1170
1171 ;
1172 ;    :
1173 ;
1174
1175 ; RDMEM -- READ ONE BYTE OF DATA MEMORY
1176
1177 ;     R0 POINTS TO ADDRESS BYTE (BYTE 3)
1178
0200                1179         ORG     200H
                    1180 RDMEM:
0200 80             1181         MOVX    A,@R0   ; FETCH ADDRESS
0201 18             1182         INC     R0
0202 A9             1183         MOV     R1,A
0203 F1             1184         MOV     A,@R1   ; DATA IN 'A' REG
0204 90             1185         MOVX    @R0,A   ; WRITE DATA INTO CONTROL REG. BYTE 3
                    1186
0205 83             1187         RET
                    1188
                    1189 ;*** END OF RDMEM ***
                    1190 $EJECT
                    1191
                    1192 ;       NAME           WRMEM
                    1193
                    1194 ;
                    1195 ;
                    1196 ;
                    1197
                    1198 ; WRMEM -- WRITE ONE BYTE INTO DATA MEMORY
                    1199
                    1200 ;     R0 POINTS TO ADDRESS BYTE (BYTE 3)
                    1201 ;     BYTE 4 CONTAINS DATA TO BE WRITTEN INTO DATA MEMORY
                    1202
                    1203 WRMEM:
0206 80             1204         MOVX    A,@R0   ; FETCH ADDRESS
0207 18             1205         INC     R0
0208 A9             1206         MOV     R1,A
0209 80             1207         MOVX    A,@R0   ; FETCH DATA
020A A1             1208         MOV     @R1,A   ;  AND WRITE INTO DATA MEMORY
020B 90             1209         MOVX    @R0,A   ; SET RESPONSE ENABLE FLIP-FLOP BY
                    1210                         ;   WRITING INTO CONTROL REG. BYTE 4
020C 83             1211         RET
                    1212
                    1213 ;*** END OF WRMEM ***
                    1214 $EJECT
                    1215
                    1216 ;       NAME           WRCDR
                    1217
                    1218 ;
                    1219 ;
                    1220 ;
                    1221
                    1222 ; WRCDR -- WRITE CONTROL DATA INTO CODEC
                    1223
```

```
                1224 WRCDR:
                1225 ;   FETCH CODEC CONTROL BYTE FROM COMMAND REG. BYTE 3
020D 80         1226         MOVX    A,@R0
020E AC         1227         MOV     R4,A
                1228
                1229 ;   ECHO COMMAND REG. BYTE 4 TO SET 'RESPONSE ENABLE' FLIP-FLOP
020F 18         1230         INC     R0
0210 80         1231         MOVX    A,@R0
0211 90         1232         MOVX    @R0,A
                1233
                1234 ;   WAIT FOR RESPONSE FRAME
0212 14E4       1235         CALL    FRWAIT
                1236
                1237 ;   SEND CONTROL BYTE TO CODEC
0214 FC         1238         MOV     A,R4
0215 942F       1239         CALL    CODEC
                1240
0217 83         1241         RET
                1242
                1243 ;*** END OF WRCDR ***
                1244 $EJECT
                1245
                1246 ;       NAME            WRCRDS
                1247
                1248 ;
                1249 ;
                1250 ;
                1251
                1252 ;   WRCRDS -- WRITE NEW DATA INTO LINE CARD STATUS BYTE FROM
                1253 ;              LINE SWITCH CONTROLLER.  THE FIRST COMMAND
                1254 ;              WORD DATA BYTE CONTAINS THE NEW DATA; THE
                1255 ;              SECOND COMMAND DATA BYTE CONTAINS THE CHANGE
                1256 ;              MASK IN WHICH A '1' INDICATES THAT THAT BIT
                1257 ;              POSITION(S) IN THE CURRENTLY STORED LINE CARD
                1258 ;              STATUS BYTE IS(ARE) TO BE UPDATED TO THE VALUES
                1259 ;              IN THE FIRST COMMAND DATA BYTE.
                1260
                1261 ;              NOTE THAT IF ALL BITS OF THE 'CHANGE MASK' ARE
                1262 ;              '0' THEN THE COMMAND IS EQUIVALENT TO A READ
                1263 ;              OF THE CURRENT LINE CARD STATUS BYTE.
                1264
                1265 WRCRDS:
0218 80         1266         MOVX    A,@R0   ; FETCH NEW DATA WORD &
0219 AB         1267         MOV     R3,A    ;   SAVE IN R3
021A 18         1268         INC     R0
021B 80         1269         MOVX    A,@R0   ; FETCH DATA CHANGE MASK
021C AA         1270         MOV     R2,A    ;   & SAVE IN R2
021D 5B         1271         ANL     A,R3    ; 'AND' MASK WITH NEW DATA BYTE &
021E AB         1272         MOV     R3,A    ;   SAVE 'MASKED NEW DATA BITS' IN R3
                1273
021F B920       1274         MOV     R1,#LNCRDS
0221 FA         1275         MOV     A,R2
0222 37         1276         CPL     A       ; COMPLEMENT 'CHANGE MASK' (ONE'S IN BIT
                1277                         ;   POSITIONS NOT TO BE UPDATED)
0223 51         1278         ANL     A,@R1   ; ZERO BIT POSITIONS OF CURRENT CARD STATUS
                1279                         ;   BYTE WHICH ARE NOT TO CHANGE
```

```
8224 4B        1280          ORL     A,R3    ; UPDATED LINE CARD STATUS BYTE
8225 A1        1281          MOV     @R1,A
               1282
               1283 ; LOAD 'CARD STATUS' & 'S/H VECTOR' INTO RESPONSE REGISTER
8226 C8        1284          DEC     R0
8227 549E      1285          CALL    RDCRDS
               1286
8229 83        1287          RET
               1288
               1289 ;*** END OF WRCRDS ***
               1290 $EJECT
               1291
               1292 ;     NAME           RDHDHS
               1293
               1294 ;
               1295 ;
               1296 ;
               1297
               1298 ; RDHDHS — READ 'HOOK STATUS VECTOR' & 'DELTA HOOK STATUS VECTOR'
               1299 ;          THEN RESET 'DELTA HOOK STATUS VECTOR' & "OR'D DLTA HS"
               1300
               1301 RDHDHS:
822A B921      1302          MOV     R1,#HSW ; ADDR. OF 'HOOK SWITCH STATUS VECTOR'
822C F1        1303          MOV     A,@R1
822D 90        1304          MOVX    @R0,A   ; WRITE 'HOOK STATUS VECTOR' INTO BYTE 3
822E 18        1305          INC     R0
822F 19        1306          INC     R1
8230 F1        1307          MOV     A,@R1
8231 90        1308          MOVX    @R0,A   ; WRITE 'DELTA HS VECTOR' INTO BYTE 4
               1309
8232 83        1310          RET
               1311
               1312 ;*** END OF RDHDHS ***
               1313 $EJECT
               1314
               1315 ;     NAME           RDTRCH
               1316
               1317 ;
               1318 ;
               1319 ;
               1320
               1321 ; RDTRCH — READ MOST RECENT TX & RX CHANNEL ASSIGNMENTS
               1322 ;         FOR THE SPECIFIED LINE CIRCUIT.
               1323
               1324 RDTRCH:
8233 2340      1325          MOV     A,#TXCH
8235 6E        1326          ADD     A,R6    ; ADD LC INDEX TO TX CHAN. BASE ADDR.
8236 A9        1327          MOV     R1,A    ;   AND MOVE INTO POINTER REG. R1
               1328
8237 F1        1329          MOV     A,@R1   ; FETCH STORED TX CHANNEL ASSIGNMENT
8238 90        1330          MOVX    @R0,A   ;   AND MOVE TX CHAN. INTO CNTRL. S/R BYTE 3
8239 18        1331          INC     R0
               1332
823A 2348      1333          MOV     A,#RXCH
823C 6E        1334          ADD     A,R6    ; ADD LC INDEX TO RX CHAN. BASE ADDR.
823D A9        1335          MOV     R1,A
               1336
```

```
023E F1        1337          MOV     A,@R1   ; FETCH STORED RX CHANNEL ASSIGNMENT
023F 90        1338          MOVX    @R0,A   ;   AND MOVE RX CHAN. INTO CNTRL S/R BYTE 4
               1339                          ;   (WHICH ALSO SETS RESPONSE ENA FLIP-FLOP)
               1340
0240 83        1341          RET
               1342
               1343 ;*** END OF RQTRCH ***
               1344 $EJECT
               1345
               1346 ;         NAME            RQTRGN
               1347
               1348 ;
               1349 ;
               1350 ;
               1351
               1352 ; RQTRGN -- REQUEST CURRENT TX & RX GAIN SETTINGS FOR THE
               1353 ;          SELECTED LINE CIRCUIT.
               1354
               1355 RQTRGN:
0241 9440      1356          CALL    RQST    ; 'REQUEST' COMMAND PRELIMINARY TASKS
               1357
0243 23C0      1358          MOV     A,#RDANA
0245 9400      1359          CALL    XMIT4
               1360
               1361 ; ENABLE RESPONSE TRANSMISSION, THEN FETCH REQUESTED DATA
0247 14E4      1362          CALL    FRWAIT
               1363
               1364 ; SKIP OVER LINE BALANCE BYTE IN ANALOG PER-LINE I.C.
0249 54C7      1365          CALL    CKBRST
               1366
               1367 ; FETCH RX GAIN SETTING
024B 941C      1368          CALL    RCV8
024D B927      1369          MOV     R1,#RQBYT2
024F A1        1370          MOV     @R1,A   ; 'RQBYT2' = RX GAIN SETTING
               1371
               1372 ; FETCH TX GAIN SETTING
0250 941C      1373          CALL    RCV8
0252 B926      1374          MOV     R1,#RQBYT1
0254 A1        1375          MOV     @R1,A   ; 'RQBYT1' = TX GAIN SETTING
               1376
               1377 ; RETURN S/H VECTOR ON PORT 1 INPUTS
0255 74E4      1378          CALL    RTNSH
               1379
0257 83        1380          RET
               1381
               1382 ;*** END OFF RQTRGN ***
               1383 $EJECT
               1384
               1385 ;         NAME            RQLBAL
               1386
               1387 ;
               1388 ;
               1389 ;
               1390
               1391 ; RQLBAL -- REQUEST CURRENT LINE BALANCE SETTING
               1392
```

```
                 1393 RQLBAL:
                 1394 ; 'REQUEST' COMMAND PRELIMINARY OPERATIONS
0258 9440        1395          CALL    RQST
                 1396
025A 23C0        1397          MOV     A,#RDANA  ; SET ANALOG CHIP FOR READ MODE
025C 9400        1398          CALL    XMIT4
                 1399
                 1400 ; ENABLE RESPONSE TRANSMISSION, THEN CONTINUE TO FETCH REQUESTED DATA
025E 14E4        1401          CALL    FRWAIT
                 1402
                 1403 ; FETCH LINE BALANCE SETTING BYTE FROM ANALOG PER-LINE I.C.
0260 941C        1404          CALL    RCV8
0262 B926        1405          MOV     R1,#RQBYT1
0264 A1          1406          MOV     @R1,A     ; 'RQBYT1' = 'LINE BALANCE BYTE'
                 1407
0265 19          1408          INC     R1
0266 A1          1409          MOV     @R1,A     ; 'RQBYT2' = 'RQBYT1'
                 1410
                 1411 ; SKIP OVER RX & TX GAIN SETTINGS
0267 54C7        1412          CALL    CKBRST
0269 54C7        1413          CALL    CKBRST
                 1414
                 1415 ; RETURN S/H VECTOR ON PORT 1 INPUTS
026B 74E4        1416          CALL    RTNSH
                 1417
026D 83          1418          RET
                 1419
                 1420 ;*** END OF RQLBAL ***
                 1421 $EJECT
                 1422
                 1423 ;       NAME            RQDIG
                 1424
                 1425 ;
                 1426 ;
                 1427 ;
                 1428
                 1429 ; RQDIG -- REQUEST DIGITAL PER-LINE CUSTOM I.C.'S CONTENTS
                 1430
                 1431 RQDIG:
                 1432 ; 'REQUEST' COMMAND PRELIMINARY OPERATIONS
026E 9440        1433          CALL    RQST
                 1434
                 1435 ; SEND 'READ DIGITAL I.C.' COMMAND TO LINE CIRCUITS
0270 2380        1436          MOV     A,#RDDIG
0272 9400        1437          CALL    XMIT4
                 1438
                 1439 ; ENABLE RESPONSE TRANSMISSION, THEN CONTINUE TO FETCH REQUESTED DATA
0274 14E4        1440          CALL    FRWAIT
                 1441
                 1442 ; FETCH CONTENTS OF DIGITAL PER-LINE I.C.
0276 941C        1443          CALL    RCV8
0278 B926        1444          MOV     R1,#RQBYT1
027A A1          1445          MOV     @R1,A     ; 'RQBYT1' = DIGITAL I.C.'S CONTENTS
                 1446
027B 19          1447          INC     R1
027C A1          1448          MOV     @R1,A     ; 'RQBYT2' = 'RQBYT1'
                 1449
```

```
                    1450 ;   RETURN S/H VECTOR ON PORT 1 INPUTS
027D 74E4           1451            CALL    RTNSH
                    1452
027F 83             1453            RET
                    1454
                    1455 ;*** END OF RQDIG ***
                    1456 $EJECT
                    1457
                    1458 ;          NAME            RDRQST
                    1459
                    1460 ;
                    1461 ;
                    1462 ;
                    1463
                    1464 ;   RDRQST -- READ DATA CURRENTLY IN THE 'REQUESTED DATA'
                    1465 ;            LOCATIONS OF DATA MEMORY.  ONE BYTE RETURNED
                    1466 ;            WILL BE THE FUNCTION CODE BYTE WHICH LAST
                    1467 ;            REQUESTED DATA AND THE REMAINING TWO BYTES
                    1468 ;            ARE THE ACTUAL REQUESTED DATA BYTES.
                    1469
                    1470 RDRQST:
0280 C8             1471            DEC     R0
0281 B925           1472            MOV     R1,#RQFNCD ; LOCATION WHERE 'RQST FUNCTION CODE'
                    1473                                ;   IS STORED.
0283 BA03           1474            MOV     R2,#3      ; 3 BYTES TO BE MOVED
0285 F1             1475 RQNEXT:    MOV     A,@R1
0286 90             1476            MOVX    @R0,A
0287 18             1477            INC     R0
0288 19             1478            INC     R1
0289 EA85           1479            DJNZ    R2,RQNEXT
                    1480
028B 83             1481            RET
                    1482
                    1483 ;*** END OF RDRQST ***
                    1484 $EJECT
                    1485
                    1486 ;          NAME            RQCDR
                    1487
                    1488 ;
                    1489 ;
                    1490 ;
                    1491
                    1492 ;   RQCDR -- REQUEST CODEC DATA REGISTER CONTENTS
                    1493
                    1494
                    1495 RQCDR:
                    1496 ;  'REQUEST' COMMAND PRELIMINARY OPERATIONS
028C 9440           1497            CALL    RQST
                    1498
                    1499 ;  SEND 'READ CODEC DATA REG.' COMMAND TO PER-LINE I.C.'S
028E 23A0           1500            MOV     A,#RDCDR
0290 9400           1501            CALL    XMIT4
                    1502
                    1503 ;  ENABLE RESPONSE TRANSMISSION, THEN CONTINUE TO FETCH REQUESTED DATA
0292 14E4           1504            CALL    FRWAIT
                    1505
```

```
                    1506 ; FETCH CODEC DATA REGISTER CONTENTS
0294 941C           1507         CALL    RCV8
0296 B926           1508         MOV     R1,#RQBYT1  ; RQBYT1='CODEC DATA REG.' CONTENTS
0298 A1             1509         MOV     @R1,A
0299 19             1510         INC     R1
029A A1             1511         MOV     @R1,A       ; 'RQBYT2' = 'RQBYT1'
                    1512
                    1513 ; RETURN S/H VECTOR ON PORT 1 INPUTS
029B 74E4           1514         CALL    RTNSH
                    1515
029D 83             1516         RET
                    1517
                    1518 ;*** END OF RQCDR ***
                    1519 $EJECT
                    1520
                    1521 ;       NAME            RDCRDS
                    1522
                    1523 ;
                    1524 ;
                    1525 ;
                    1526
                    1527 ; RDCRDS -- READ LINE CARD STATUS
                    1528
                    1529 RDCRDS:
                    1530 ; FETCH CURRENT LINE CARD STATUS BYTE FROM DATA MEMORY
                    1531 ; AND MOVE INTO RESPONSE REG. BYTE 3
                    1532
029E B920           1533         MOV     R1,#LNCRDS
02A0 F1             1534         MOV     A,@R1
02A1 90             1535         MOVX    @R0,A
                    1536
                    1537 ; PUT S/H VECTOR INTO RESPONSE REG. BYTE 4
                    1538
02A2 18             1539         INC     R0
02A3 09             1540         IN      A,P1        ; READ S/H VECTOR
02A4 90             1541         MOVX    @R0,A
                    1542
02A5 83             1543         RET
                    1544
                    1545 ;*** END OF RDCRDS ***
                    1546 $EJECT
                    1547
                    1548 ;       NAME            LINERS
                    1549
                    1550 ;
                    1551 ;
                    1552 ;
                    1553
                    1554 ; LINE -- RESET ALL LINE CIRCUITS ON LINE CARD
                    1555
                    1556 ; DIGITAL PER-LINE CUSTOM I.C.'S INITIALIZATION VALUES
                    1557 ;BIT 7  EVEN BAR/ODD=   0 (EVEN 4 MHZ CHAN.)
                    1558 ;BIT 6  EURO SEL=       0 (NON-EUROPEAN FORMAT)
                    1559 ;BIT 5  POWER=          0 (LINE CKT. POWERED DOWN)
                    1560 ;BIT 4  TR=             1 (TEST RELAY OPEN)
                    1561 ;BIT 3  RR=             1 (RING RELAY OPEN)
```

```
1562 ;BIT 2  LC EN=        0 (LINE CKT'S PCM DRIVERS IN HI-Z STATE)
1563 ;BIT 1  ILS=          0 (ILS NOT SELECTED)
1564 ;BIT 0  A BAR/B SEL=  0 (DEFAULTS TO 'A' PCM)
1565
1566 ; CODEC IS PUT IN 'STANDBY' MODE
1567
1568 ; ANALOG PER-LINE CUSTOM I.C.'S INITIALIZATION VALUES
1569 ;        'CLKC +BAR/-'  IS SET TO 1
1570 ;        'LINE BAL'     IS SET TO 'STD BAL SETTING' (4H)
1571 ;        'RX GAIN'      IS SET TO 'STD RX GN SETTING' (20H)
1572 ;        'TX GAIN'      IS SET TO 'STD TX GAIN SETTING' (20H)
1573
1574 LINERS:
1575 ; WRITE TO DIGITAL PER-LINE CHIPS
```
```
02A6 BF00      1576        MOV     R7,#0      ; CLOCK VECTOR FOR ALL LINE CKTS
02A8 2300      1577        MOV     A,#WRDIG   ; 'WRITE TO DIGITAL CHIP' CODE
02AA 9400      1578        CALL    XMIT4
02AC 2318      1579        MOV     A,#IDIG    ; INIT. DIG. CHIP CONTENTS TO 00011000B
02AE 9406      1580        CALL    XMIT8
               1581
               1582 ; WRITE TO CODECS
02B0 23FF      1583        MOV     A,#ICODEC
02B2 942F      1584        CALL    CODEC      ; PUT CODECS IN 'STANDBY' MODE
               1585
               1586 ; WRITE TO ANALOG PER-LINE CHIP
02B4 2340      1587        MOV     A,#WRANA   ; 'WRITE TO ANALOG CHIP' CODE
02B6 9400      1588        CALL    XMIT4
02B8 2304      1589        MOV     A,#IANA1   ; INITIAL 'CLKC' & 'LINE BAL' SETTINGS
02BA 9406      1590        CALL    XMIT8
02BC 2320      1591        MOV     A,#IANA2   ; INITIAL 'RX GAIN SETTING'
02BE 9406      1592        CALL    XMIT8 .
02C0 2320      1593        MOV     A,#IANA3   ; INITIAL 'TX GAIN SETTING'
02C2 9406      1594        CALL    XMIT8
               1595
               1596 ; RETURN S/H ON PORT 1
02C4 74E4      1597        CALL    RTNSH
02C6 83        1598        RET
               1599 ;*** END OF LINERS ***
               1600 $EJECT
               1601
               1602 ;       NAME            CKBRST
               1603
               1604 ;
               1605 ;
               1606 ;
               1607
               1608
               1609 ; CKBRST -- PULSES CLOCK LINE 8 TIMES AT MAX. RATE
               1610
               1611 ; R7 CONTAINS CLOCK VECTOR UPON ENTRY
               1612 ;
               1613
               1614 CKBRST:
02C7 FF        1615        MOV     A,R7       ; MOVE CLOCK VECTOR INTO A
02C8 39        1616        OUTL    P1,A
02C9 89FF      1617        ORL     P1,#0FFH
```

```
02CB 39         1618            OUTL    P1,A
02CC 89FF       1619            ORL     P1,#0FFH
02CE 39         1620            OUTL    P1,A
02CF 89FF       1621            ORL     P1,#0FFH
02D1 39         1622            OUTL    P1,A
02D2 89FF       1623            ORL     P1,#0FFH
02D4 39         1624            OUTL    P1,A
02D5 89FF       1625            ORL     P1,#0FFH
02D7 39         1626            OUTL    P1,A
02D8 89FF       1627            ORL     P1,#0FFH
02DA 39         1628            OUTL    P1,A
02DB 89FF       1629            ORL     P1,#0FFH
02DD 39         1630            OUTL    P1,A
02DE 89FF       1631            ORL     P1,#0FFH
                1632
02E0 83         1633            RET
                1634
                1635 ;*** END OF CKBRST ***
                1636 $EJECT
                1637
                1638 ;      NAME            RGNADD
                1639
                1640 ;
                1641 ;
                1642 ;
                1643
                1644 ; RGNADD -- LOADS REG. R1 WITH THE ADDRESS OF THE RX GAIN SETTING
                1645 ;          BYTE FOR THE SELECTED LINE CKT.
                1646
                1647 RGNADD:
02E1 FE         1648            MOV     A,R6
02E2 E7         1649            RL      A
02E3 6E         1650            ADD     A,R6         ; 3 * 'LC INDEX'
02E4 0351       1651            ADD     A,#(GNBAL+1) ; ADD BASE ADDR. OF RX GAIN SETTING BYTE
02E6 A9         1652            MOV     R1,A
                1653
02E7 83         1654            RET
                1655
                1656 ;*** END OF RGNADD ***
                1657 $EJECT
                1658
                1659 ;      NAME            RWPORT
                1660
                1661 ;
                1662 ;
                1663 ;
                1664
                1665 ; RWPORT -- READ/WRITE DATA FROM/TO I/O PORTS 1 & 2
                1666
                1667 ; BIT 1 OF FUNCTION CODE BYTE (COMMAND BYTE 2) = R/W BAR PORT 1
                1668 ;  "  2 "     "      "    "   (  "      "   ") = R/W BAR PORT 2
                1669
                1670 RWPORT:
                1671 ; TEST IF READ OR WRITE OPERATION ON PORT 1
02E8 FD         1672            MOV     A,R5         ; FETCH FUNCTION CODE BYTE
02E9 32ED       1673            JB1     $+4          ; SKIP NEXT TWO INSTRUCTIONS IF READ COMMAND
```

```
02EB 80        1674            MOVX    A,@R0   ; FETCH NEW PORT 1 DATA
02EC 39        1675            OUTL    P1,A    ;  & WRITE INTO PORT 1
02ED 09        1676            IN      A,P1    ; READ PORT 1
02EE 90        1677            MOVX    @R0,A   ;  & RETURN IN RESPONSE BYTE 3
               1678
               1679 ; TEST IF READ OR WRITE OPERATION ON PORT 2
02EF 18        1680            INC     R0
02F0 FD        1681            MOV     A,R5
02F1 12F5      1682            JB0     $+4     ; SKIP NEXT TWO INSTRUCTIONS IF READ COMMAND
02F3 80        1683            MOVX    A,@R0   ; FETCH NEW PORT 2 DATA
02F4 3A        1684            OUTL    P2,A    ;  & WRITE INTO PORT 2
02F5 0A        1685            IN      A,P2    ; READ PORT 2
02F6 90        1686            MOVX    @R0,A   ;  & RETURN IN RESPONSE BYTE 4
               1687
02F7 83        1688            RET
               1689
               1690 ;*** END OF RWPORT ***
               1691 $EJECT
               1692
               1693 ;      NAME            XMIT
               1694
               1695 ;
               1696 ;
               1697 ;
               1698
               1699 ;      XMIT -- TRANSMIT DATA TO LINE CIRCUIT
               1700
               1701 ;      ASSUMED CONTENTS OF REGISTERS UPON ENTRY:
               1702 ;              R7      CLOCK VECTOR(I.E. BIT CORRESPONDING
               1703 ;                              TO SELECTED LINE CKT IS A LOGIC
               1704 ;                              '0', ALL OTHER BITS MUST BE '1')
               1705 ;              A       DATA TO SENT TO LINE CKT. (MSB 1ST)
               1706 ;              R1      BIT COUNTER: NUMBER OF BITS TO BE SENT
               1707 ;                              (NORMALLY 1-8)
               1708
               1709 ;              R3      HOLDS INTERMEDIATE RESULTS
               1710 ;              P26     DATA LINE TO LINE CIRCUITS
               1711 ;              P27     'CMD ENA BAR' LINE TO LINE CIRCUITS
               1712 ;              P1      PORT 1 IS THE CLOCK/SH VECTOR INTERFACE
               1713 ;                              TO THE LINE CIRCUITS(BIT 0 GOES
               1714 ;                              TO LC #1, BIT 1 TO LC #2, ETC.)
               1715
               1716
0400           1717            ORG     400H
               1718 XMIT4:
0400 B904      1719            MOV     R1,#4
0402 9A7F      1720            ANL     P2,#7FH ; 'CMD ENA BAR' = 0
0404 0408      1721            JMP     XMIT
               1722
0406 B908      1723 XMIT8:     MOV     R1,#8
               1724
               1725 XMIT:
0408 AB        1726            MOV     R3,A
0409 F20F      1727            JB7     XMIT1   ; IS '0' OR '1' TO BE SENT NEXT?
040B 9A6F      1728 XMIT0:     ANL     P2,#06FH        ; SET DATA LINE TO 0
```

```
040D 8411      1729           JMP     CKPSL
               1730
040F 8A40      1731 XMIT1:    ORL     P2,#40H ; SET DATA LINE TO 1
0411 FF        1732 CKPSL:    MOV     A,R7    ; LOAD CLOCK VECTOR INTO A
0412 39        1733           OUTL    P1,A    ;    PULSE CLOCK LINE LOW
0413 89FF      1734           ORL     P1,#0FFH ;    THEN HIGH
               1735
0415 FB        1736           MOV     A,R3    ; HAVE ALL BITS BEEN TRANSMITTED?
0416 E7        1737           RL      A
0417 E90B      1738           DJNZ    R1,XMIT
               1739
0419 8AC0      1740           ORL     P2,#0C0H        ; SET 'CMD ENA EAR' AND 'DATA' TO 1
041B 83        1741           RET
               1742
               1743 ;*** END OF XMIT ***
               1744 $EJECT
               1745
               1746 ;         NAME            RCV
               1747
               1748 ;
               1749 ;
               1750 ;
               1751
               1752 ; RCV — RECEIVE 1 TO 8 BITS OF DATA FROM THE LINE CIRCUIT
               1753 ;         SPECIFIED BY THE CLOCK VECTOR STORED IN R2 UPON ENTRY.
               1754
               1755 ; ENTRY POINT 'RCV8' RECEIVES 8 BITS OF DATA RETURNED IN 'A' REG.
               1756
               1757 RCV8:
041C B908      1758           MOV     R1,#8
               1759 RCV:
041E FF        1760           MOV     A,R7    ; MOVE CLOCK VECTOR INTO A
041F 39        1761           OUTL    P1,A    ; 'CLOCK LINE' = 0
0420 0A        1762           IN      A,P2    ; READ IN NEXT BIT OF DATA
0421 89FF      1763           ORL     P1,#0FFH ;'CLOCK LINE' = 1
0423 97        1764           CLR     C       ; CLEAR CARRY FLAG (ASSUME DATA = 0)
0424 37        1765           CPL     A
0425 D228      1766           JB6     RD0     ; SKIP NEXT INSTR. IF 'DATA' = 0
0427 A7        1767 RD1:      CPL     C       ; SET CARRY FLAG (SINCE DATA = 1)
0428 FB        1768 RD0:      MOV     A,R3
0429 F7        1769           RLC     A       ; MOVE NEXT DATA BIT INTO LSB
042A AB        1770           MOV     R3,A    ;    POSITION OF R3
               1771
042B E91E      1772           DJNZ    R1,RCV  ; HAVE ALL BITS BEEN RECEIVED?
               1773
042D FB        1774           MOV     A,R3    ; LOAD 'A' WITH RECEIVED DATA AND RETURN
               1775                           ;    TO CALLING ROUTINE
042E 83        1776           RET
               1777
               1778 ;*** END OF RCV ***
               1779 $EJECT
               1780
               1781 ;         NAME            CODEC
               1782
               1783 ;
               1784 ;
```

```
                    1785 ;
                    1786
                    1787 ; CODEC — THE DATA CONTAINED IN THE 'A' REG. UPON ENTRY
                    1788 ;         IS TRANSMITTED TO THE SELECTED LINE CIRCUIT'S
                    1789 ;         CODEC.
                    1790
                    1791 ; ASSUMED REG. CONTENTS UPON ENTRY:
                    1792 ;   R7=CLOCK VECTOR
                    1793 ;   A=CODEC CONTROL DATA
                    1794
                    1795 CODEC:
042F AC             1796        MOV     R4,A        ; SAVE CODEC CONTROL DATA
0430 2320           1797        MOV     A,#WRCDRC
0432 9400           1798        CALL    XMIT4       ; PUT ANALOG CUSTOM I.C. IN 'WRITE TO CDR' MODE
0434 FC             1799        MOV     A,R4
0435 9406           1800        CALL    XMIT8       ; LOAD DATA INTO CODEC DATA REG.
                    1801
0437 2360           1802        MOV     A,#LDCODC
0439 9400           1803        CALL    XMIT4       ; PUT DIG. I.C. IN 'LOAD CODEC' MODE
043B 54C7           1804        CALL    CKBRST      ; LOAD DATA INTO CODEC
                    1805
043D 74E4           1806        CALL    RTNSH       ; PUT CUSTOM I.C. IN 'RETURN S/H' MODE
                    1807
043F 83             1808        RET
                    1809
                    1810 ;*** END OF CODEC ***
                    1811 $EJECT
                    1812
                    1813 ;       NAME            RQST
                    1814
                    1815 ;
                    1816 ;
                    1817 ;
                    1818
                    1819 ; RQST — PERFORM THE PRELIMINARY STUFF THAT'S COMMON TO
                    1820 ;        ALL 'RQXXXX' SUBROUTINES.
                    1821
                    1822 RQST:
                    1823 ; ECHO COMMAND BYTE 4 TO SET 'RESPONSE ENABLE' FLIP-FLOP
0440 18             1824        INC     R0
0441 80             1825        MOVX    A,@R0
0442 90             1826        MOVX    @R0,A
                    1827
                    1828 ; MOVE FUNCTION CODE BYTE OF REQUEST COMMAND INTO 'RQFNCD'
0443 B925           1829        MOV     R1,#RQFNCD
0445 FD             1830        MOV     A,R5
0446 A1             1831        MOV     @R1,A
                    1832
                    1833 ; SET 'RQST A BAR/B' TO THE VALUE OF FLAG F1
0447 B920           1834        MOV     R1,#LNCRDS  ; ADDR. OF LINE CARD STATUS BYTE
0449 F1             1835        MOV     A,@R1
044A 7650           1836        JF1     $+6         ; SKIP NEXT 3 INSTRUCTIONS IF 'F1' = 1
                    1837
                    1838 ; REQUEST COMMAND WAS RECEIVED OVER 'A' PCM HIGHWAY
044C 53FB           1839        ANL     A,#0FBH     ; CLEAR 'RQST A BAR/B' (BIT 2)
044E A1             1840        MOV     @R1,A
```

```
044F 83         1841          RET
                1842
                1843 ; REQUEST COMMAND WAS RECEIVED OVER 'B' PCM HIGHWAY
0450 4304       1844          ORL    A,#04H   ; SET 'RQST A BAR/B' (BIT 2)
0452 A1         1845          MOV    @R1,A
0453 83         1846          RET
                1847
                1848 ;*** END OF RQST ***
                1849 $EJECT
                1850
                1851 ;         NAME              DTR
                1852
                1853 ;
                1854 ;
                1855 ;
                1856
                1857 ; DTR — DISPLAY SELF-TEST RESULTS AND FLASH THE 'BUSY INDICATE'
                1858 ;         LED IF A HARDWARE FAILURE WAS DETECTED
                1859
0454 BA04       1860 DTR:     MOV    R2,#4
0456 B82A       1861          MOV    R0,#TESTR
0458 27         1862          CLR    A
0459 40         1863 DTR2:    ORL    A,@R0    ; READ NEXT 'TEST RESULTS' BYTE
045A 9671       1864          JNZ    BADB     ; JUMP TO BADB IF ANY ERROR WAS DETECTED
045C 18         1865          INC    R0
045D EA59       1866          DJNZ   R2,DTR2  ; REPEAT FOR ALL TEST RESULTS BYTES
                1867
                1868 ; BOARD GOOD — NO ERRORS WERE DETECTED BY SELF-TEST SOFTWARE
045F F0         1869          MOV    A,@R0    ; READ 'GOOD BOARD' DOWN COUNTER
0460 9663       1870          JNZ    $+3      ; SKIP NEXT INSTR. IF DOWN COUNT NON ZERO
0462 93         1871          RETR
0463 18         1872          INC    R0       ; ADDR. OF 'BLINK COUNTER'
0464 10         1873          INC    @R0      ; INCREMENT 'BLINK COUNTER'
0465 F0         1874          MOV    A,@R0
0466 C66C       1875          JZ     DTR3
0468 F27D       1876          JB7    BLNK1    ; SLOW BLINK FOR A GOOD BOARD
046A 847A       1877          JMP    BLNK0
                1878 DTR3:
                1879 ; IF 'BLINK COUNTER' = 0, THEN DECREMENT 'GOOD BOARD' DOWN COUNTER
046C C8         1880          DEC    R0
046D F0         1881          MOV    A,@R0
046E 07         1882          DEC    A
046F A0         1883          MOV    @R0,A
0470 93         1884          RETR
                1885
                1886 BADB:
                1887 ; BOARD BAD — SELF-TEST SOFTWARE DETECTED A HARDWARE MALFUNCTION
0471 B82F       1888          MOV    R0,#BLINKC
0473 10         1889          INC    @R0      ; INCREMENT 'BLINK COUNTER'
0474 F0         1890          MOV    A,@R0
0475 F278       1891          JB7    BLNKX    ; BLINK ONLY HALF THE TIME, DISPLAY 'BUSY' STATUS
0477 93         1892          RETR            ;   THE OTHER HALF.
0478 927D       1893 BLNKX:   JB4    BLNK1    ; FAST BLINK FOR BAD BOARD
                1894
047A 9AEF       1895 BLNK0:   ANL    P2,#0EFH ; TURN-OFF LED
```

```
047C 93          1896          RETR
                 1897
047D 8A10        1898 BLNK1:   ORL     P2,#10H   ; TURN-ON LED
047F 93          1899          RETR
                 1900 ;*** END OF DTR ***
                 1901 $EJECT
                 1902
                 1903 ;       NAME            LDFXAD
                 1904
                 1905 ;
                 1906 ;
                 1907 ;
                 1908
                 1909 ; LDFXAD -- LOAD LINE CARD'S FIXED ADDRESS INTO CONTROL COMM. I.C.'S
                 1910 ;             EXPECTED ADDRESS REG.
                 1911
                 1912 LDFXAD:
                 1913 ; CLEAR 'LOAD BAR' & 'CLK' INPUTS OF 'FIXED ADDRESS' SHIFT REG.
0480 9ADE        1914          ANL     P2,#0DEH
                 1915
                 1916 ; SET 'LOAD BAR' INPUT OF 'FIXED ADDR.' S/R
0482 8A01        1917          ORL     P2,#01H
                 1918
                 1919 ; INITIALIZE BIT COUNTER
0484 B808        1920          MOV     R0,#8
                 1921
0486 97          1922 LFA1:    CLR     C         ; CLEAR C FLAG
0487 २६०A        1923          JNT0    $+3
0489 A7          1924          CPL     C         ; SET C IF NEXT BIT=1
                 1925
                 1926 ; C = NEXT BIT OF FIXED ADDR.
048A F7          1927          RLC     A         ; MOVE NEXT BIT INTO LSB OF ACCUMULATOR
                 1928
                 1929 ; PULSE CLOCK LINE
048B 8A20        1930          ORL     P2,#20H
048D 9ADF        1931          ANL     P2,#0DFH
                 1932
048F E886        1933          DJNZ    R0,LFA1
                 1934
0491 B808        1935          MOV     R0,#CFXADD
0493 90          1936          MOVX    @R0,A     ; LOAD 'FIXED ADDRESS' INTO CONTROL COMM. I.C.
                 1937
0494 83          1938          RET
                 1939
                 1940 ;*** END OF LDFXAD ***
                 1941 $EJECT
                 1942
                 1943 ;       NAME            LNTST
                 1944
                 1945 ;
                 1946 ;
                 1947 ;
                 1948
                 1949 ; LNTST -- LINE TEST ROUTINE
                 1950
                 1951 LNTST:
```

```
0495 18         1952            INC     R0
0496 80         1953            MOVX    A,@R0
0497 90         1954            MOVX    @R0,A
0498 14E4       1955            CALL    FRWAIT ; ECHO COMMAND AS RESPONSE
                1956
                1957 ; TEST DIGITAL PER-LINE CUSTOM I.C.
049A F400       1958            CALL    DIGICT
                1959
                1960 ; TEST ANALOG PER-LINE CUSTOM I.C.
049C F44D       1961            CALL    ANAICT
                1962
                1963 ; PERFORM CHECKSUM TEST OF PROGRAM MEMORY
049E 94D8       1964            CALL    ROMT
                1965
                1966 ; RETURN S/H DATA ON PORT 1 INPUTS
04A0 74E4       1967            CALL    RTNSH
                1968
04A2 83         1969            RET
                1970
                1971 ;*** END OF LNTST ***
                1972 $EJECT
                1973
                1974 ;       NAME            DELAY
                1975
                1976 ;
                1977 ;
                1978 ;
                1979
                1980 ; DELAY -- DELAY SUBROUTINE. THE CONTENTS OF THE 'A' REG. AT ENTRY
                1981 ;          IS THE DELAY IN MILLISECONDS.
                1982
                1983 DELAY:
04A3 AA         1984            MOV     R2,A
04A4 235A       1985            MOV     A,#90   ; 90 @ 4.096 MHZ, 132 @ 6 MHZ,
                1986                            ; 180 @ 8.192 MHZ, 242 @ 11 MHZ
04A6 07         1987            DEC     A
04A7 96A6       1988            JNZ     $-1
04A9 EAA4       1989            DJNZ    R2,$-5
04AB 83         1990            RET
                1991
                1992 ;*** END OF DELAY ***
                1993 $EJECT
                1994
                1995 ;       NAME            RSDHS
                1996
                1997 ;
                1998 ;
                1999 ;
                2000
                2001 ; RSDHS -- RESET 'DELTA HOOK STATUS' BIT OF THE SPECIFIED LINE CKT.
                2002
                2003 RSDHS:
                2004 ; ECHO COMMAND BYTE 4 TO SET 'RESPONSE ENA' FF
04AC 18         2005            INC     R0
04AD 80         2006            MOVX    A,@R0
04AE 90         2007            MOVX    @R0,A
```

```
                2008
                2009 ; CLEAR SELECTED LINE CIRCUIT'S 'DELTA H/S' BIT
04AF B922       2010        MOV     R1,#DLTAHS
04B1 F1         2011        MOV     A,@R1
04B2 5F         2012        ANL     A,R7    ; CLEAR BIT OF 'DLTAHS' CORRESPONDING TO
04B3 A1         2013        MOV     @R1,A   ;   SPECIFIED LINE CKT.
04B4 96BC       2014        JNZ     RSDHS1
                2015
                2016 ; ALL 'DLTAHS' BITS ARE ZERO, CLEAR "OR'D DELTA H/S" BIT OF 'LNCRDS'
04B6 B920       2017        MOV     R1,#LNCRDS
04B8 F1         2018        MOV     A,@R1
04B9 53FE       2019        ANL     A,#0FEH
04BB A1         2020        MOV     @R1,A
                2021
04BC 83         2022 RSDHS1: RET
                2023
                2024 ;*** END OF RSDHS ***
                2025 $EJECT
                2026
                2027 ;      NAME            SMPTX4
                2028
                2029 ;
                2030 ;
                2031 ;
                2032
                2033 ; SMPTX4 — SAMPLES TX PCM CHANNEL 4 AND COUNTS THE NUMBER OF OCCURRANCES
                2034 ;           OF THE PCM VALUE CORRESPONDING TO THE ABSOLUTE PEAK AMPLITUDE
                2035 ;           OF THE SIGNAL ON CHAN. 4.  THE NUMBER OF SAMPLES TAKEN IS
                2036 ;           SPECIFIED IN COMMAND BYTE 3 (THE MIN. NUMBER OF SAMPLES IS 1,
                2037 ;           THE MAX. IS 256 (0).)
                2038
                2039 SMPTX4:
04BD 9440       2040        CALL    RQST
04BF C8         2041        DEC     R0
04C0 80         2042        MOVX    A,@R0   ; FETCH NO. OF SAMPLES TO BE EXAMINED
04C1 AA         2043        MOV     R2,A
                2044
                2045 ; WAIT FOR RESPONSE FRAME, RETURN RESPONSE, THEN CONTINUE
04C2 14E4       2046        CALL    FRWAIT
                2047
                2048 ; SAMPLE TX CHAN. 4 (R2) TIMES
04C4 B4C7       2049        CALL    FPL     ; TAKE THE NUMBER OF SAMPLES SPECIFIED IN R2
                2050                        ;  (ABSOLUTE PEAK PCM VALUE RETURNED IN R4,
                2051                        ;   NUMBER OF OCCURANCES IS RETURNED IN R3)
                2052
                2053 ; PUT PEAK VALUE & NO. OF OCCURANCES IN REQUESTED DATA BYTES
04C6 B926       2054        MOV     R1,#RQBYT1
04C8 FC         2055        MOV     A,R4
04C9 A1         2056        MOV     @R1,A   ; FETCH PEAK VALUE AND PUT IN 'RQBYT1'
04CA 19         2057        INC     R1
04CB FB         2058        MOV     A,R3
04CC A1         2059        MOV     @R1,A   ; FETCH NO. OF OCCURANCES AND PUT IN 'RQBYT2'
                2060
                2061 ; JUMP INTO GNADJ SUBROUTINE TO FINISH UP
04CD A4B2       2062        JMP     ENDADJ
                2063
```

```
              2064 ;*** END OF SMPTX4 ***
              2065 $EJECT
              2066
              2067 ;        NAME         RDROM
              2068
              2069 ;
              2070 ;
              2071 ;
              2072
              2073 ; RDROM — READ BYTE OF PROGRAM MEMORY SPECIFIED BY BITS (2-0) OF FUNCTION
              2074 ;         CODE BYTE AND BITS (7-0) OF COMMAND BYTE 3 TO FORM AN
              2075 ;         ELEVEN-BIT ADDRESS (FUNCTION CODE BITS (2-0) ARE MOST SIGNIFICANT)
              2076
              2077 RDROM:
04CF FE       2078         MOV    A,R6
04D0 AA       2079         MOV    R2,A       ; PAGE SELECT
04D1 80       2080         MOVX   A,@R0
04D2 AB       2081         MOV    R3,A       ; BYTE SELECT
04D3 18       2082         INC    R0
04D4 F4DD     2083         CALL   GETROM
04D6 90       2084         MOVX   @R0,A      ; PUT FETCHED DATA IN RESPONSE REG BYTE 4
04D7 83       2085         RET
              2086
              2087 ;*** END OF RDROM ***
              2088 $EJECT
              2089
              2090 ;        NAME         ROMT
              2091
              2092 ;
              2093 ;
              2094 ;
              2095
              2096 ; ROMT — CHECKSUM TEST OF PROGRAM MEMORY
              2097
              2098 ROMT:
              2099 ; CLEAR 'ROM TEST FAILED' FLAG
04D8 B92A     2100         MOV    R1,#TESTR
04DA F1       2101         MOV    A,@R1
04DB 53FD     2102         ANL    A,#0FDH
04DD A1       2103         MOV    @R1,A
              2104
              2105 ; INITIALIZE CHECKSUM BYTE AND ADDRESS POINTERS
04DE BC00     2106         MOV    R4,#0      ; CHECKSUM BYTE
04E0 BB00     2107         MOV    R3,#0      ; BYTE POINTER
04E2 BA08     2108         MOV    R2,#8      ; PAGE POINTER
              2109
              2110 ; SUM ALL BYTES OF PROGRAM MEMORY
04E4 F4DD     2111         CALL   GETROM
04E6 6C       2112         ADD    A,R4
04E7 AC       2113         MOV    R4,A
04E8 EBE4     2114         DJNZ   R3,$-4     ; HAVE ALL BYTES OF THIS PAGE BEEN SUMMED?
04EA EAE4     2115         DJNZ   R2,$-6     ; HAVE ALL PAGES BEEN SUMMED?
              2116
              2117 ; TEST CHECK SUM FOR ZERO
04EC 96EF     2118         JNZ    ROMF       ; TEST FAILS IF CHECKSUM NOT ZERO
04EE 83       2119         RET
```

```
                2120
                2121 ROMF:
                2122 ; CHECKSUM NOT ZERO----SET 'ROM TEST FAILED' FLAG
04EF F1         2123          MOV     A,@R1
04F0 4302       2124          ORL     A,#2
04F2 A1         2125          MOV     @R1,A
04F3 83         2126          RET
                2127
                2128 ;*** END OF ROMT ***
                2129 $EJECT
                2130
                2131 ;      NAME          RGNADJ
                2132
                2133 ;
                2134 ;
                2135 ;
                2136
                2137 ; RGNADJ -- RX GAIN AUTO-ADJUST ROUTINE
                2138
0500            2139          ORG     500H
                2140 RGNADJ:
                2141 ; SET FLAG F0 (RX GAIN ADJ. OPERATION)
0500 85         2142          CLR     F0
0501 95         2143          CPL     F0
                2144
                2145 ; SAVE 2ND LINE CIRCUIT'S 'INDEX' IN TEMP1
0502 B96B       2146          MOV     R1,#TEMP1
0504 80         2147          MOVX    A,@R0
0505 5307       2148          ANL     A,#7
0507 A1         2149          MOV     @R1,A
                2150
                2151 ; ECHO COMMAND BYTE 4 TO SET 'RESPONSE ENA' FF
0508 18         2152          INC     R0
0509 80         2153          MOVX    A,@R0
050A 90         2154          MOVX    @R0,A
                2155
                2156 ; WAIT FOR RESPONSE FRAME
050B 14E4       2157          CALL    FRWAIT
                2158
                2159 ; ARE 2ND LINE CKT'S 'INDEX' & SELECTED LINT CKT'S 'INDEX' EQUAL?
050D B96B       2160          MOV     R1,#TEMP1
050F F1         2161          MOV     A,@R1
0510 DE         2162          XRL     A,R6
0511 9614       2163          JNZ     RGA1
                2164
                2165 ; INDICES ARE EQUAL----TEST CANNOT BE PERFORMED
0513 83         2166          RET
                2167
                2168 RGA1:
                2169 ; PULL-IN 'TEST RELAY', ETC. FOR SELECTED LINE CKT.
                2170 ; EVEN BAR/ODD = 1, EURO SEL = 0, POWER = 1, TR BAR = 0,
                2171 ; RR BAR = 1, LC ENA = 0, ILS = 0, A BAR/B PCM SEL = 0
0514 BAA8       2172          MOV     R2,#0A8H
0516 3431       2173          CALL    LDDIG   ; LOAD DIGITAL I.C. & RETURN WITH LINE CKT. IN
                2174                          ;   'RETURN S/H' MODE
                2175
                2176 $EJECT
```

```
                2177 ; PULL-IN 'TEST RELAY', ETC. FOR 2ND LINE CKT.
0518 B96B       2178        MOV     R1,#TEMP1
051A 2E         2179        XCH     A,R6
051B 21         2180        XCH     A,@R1
051C AE         2181        MOV     R6,A
051D 23EF       2182        MOV     A,#(CLKVCT-(100H*(CLKVCT/100H)))
051F 6E         2183        ADD     A,R6
0520 E3         2184        MOVP3   A,@A    ; TABLE LOOK-UP 2ND LINE CKT'S 'CLK VECTOR'
0521 AF         2185        MOV     R7,A
                2186
                2187 ; EVEN BAR/ODD = 0, EURO SEL = 0, POWER = 1, TR BAR = 0, RR BAR = 1,
                2188 ; LC ENA = 1, ILS = 0, A BAR/B PCM SEL = 0
0522 BA2C       2189        MOV     R2,#2CH
0524 3431       2190        CALL    LDDIG   ; LOAD DIGITAL I.C. & RETURN WITH LINE CIRCUIT
                2191                        ;    IN 'RETURN S/H' MODE
                2192
                2193 ; ASSIGN 2ND LINE CKT'S TX & RX CHANNELS
0526 2340       2194        MOV     A,#40H  ; TX PCM CH. 4 ===> CODEC TX CH. 0
0528 942F       2195        CALL    CODEC
052A 238A       2196        MOV     A,#08AH ; RX PCM NOT USED ===> CODEC RX CH. 0AH
052C 942F       2197        CALL    CODEC   ; CODEC SUBROUTINE RETURNS WITH LINE CKT.
                2198                        ;    IN 'RETURN S/H' MODE
                2199
                2200 ; ASSIGN SELECTED LINE CKT'S TX & RX CHANNELS
052E B96B       2201        MOV     R1,#TEMP1
0530 2E         2202        XCH     A,R6
0531 21         2203        XCH     A,@R1
0532 AE         2204        MOV     R6,A
0533 23EF       2205        MOV     A,#(CLKVCT-(100H*(CLKVCT/100H)))
0535 6E         2206        ADD     A,R6
0536 E3         2207        MOVP3   A,@A    ; TABLE LOOK-UP SELECTED LINE CKT'S 'CLK VECT'
0537 AF         2208        MOV     R7,A
                2209
0538 2340       2210        MOV     A,#40H  ; NOT INTERESTED IN SELECTED LINE CKT'S TX PCM
053A 942F       2211        CALL    CODEC
053C 2389       2212        MOV     A,#89H  ; RECEIVE 'DIGITAL MILLIWATT' ON RX PCM CH. 9
053E 942F       2213        CALL    CODEC
                2214
0540 A454       2215        JMP     GNADJ
                2216
                2217 ;*** END OF RGNADJ ***
                2218 $EJECT
                2219
                2220 ;      NAME            TGNADJ
                2221
                2222 ;
                2223 ;
                2224 ;
                2225
                2226 ; TGNADJ -- TX GAIN AUTO-ADJUST ROUTINE
                2227
                2228 TGNADJ:
                2229 ; CLEAR FLAG F0 (TX GAIN ADJ. OPERATION)
0542 85         2230        CLR     F0
                2231
                2232 ; ECHO COMMAND BYTE 4 TO SET 'RESPONSE ENA' FF
0543 18         2233        INC     R0
```

```
0544 80         2234            MOVX    A,@R0
0545 90         2235            MOVX    @R0,A
                2236
                2237 ; WAIT FOR RESPONSE FRAME
0546 14E4       2238            CALL    FRWAIT
                2239
                2240 ; PULL-IN 'TEST RELAY', ETC.
                2241 ; EVEN BAR/ODD = 0, EURO SEL = 0, POWER = 1, TR BAR = 0,
                2242 ; RR BAR = 1, LC ENA = 1, ILS = 0, A BAR/B PCM SEL = 0
0548 BA2C       2243            MOV     R2,#2CH
054A 3431       2244            CALL    LDDIG
                2245
                2246 ; ASSIGN TX & RX CHANNELS
054C 2340       2247            MOV     A,#40H  ; TX PCM CH. 4 ===> CODEC TX CH. 0
054E 942F       2248            CALL    CODEC
0550 230A       2249            MOV     A,#0AH  ; RX PCM NOT NEEDED FOR TEST
0552 942F       2250            CALL    CODEC   ; CODEC SUBROUTINE RETURNS WITH LINE CIRCUIT
                2251                            ;   IN 'RETURN S/H' MODE
                2252
                2253 ; ENTER 'GNADJ'
                2254
                2255 ;*** END OF TGNADJ ***
                2256 $EJECT
                2257
                2258 ;       NAME            GNADJ
                2259
                2260 ;
                2261 ;
                2262 ;
                2263
                2264 ; GNADJ -- GAIN AUTO-ADJUST ROUTINE (CONTINUATION OF RGNADJ & TGNADJ)
                2265
                2266 GNADJ:
                2267 ; WAIT FOR RELAY CONTACT BOUNCE TO STOP.
0554 B868       2268            MOV     R0,#RELAYD
0556 F0         2269            MOV     A,@R0   ; GET RELAY DEBOUNCE DELAY VALUE
0557 94A3       2270            CALL    DELAY
                2271
                2272 ; INITIALIZE SELECTED LINE CKT'S GAIN SETTING (TX GAIN IF F0=0,
                2273 ;   RX GAIN IF F0=1)
0559 54E1       2274            CALL    RGNADD
055B B65E       2275            JF0     $+3     ; SKIP NEXT INSTR. IF RX GAIN ADJ.
055D C9         2276            DEC     R1      ; ADJUST R1 TO POINT TO 'TX GAIN' BYTE
055E B100       2277            MOV     @R1,#0
0560 3492       2278            CALL    LDGAIN  ; LOAD GAIN SETTING INTO ANALOG I.C.
                2279
                2280 GETPK:
                2281 ; WAIT FOR TEST SIGNAL TO STABLIZE AFTER GAIN CHANGE
0562 B369       2282            MOV     R0,#GNDEL
0564 F0         2283            MOV     A,@R0   ; GET GAIN ADJUST DELAY VALUE
0565 94A3       2284            CALL    DELAY
                2285
                2286 ; FIND PEAK PCM LEVEL (RETURNS 'PEAK LEVEL' IN R4, 'PEAK COUNT' IN R3)
0567 B4C7       2287            CALL    FPL
                2288
                2289 ; IS 'PEAK LEVEL' < 8 (GAIN TOO HIGH) ?
0569 FC         2290            MOV     A,R4
```

```
056A 03F8    2291           ADD     A,#0F8H  ; ADD 2'S COMPLEMENT OF 8 TO 'PEAK LEVEL' VALUE
             2292                            ; CARRY FLAG WILL BE SET IF 'PEAK LEVEL'>=8
056C E690    2293           JNC     GNERR1   ; GAIN TOO HIGH----HARDWARE ERROR
056E 9681    2294           JNZ     GNLO
             2295
             2296 ; 'PEAK LEVEL' VALUE = 8 OR 9
             2297 ; IS 'PEAK COUNT' < 9 (GAIN TOO LOW) ?
0570 FB      2298           MOV     A,R3
0571 03F7    2299           ADD     A,#0F7H  ; ADD 2'S COMPLEMENT OF 9 TO 'PEAK COUNT'
             2300                            ; CARRY FLAG WILL BE SET IF 'PEAK COUNT'<9
0573 E681    2301           JNC     GNLO
             2302
             2303 ; IS 'PEAK COUNT' >= 16 (GAIN TOO HIGH) ?
0575 FB      2304           MOV     A,R3
0576 03F0    2305           ADD     A,#0F0H  ; ADD 2'S COMPL. OF 16 TO 'PEAK COUNT'
0578 F690    2306           JC      GNERR1   ; IF CARRY FLAG SET, 'PEAK COUNT'>=16 WHICH
             2307                            ; MEANS THAT GAIN CANNOT BE ADJUSTED WITHIN
             2308                            ; THE REQUIRED BAND----HARDWARE ERROR
             2309
             2310 $EJECT
             2311 ; GAIN IS SET WITHIN TOLERANCE----CLEAR 'ANALOG I.C. FAILED' BIT OF 'TESTRA'
057A B92D    2312           MOV     R1,#TESTRA
057C F1      2313           MOV     A,@R1
057D 5F      2314           ANL     A,R7
057E A1      2315           MOV     @R1,A
057F A4A2    2316           JMP     GNADJ1
             2317
             2318 GNLO:
             2319 ; GAIN SETTING TOO LOW----INCREMENT PRESENT SETTING BY ONE
0581 54E1    2320           CALL    RGNADD
0583 B686    2321           JF0     $+3      ; SKIP NEXT INSTR. IF RX GAIN ADJ.
0585 C9      2322           DEC     R1
0586 F1      2323           MOV     A,@R1
0587 D31F    2324           XRL     A,#1FH   ; IS GAIN ALREADY AT MAX. VALUE?
0589 C69C    2325           JZ      GNERR2   ; IF ALREADY AT MAX. GAIN SETTING, THEN
             2326 ;                            MAX. GAIN TOO LOW----HARDWARE ERROR
058B 11      2327           INC     @R1      ; INCREMENT 'GAIN' BYTE IN MEMORY
058C 3492    2328           CALL    LDGAIN   ; LOAD NEW GAIN SETTING INTO ANALOG I.C.
058E A462    2329           JMP     GETPK
             2330
             2331 GNERR1:
             2332 ; DECREMENT GAIN SETTING BY ONE (IF NOT AT MIN.)
0590 54E1    2333           CALL    RGNADD
0592 B695    2334           JF0     $+3      ; SKIP NEXT INSTR. IF RX GAIN ADJ.
0594 C9      2335           DEC     R1
0595 F1      2336           MOV     A,@R1
0596 C69C    2337           JZ      GNERR2   ; CHECK IF ALREADY ZERO
0598 07      2338           DEC     A
0599 A1      2339           MOV     @R1,A
059A 3492    2340           CALL    LDGAIN
             2341
             2342 GNERR2:
             2343 ; SET 'FAILED TEST' BIT OF 'TESTRA' FOR SELECTED LINE CKT.
059C B92D    2344           MOV     R1,#TESTRA
059E FF      2345           MOV     A,R7
059F 37      2346           CPL     A
05A0 41      2347           ORL     A,@R1
```

```
05A1 A1         2348        MOV     @R1,A
                2349
                2350 GNADJ1:
                2351 ; PUT CODEC IN 'STANDBY' MODE
05A2 23FF       2352        MOV     A,#0FFH
05A4 942F       2353        CALL    CODEC
                2354
                2355 ; RELEASE 'TEST RELAY', ETC.
05A6 2330       2356        MOV     A,#LCST1
05A8 6E         2357        ADD     A,R6
05A9 A9         2358        MOV     R1,A
05AA B118       2359        MOV     @R1,#IDIG
05AC BA18       2360        MOV     R2,#IDIG
05AE 3431       2361        CALL    LDDIG
                2362 $EJECT
                2363 ; REPEAT FOR 2ND LINE CKT. IF RX GAIN ADJ.
05B0 B6BA       2364        JF0     GNADJ2
                2365
                2366 ENDADJ:
                2367 ; RESET FRAME COUNTER TO INITIALIZATION VALUE
05B2 65         2368        STOP    TCNT
05B3 2318       2369        MOV     A,#18H
05B5 62         2370        MOV     T,A
05B6 45         2371        STRT    CNT
05B7 16BA       2372        JTF     $+3       ; RESET TIMER FLAG
05B9 83         2373        RET
                2374
                2375 GNADJ2:
                2376 ; PUT 2ND LINE CKT'S 'INDEX' & 'CLOCK VECTOR' INTO THE SELECTED
                2377 ;   LINE CIRCUIT'S 'INDEX' & 'CLOCK VECTOR' REGISTERS.
05BA 85         2378        CLR     F0
05BB B96B       2379        MOV     R1,#TEMP1
05BD 2E         2380        XCH     A,R6
05BE 21         2381        XCH     A,@R1
05BF AE         2382        MOV     R6,A      ; 2ND LINE CKT'S 'INDEX' IN R6
05C0 23EF       2383        MOV     A,#(CLKVCT-(100H*(CLKVCT/100H)))
05C2 6E         2384        ADD     A,R6
05C3 E3         2385        MOVP3   A,@A
05C4 AF         2386        MOV     R7,A      ; 2ND LINE CKT'S 'CLOCK VECTOR' IN R7
05C5 A4A2       2387        JMP     GNADJ1
                2388
                2389 ;*** END OF GNADJ ***
                2390 $EJECT
                2391
                2392 ;       NAME            FPL
                2393
                2394 ;
                2395 ;
                2396 ;
                2397
                2398 ; FPL — FIND PEAK PCM LEVEL SUBROUTINE
                2399
                2400 FPL:
05C7 BA7D       2401        MOV     R2,#125 ; INITIALIZE SAMPLE COUNTER
05C9 B809       2402        MOV     R0,#9   ; ADDR. OF PCM SAMPLING REG.
05CB BB00       2403        MOV     R3,#0   ; INITIALIZE PEAK COUNTER
05CD BC7F       2404        MOV     R4,#7FH ; INITIALIZE PEAK LEVEL BYTE
```

```
05CF 45        2406            STRT    CNT
05D0 42        2407            MOV     A,T
05D1 37        2408            CPL     A
05D2 07        2409            DEC     A       ; 2'S COMPL. OF STARTING FRAME COUNT
05D3 A9        2410            MOV     R1,A
               2411
05D4 42        2412 NXTSMP:    MOV     A,T
05D5 69        2413            ADD     A,R1
05D6 96D4      2414            JNZ     NXTSMP  ; WAIT UNTIL NEXT SAMPLE'S FRAME BEGINS
05D8 00        2415            NOP
05D9 00        2416            NOP     ; WILL WORK AS-IS UP TO 8.192 MHZ
05DA 00        2417            NOP     ; TWO MORE NO-OP'S ARE NEEDED FOR RELIABLE
               2418                    ;   OPERATION AT 11 MHZ
05DB 80        2419            MOVX    A,@R0   ; FETCH NEXT PCM SAMPLE
05DC C9        2420            DEC     R1
05DD 537E      2421            ANL     A,#7EH  ; MASK OFF SIGN BIT & LSB
05DF AD        2422            MOV     R5,A    ; TEMP. SAVE IN R5
               2423
05E0 37        2424            CPL     A
05E1 17        2425            INC     A       ; 2'S COMPL. OF SAMPLE
05E2 6C        2426            ADD     A,R4    ; CARRY SET IF SAMPLE <= CURRENT PEAK VALUE
05E3 E6E8      2427            JNC     NOPEAK
05E5 96EB      2428            JNZ     NEWPK
05E7 1B        2429            INC     R3      ; SAMPLE=CURRENT PEAK VALUE, INCREMENT PEAK CNT.
05E8 EAD4      2430 NOPEAK:    DJNZ    R2,NXTSMP ; ANY MORE SAMPLES?
05EA 83        2431            RET
               2432
05EB FD        2433 NEWPK:     MOV     A,R5
05EC AC        2434            MOV     R4,A    ; SAMPLE VALUE BECOMES NEW PEAK VALUE
05ED BB01      2435            MOV     R3,#1   ; RESET PEAK COUNTER
05EF EAD4      2436            DJNZ    R2,NXTSMP ; ANY MORE SAMPLES?
05F1 83        2437            RET
               2438
               2439 ;*** END OF FPL ***
               2440 $EJECT
               2441
               2442 ;      NAME            SLFTST
               2443
               2444 ;
               2445 ;
               2446 ;
               2447
               2448 ; SLFTST -- LINE CARD SELF-TEST ROUTINE
               2449
0600           2450            ORG     600H
               2451 SLFTST:
               2452 ; CHECK DATA MEMORY
0600 E48A      2453            JMP     RAMT
               2454 RAMRET:
               2455 ; INITIALIZE TEST RESULTS BYTES
0602 B82D      2456            MOV     R0,#TESTR+3
0604 B903      2457            MOV     R1,#3
0606 B000      2458            MOV     @R0,#0
0608 C8        2459            DEC     R0
0609 E906      2460            DJNZ    R1,$-3
               2461
```

```
                     2462 ; CHECK PROGRAM MEMORY
060B 94D9            2463        CALL    ROMT
                     2464
                     2465 ; CHECK PER-CARD CUSTOM CONTROL COMMUNICATIONS I.C.
060D D424            2466        CALL    COMICT
                     2467
                     2468 ; CHECK DIGITAL & ANALOG PER-LINE CUSTOM I.C.'S
060F 7445            2469        CALL    RAMRS
                     2470 ;################################################################
0611 BE02            2471        MOV     R6,#2   ;
0613 BFFD            2472        MOV     R7,#0FDH ;
                     2473 ;################################################################
0615 CE              2474 ST1:   DEC     R6      ; NEXT LINE CKT. TO BE TESTED
0616 F400            2475        CALL    DIGICT  ; TEST DIGITAL PER-LINE CUSTOM I.C.
0618 F44D            2476        CALL    ANAICT  ; TEST ANALOG PER-LINE CUSTOM I.C.
061A FF              2477        MOV     A,R7
061B 77              2478        RR      A
061C AF              2479        MOV     R7,A    ; NEXT LINE CKT'S CLOCK VECTOR
061D FE              2480        MOV     A,R6
061E 9615            2481        JNZ     ST1     ; HAVE ALL LINE CKTS. BEEN TESTED?
                     2482
                     2483 ; RETURN S/H ON PORT 1
0620 74E4            2484        CALL    RTNSH
                     2485
                     2486 ; RETURN TO POWER-ON RESET SEQUENCE
0622 6413            2487        JMP     STRET   ; SELF TEST ROUTINE'S RETURN ADDRESS
                     2488
                     2489 ;*** END OF SLFTST ***
                     2490 $EJECT
                     2491
                     2492 ;      NAME            COMICT
                     2493
                     2494 ;
                     2495 ;
                     2496 ;
                     2497
                     2498 ;  COMICT -- TEST ROUTINE FOR THE PER-CARD CUSTOM CONTROL
                     2499 ;              COMMUNICATIONS I.C.
                     2500
                     2501 COMICT:
0624 15              2502        DIS     I
                     2503
                     2504 ; RESET 'COM. I.C. FAILED' BIT OF TESTR
0625 B92A            2505        MOV     R1,#TESTR
0627 F1              2506        MOV     A,@R1
0628 53FB            2507        ANL     A,#0FBH
062A A1              2508        MOV     @R1,A
                     2509
                     2510 ; CHECK OPERATION OF MODE REGISTER (WALKING 1/0 TEST)
                     2511 ;   WALKING 1'S TEST
062B B900            2512        MOV     R1,#CMODE
062D BC00            2513        MOV     R4,#0   ; INITIALIZE TEST DATA BYTE
062F BA08            2514        MOV     R2,#8   ; INITIALIZE TEST COUNTER
                     2515 WALK1:
0631 FC              2516        MOV     A,R4
0632 91              2517        MOVX    @R1,A
0633 81              2518        MOVX    A,@R1   ; WRITE THEN READ BACK NEXT TEST BYTE
```

```
0634 DC        2519           XRL     A,R4    ; COMPARE WITH EXPECTED DATA
0635 96C7      2520           JNZ     CFAIL
0637 FC        2521           MOV     A,R4
0638 97        2522           CLR     C
0639 A7        2523           CPL     C       ; SET C
063A F7        2524           RLC     A
063B AC        2525           MOV     R4,A    ; PUT NEXT TEST DATA BYTE INTO R4
063C EA31      2526           DJNZ    R2,WALK1
               2527
               2528 ;         WALKING 0'S TEST
063E BA08      2529           MOV     R2,#8
               2530 WALK0:
0640 FC        2531           MOV     A,R4
0641 91        2532           MOVX    @R1,A
0642 81        2533           MOVX    A,@R1
0643 DC        2534           XRL     A,R4    ; COMPARE WITH EXPECTED DATA
0644 96C7      2535           JNZ     CFAIL
0646 FC        2536           MOV     A,R4
0647 97        2537           CLR     C       ; CLEAR C
0648 F7        2538           RLC     A
0649 AC        2539           MOV     R4,A
064A EA40      2540           DJNZ    R2,WALK0
               2541
               2542 $EJECT
               2543
               2544 ;         SET UP MODE CONTROL REG. FOR TEST
064C 2383      2545           MOV     A,#083H ; 'A' SHIFT REG. FEEDBACK SELECTED
064E 91        2546           MOVX    @R1,A
               2547
               2548 ;         SET UP TEST DATA IN REGS 2,3,4,&5
064F BD63      2549           MOV     R5,#63H ; BYTE 1
0651 BCC1      2550           MOV     R4,#0C1H ; BYTE 2
0653 BBF8      2551           MOV     R3,#0F8H ; BYTE 3
0655 BA0F      2552           MOV     R2,#0FH ; BYTE 4
               2553
               2554 ;         LOAD S/R'S WITH TEST DATA AND VERIFY
0657 BE02      2555           MOV     R6,#2
0659 B80E      2556           MOV     R0,#0EH
065B 27        2557           CLR     A
065C 90        2558 COM00:    MOVX    @R0,A
065D 18        2559           INC     R0
065E B905      2560           MOV     R1,#5   ; INIT. TEST DATA POINTER
0660 BF04      2561           MOV     R7,#4   ; INIT. BYTE COUNTER
               2562 COM01:
0662 F1        2563           MOV     A,@R1
0663 37        2564           CPL     A       ; INVERT TEST DATA
0664 90        2565           MOVX    @R0,A   ;   & WRITE INTO S/R
0665 C9        2566           DEC     R1
0666 EF62      2567           DJNZ    R7,COM01
               2568
               2569 ;         LOAD OTHER S/R WITH TEST DATA
0668 B905      2570           MOV     R1,#5
066A BF04      2571           MOV     R7,#4
               2572 COM02:
066C F1        2573           MOV     A,@R1
066D 90        2574           MOVX    @R0,A   ; WRITE TEST DATA INTO S/R
066E C9        2575           DEC     R1
```

```
066F EF6C      2576           DJNZ    R7,COM02
               2577
               2578 ;    VERIFY INVERTED TEST DATA IN S/R
0671 B905      2579           MOV     R1,#5
0673 BF04      2580           MOV     R7,#4
               2581 COM03:
0675 80        2582           MOVX    A,@R0   ; FETCH NEXT BYTE FROM S/R
0676 37        2583           CPL     A       ;    & INVERT
0677 D1        2584           XRL     A,@R1   ; COMPARE WITH EXPECTED DATA
0678 96C7      2585           JNZ     CFAIL
067A C9        2586           DEC     R1
067B EF75      2587           DJNZ    R7,COM03
               2588
               2589 $EJECT
               2590 ;    VERIFY DATA IN OTHER S/R
067D B905      2591           MOV     R1,#5
067F BF04      2592           MOV     R7,#4
               2593 COM04:
0681 80        2594           MOVX    A,@R0   ; FETCH NEXT BYTE FROM S/R
0682 D1        2595           XRL     A,@R1   ;    & COMPARE WITH EXPECTED DATA
0683 96C7      2596           JNZ     CFAIL
0685 C9        2597           DEC     R1
0686 EF81      2598           DJNZ    R7,COM04
               2599
               2600 ;    REPEAT ONLY INVERTING THE DATA WRITTEN EACH S/R
0688 B80E      2601           MOV     R0,#0EH
068A 2304      2602           MOV     A,#4
068C 90        2603           MOVX    @R0,A
068D EE5C      2604           DJNZ    R6,COM00
               2605
               2606 ;    LOAD 'FIXED ADDRESS' REGISTER
068F B808      2607           MOV     R0,#CFXADD
0691 FB        2608           MOV     A,R3
0692 90        2609           MOVX    @R0,A
               2610
               2611 ;    INITIALIZE FRAME COUNTER FOR TEST
0693 65        2612           STOP    TCNT
0694 23F6      2613           MOV     A,#0F6H ; (-10 DECIMAL)
0696 62        2614           MOV     T,A
0697 1699      2615           JTF     $+2     ; RESETS 'TIMER FLAG'
0699 B908      2616           MOV     R1,#8
069B 45        2617           STRT    CNT
               2618
               2619 ; BEGIN TEST OF THE DYNAMIC OPERATION OF THE I.C.
069C 14D9      2620           CALL    CNTLE1  ; SYNCHRONIZES SOFTWARE TO FRAME CLOCK, THEN
               2621                           ;     ENABLES CONTROL S/R SHIFTING.
069E B80D      2622           MOV     R0,#CMODE
06A0 B90C      2623           MOV     R1,#CSTS
               2624
               2625 ; WAIT UNTIL FRAME COUNTER OVERFLOWS
06A2 16A6      2626 LC005:    JTF     CCNT    ; EXIT LOOP IF TERMINAL COUNT IS REACHED
06A4 C4A2      2627           JMP     LC005   ; REPEAT LOOP
               2628
06A6 81        2629 CCNT:     MOVX    A,@R1
06A7 92A6      2630           JB4     CCNT    ; LOOP UNTIL 'CNTRL WINDOW' = 0
06A9 65        2631           STOP    TCNT    ; HALT FRAME COUNTER
06AA 27        2632           CLR     A       ;    &
```

```
86AB 90         2633            MOVX    @R0,A    ;     SHIFTING
                2634
                2635 $EJECT
                2636 ; VERIFY THAT BOTH ADDR. MATCH FLAGS ARE SET AND THAT THE FRAME
                2637 ;    COUNT IS CORRECT.
86AC 81         2638            MOVX    A,@R1
86AD 37         2639            CPL     A
86AE 12C7       2640            JB0     CFAIL    ; TEST 'A' ADDR. MATCH FLAG
86B0 32C7       2641            JB1     CFAIL    ;   "  'B'  "    "     "
                2642
                2643 ; LOAD EXPECTED DATA INTO REGS. R5, R4, R3, & R2
86B2 BDF8       2644            MOV     R5,#0F8H
86B4 BC0F       2645            MOV     R4,#0FH
86B6 BB63       2646            MOV     R3,#63H
86B8 BAC1       2647            MOV     R2,#0C1H
                2648
                2649 ; VERIFY THE CONTENTS OF BOTH SHIFT REGISTERS
86BA D4D0       2650            CALL    DATCHK
86BC B804       2651            MOV     R0,#4
86BE D4D2       2652            CALL    DATCHK+2
86C0 748F       2653            CALL    CNTLRS   ; RESET COMM. I.C.
86C2 83         2654            RET
                2655
86C3 C7         2656 CFAIL1:    MOV     A,PSW
86C4 0307       2657            ADD     A,#7     ; MODULO 8 DECREMENT OF STACK POINTER
86C6 D7         2658            MOV     PSW,A
86C7 B82A       2659 CFAIL:     MOV     R0,#TESTR
86C9 F0         2660            MOV     A,@R0
86CA 4304       2661            ORL     A,#04H   ; SET 'CTEST FAILED' FLAG
86CC A0         2662            MOV     @R0,A
86CD 748F       2663            CALL    CNTLRS   ; RESET COMM. I.C.
86CF 83         2664            RET
                2665
                2666 ; SUBROUTINE DATCHK ****************************************
86D0 B800       2667 DATCHK:    MOV     R0,#0    ; R0 POINTS TO BYTE 1 OF 'A' S/R
86D2 BF04       2668            MOV     R7,#4    ; INIT. BYTE COUNTER
86D4 B905       2669            MOV     R1,#5    ; INIT. TEST DATA POINTER
                2670
86D6 80         2671 LC008:     MOVX    A,@R0    ; READ NEXT BYTE OUT OF S/R
86D7 D1         2672            XRL     A,@R1    ;   & COMPARE WITH THE EXPECTED VALUE
86D8 96C3       2673            JNZ     CFAIL1
86DA 18         2674            INC     R0       ; ADJUST R0 TO POINT TO NEXT BYTE
86DB C9         2675            DEC     R1       ; ADJUST R1 TO POINT TO NEXT EXPECTED BYTE
86DC EFD6       2676            DJNZ    R7,LC008 ; REPEAT UNTIL ALL 4 BYTES OF S/R ARE CHECKED
                2677
86DE 83         2678            RET
                2679 ; END OF DATCHK ********************************************
                2680
                2681
                2682 ;*** END OF COMICT ***
                2683 $EJECT
                2684
                2685 ;       NAME            DIGICT
                2686
                2687 ;
                2688 ;
                2689 ;
```

```
                  2690
                  2691 ; DIGICT -- CHECKS DIGITAL PER-LINE CUSTOM I.C.'S
                  2692
0700              2693         ORG     700H
                  2694 DIGICT:
                  2695 ; INITIALIZE 'TEST FAILED' BITS FOR DIGITAL PER-LINE CUSTOM I.C.
0700 B82C         2696         MOV     R0,#TESTRD
0702 F0           2697         MOV     A,@R0
0703 5F           2698         ANL     A,R7    ; INITIALIZE LINE CKT'S 'TESTRD' BIT
0704 A0           2699         MOV     @R0,A
                  2700
0705 B82B         2701         MOV     R0,#TESTRC
0707 F0           2702         MOV     A,@R0
0708 5F           2703         ANL     A,R7    ; INITIALIZE LINE CKT'S 'TESTRC' BIT
0709 A0           2704         MOV     @R0,A
                  2705
                  2706 ; SET UP FOR DIGITAL I.C. STATUS REG. TEST
070A BC00         2707         MOV     R4,#WRDIG
070C BD00         2708         MOV     R5,#RDDIG
070E 85           2709         CLR     F0      ; DIG. TEST--F0=0, CDR TEST--F0=1
                  2710
070F BA02         2711 DIG1:   MOV     R2,#2           ; INIT. TEST COUNTER
0711 B84B         2712         MOV     R0,#(LOW DTDATA) ; INITIALIZE TEST DATA POINTER
                  2713
                  2714 ; LOAD TEST DATA INTO CUSTOM I.C.'S REG.
0713 FC           2715 DIG2:   MOV     A,R4
0714 9400         2716         CALL    XMIT4
0716 F8           2717         MOV     A,R0
0717 A3           2718         MOVP    A,@A    ; LOAD TEST DATA INTO CUSTOM I.C. REG.
0718 9406         2719         CALL    XMIT8
                  2720
                  2721 ; VERIFY THAT DATA WERE WRITTEN CORRECTLY
071A FD           2722         MOV     A,R5
071B 9400         2723         CALL    XMIT4
071D 941C         2724         CALL    RCV8
071F A9           2725         MOV     R1,A
0720 F8           2726         MOV     A,R0
0721 A3           2727         MOVP    A,@A
0722 D9           2728         XRL     A,R1    ; COMPARE READ DATA WITH TEST DATA
0723 C62F         2729         JZ      NXTDIG
                  2730
                  2731 $EJECT
                  2732 ; DATA DO NOT MATCH -- ERROR DETECTED
0725 B92B         2733         MOV     R1,#TESTRC
0727 B62B         2734         JF0     CDRF
0729 B92C         2735         MOV     R1,#TESTRD
072B FF           2736 CDRF:   MOV     A,R7
072C 37           2737         CPL     A
072D 41           2738         ORL     A,@R1   ; SET BIT CORRESPONDING TO THIS LINE CKT.
072E A1           2739         MOV     @R1,A
                  2740
                  2741 NXTDIG:
072F 18           2742         INC     R0      ; ADJUST TEST DATA POINTER FOR NEXT TEST ITER.
0730 EA13         2743         DJNZ    R2,DIG2
                  2744
0732 FC           2745         MOV     A,R4
```

```
0733 9400    2746           CALL    XMIT4
0735 23FF    2747           MOV     A,#ICODEC
0737 B63E    2748           JF0     CINIT
0739 2330    2749           MOV     A,#LCST1
073B 6E      2750           ADD     A,R6
073C A9      2751           MOV     R1,A
073D F1      2752           MOV     A,@R1
             2753
073E 9406    2754 CINIT:    CALL    XMIT8   ; RESORE CONTENTS OF REGISTER
             2755
0740 B64A    2756           JF0     DIGEND  ; HAS CDR TEST BEEN PERFORMED?
             2757
             2758 ; SET UP FOR CDR TEST
0742 BC20    2759           MOV     R4,#WRCDRC
0744 BDA0    2760           MOV     R5,#RDCDR
0746 85      2761           CLR     F0
0747 95      2762           CPL     F0      ; SET F0 (INDICATES CDR TEST PHASE)
0748 E40F    2763           JMP     DIG1
             2764
             2765 ; DIGITAL I.C. TEST COMPLETED
074A 83      2766 DIGEND:   RET
             2767
             2768 ; DIGITAL I.C. TEST DATA
             2769 ;++++++++++++++++++++++++++++++++++++++++
074B 63      2770 DTDATA:   DB      063H    ; TEST DATA BYTE 1
074C 9C      2771           DB      09CH    ;   "    "    "  2
             2772 ;++++++++++++++++++++++++++++++++++++++++
             2773
             2774 ;*** END OF DIGICT ***
             2775 $EJECT
             2776
             2777 ;         NAME            ANAICT
             2778
             2779 ;
             2780 ;
             2781 ;
             2782
             2783 ; ANAICT — CHECKS ANALOG PER-LINE CUSTOM I.C.'S
             2784
             2785 ANAICT:
             2786 ; RESET LINE CKT'S 'TESTRA' BIT
074D B92D    2787           MOV     R0,#TESTRA
074F F0      2788           MOV     A,@R0
0750 5F      2789           ANL     A,R7
0751 A0      2790           MOV     @R0,A
             2791
0752 B994    2792           MOV     R0,#(LOW ATDATA) ; INITIALIZE TEST DATA POINTER
0754 BA02    2793           MOV     R2,#2            ; INITIALIZE TEST DATA COUNTER
             2794
             2795 ; LOAD TEST DATA INTO ANALOG I.C.'S REG
0756 2340    2796 ANA3:     MOV     A,#WRANA
0758 9400    2797           CALL    XMIT4
075A BC03    2798           MOV     R4,#3   ; INIT. BYTE COUNTER
             2799
075C F8      2800 ANA35:    MOV     A,R0
075D A3      2801           MOVP    A,@A    ; FETCH NEXT TEST DATA BYTE
075E 9406    2802           CALL    XMIT8   ; LOAD NEXT BYTE OF TEST DATA INTO ANA REG
```

```
0760 18        2803          INC    R0        ; INCREMENT TEST DATA POINTER
0761 EC5C      2804          DJNZ   R4,ANA35
               2805
               2806 ; VERIFY THAT DATA WERE WRITTEN CORRECTLY
0763 C8        2807          DEC    R0
0764 C8        2808          DEC    R0
0765 C8        2809          DEC    R0
0766 23C0      2810          MOV    A,#RDANA
0768 9400      2811          CALL   XMIT4
               2812
076A BC03      2813          MOV    R4,#3     ; INIT. BYTE COUNTER
               2814
076C 941C      2815 ANA4:    CALL   RCY8      ; VERIFY NEXT BYTE
076E A9        2816          MOV    R1,A
076F F8        2817          MOV    A,R0
0770 A3        2818          MOVP   A,@A
0771 D9        2819          XRL    A,R1
0772 18        2820          INC    R0
0773 967C      2821          JNZ    ANAF
0775 EC6C      2822          DJNZ   R4,ANA4
               2823
0777 EA56      2824          DJNZ   R2,ANA3
               2825
               2826 $EJECT
               2827 ANA5:
               2828 ; TEST COMPLETED----RELOAD ANALOG REG. WITH DATA STORED IN RAM
0779 3492      2829          CALL   LDGAIN
077B 83        2830          RET
               2831
               2832 ANAF:
               2833 ; ERROR WAS DETECTED
077C B82D      2834          MOV    R0,#TESTRA
077E FF        2835          MOV    A,R7
077F 37        2836          CPL    A
0780 40        2837          ORL    A,@R0     ; SET 'ANA I.C. FAILS' FLAG
0781 A0        2838          MOV    @R0,A
0782 E479      2839          JMP    ANA5
               2840
               2841 ; ANALOG I.C. TEST DATA
               2842 ;++++++++++++++++++++++++++++++++++++++++++++++++++++++++
0784 63        2843 ATDATA: DB     063H,   0C1H,   0F8H   ; TEST DATA TRIPLET 1
0785 C1
0786 F8
0787 9C        2844          DB     09CH,   03EH,   007H  ;  "    "    "    "  2
0788 3E
0789 07

2845 ;++++++++++++++++++++++++++++++++++++++++++++++++++++++++
               2846
               2847 ;*** END OF ANAICT ***
               2848 $EJECT
               2849
               2850 ;        NAME           RAMT
               2851
               2852 ;
               2853 ;
               2854 ;
               2855
```

```
                    2856 ; RAMT -- CHECKS 8049'S DATA MEMORY
                    2857
                    2858 RAMT:
                    2859 ; LOAD DATA MEMORY WITH TEST PATTERN 1 (EVEN BYTES=55H, ODD BYTES=AAH)
078A B87F           2860          MOV     R0,#LSTBYT
078C 23AA           2861          MOV     A,#0AAH
078E A0             2862 RAMT1:   MOV     @R0,A
078F 37             2863          CPL     A
0790 E88E           2864          DJNZ    R0,RAMT1
                    2865
                    2866 ; VERIFY TEST PATTERN 1
0792 B87F           2867          MOV     R0,#LSTBYT      ; (7FH IN THE 8049)
0794 B93F           2868          MOV     R1,#(LSTBYT-1)/2 ; (3FH)
0796 F0             2869 RAMT2:   MOV     A,@R0
0797 D3AA           2870          XRL     A,#0AAH
0799 96C4           2871          JNZ     RAMF
079B C8             2872          DEC     R0
079C F0             2873          MOV     A,@R0
079D D355           2874          XRL     A,#55H
079F 96C4           2875          JNZ     RAMF
07A1 C8             2876          DEC     R0
07A2 E996           2877          DJNZ    R1,RAMT2
                    2878
                    2879 ; LOAD DATA MEMORY WITH TEST PATTERN 2 (EVEN BYTES=AAH, ODD BYTES=55H)
07A4 B87F           2880          MOV     R0,#LSTBYT
07A6 2355           2881          MOV     A,#55H
07A8 A0             2882 RAMT3:   MOV     @R0,A
07A9 37             2883          CPL     A
07AA E8A8           2884          DJNZ    R0,RAMT3
                    2885
                    2886 $EJECT
                    2887 ; VERIFY TEST PATTERN 2
07AC B87F           2888          MOV     R0,#LSTBYT      ; (7FH)
07AE B93F           2889          MOV     R1,#(LSTBYT-1)/2 ; (3FH)
07B0 F0             2890 RAMT4:   MOV     A,@R0
07B1 D355           2891          XRL     A,#55H
07B3 96C4           2892          JNZ     RAMF
07B5 C8             2893          DEC     R0
07B6 F0             2894          MOV     A,@R0
07B7 D3AA           2895          XRL     A,#0AAH
07B9 96C4           2896          JNZ     RAMF
07BB C8             2897          DEC     R0
07BC E9B0           2898          DJNZ    R1,RAMT4
                    2899
                    2900 ; RAM TEST PASSED----CLEAR 'RAM TEST FAILED' BIT OF 'TESTR'
07BE B82A           2901          MOV     R0,#TESTR
07C0 B000           2902          MOV     @R0,#0  ; RESET 'TEST RESULTS' BYTE
                    2903
                    2904 ; RETURN TO SLFTST
07C2 C402           2905          JMP     RAMRET ; RAM TEST ROUTINE'S RETURN ADDRESS
                    2906
                    2907 RAMF:
                    2908 ; RAM TEST FAILED----SET 'RAM TEST FAILED' BIT OF 'TESTR'
07C4 B82A           2909          MOV     R0,#TESTR
07C6 B001           2910          MOV     @R0,#01H        ; SET 'RAM TEST FAILED' BIT
                    2911
                    2912 ; RETURN TO SLFTST
```

```
07C8 C402      2913            JMP     RAMRET
               2914
               2915 ;*** END OF RAMT ***
               2916 $EJECT
               2917
               2918 ;        NAME            GETROM
               2919
               2920 ;
               2921 ;
               2922 ;
               2923
               2924 ; GETROM -- FETCH BYTE OF PROGRAM MEMORY
               2925
               2926 ;       R2 = PAGE ADDRESS (0 - 7)
               2927 ;       R3 = BYTE ADDRESS (0 TO 0FFH)
               2928
07DD           2929            ORG     7DDH
               2930 GETROM:
07DD FA        2931            MOV     A,R2    ; FETCH PAGE ADDRESS
07DE 5307      2932            ANL     A,#7
07E0 03E3      2933            ADD     A,#(LOW ROMTBL)
07E2 B3        2934            JMPP    @A
               2935
               2936 ROMTBL:
               2937 ; PROGRAM MEMORY PAGE JUMP TABLE
07E3 EB        2938            DB      (LOW ($+8))
07E4 ED        2939            DB      (LOW ($+9))
07E5 EF        2940            DB      (LOW ($+10))
07E6 F1        2941            DB      (LOW ($+11))
07E7 F3        2942            DB      (LOW ($+12))
07E8 F5        2943            DB      (LOW ($+13))
07E9 F7        2944            DB      (LOW ($+14))
07EA F9        2945            DB      (LOW RDPG7)
               2946
07EB 04FD      2947            JMP     RDPG0
07ED 24FD      2948            JMP     RDPG1
07EF 44FD      2949            JMP     RDPG2
07F1 64FD      2950            JMP     RDPG3
07F3 84FD      2951            JMP     RDPG4
07F5 A4FD      2952            JMP     RDPG5
07F7 C4FD      2953            JMP     RDPG6
07F9 FB        2954 RDPG7:     MOV     A,R3    ; FETCH BYTE ADDRESS
07FA A3        2955            MOVP    A,@A    ; FETCH ROM DATA BYTE
07FB 83        2956            RET
               2957
               2958 ;++++++++++++++++++++++++
               2959 ; ROM TEST CHECKSUM BYTE
07FC 00        2960            DB      0
               2961 ;++++++++++++++++++++++++
               2962 $EJECT
               2963 ; ROMT---PAGE 0
00FD           2964            ORG     0FDH
00FD FB        2965 RDPG0:     MOV     A,R3    ; FETCH BYTE ADDRESS
00FE A3        2966            MOVP    A,@A    ; FETCH ROM DATA BYTE
00FF 83        2967            RET
               2968
               2969 ; ROMT---PAGE 1
```

```
01FD           2970           ORG     1FDH
01FD FB        2971 RDPG1:    MOV     A,R3
01FE A3        2972           MOVP    A,@A
01FF 83        2973           RET
               2974
               2975 ; ROMT----PAGE 2
02FD           2976           ORG     2FDH
02FD FB        2977 RDPG2:    MOV     A,R3
02FE A3        2978           MOVP    A,@A
02FF 83        2979           RET
               2980
               2981 ; ROMT----PAGE 3
03FD           2982           ORG     3FDH
03FD FB        2983 RDPG3:    MOV     A,R3
03FE A3        2984           MOVP    A,@A
03FF 83        2985           RET
               2986
               2987 ; ROMT----PAGE 4
04FD           2988           ORG     4FDH
04FD FB        2989 RDPG4:    MOV     A,R3
04FE A3        2990           MOVP    A,@A
04FF 83        2991           RET
               2992
               2993 ; ROMT----PAGE 5
05FD           2994           ORG     5FDH
05FD FB        2995 RDPG5:    MOV     A,R3
05FE A3        2996           MOVP    A,@A
05FF 83        2997           RET
               2998
               2999 ; ROMT----PAGE 6
06FD           3000           ORG     6FDH
06FD FB        3001 RDPG6:    MOV     A,R3
06FE A3        3002           MOVP    A,@A
06FF 83        3003           RET
               3004
               3005 ;*** END OF GETROM ***
               3006 $EJECT
```

What is claimed is:

1. In a telephone switching system,
a first line clock having a given frequency;
a second line clock having said given frequency;
first clock signal means for deriving a first clock from said first line clock;
second clock signal means for deriving a second clock from said second line clock;
first selector means coupled to said first and second clock signal means for selecting one of said first and second clock as a clock output in response to first control signals;
failure detecting means for detecting failures in said first and second line clocks and for providing signals indicating a failure; and
a microprocessor coupled to said first selector means for providing said first control signals to select said one of said first and second clocks, said microprocessor being coupled to said failure detecting means and responsive to said failure detecting means indicting a failure in said selected one clock for generating second control signals to cause said first selector means to select the other one of said first and second clocks as said clock output.

2. An arrangement in accordance with claim 1, wherein said telephone switching system comprises a system controller, said system controller providing control information for use by said microprocessor to initially select said one of said first and second clocks.

3. An arrangement in accordance with claim 2, wherein said microprocessor independently selects the other one of said first and second clocks when said failure detecting means indicates a failure in said selected one clock.

4. An arrangement in accordance with claims 1, 2 or 3, further comprising:
a phase-locked oscillator coupled to said clock output for generating output clock signals having a predetermined phase relationship to said clock output.

5. In a telephone switching system,
a system controller;
a switching network;
a plurality of time-division multiplexed lines coupled to said switching network, each of said plurality of time-division multiplexed lines having associated therewith a line clock having a given frequency; and
a line switch coupled to said plurality of lines and to each of said line clocks;
said line switch comprising:
first clock deriving means for deriving a first clock signal from a first line clock;
second clock deriving means for deriving a second clock signal from a second line clock;
third clock deriving means for deriving a third clock signal from a third line clock;
first failure detecting means for detecting failures in said first, second and third line clocks and for generating first failure signals when a failure is detected;
first selector means coupled to said first, second and third clock deriving means for selecting one of said first, second, and third clock signals as a first clock output in response to first selection signals;
second selector means coupled to said first, second and third clock deriving means for selecting one of said first, second and third clock signals as a second clock output in response to second selector signals;
a first microprocessor for generating said first selection signals;
first coupling means coupling said first microprocessor to said system controller, said system controller controlling said first microprocessor such that said first microprocessor generates said first selection signals to initially select one of said first, second and third clock signals as said first clock output;
said first microprocessor being responsive to said first failure detecting means indicating a failure in said selected one clock signal to generate third selection signals for selecting another one of said first, second and third clock signals as said first clock output;
a second microprocessor for generating said second selection signals;
said first coupling means coupling said second microprocessor to said system controller, said system controller controlling said second microprocessor such that said second microprocessor generates said second selection signals to initially select a first one of said first, second and third clock signals as said second clock output; and
said second microprocessor being responsive to said first failure detecting means indicating a failure in said selected first one clock signal to generate forth selection signals for selecting a second one of said first, second and third clock signals as said second clock output.

6. An arrangement in accordance with claim 5, wherein said first coupling means comprises:
a third microprocessor;
first channel means for carrying first control information between said third microprocessor and said system controller; second channel means for carrying second control information between said third microprocessor and said first first microprocessor;
said third microprocessor controlling said first microprocessor in response to said first control information.

7. An arrangement in accordance with claim 5, wherein said first channel means comprises common channels on each of said lines.

8. An arrangement in accordance with claims 5, 6, or 7, further comprising:
first oscillator means for generating a first synchronized clock signal having a predetermined phase relationship to said first clock output;
second oscillator means for generating a second synchronized clock signal having a predetermined phase relationship to said second clock output;
first output selection means for selecting one of said first and second synchronized clock signals as a first output;
said first microprocessor being operative to control said first output selection means.

9. An arrangement in accordance with claim 8, wherein said first microprocessor initially selects one of said first and second synchronized clock signals as said first output; and
said arrangement further comprises second failure detecting means,
said second failure detecting means being operative to control said first output selection means.

10. An arrangement in accordance with claim 8, wherein said first coupling means comprises:
a fourth microprocessor;
third channel means for carrying third control information between said fourth microprocessor and said second microprocessor;
whereby said fourth microprocessor controls said second microprocessor in response to said third control information.

11. An arrangement in accordance with claim 10, further comprising:
second output selection means for selecting one of said first and second synchronized clocks signals as a second output;
said second microprocessor being operative to control said second output selector means.

12. An arrangement in accordance with claim 11, further comprising:
second failure detecting means for detecting failures in said first and second synchronized clock signals and operative to control said first and second output selection means.

13. An arrangement in accordance with claim 12, wherein said first microprocessor initially selects one of said first and second synchronized clock signals as said first output; and
said second microprocessor initially selects one of said first or second synchronized clock signals as said second output.

14. An arrangement in accordance with claim 13, wherein said system controller provides control information for directing said first and second microprocessors to initially select one of said first and second synchronized clocks as said first and second outputs.

15. An arrangement in accordance with claim 14, wherein said first oscillator means comprises a phase-locked loop;
a controlled oscillator; and
a third failure detecting means for detecting loss of a phase-locked condition and for generating a third failure signal when said phase-locked condition is lost, said first microprocessor in response to said third failure signal selecting said second synchronized clock as said first output.

16. A line switch coupled to a switching system having a system controller, said line switch comprising:
- a first microprocessor coupled to said system controller, said first microprocessor being responsive to commands from said system controller to control portions of said line switch;
- a first clock generation circuit for providing output clock signals having a predetermined relationship to a predetermined one of a plurality of input clock signals; and
- a second microprocessor coupled to said first microprocessor and to said first clock generation circuit, said second microprocessor being responsive to said first microprocessor for controlling said first clock generation circuit to select one of said plurality of input clock signals as said predetermined one.

17. A line switch in accordance with claim 16, wherein said first clock generation circuit includes first failure detection means for detecting the occurrence of a first failure in said predetermined one input clock signal;
- said second microprocessor being coupled to said first failure detector means and responsive to the detection of said first failure for controlling said first clock generation circuit such that a different one of said plurality of input clock signals is selected as said predetermined one.

18. A line switch in accordance with claim 16, further comprising:
- a second clock generation circuit for providing second output clock signals having a predetermined relationship to a second predetermined one of said plurality of input clock signals;
- a third microprocessor coupled to said system controller and responsive to commands from said system controller; and
- a fourth microprocessor coupled to said third microprocessor and to said second clock generation circuit, said fourth microprocessor being responsive to said third microprocessor for controlling said second clock generation circuit to select one of said plurality of input clock signals as said second predetermined one.

19. A line switch in accordance with claim 18, further comprising:
- first failure detection means for detecting the occurrence of a first failure in said predetermined one input clock signal and for detecting the occurrence of a second failure in said second predetermined one input clock signal;
- said second microprocessor being coupled to said first failure detection means and being responsive to the detection of said first failure for controlling said first clock generation circuit such that a different one of said plurality of input clock signals is selected as said predetermined one.

20. A line switch in accordance with claim 19, wherein
- said fourth microprocessor is coupled to said first failure detection means and is responsive to the detection of said second failure for controlling said second clock generation circuit such that a second different one of said plurality of input clock signals is selected as said second predetermined one.

21. A line switch in accordance with claim 20, wherein said predetermined one and said second predetermined one of said plurality of input clock signals are the same.

22. A line switch in accordance with claim 21, wherein said second microprocessor transmits first information to said first microprocessor when said different one of said input clock signals is selected as said predetermined one;
- said first microprocessor transmits said first information to said system controller,
- said system controller transmits second information to said fourth microprocessor in response to said first information; and
- said third microprocessor in response to said second information transmits control information to said fourth microprocessor causing said fourth microprocessor to select said different one input clock signal as said second different one of said input clock signals.

23. A line switch in accordance with claims 18, 19, 20, 21, or 22, wherein said first clock generating means comprises:
- first oscillator means for providing a first output clock signal having a predetermined relationship to said predetermined one of said input clock signals; and
- said second clock generating means comprises second oscillator means for providing a second output clock signal having a predetermined relationship to said second predetermined one of said input clock signals.

24. A line switch in accordance with claim 23, further comprising
- output selection means for selecting one of said first and second output clock signals as a final output clock signal;
- said second microprocessor controlling said output selection means to initially select one of said first and second output clock signals.

25. A line switch in accordance with claim 24, further comprising:
- second failure detection means for detecting failure in said first and second output clock signals;
- said second failure detection means being coupled to said output selection means for causing said selection means to select the other of said first and second output signals when a failure is detected in said initially selected one of said first or second output signals.

26. A line switch in accordance with claim 25, further comprising:
- second output selection means for selecting one of said first and second output clocks signals as a second final output clock signal;
- said fourth microprocessor being coupled to said second output selections means to initially select one of said first and second output clock signals.

27. A line switch in accordance with claim 26, wherein said second failure detection means is coupled to said second output selection means for causing said second selection means to select the other of said first and second output signals when a failure is detected in said first and second output signals initially selected by said fourth microprocessor.

28. A line switch in accordance with claim 26, wherein said second and fourth microprocessors initally select one of said first and second output signals under respective control of said first and third microprocessors.

* * * * *